Oct. 8, 1957 R. B. TROUSDALE 2,809,235

TELEPHONE SYSTEM

Filed Feb. 11, 1953 37 Sheets-Sheet 1

INVENTOR.
Robert B. Trousdale
BY
T. L. Bowes
Att'y.

INVENTOR.
Robert B. Trousdale
BY
J. L. Bowes
Atty.

Oct. 8, 1957 R. B. TROUSDALE 2,809,235

TELEPHONE SYSTEM

Filed Feb. 11, 1953 37 Sheets-Sheet 3

INVENTOR.
Robert B. Trousdale
BY
J. L. Bowes
Att'y

INVENTOR.
Robert B. Trousdale
BY
Att'y

Second Hundreds Group-13

INVENTOR.
Robert B. Trousdale
BY
J. L. Bowes
Att'y

INVENTOR.
Robert B. Trousdale
BY T. L. Bowes
Att'y

INVENTOR.
Robert B. Trousdale
BY
T. L. Bowes
Att'y

INVENTOR.
Robert B. Trousdale
BY
T. L. Bowes
Att'y

INVENTOR.
Robert B. Trousdale
BY
J. L. Bowes
Att'y

REVERTIVE CALL ACCEPTOR-121a

INVENTOR.
Robert B. Trousdale
BY
T. L. Bowes
Atty.

Oct. 8, 1957 R. B. TROUSDALE 2,809,235

TELEPHONE SYSTEM

Filed Feb. 11, 1953 37 Sheets-Sheet 11

REVERTIVE CALL SELECTOR-121b

INVENTOR.
Robert B. Trousdale
BY
[signature]
atty.

INVENTOR.
Robert B. Trousdale
BY
T. L. Bowes
Att'y

Tenth Hundreds Group-14

INVENTOR.
Robert B. Trousdale
BY
T. L. Bowes
Att'y

INVENTOR.
Robert B. Trousdale
BY
J. L. Bowes
Att'y

INVENTOR.
Robert B. Trousdale
BY
J. L. Bowes
Att'y

INVENTOR.
Robert B. Trousdale
BY
T. L. Bowes
Att'y

INVENTOR.
Robert B. Trousdale
BY T. L. Bowes
Att'y

Oct. 8, 1957 R. B. TROUSDALE 2,809,235

TELEPHONE SYSTEM

Filed Feb. 11, 1953 37 Sheets-Sheet 18

INVENTOR.
Robert B. Trousdale
BY
T. L. Bowes
Att'y

Selector-130 b

INVENTOR.
Robert B. Trousdale
BY
T. L. Bowes
Atty.

INVENTOR.
Robert B. Trousdale
BY
T. L. Bowes
Att'y

Oct. 8, 1957 R. B. TROUSDALE 2,809,235

TELEPHONE SYSTEM

Filed Feb. 11, 1953 37 Sheets-Sheet 21

INVENTOR.
Robert B. Trousdale
BY J. L. Bowes
Atty.

INVENTOR.
Robert B. Trousdale
BY T. L. Bowes
Atty

INVENTOR.
Robert B. Trousdale
BY
T. L. Bowes
Atty

Oct. 8, 1957 R. B. TROUSDALE 2,809,235

TELEPHONE SYSTEM

Filed Feb. 11, 1953 37 Sheets-Sheet 24

INVENTOR.
Robert B. Trousdale
BY
J. L. Bowes
Atty.

Oct. 8, 1957 R. B. TROUSDALE 2,809,235

TELEPHONE SYSTEM

Filed Feb. 11, 1953 37 Sheets-Sheet 25

INVENTOR.
Robert B. Trousdale
BY
T. L. Bowes
Att'y

INVENTOR.
Robert B. Trousdale
BY
T. L. Bowes
Attorney

Oct. 8, 1957 R. B. TROUSDALE 2,809,235

TELEPHONE SYSTEM

Filed Feb. 11, 1953 37 Sheets-Sheet 27

INVENTOR.
Robert B. Trousdale
BY
T. L. Bowes
Attorney

INVENTOR.
Robert B. Trousdale
BY
T. L. Bowes
Attorney

INVENTOR.
Robert B. Trousdale
BY
T. L. Bowes
Attorney

Oct. 8, 1957 R. B. TROUSDALE 2,809,235

TELEPHONE SYSTEM

Filed Feb. 11, 1953 37 Sheets-Sheet 30

SEQUENCE CHART FOR

INVENTOR.
Robert B. Trousdale
BY
T. L. Bowes
Atty.

Oct. 8, 1957 R. B. TROUSDALE 2,809,235

TELEPHONE SYSTEM

Filed Feb. 11, 1953 37 Sheets-Sheet 31

INVENTOR.
Robert B. Trousdale
BY
J. L. Bowes
Atty.

INVENTOR.
Robert B. Trousdale
BY
T. L. Bowes
Attorney

Oct. 8, 1957 R. B. TROUSDALE 2,809,235

TELEPHONE SYSTEM

Filed Feb. 11, 1953 37 Sheets-Sheet 33

INVENTOR.
Robert B. Trousdale
BY T. L. Bowes
Attorney

Revertive Call Selector 121b

INVENTOR.
Robert B. Trousdale
BY
J. L. Bowes
Att'y.

Oct. 8, 1957 R. B. TROUSDALE 2,809,235

TELEPHONE SYSTEM

Filed Feb. 11, 1953 37 Sheets-Sheet 35

INVENTOR.
Robert B. Trousdale
BY J. L. Bowes
Atty.

Revertive Call Selector 121b

INVENTOR.
Robert B. Trousdale
BY
J. L. Bowes
Att'y.

INVENTOR.
Robert B. Trousdale
BY
Atty.

2,809,235
Patented Oct. 8, 1957

2,809,235

TELEPHONE SYSTEM

Robert B. Trousdale, Webster, N. Y., assignor, by mesne assignments, to General Dynamics Corporation, a corporation of Delaware Application February 11, 1953, Serial No. 336,317

61 Claims. (Cl. 179—17)

The present invention relates to improved methods and apparatus for selectively setting up signal transmission connections between the lines of a signalling system, and, more particularly, to improve methods and apparatus for setting up two-way communication connections between the lines of an automatic telephone system, wherein a large number of lines are serviced and facilities are provided for handling revertive calls between different substations associated with any one line of the system. Specifically, the present invention is directed to certain improvements in a fully automatic telephone system of the electronic type, such as disclosed in the co-pending applications of Frank A. Morris and Robert B. Trousdale, Serial No. 134,974, filed on December 24, 1949, and Serial No. 326,213, filed on December 16, 1952, and my co-pending applications Serial No. 301,215, filed July 28, 1952, and Serial No. 336,316, filed on February 11, 1953, all of which applications are assigned to the same assignee as the present invention, whereby a relatively large telephone office may be serviced and revertive calls may be set up between different substations associated with any one line thereof.

Many types of automatic switching apparatus have been proposed and developed for transmitting signals between the lines of telephone, telegraph and other communication systems. In the main, the apparatus proposed and developed for this purpose utilizes electro-mechanical devices embodying moving mechanical parts, such, for example, as relays, stepping switches, and the like, to perform the line selecting, line interconnecting and ancillary functions required in selectively interconnecting any two lines of a large group of lines. While apparatus of this type and embodying switching devices of various forms has been developed to provide thoroughly reliable service, it is inherently subject to several limitations including that of insufficient operating speed. To overcome these limitations various proposals have been made for utilizing electronic facilities, such, for example, as cathode ray tubes, for the purpose of transmitting signals between the lines of a signalling system on a selective basis. However, most of these proposals are limited to arrangements for providing signal transmission between a relatively small number of lines, such as 20 lines, and include no provisions whatever for accommodating the large number of subscriber lines necessary to any practical, commercially acceptable system.

In the improved system disclosed in the co-pending application, Serial No. 326,213, identified above, there is disclosed an electronic telephone system wherein a large number of subscriber lines, such as 1,000 lines, may be serviced from the same common equipment. While this system is entirely satisfactory in operation, no provisions are made therein for setting up revertive calls between different substations associated with any one of the 1,000 lines of the system. Also, in the co-pending application, Serial No. 336,316, identified above, there is disclosed an electronic telephone system wherein revertive call facilities are provided for setting up revertive calls between different sub-stations associated with the same line in a 100 line office. While this system is also entirely satisfactory in operation, no provisions are made therein for servicing a relatively large number of subscriber lines. It would, therefore, be desirable to provide revertive call facilities for a large electronic office, and furthermore, to provide trunks common to all of the lines of the large electronic office for setting up revertive calls.

Accordingly, it is an object of the present invention to provide new and improved methods and apparatus for selectively setting up two-way communication connections between the lines of a signalling system wherein facilities are provided for setting up revertive calls between different substations associated with any one of the lines of a relatively large system.

It is another object of the present invention to provide an automatic telephone system capable of providing the services of an electro-mechanical switch type system, including revertive call facilities for a relatively large telephone office, but which consists exclusively of electron conducting devices, such, for example, as electron tubes, gas tubes, crystal rectifiers, semi-conductors, and the like, together with interconnecting circuit components therefor.

It is a further object of the present invention to provide a new and improved electronic telephone system for a relatively large telephone office wherein trunks common to the entire telephone office are employed to set up revertive calls between different substations associated with any one of the lines of the system.

It is a still further object of the present invention to provide a new and improved electronic telephone system for a relatively large telephone office wherein revertive calls between different substations associated with the same line may be established and wherein facilities are provided for releasing at least a portion of the linkage employed to establish the revertive call after the revertive call is answered.

Another object of the present invention resides in the provision of a new and improved electronic telephone system wherein revertive calls between different substations associated with any one line of the system may be established in response to dialing of a special number other than the normally used directory number assigned to the one line.

Still another object of the present invention resides in the provision of a new and improved electronic telephone system wherein party line identification facilities are provided for registering information concerning the calling substation.

A further object of the present invention resides in the provision of a new and improved electronic telephone system for a relatively large telephone office wherein revertive calls between different substations associated with the same line may be established and wherein facilities are provided for transmitting a ringing signal to both the calling and called substations on a revertive call.

A still further object of the present invention resides in the provision of a new and improved automatic telephone system wherein party line ringing signals are employed selectively to signal different substations associated with the same line, and wherein both the calling and called substations are rung during the setting up of a revertive call between different substations associated with the same line.

It is another object of the present invention to provide a new and improved electronic telephone system for a relatively large telephone office wherein party line ringing on a frequency selective basis is employed and wherein revertive calls between different substations associated with the same line may be established, both the calling and called substations being rung during the setting up of a revertive call.

It is a still further object of the present invention to provide a new and improved electronic telephone system for a relatively large telephone office wherein revertive calls between different substations associated with the same line may be established and wherein at least a portion of the linkage employed to establish a revertive call may also be employed to set up a nonrevertive call, on either a private or a party line basis.

Another object of the present invention resides in the provision of a new and improved electronic telephone system for a relatively large telephone office, wherein linkage which is common to all of the lines of the office is employed for setting up revertive calls between different substations associated with any one one line of the system, and wherein a special control channel is provided between the revertive call linkage and other portions of the system.

The invention, both as to its organization and method of operation, together with further objects and advantages thereof, will best be understood with reference to the following specification, taken in connection with the accompanying drawings, in which:

Figs. 3 to 12, inclusive, when arranged in the manner shown in Fig. 1, diagrammatically illustrate an automatic telephone system characterized by the features of the present invention;

Figs. 3A and 3B when arranged in the manner shown in Fig. 21, diagrammatically illustrate the components of one of the finder-selector links embodied in the system shown in Figs. 3 to 12, inclusive;

Figs. 4A, 4B and 4C, when arranged in the manner shown in Fig. 20, diagrammatically illustrate the components of one of the acceptor-connector links embodied in the system shown in Figs. 3 to 12, inclusive;

Figs. 5A and 5B, when arranged in the manner shown in Fig. 22, diagrammatically illustrate the components of one of the revertive call trunks embodied in the system shown in Figs. 3 to 12, inclusive;

Figs. 13 to 18, inclusive, when arranged in the manner shown in Fig. 2, illustrate schematically the details of the selector portion of one of the finder-selector links diagrammatically illustrated in Figs. 3A and 3B;

Fig. 19 is a schematic diagram showing the details of the acceptor portion of one of the revertive call trunks diagrammatically illustrated in Figs. 5A and 5B;

Figs. 24 to 27, inclusive, when arranged in the manner shown in Fig. 28 are graphs illustrating the operating characteristics of certain components of the system;

Figs. 29 and 30, when arranged in the manner shown in Fig. 23, are timing diagrams illustrating certain of the potentials developed by certain components of the system;

Figs. 33 to 36, inclusive, when arranged in the manner shown in Fig. 37, illustrate schematically the details of the selector portion of one of the reverting call trunks diagrammatically illustrated in Figs. 5A and 5B; and Figs. 31 and 32 are timing diagrams also illustrating certain wave forms developed in the system of Figs. 3 to 12, inclusive.

In general, the electronic telephone system herein disclosed is capable of serving a relatively large group of lines, each of which may have associated therewith a number of party line substations, up to maximum of ten such party line substations for each line. More specifically, the system is capable of providing two-way communication connections between any two lines of a relatively large telephone office, on either a private or party line basis, and includes entirely novel facilities for performing the functions of:

(1) Associating the revertive calling line with a revertive call trunk in response to dialing of a special revertive call number at the calling substation.

(2) Identifying the party line ringing frequency or code assigned to the calling party in accordance with one of the digits dialed at the calling substation and registering the same.

(3) Identifying the party line ringing frequency or code assigned to the called party in accordance with one of the digits dialed at the calling substation and registering the same.

(4) Transmitting revertive ringing signals over the revertive calling line in accordance with the ringing frequency or code assigned to both the calling and called parties.

(5) Transmitting a special revertive call tone to the answering party to inform him of the nature of the revertive call.

(6) Releasing the revertive call trunk as soon as the revertive call is answered while busying the revertive calling line to the other linkage of the system.

(7) Releasing all of the linkage involved in setting up a revertive call after the revertive call is terminated.

All of the above functions are accomplished on a fully automatic basis without the use of any relays, stepping switches, or other mechanical devices having moving parts.

In the above identified co-pending application, Serial No. 326,213, a system of multiplexing, namely pulse sampling effectively at an ultrasonic rate of the control and intelligence signals produced on each line of the system to provide signal channel separation. Specifically, the 1,000 lines of the system disclosed in this co-pending application are divided into ten groups or levels of 100 lines each, and the 100 lines of each line group have individually assigned thereto different pulse time positions in repetitive time position frames, each frame comprising 100 pulse time positions. Thus, each pulse time position is assigned to one line in each hundreds line group. Each line group consisting of 100 lines is designated as a particular hundreds digit line group and the lines of each hundreds digit line group also have collectively assigned thereto a group of ten of said pulse time positions, or trunk group positions, which identify the hundreds digit position or level of these lines in the 1,000 line system.

In accordance with the present invention, one of the hundreds digit line groups, in the illustrated embodiment the first hundreds digit line group, is omitted and the trunk group positions normally assigned to this hundreds line group are employed to identify revertive call trunks which service all of the other lines of the system. Accordingly, in the system of the present invention, a group of 900 lines are provided, which are arranged in nine hundreds digit line groups, and a group of ten revertive call trunks are provided to service the 900 lines of the system and to set up revertive calls between different substations associated with any one line of the system.

Intelligence and control signals developed on any one line in a given hundreds digit line group are sampled only in the particular pulse time position assigned to said one line, and the samples are carried through the signal transmitting components of the system as far as the hundreds group selector stage on multiplexer signal pulses occurring in this particular time position. In the hundreds group selector stage, the control and intelligence signals carried by the multiplexer signal pulses are detected and either used for control purposes, such as called line hundreds group selection, or are superimposed on selector forward signal pulses occurring in an idle one of the ten time positions assigned to the hundreds line group which includes the called line. These samples are then carried through the signal transmitting components of the system as far as the line selector or connector stage on the selector forward signal pulses occurring in the selected time position. In the connector stage, the control and intelligence signals carried by the selector forward signal pulses are detected and either used for control purposes, such as called line selection within the called hundreds line group, or are superimposed on connector signal pulses occurring in the time position assigned to the called line within the called hundreds line group for redistribution to the substations associated with the called line. The reverse process is employed in transmitting intelligence from the called substation back to the calling substation.

When a revertive call is initiated at a substation associated with any one of the lines of the system, the intelligence and control signals developed on this one line are again sampled only in the particular pulse time position assigned to the one line and the samples are carried through the signal transmitting components of the system as far as the hundreds group selector stage on multiplexer signal pulses occurring in this particular time position. However, in the hundreds group selector stage the control signals carried by these multiplexer signal pulses are detected and used for selection of an idle one of the revertive call trunks which are common to all of the lines of the system. More specifically, the control signals carried by the multiplexer signal pulses are detected and either used for control purposes, such as selection of the hundreds group allocated to the revertive call trunks of the system, or are superimposed on selector forward signal pulses occurring in an idle one of the ten time positions assigned to the revertive call trunk group. These samples are then carried through the signal transmitting components of the system as far as the revertive call trunk on the selector forward signal pulses occurring in the selected time position.

In the revertive call trunk stage the control signals are detected and used to select the party line ringing signal assigned to the calling substation and the party line ringing signal assigned to the called substation. These party line ringing signals are superimposed on selector return pulses and are transmitted back through the selector stage to the revertive calling line so that this line is rung in accordance therewith. When the revertive call is answered the revertive call trunk is dropped off so as to be free to handle another revertive call.

In order to minimize the amount of equipment used in certain operations of the system, and to avoid the extremely high sampling rate which would be required if different time positions were used for each line of the system, a decimal system of multiplexing is employed which entails arbitrary division of the lines of the system into hundreds line groups and arbitrary division of the lines of each hundreds line group into line subgroups. More specifically, the 900 lines of the system are divided into 9 line groups of 100 lines each which are referred to as hundreds digit line groups, and the 100 lines of each hundreds digit line group are divided into 10 subgroups of 10 lines each. Since only 100 time positions are used for the entire system, the same time position is utilized by one line in each of the hundreds digit line groups. Tens multiplexing or gating pulses are developed at the rate of ten pulses for each pulse frame and each tens pulse individually corresponds to a particular subgroup of ten lines within each hundreds digit line group and occurs during the time interval of each pulse frame which exactly spans the ten pulse time positions individually assigned to the lines of the particular subgroup.

A group of line selector, or connector stages are permanently assigned to each of the hundreds digit line groups and each connector stage associated with a given line group has assigned thereto one of the ten pulse time positions, or trunk group positions assigned to each hundreds line group. In addition, a group of revertive call trunks have individually assigned thereto one of the ten time positions assigned to the first hundreds line group. Thus, each pulse time position identifies one line in each hundreds line group and also identifies either one connector stage or one of the revertive call trunks. Accordingly, the ten pulse time positions spanned by each tens pulse are individually assigned to different connector stages associated with a given hundreds line group, or different revertive call trunks employed in place of the first hundreds line group. Since ten trunk group positions are assigned to each hundreds line group, a maximum of 90 connector stages is employed in the 900 line system and a maximum of 10 revertive call trunks being identified by a different time position.

With this system of multiplexing, transmission of multiplexer signal pulses through certain of the signal transmission components of the system is dependent upon time coincidence of these signal pulses with particular tens pulses of successive pulse frames, as well as coincidence of these pulses with particular pulse time positions within successive pulse frames. In order to provide for such features as line busying, all links busying, revertive call trunk busying, trunk hunting, etc., certain facilities are associated with each hundreds digit line group as will be described in more detail hereinafter. In this connection it is pointed out that the above described arrangement wherein 900 lines are employed in conjunction with ten revertive call trunks is shown merely for purposes of illustration, it being understood that the relative distribution of these components may be varied as desired in accordance with the traffic requirements of the system.

GENERAL DESCRIPTION OF THE SYSTEM

Referring now to the drawings, and more particularly to Figs. 3 to 12 inclusive, thereof, the present fully automatic electronic telephone system is therein illustrated as comprising 900 lines which are arranged in different hundreds digit line groups of which the second and tenth hundreds digit groups are shown in the drawings. Thus, the equipment common to the one hundred lines in the second hundreds group 13 is shown in the horizontally arranged Figs. 4, 5 and 6, and the equipment common to the 100 lines in the tenth hundreds group 14 is shown in the horizontally arranged Figs. 7, 8 and 9. The first hundreds group 12 is not arranged to service individual lines of the system, but instead is reserved for a group of revertive call trunks shown in Fig. 3 of the drawings. The equipment 17, which is common to the lines of the system, is shown in the horizontally arranged Figs. 10, 11 and 12.

Considering first the equipment included in the second hundreds group 13, this equipment includes 100 line circuits individual to the 100 lines of the second hundreds line group, of which three line circuits 9*b*, 10*b* and 16*b* are shown in Fig. 4, a multiplexer 11*b*, of which only one is required for each hundreds line group, a plurality of identical finder-connector links 130, 132, 134, a plurality of acceptor-connector links 131, 133 and 135, a distributor 15*b* of which only one is required for each hundreds line group, a buffer amplifier 190*b*, of which only one is required for each hundreds line group, a distributor coupling circuit 191*b*, of which only one is required for each hundreds line group, an all links busy circuit 192*b*, of which only one is required for each hundreds line group, a busy pulse drive circuit 193*b*, of which only one is required for each hundreds line group, and a trunk marking pulse generator 194*b*, of which only one is required for each hundreds line group.

In general, the equipment associated with each hundreds line group is the same, and corresponding components in each line group have, in general, been given the same reference numerals with different subscripts. Thus, in the second hundreds digit line group 13 the components have been identified by the subscript *b* whereas in the tenth hundreds digit line group 14, the components have been identified by the subscript *j*. In the first hundreds group 12, there is provided a plurality of identical revertive call trunks, 121, 123 and 125, and a revertive call signal coupling circuit 207, of which only one is required for the entire system.

In addition, there is provided a selective forward coupling circuit 186, of which only one is required in the system, an idle pulse coupling circuit 187, of which only one is required in the system, a selector return coupling circuit 188, of which only one is required for the system, an acceptor drive circuit 189, of which only one is required for the system and a connector busy pulse coupling circuit 205 which is also common to all of the lines of the system.

Each of the finder-selector links comprises a finder and a selector. Thus, in the second hundreds group 13, the first finder-selector link 130 comprises a finder 130*a* and a selector 130*b*, the second finder-selector link 132 comprises a finder 132*a* and a selector 132*b* and the last finder-selector link 134 comprises a finder 134*a* and a selector 134*b*. Likewise, each of the acceptor-connector links comprises an acceptor and a connector. Thus, in the second hundreds group 13, the first acceptor-connector link 131 comprises an acceptor 131*a* and a connector 131*b*, the second acceptor-connector link 133 comprises an acceptor 133*a* and a connector 133*b*, etc. In addition, each of the revertive call trunks comprises a revertive call acceptor and a revertive call selector. Thus, the trunk 121 comprises a revertive call acceptor 121*a* and a revertive call selector 121*b*, the second revertive call trunk 123 comprises a revertive call acceptor 123*a* and a revertive call selector 123*b*, etc. It will be understood that the number of finder-selector links, the number of acceptor-connector links, and the number of revertive call trunks may be chosen as required to handle the necessary traffic of the system. Although only three links have been illustrated in each hundreds line group, from seven to ten links will normally be required in actual practice to handle the traffic of a nine hundred line office. Inclusion of the additional links and trunks in the system may readily be accomplished by connecting appropriate terminals of additional links or trunks to the indicated multiple points between the second and last link or trunk in each hundreds line group.

As shown, the line circuits respectively terminate different two-conductor lines included within the designated hundreds line group. Thus, the line circuits 9*b*, 10*b* and 16*b*, respectively, terminate three two-conductor lines No. 211, No. 223 and No. 232 within the second hundreds line group which includes the line Nos. 211 to 200, inclusive. In a similar manner the line circuit 9*j*, 10*j* and 16*j*, respectively, terminate the three two-conductor lines No. 011, No. 023, and No. 032 within the tenth hundreds group 14.

The lines of the system may be used for either private or party line service. In the illustrated embodiment all of the lines, except the line 232, are shown as private lines, and accordingly extend only to a single substation having a directory number designation corresponding to the associated line plus a party line ringing digit of "1." Thus, in the illustrated embodiment the line No. 223, which is shown as a private line, extends to the substation E which has assigned thereto the directory number designation 2231. On the other hand, the line No. 232, in the hundreds group 13, is illustrated as a party line and extends to a plurality of parallel connected substations F, G and H, having respectively assigned thereto the directory number designations No. 2321, No. 2322 and 2323. In this connection, it will be understood that any one line, such as the line No. 232, may have associated therewith a maximum of ten substations such as the substations F, G and H, these substations having different party line ringing digits assigned thereto.

Each line circuit performs the function of repeating intelligence or control signals from its associated substation or substations to a corresponding one of the gate circuits in the multiplexer which serves the corresponding hundreds line group. Also, each line circuit performs the function of repeating intelligence signals derived from a particular gate circuit of the corresponding hundreds line group distributor to its associated substation or substations and of responding to ringing control signals derived from one of the connectors assigned to the same hundreds line group on a call incoming thereto. Thus, the line circuit 10*b*, for example, performs the functions of repeating intelligence or control signals from its associated substation E to the corresponding one of the gate circuits in the multiplexer 11*b*, repeating intelligence signals derived from a particular gate circuit of the distributor 15*b* to its associated substation E, and of responding to ringing control signals derived from one of the connectors 131*b*, 133*b* and 135*b* in the hundreds group 13 by transmitting a ringing current to the substation E on a call incoming thereto.

To perform these functions the line circuit 10*b* is connected by way of the conductors 54*b*' and 54*b* to one of the gate circuits provided in the multiplexer 11*b* and is connected by way of the conductor 44*b* to one of the gate circuits provided in the distributor 15*b*. The line circuit 10*b* is also connected to certain components in the common equipment 17 in the manner described below. The line circuits 9*b*, and 16*b* are likewise connected by means of the illustrated conductors to the multiplexer 11*b* and distributor 15*b* and to the common equipment 17, as are the other 97 line circuits of the second hundreds group 13 of the system.

Generally speaking, the multiplexers 11*b*–11*j*, inclusive, perform the functions of sampling the intelligence and control signals derived from the one hundred line circuits individually associated therewith only in the pulse time positions of each pulse frame individually assigned to the lines served by these line circuits and of modulating the sampled intelligence or control signals on multiplexer signal pulses occurring in these pulse time positions for transmission to the finders, selectors, and connectors the linkage in the same hundreds line group. For example, the output terminals of the multiplexer 11*b* are connected by way of the common conductor 50*b* to the multiplexer input terminals of each of the selectors 130*b*, 132*b* and 134*b*, to the multiplexer input terminals of each of the connectors 131*b*, 133*b* and 135*b*, and also by way of the buffer amplifier 190*b* and over the conductor 204*b* to each of the finders 130*a*, 132*a* and 134*a*. The output from the multiplexer 11*b* is also connected by way of the buffer amplifier 190*b* and the connector 204*b* to the all links busy circuit 192*b*.

In reverse manner the distributors 15*b*–15*j*, inclusive, individually perform the function of repeating intelligence signals derived from the connectors in the associated hundreds line group, and the selectors in the associated hundreds line group, in the pulse time positions corresponding to particular calling and called lines, to the line circuits respectively terminating these lines. Thus, the input terminals of the distributor 15*b* are connected by way of the distributor coupling circuit 191*b* and the common conductor 51*b* to the output terminals of each of the connectors 131*b*, 133*b*, and 135*b*, and the output terminals of each of the selectors 130*b*, 132*b*, and 134*b*. In performing the described functions, the multiplexers 11*b*–11*j*, inclusive and the distributors 15*b*–15*j*, inclusive, are controlled by certain components of the common equipment 17 in the manner hereinafter explained.

The finders of the various finder-selector links, such, for example, as the finder 130*a*, do not perform any intelligence transmission functions, but instead function strictly as control units. Specifically, the finder 130*a* performs the function of determining when the finder-selector link 130 shall be taken into use, determining the calling line within the hundreds group 13 with which the link 130 is to be associated in handling a call, and determining the particular pulse time position of successive pulse frames which is assigned to the calling line and during which signal bearing pulses derived from the multiplexer 11*b* shall be effective to produce a response in the finder and in the associated hundreds line group selector 130*b*. To advise the associated selector of the pulse time position assigned to the calling line, the finder 130*a* transmits finder gate pulses to the selector 130*b* in this time position over the conductor 130*d*. The finder 130*a* also performs the function of conditioning its associated selector 130b for operation when the link 130 is definitely associated with a calling line to handle a call initiated on the line. This is accomplished through operation of the finder 130a to impress operating potential upon a plurality of the tubes in the selector 130b over the +B switch conductor 130c. When operatively associated with a particular calling line, the finder 130a also performs the function of guarding the calling line against intrusion on an incoming call to the line. This is accomplished through operation of the finder 130a to transmit busy pulse, occurring in the pulse time position assigned to the calling line with which the finder is operatively associated, over the common busy pulse out conductor 202b to the busy pulse drive circuit 193b associated with the second hundreds group 13. From the busy pulse drive circuit 193b the busy pulses are fed over the common busy pulse in conductor 203b to each of the finders 130b, 132b, and 134b, in the second hundreds group 13, to each of the connectors 131b, 133b, and 135b in the second hundreds group 13, and to the all links busy circuit 192b in the second hundreds group 13. The finder 130a further performs the function of supplying an allotting signal over the conductor 36b to the finder 132a of the next succeeding link 132 in the hundreds group 13 when the finder 130a is taken into use, so as to provide a self-allotting system for the finder-selector links of each hundreds group of the system.

When a revertive call is initiated on the calling line, the finder 130a responds to a revertive call hold potential developed in the associated selector 130b by remaining operatively associated with the calling line while the calling party hangs up to permit ringing of the called party over the same line. During this period, the finder 130a continues to guard the calling line by developing busy pulses in the time position assigned thereto. The finder 130a also responds to termination of the revertive call hold potential developed in the selector 130b by conditioning itself to release the link 130 in response to the next disconnect signal transmitted over the calling line so that the link 130 will be released on termination of the revertive call.

To perform the above functions in the manner fully explained below, the finder 130a comprises (see Fig. 3A) a pulse input circuit 300, a +B switching circuit 301, a pulse combining circuit 302, tens and units coincidence tube circuits 303 and 304, a finder pulse forming circuit 305, and a self-allotting circuit 306. The finder 130a and the selector 130b are connected on an individual link basis by three conductors, namely, the +B switch conductor 130c, the finder gate pulse conductor 130d, and the revertive call hold conductor 130f. Each of the other finder-selector links are similarly connected on the individual link basis by means of the three indicated conductors.

Each of the selectors in each hundreds line group performs a plurality of different functions. Thus, the selector 130b, for example, is controlled by finder gate pulses delivered thereto over the conductor 130d to accept and respond to signal bearing multiplexer pulses occurring in the pulse time division assigned to the calling line with which the finder-selector link 130 is operatively associated. The selector 130b also responds to the application of operating potential to the conductor 130c and to the finder gate pulses appearing on the conductor 130d by feeding a dial tone signal to the distributor 15b on selector signal pulses occurring in the pulse time position assigned to the calling line with which the selector 130b is operatively associated, thereby to return a dial tone signal to the calling subscriber.

The selector 130b responds to dial impulses which constitute the first, or hundreds digit, of the called line, and originate at the calling line with which the link 130 is operatively associated, by selecting the particular hundreds digit line group containing the called line. In the event that a revertive call is initiated, the first digit will be "1" indicating the first hundreds line group which is reserved for the revertive call trunks of the system, and the selector 130b responds to a first digit of "1" by selecting the first hundreds line group 12 containing the revertive call trunks. After selection of the particular hundreds digit line group which contains either the called line or a revertive call trunk, the selector 130b then selects the pulse time position assigned to an idle one of the connectors associated with the called hundreds line group, or an idle one of the revertive call trunks, and transmits selector forward signal pulses in the time position assigned to the selected idle connector or trunk over the common selector forward conductor 195, through the selector forward coupling circuit 186 and over the common conductor 196 to all of the connectors of the system and the revertive call trunks.

Incident to the selection of this time position, the selector 130b conditions itself to accept selector return pulses which are impressed upon the selector return conductor 199 from the selector return coupling circuit 188 and occur in the pulse time position assigned to the selected idle connector or revertive call trunk, to store the intelligence carried by the selector return pulses, and to transmit the stored intelligence to the distributor 15b on selector signal pulses occurring in the pulse time position assigned to the calling line with which the link 130 is operatively associated. In effect, therefore, the selector functions to shift signal carrying pulses from the pulse time position assigned to the calling line with which it is operatively associated to the pulse time position assigned to an idle connector in the hundreds line group containing the called line, or, in the alternative, to the pulse time position assigned to an idle revertive call trunk in the first hundreds line group 12. The selector 130b also functions to shift the selector return signal pulses carrying the intelligence derived from the called line by way of the associated connector from the particular pulse time position assigned to this connector to the particular pulse time position assigned to the calling line.

In addition, the selector 130b performs the auxiliary functions of terminating dial tone transmission to the calling substation when the first line selecting impulse therefrom is dialed into the selector, feeding connector busy pulses to the selected acceptor-connector link in the time position assigned thereto to inform this link that it has been selected, and transmitting busy tone carrying selector signal pulse to the distributor 15b in the pulse time position assigned to the calling line in the event that there are no idle connectors in the called hundreds line group. The selector 130b is also arranged to release in response to the release of a connection involving the link 130 at the calling substation.

On a revertive call, the selector 130b responds to a first digit of "1" by selecting the first hundreds line group containing the revertive call trunks and a pulse time position assigned to an idle one of these trunks, and transmits selector forward signal pulses in the time position assigned to the selected idle trunk so as to seize this trunk. After two additional digits are dialed into the selected revertive call trunk by way of the selector 130b, the calling party must hang up in order to permit transmission of a ringing current over his line to summon the called party to the phone. However, the selector 130b must remain operatively associated with the calling line during this time. Accordingly, the selector 130b is arranged to respond to a revertive call signal developed in the seized revertive call trunk by impressing a revertive call hold potential on the conductor 130f which is transmitted back to the finder 130a and has the effect of holding this finder and hence the link 130, operatively associated with the calling line even though a calling condition does not exist on this line. When the revertive call is answered, the revertive call trunk is arranged to send back a second revertive call signal over the conductor 207a, through the revertive call signal coupling circuit 207 and over the conductor 207b to all of the selectors of the system. The selector 130b is arranged to respond to this second revertive call signal by removing the revertive call hold potential from the conductor 130f so that the finder 130a can release the finder-selector link 130 when the revertive call is terminated. The selector 130b is also arranged to terminate transmission of selector forward pulses to the seized revertive call trunk, so that this trunk is released when the revertive call is answered.

To perform the above functions in the manner fully explained below, the selector 130b, as diagrammatically illustrated in Fig. 3B, and as shown in detail in Figs. 15 to 18, inclusive, is provided with a forward in gate circuit 307 which responds to finder gate pulses transmitted to the selector over the conductor 130d by repeating signal bearing pulses delivered thereto from the multiplexer 11b in the pulse time position assigned to the calling line, and a forward reconstructor circuit 308, having the function of detecting or reconstructing and storing the intelligence carried by the signal bearing pulses transmitted to the selector from the multiplexer 11b in the pulse time position assigned to the calling line. The selector 130b further comprises a forward out gate circuit 324 for gating to the selector forward coupling circuit 186, selector forward signal pulses, which occur in the time position assigned to the selected connector in the called hundreds line group, or in the pulse time position assigned to a selected revertive call trunk, and carry the intelligence and supervisory signals reconstructed by the circuit 308. In addition, the selector 130b includes a return in gate circuit 323 for repeating selector return signal pulses in the pulse time position assigned to the selected connectors which bear intelligence or control signals derived from the called line, a return reconstructor circuit 322 for detecting or reconstructing the intelligence or control signals gated by the return in gate circuit 323, and a return out gate circuit 326 which is controlled in accordance with the detected signals stored in the circuit 322, and by the finder gate pulses delivered to the selector 130b over the conductor 130d, to gate to the distributor 15b by way of the distributor coupling circuit 191b, signal bearing selector pulses which appear in the pulse time position assigned to the calling line. Accordingly, the three circuits 307, 308 and 324 function to repeat intelligence and supervisory signals from the calling line to the selected connector or revertive call trunk, whereas the corresponding circuits, 323, 322 and 326 function to repeat to the calling line intelligence and control signals derived from the called line by way of the selected connector or signals developed in the selected revertive call trunk.

The selector 130b additionally comprises a plurality of components for corresponding to the first digit of dial impulses repeated to the selector on multiplexer pulses occurring in the pulse time position assigned to the calling line, this first digit corresponding to the hundreds line group which contains the called line, or in the case of a revertive call, the hundreds line group which contains the revertive call trunks. In general, the dial impulse responsive equipment of the selector 130b comprises a dial impulse integrator circuit 309 which receives dial impulses from the reconstructor circuit 308, a hundreds register inverter 360 to which pulses are repeated by the dial impulse integrator circuit 309, a hundreds register pulser 310 which serves to drive the hundreds digit register 311, and a hundreds sequence timing circuit 312, which functions to initiate certain operations at the end of the first digit dialed into the selector.

The selector 130b further comprises an idle pulse gate circuit 395 which is controlled in accordance with the selector allotting circuit 20b and the setting imparted to the hundreds digit register 311 at the end of the first digit to select only those idle pulses which identify idle connectors in the called hundreds line group and to supply the selected idle pulses over the conductor 395a to the connector coincidence tube circuit 397. The coincidence tube circuit 397 operates to select at random one of these selected idle pulses which represents an idle connector in the called hundreds line group. The selector 130b also comprises a selector pulse and connector busy pulse forming circuit 317 which is controlled in accordance with the setting imparted to the hundreds digit register 311 at the end of the first digit and the idle pulse selected by the coincidence tube circuit 397 to produce selector pulses which are employed to control the circuits 322, 323 and 324 in the transmission of intelligence and control signal information from the selector 130b to the selected connector in the pulse time position assigned thereto. The circuit 317 also develops connector busy pulses which are transmitted over the conductor 205a, through the coupling circuit 205 and over the conductor 205b to the selected acceptor-connector link to inform this link of seizure by the selector 130b. The connector busylock circuit 396 in the selector 130b is controlled jointly by the hundreds sequence timing circuit 312 and the connector coincidence tube circuit 397 to lock up the selector 130b at the end of a connector busy test interval of predetermined duration in the event that no idle connector is found in the called hundreds line group, or in the event that no idle revertive call trunk is found in the first hundreds line group 12. The selector 130b also includes the busy tone gate 325a and the dial tone gate 325 which have the function of gating busy and dial tones to the calling line under the conditions described generally above. Also, the selector 130b includes a revertive call control circuit 365 which is controlled in accordance with the revertive call signals developed by the seized revertive call trunk, and functions to impress a revertive call hold potential on the conductor 130f during periods when the finder-selector link is to be held operative associated with the calling line even though a calling condition does not exist on this line.

The acceptors associated with the various acceptor-connector links of the system, such as the acceptor 141a in the tenth hundreds group 14, do not perform any intelligence transmission function, but on the contrary, function strictly as control units. Thus, the acceptor 141a performs the function of establishing a particular pulse time position within each pulse frame which identifies the acceptor-connector link 141 as serving the lines in a particular hundreds line group, i. e., the tenth hundreds group 14, and also distinguishes the link 141 from the other links 143, 145, etc. which also serve the same hundreds group 14. In addition, the acceptor 141a performs the function of generating idle pulses in the established pulse time position for the use of selectors in selecting an idle connector within the called hundreds line group. To advise all of the selectors of the system of the pulse time position assigned to the associated connector and the idle or busy condition thereof, the acceptor 141a transmits these idle impulses over the conductor 198, through the idle pulse coupling circuit 197 to all of the selectors of the system during periods when the associated connector is idle.

The acceptor 141a also performs the function of conditioning its associated connector 141b for operation when the link 141 is definitely associated with a call forwarding selector to handle a call initiated on the calling line associated therewith. This is accomplished through operation of the acceptor 141a to impress operating potential upon a plurality of tubes in the connector 141b over the +B switch conductor 141c. Also, to advise the connector 141b of the pulse time position which is permanently assigned thereto, the acceptor 141a continuously transmits acceptor gate pulses to the associated connector 141b in this pulse time position over the conductor 141*d*. When operatively associated with a particular call forwarding selector, the acceptor 141*a* responds to connector busy pulses transmitted thereto from the call forwarding selector by way of the connector busy pulse coupling circuit 205, by removing the corresponding idle pulses from the common idle pulse out conductor 198, thereby guarding the associated connector 141*b* against intrusion on an incoming call to the hundreds group 14.

In addition to the acceptors associated with the acceptor-connector links of a system, there is provided a series of revertive call acceptors associated with the revertive call trunks of the system. More specifically, there is provided the revertive call acceptors 121*a*, 123*a*, and 125*a*, which are respectively associated with the revertive call selectors 121*b*, 123*b*, and 125*b*. The revertive call acceptors, such, for example, as the acceptor 121*a*, are in general similar to the acceptors of the system associated with the acceptor-connector links thereof. However, the revertive call acceptor 121*a* also performs the function of responding to a revertive call hold potential, developed in the associated revertive call selector 121*b*, by remaining operatively associated with the call forwarding selector even though this selector does not continue to produce selector forward pulses, during a period when the revertive call is being set up. Also, the revertive call acceptor 121*a* is arranged to transmit a revertive ring start signal over the conductor 121*e* to the revertive call selector 121*b*, when the calling party hangs up, so that the selector 121*b* is informed that revertive ringing may be initiated.

To perform the above functions in the manner fully explained below, the revertive call acceptor 121*a* comprises (see Figs. 5A and 19) an acceptor control gate circuit 400, a +B switching circuit 401, an acceptor gate pulse forming circuit 402, and an idle pulse circuit 410. The acceptors associated with the connectors of the system, such as the acceptor 131*a*, also comprise a similar group of circuits. However, the +B switching circuit of these acceptors is not arranged to provide the described revertive ring start signal and to respond to the described revertive call hold potential.

Each of the connectors in each hundreds line group performs a plurality of different functions. Thus, the connector 141*b* in the tenth hundreds group 14, for example, is controlled by the acceptor gate pulses delivered thereto over the conductor 141*d* from the acceptor 141*a* to accept and respond to signal bearing selector forward pulses occurring in the same time position, i. e., the time position assigned to the acceptor-connector link 141. The connector 141*b*, which in the illustrated embodiment is adapted for party line ringing, also responds to dial impulses during a second or tens digit, a third or units digit, and a fourth or party line ringing digit which originate at the calling line with which the call forwarding selector is operatively associated, by selecting the particular pulse time position assigned to the called line within the called hundreds line group, and the particular party line ringing signal assigned to the called substation associated with the called line. Incident to the selection of the time position assigned to the called line, the connector 141*b* conditions itself to accept signal carrying pulses from the multiplexer 11*j* which occur in a time position corresponding to the selected called line within the tenth hundreds group 14, to store the intelligence carried by these pulses, and to transmit the stored intelligence to the call forwarding selector on selector return signal pulses occurring in the pulse time position assigned to the connector 141*b*. In effect, therefore, the connector functions to shift selector forward signal carrying pulses transmitted thereto by the call forwarding selector from the pulse time position assigned to the connector to the pulse time position assigned to the called line within the called hundreds line group, and to shift multiplexer signal pulses carrying intelligence derived from the called line from the pulse time position assigned to the called line to the pulse time position assigned to the connector.

In addition, the connector 141*b* performs the auxiliary functions of feeding busy pulses occurring in the pulse time position assigned to the called line within the hundreds groups 14 over the common busy pulse out conductor 202*j* in this hundreds group to the busy pulse drive circuit 193*j* and from the circuit 193*j* over the common busy pulse in conductor 203*j* to the other links in the hundreds group 14, thereby to guard the called line against seizure through another link in the tenth hundreds group 14; testing the pulse time position assigned to the called line to determine the idle or busy condition of that line; transmitting busy tone carrying selector return signal pulses to the call forwarding selector in the pulse time position assigned to the connector 141*b* in the event the called line tests busy, to inform the calling subscriber of this condition; transmitting a party line ringing signal in accordance with the identity of the called substation associated with the called line to the line circuit terminating the called line in the event the called line tests idle; concurrently transmitting selector return signal pulses which are modulated with a corresponding ringback tone signal to the call forwarding selector in the pulse time position assigned to the connector 141*b*, to inform the calling subscriber that the called line is being rung; and terminating the party-line ringing signal and concurrently terminating ringback tone signal modulation in response to answering of the call at the called party line substation. The connector 141*b* also transmits an extinguishing pulse over the conductor 141*e* to the acceptor 141*a* at the end of a conversation timing interval to cause the link 141 to release independently of the calling and called subscribers. The connector 141*b* is also arranged to release in response to a release of the connection involving the link 141 at the called substation.

To perform the above-mentioned functions in the manner fully explained below, the connector 141*b*, as diagrammatically illustrated in Figs. 4B and 4C, is provided with a calling line in gate circuit 407 which responds to acceptor gate pulses transmitted to the connector over the conductor 141*d* by repeating selector forward signal bearing pulses delivered thereto from the call forwarding selector in the pulse time position assigned to the connector 141*b*, and a calling line reconstructor circuit 408 having the function of detecting, or reconstructing, and storing the intelligence carried by the selector forward signal bearing pulses transmitted to the connector from the call forwarding selector in the pulse time position assigned to the connector 141*b*. The connector 141*b* further comprises a called line out gate circuit 424 for gating to the distributor 15*j* connector signal pulses carrying the intelligence reconstructed by the circuit 408 in the time position assigned to the particular called line within the tenth hundreds group 14. In addition, the connector 141*b* includes a called line in gate circuit 423 for repeating multiplexer pulses from the multiplexer 11*j* in the pulse time position assigned to the called line which bear intelligence or control signals derived from the called line, a called line reconstructor circuit 422 for detecting or reconstructing the intelligence or control signals gated by the called line in gate circuit 423, and a calling line out gate circuit 426 which is controlled in accordance with the detected intelligence stored in the circuit 422 and by the acceptor gate pulses delivered to the connector over the conductor 141*d* to gate to the call forwarding selector signal bearing selector return pulses which occur in the time position assigned to the connector 141*b*. More generally, the three circuits 407, 408 and 424, function to repeat intelligence from the call forwarding selector to the called line, whereas the three corresponding circuits 422, 423 and 426 function to repeat to the call forwarding selector intelligence derived from the called line.

The connector 141*b* is adapted for party line service on non-revertive calls and additionally comprises a plurality of components for responding to three digits (2nd, 3rd and 4th) of dial impulses repeated to the connector on selector forward signal pulses occurring in the pulse time position assigned to the connector **141*b*, the last digit corresponding to the particular party line ringing signal assigned to the called party line substation. In general, the dial impulse responsive equipment of the connector 141*b* comprises a dial impulse integrator circuit 409, which receives dial impulses from the reconstructor circuit 408; tens, units and party inverter circuits 460, 461 and 462, to which pulses are repeated by the dial impulse integrator circuit 409; tens, units and party digit registers 411, 415 and 465 which are respectively controlled in accordance with the numerical values of the tens, units and party digits repeated to the circuits 460, 461 and 462 from the integrator circuit 409; tens, units and party register pulsers 410, 414 and 463, which are respectively interposed between the inverter circuit and the digit register of the tens, units and party digit channels; and the tens, units and party sequence timing circuits 412, 416, and 464 which, in effect, function as digit counting components of the connector, i. e., initiate certain operations at the end of the tens, units and party digits dialed into the connector 141*b***.

The connector **141*b* further comprises a connector pulse forming circuit 417 which is controlled in accordance with the settings imparted to the tens and units registers 411 and 415 at the end of the units digit to produce connector pulses which are employed to control the circuits 422, 423 and 424 in the transmission of intelligence and control signal information from the connector 141*b* to the distributor 15*j*** in the pulse time position assigned to the called line.

The busy test facilities of the connector **141*b* comprise a busy test circuit 418 jointly controlled by the connector pulse forming circuit 417 and busy pulses transmitted to the connector over the common busy pulse in conductor 203*j*, the busylock circuit 419 and the busy gate circuit 420. The trunk hunting facilities of the connector comprise a trunk hunting control circuit 483 jointly controlled by the connector pulse forming circuit 417, the unit sequence timing circuit 416, busy pulses transmitted to the connector over the common busy pulse in conductor 203*j*, and trunk marking pulses transmitted to the connector over the common trunk marking pulse conductor 206*j* from the trunk marking pulse generator 194*j* in the tenth hundreds group 14; a units register advancer 481, and a tens register advancer 480. The conversation timing facilities of the connector 141*b* comprise a conversation timing warning tone circuit 484, jointly controlled by the party digit register 465, the ring trip circuit 421, and a warning tone signal transmitted to the connector over the common conductor 58*a*; a party register advancer 482; and a conversation timing control circuit 485**.

In addition, the connector **141*b* comprises the supervisory tone gate circuits 425 having the functions of gating a busy tone to the calling line by way of the call forwarding selector, gating a particular party line ringback tone signal selected by the party digit register 465 in accordance with the identity of the called substation, and transmitting a ringing control signal to the called line out gate circuit 424; a code start circuit 468 which performs the function of delaying the transmission of the selected party line ringback tone signal through the ringback tone gate circuit until the start of each ringing period in the ringing cycle; and a ring trip circuit 421** which is assigned the function of terminating ringing current transmission to the called substation when a call answering operation is performed at the called substation.

Each of the revertive call selectors **121*b*, 123*b* and 125*b* performs a plurality of different functions in conjunction with the setting up of a revertive call between different substations associated with any one line of the system. In this connection, it will be understood that the revertive call trunks do not handle any non-revertive calls between different calling and called lines of the system, but instead, are employed only to set up revertive calls between different substations associated with any one line in any hundreds line group of the system. However, the revertive call selectors are seized by the call forwarding selector in substantially the same manner as are the connectors of the system. Thus, the revertive call selector 121*b*, for example, in the revertive call hundreds group 12, is controlled by the acceptor gate pulses delivered thereto over the conductor 121*d* from the revertive call acceptor 121*a* to accept and respond to signal bearing selector forward pulses occurring in the same time position, i. e., the time position assigned to the revertive call trunk 121**.

The revertive call selector **121*b* responds to dial impulses during the second digit of the special revertive call number dialed at the calling substation by selecting the partly line ringing signal assigned to the calling substation, and the revertive call selector 121*b* also responds to dial impulses during a third digit of the special revertive call number dialed at the calling substation by selecting the party line ringing signal assigned to the called substation. At the same time, the revertive call selector 121*b* conditions itself to transmit the selected party line ringing signals on selector return signal pulses occurring in the pulse time position assigned to the revertive call trunk 121**, these selector return signal pulses being transmitted back to the selectors of the system over the selector return channel and are routed by way of the call forwarding selector to the revertive calling line.

In addition, the revertive call selector **121*b* performs the auxiliary functions of transmitting a first revertive call signal by way of the revertive call signal coupling circuit 207 to the call forwarding selector so as to condition this selector to remain operatively associated with the calling line during the period when the calling party hangs up to permit completion of the revertive call; transmitting a revertive call hold potential to the revertive call acceptor 121*a* so as to condition this acceptor to remain operatively associated with the call forwarding selector while the calling party hangs up; responding to a revertive ring start signal developed in the revertive call acceptor 121*a* in response to the calling subscriber's hanging up, by initiating the transmission of party line ringing signals over the revertive calling line; transmitting a second revertive call signal by way of the revertive call signal coupling circuit 207 to the call forwarding selector when the revertive call is answered, to condition this selector to respond to termination of the revertive call by releasing the finder-selector link 131; and removing the revertive call hold potential from the revertive call acceptor 121*a* when the revertive call is answered, so that the revertive call acceptor 121*a* can release the revertive call trunk 121** after the revertive call is answered.

To perform the above functions in the manner fully explained below, the revertive call selector **121*b*, as diagrammatically illustrated in Fig. 5B, is provided with a forward in gate 507 which responds to acceptor gate pulses transmitted to the revertive call selector 121*b* over the conductor 121*d* by repeating selector forward signal pulses delivered thereto from the call forwarding selector in the pulse time position assigned to the trunk 121, and a forward reconstructor circuit 508 having the function of detecting, or reconstructing, and storing the control signals carried by the selector forward signal pulses transmitted to the revertive call selector 121*b* from the call forwarding selector in the pulse time position assigned to the revertive trunk 121. The selector 121*b* further comprises a return out gate circuit 526 which is controlled in accordance with the party line ringing signal selected in the revertive call selector 121*b* and the acceptor gate pulses delivered to the revertive call selector 121*b* over the conductor 121*d* to release selector return signal pulses which are modulated with the selected party line ringing signals, these selected ringing signals being transmitted by way of the selector return coupling circuit 188** and the call forwarding selector to the revertive calling line.

The revertive call selector **121*b* additionally comprises a plurality of components for responding to the second and third digits of the special revertive call number which is dialed into the revertive call trunk 121. Thus, the dial impulse responsive equipment in the revertive call selector 121*b* comprises a dial impulse integrator circuit 509 which receives dial impulses from the reconstructor circuit 508, a calling party inverter circuit 560 and a called party inverter circuit 561 to which pulses are repeated by the dial impulse integrator circuit 509, a calling party register pulser 510 which serves to drive a calling party register 511, a calling party sequence timing circuit 512 which functions to initiate certain operations at the end of the calling party digit dialed into the revertive call trunk 121, a called party register pulser 514 which serves to drive a called party register 515, and a called party sequence timing circuit 516 which functions to initiate certain operations at the end of the called party digit dialed into the trunk 121. A plurality of ringback tone gates 562, jointly controlled by the ringback tone signals developed on the conductor 48 and by the settings of the calling party register 511 and the called party register 515 are provided to gate the selected ringback tone signals corresponding to the selected party line ringing signals to a ringback tone gate circuit 525**.

The revertive call selector **121*b* further comprises a code start circuit 568, which is controlled in accordance with the revertive call ring start signal developed on the conductor 121*e*, and delays the transmission of the selected party line ringback tone signals through the ringback tone gate circuit 525 until the start of a ringing period in the ringing cycle; a ring trip circuit 521 which in general functions to terminate ringing current transmission over the revertive calling line when a call answering operation is performed thereon; a ringing carrier modulator circuit 505 which performs the function of developing a ringing carrier wave which is modulated in accordance with the selected party line ringing signals, this modulated ringing carrier wave being itself modulated on the selector return signal pulses developed by the return out gate circuit 526; a revertive call tone gate circuit 597 which functions to transmit a revertive call tone signal by way of the return out gate circuit 526 and the call forwarding selector to the revertive calling line to inform the answering party of the nature of the revertive call; a ringing timeout circuit 599 which performs the function of conditioning the revertive call trunk 121 and the associated call-forwarding selector to release at the end of a ringing timeout interval if the call is not answered before the end of this interval; and a revertive call signaling circuit 563 which performs the functions of developing a first revertive call signal after the called party digit is dialed into the revertive call selector 121*b*, this first revertive call signal being transmitted by way of the revertive call signal coupling circuit 207 to the call forwardly selector to condition this selector to remain operatively associated with the calling line when the calling party hangs up, and to transmit a second revertive call signal by way of the revertive call signal coupling circuit 207 to the call forwarding selector when either the revertive call is answered or the end of the ringing timeout interval is reached, to permit the trunk 121** to be released if the call is answered or to permit the entire linkage associated with the calling line to release if a calling condition does not exist on this line.

Generally considered, the common equipment 17, which is shown diagrammatically in the horizontally arranged Figs. 10, 11, and 12, includes a master oscillator 18 designed to operate at a fixed high frequency (preferably one megacycle) and having its output terminals arranged to control a phase shifter and pulse former 19 and a pulse forming circuit **19*a*. In the present system the master oscillator 18 is common to all of the line and linkage equipment of the system including the revertive call trunks. As controlled by the master oscillator 18, the phase shifter and pulse former 19 functions continuously to develop two identical trains of shaped pulses having a common pulse frequency of one megacycle which are transmitted over the channels 40 and 41, respectively, to a linkage sampling pulse drive circuit 40*a* and a commutator drive circuit 25. The phase relationship between the pulses respectively produced on the channels 40 and 41 by the network 19 may be shifted as desired through adjustment of certain of the components of this network. The pulse forming circuit 19*a* functions to develop a train of shaped pulses having a repetition rate of one megacycle which is transmitted over the conductor 19*b* to a units pulse ring circuit 20. The units pulse ring circuit 20 functions sequentially to develop units pulses which define the pulse time positions of each pulse frame, appear on the conductors within the cable 31, and are fed by way of these conductors to the various intelligence transmitting and control components of the system. More specifically, the cable 31 comprises ten units pulse conductors 31*a*, 31*b*–31*j*, inclusive, over which positive units pulses are sequentially transmitted in the order named to the gate circuits of each of the distributors 15*b*–15*j*, inclusive, to each of the trunk marking pulse generators 194*b*–194*j*, inclusive, to the units coincidence tube circuit 304 in each of the finders of the system, to the connector coincidence tube circuit 397 in each of the selectors of the system, and to the units digit registers 415 in each of the connectors of the system. In addition, certain ones of the positive units pulses are impressed upon different ones of the acceptors of the system, including the revertive call acceptors associated with the revertive call trunks, to establish in conjunction with tens pulses impressed upon these acceptors the individual pulse time positions which are assigned to and identify each of the acceptor-connector links and revertive call trunks of the system. Thus, considering, for example, the first hundreds group 12, which is reserved for revertive call trunks, the revertive call acceptor 121*a* in the first revertive call trunk 121 has impressed thereon the positive units pulses from the first units pulse conductor 31*a*, the acceptor 123*a* in the second revertive call trunk 123 has impressed thereon units pulses from the second units pulse conductor 31*b*, etc. In a similar manner, the units pulse conductors are individually connected to the acceptors 131*a*, 133*a*, and 135*a* in the second hundreds group 13 and to each of the additional hundreds groups, so that each one of the acceptors of the system is assigned a different time position in the basic pulse time position frame. The units pulses appearing on the conductors 31*a*, 31*b*–31*j*, inclusive, are also transmitted to the pulse gating circuits of a channel pulse commutator 22, and the positive units pulses developed upon the two conductors 31*a* and 31*f* are also employed to control and synchronize a supervisory carrier supply circuit 26, this latter circuit transmitting a 100 kilocycle signal to each of the line circuits of the system and to the first finder in each hundreds group over the conductor 39**.

The positive units pulses are sequentially developed on the units pulse conductors **31*a*, 31*b*–31*j*, inclusive, at a frequency rate of 100 kilocycles, and each tenth positive units pulse, i. e., each pulse appearing on the units pulse conductor 31*j*, is used to step or trigger a tens pulse ring circuit 21 having the function of developing positive tens pulses, each of which span the time interval of ten successive units pulses. The positive tens pulses, as sequentially produced by the ring circuit 21 on the tens pulse conductors 32*a*, 32*b*–32*j*, inclusive, forming the illustrated cable 32, are supplied to the gate circuits of the multiplexers 11*b*–11*j*, inclusive, the gate circuits of the distributors 15*b*–15*j*, inclusive, the trunk marking pulse generators 194b–194j, inclusive, the tens coincidence tube circuits 303 in each of the finders of the system, the hundreds digit registers 311 in each of the selectors of the system, and the tens digit registers 411 in each of the connectors of the system, all in a manner more fully explained below. In addition, the positive tens pulses produced on the tens pulse conductors 32a, 32b–32j, inclusive, are individually impressed on different ones of the acceptors of the system, including the revertive call acceptors, to establish together with the units pulses impressed upon these acceptors, the particular pulse time position which is assigned to and identifies each of the acceptor-connector links and revertive call trunks of the system. For example, the revertive call acceptors 121a, 123a and 125a in the first hundreds group 12, have impressed thereon positive tens pulses from the first tens pulse conductor 32a. Likewise, the acceptors 131a, 133a, and 135a in the second hundreds group 13 have impressed thereon the positive tens impulses from the second tens pulse conductor 32b. Finally, the acceptors 141a, 143a, and 145a in the tenth hundreds group 14 have impressed thereon the tens pulses appearing in the tens pulse conductor 32j. In this connection, it will be understood that the tens pulses appearing on the tens pulse conductors 32c–32i** inclusive, are respectively impressed upon the acceptors of the seven hundreds groups not shown in the drawings.

As controlled by the positive units pulses derived from the units pulse ring circuit 20, and the commutator drive pulses derived from the commutator drive circuit 25, the channel pulse commutator 22 functions successively to develop very narrow channel pulses on the channel pulse conductors 34a, 34b–34j, inclusive, forming the illustrated cable 34, which are fed to the gate circuits in the multiplexers 11b–11j, inclusive. These channel pulses occur at the same freqeuncy as the units pulses but are much narrower in width and are so phased relative to the units pulses that each channel pulse occurs well within the limits of the coincident positive units pulse. Linkage sampling pulses as derived from the linkage sampling pulse drive circuit 40a are transmitted over the conductor 40b to the forward and return out gate circuits 324 and 326 in each of the selectors of the system, to the connector pulse forming circuit 417 and the calling and called line out gate circuits 424 and 426 in each of the connectors of the system, and to the return out gate circuit 526 and the revertive call signalling circuit 563 in each of the revertive call selectors of the system.

In order to provide facilities for effecting party line ringing of the called substation on either a fully selective or a semi selective harmonic ringing basis, the common equipment 17 further includes a harmonic ringing oscillator 97, which functions independently of the other components of the system and is designed to operate at an audio frequency, preferably 1200 cycles, which is suitable for subdivision into a group of related ringing frequencies of any standard ringing series. The oscillator 97 is connected over the conductor 102 to a harmonic ringing frequency generator 98 which operates under the control of the 1200 cycle signal from the oscillator 97 to develop five continuous wave ringing signals of different frequencies which are suitable for exciting the ringing facilities of five different substations connected to one of the lines of the system. In the illustrated embodiment, the ringing frequencies developed by the generator 98 correspond to the frequencies of the conventional harmonic ringing series, so that conventional frequency sensitive harmonic ringers may be employed in the substations of the system. Thus, continuous wave signals having the frequencies 16⅔ C. P. S., 25 C. P. S., 33⅓ C. P. S., 50 C. P. S. and 66⅔ C. P. S. are respectively impresed upon the output conductors 103–107, inclusive, of the generator 98.

The common equipment 17 further comprises the harmonic ringing code forming circuit 99 which operates independently of the other components of the system to develop two different party line code ringing signals during each of five successive ringing periods, which periods recur during the repetitive ringing cycles established by the circuit 99. In the illustrated embodiment, each ringing period lasts for approximately 1½ seconds, and is separated from the adjacent ringing period by a short guard interval, the overall ringing cycle being approximately 7½ seconds long. During each of the five ringing periods, the code forming circuit 99 produces both a long ringing pulse, which lasts for 1½ seconds, and two short ringing pulses, each of ½ second duration, separated by a ½ second silent period. The series of ten coded ringing pulses formed by the circuit 99 are used to control a harmonic ringing modulator circuit 100 wherein the 1½ second ringing pulses are used as gating pulses sequentially to gate to a common output conductor 108 the different ringing frequencies impressed on the conductors 103–107, inclusive, by the generator 98, and the multiplexed ringing frequencies thus impressed on the conductor 108 are transmitted to a harmonic ringing amplifier and supply circuit 101. The common equipment 17 also includes a ringback tone generator 29c which performs the function of developing a continuous audible ringback tone signal (preferably 200 C. P. S.) which is supplied over the conductor 27b to the harmonic ringing modulator circuit 100. Each one of the ten codes formed by the circuit 99 is used to develop corresponding pulses of ringback tone on the ten ringback tone conductors 48a–48j inclusive, which form the illustrated ringback tone cable 48. These coded or interrupted ringback tone signals are transmitted over the cable 48 to the party digit register 465 in each of the connectors of the system and to the ringback tone gates 562 in each of the revertive call selectors of the system. The harmonic ringing amplifier and supply circuit 101 filters and amplifies the multiplexed ringing frequencies transmitted thereto over the conductor 108 and provides a combined bias voltage and multiplexed ringing current source which is connected to each of the line circuits of the system over the common multiple conductors 61a and 61b, forming the illustrated cable 61.

In order to mark certain consecutively numbered groups of the lines in each hundreds group as trunks for handling non-revertive calls, there is provided the trunk marking pulse generators 194b–194j, inclusive, which are individually associated with each hundreds line group, other than the first hundreds line group 12 which is reserved for the revertive call trunks of the system. Each of the trunk marking pulse generators is jointly controlled by the positive units pulses transmitted thereto over the cable 31 and the positive tens pulses transmitted thereto over the cable 32 and develops on the common output conductors 206b–206j, inclusive, thereof, trunk marking pulses which appear in the time positions assigned to each of the lines in each trunk group with the exception of the last line in each group, which is unmarked. The trunk marking pulses produced on the conductors 206b–206j, inclusive, are respectively impressed upon the trunk hunting control circuit 483 in each of the connectors in the associated hundreds line group. For example, the trunk marking pulses produced on the conductor 206b are impressed upon the trunk hunting control circuit 483 in the connectors 131b, 133b and 135b in the second hundreds group 13.

To provide a trunk hunting arrangement wherein the tens and units digit registers of the connectors are successively driven to different settings to hunt for an idle trunk within the called trunk group, there is provided in the common equipment 17 a trunk hunting drive pulse generator 59 which operates independently of the other components of the system to develop positive trunk hunting drive pulses of relatively short duration which recur at a relatively low rate (preferably in the order of 100 pulses per second) which are impressed on the common conductor 59a and are connected by way of this conductor to the units register advancer 481 in each of the connectors of the system.

In order to provide facilities for timing the conversation period of a non-revertive call and for warning the calling and called line subscribers when a call is about to be terminated, the common equipment 17 includes a timing pulse generator 57 and a conversation timing warning tone generator 58. The timing generator 57 operates independently of the other components of the system to develop relatively narrow positive conversation timing pulses, which preferably have a repetition rate of approximately one pulse every forty seconds, and are connected by way of the common conductor 57a to the party register advancer 482 in each of the connectors of the system. In addition, the timing generator 57 is arranged to provide ringing timeout pulses, preferably at the rate of one pulse every two minutes, which are connected by way of the common conductor 57b to the ringing timeout circuit 599 in each of the revertive call selectors of the system. The conversation timing warning tone generator 58 also operates independently of the other components of the system to develop a continuous wave warning tone signal (preferably 400 C. P. S.) which is connected by way of the common conductor 58a to the conversation timing warning tone signal 484 in each of the connectors of the system.

The common equipment 17 also includes a busy tone generator 29a, preferably having an impulse rate of 60 impulses per minute, which is used as a line busying supervisory signal, the output of the generator 29a being connected by way of the common conductor 46 to the supervisory tone gate circuit 425 in each of the connectors of the system; a busy tone generator 29d, preferably having a 120 I. P. M. rate, which is used as a linkage busying supervisory signal, the output of the generator 29d being connected by way of the common conductor 49 to the busy tone gate circuit 325a in each of the first selectors of the system and to the all links busy circuits 192b–192j, inclusive, in each hundreds group, other than the first hundreds group 12; a dial tone generator 29b which develops a dial tone signal which is connected by way of the common conductor 47 to the dial tone gate circuit 325 in each of the first selectors of the system; a ringing carrier generator 29f which operates independently of the other components of the system to develop a ringing carrier wave (preferably having a frequency of 4900 cycles) which is connected by way of the common conductor 47a to the ringing carrier modulator circuit 405 in each of the connectors of the system, and to the ringing carrier modulator circuit 505 in each of the revertive call selectors of the system; and a revertive call tone generator 29g, preferably having a frequency different from the other tone generators of the system, which develops a revertive call tone signal which is connected by way of the common conductor 49b to the revertive call tone gate circuit 597 in each of the revertive call selectors of the system.

The common equipment 17 further comprises a selector allotting circuit 20b which is controlled by tens pulses transmitted thereto from the tens pulse ring circuit 21 by way of the conductor 32j, and functions sequentially to apply selector allotting pulses to the one hundred output conductors thereo, 20–1, 20–2, 20–3 to 20–100, inclusive, which together comprise the illustrated cable 20c. Each of the conductors of the cable 20c is connected to one of the first selectors of the system, and transmits selector allotting pulses to the idle pulse gate circuit 395 in this selector. However, in the system of the present invention, the first hundreds group 12 is reserved for revertive call trunks so that no first selectors appear in this hundreds group. Accordingly, the conductors 21–1, 21–2 to 20–10, inclusive, are left idle. These selector allotting pulses are of one pulse frame duration and function sequentially to enable the first selectors of the system to select an idle acceptor-connector link or revertive call trunk. With this arrangement, two or more first selectors cannot compete for an idle acceptor-connector link or revertive call trunk, and double connections to this linkage are avoided.

In order to render the mode of operation of the system more readily understandable, a pulse chart has been illustrated in Figs. 24 to 27, inclusive, to show the relative widths of the pulses developed by the common equipment components, 19, 19a, 20, 21 and 22 during two successive pulse frames, as well as the time or phase relationship between these pulses. As there shown, the units pulse ring drive pulses 95a, appearing on the conductor 19b, are produced by the pulse forming circuit 19a along the zero potential reference line 95 at a frequency rate of one megaclcle and are of positive polarity. Similarly, the channel pulse commutator drive pulses 96a appearing on the conductors 41 and 35 and the linkage sampling pulses 96b appearing on the conductors 40 and 40b are produced by two separate channels of the phase shifter and pulse former network 19 at the same frequency of one megacycle and are of positive polarity. It will be noted that the units pulse ring drive pulses 95a, the commutator drive pulses 96a and the linkage sampling pulses 96b are all very narrow, i. e., produced for very short time intervals, and that the pulses 96a and 96b are displaced in time relative to the pulses 95a and to each other. As shown in Fig. 24A of the drawings, wherein a few of the pulses 95a, 96a and 96b are shown on an enlarged scale to illustrate the phase relationship therebetween, each commutator drive 96a occurs during the first half of the period separating the preceding and succeeding units pulse ring drive pulses 95a, and preferably occurs one-quarter microsecond after the corresponding units pulse ring drive pulse 95a. The linkage sampling pulses 96b are also displaced in time relative to the pulses 95a and each linkage sampling pulse occurs just slightly before the middle of the period separating the preceding and succeding units pulse ring drive pulses 95a. In this connection it will be understood that the phasing of the pulses 96a and 96b relative to the pulses 95a may be independently controlled so that the pulses 96a and 96b can have different phase relationships with respect to the pulses 95a. By providing separate channels in the circuit 19 for the relative phasing of the pulses 96a and 96b, the circuit delays encountered in the system can be compensated so that positive and complete gating of signals through the system is provided.

The positive units pulses appearing respectively on the units pulse conductors 31a, 31b–31j, inclusive, are produced along the zero potential reference lines 62, 63–71, inclusive. It will be noted that the units pulses are produced by the units pulse ring circuit 20, the fundamental frequency rate of one megacycle. However, due to the diversion of the pulses successively to different ones of the unit pulse conductors *a, b–j*, inclusive, the pulses along any particular zero potential reference line recur only at a frequency rate of 100 kilocycles. It will also be noted that the units pulses are successively produced on the units pulse conductors 31a, 31b–31j, inclusive, in the order of alphabetical designation of these conductors. Thus, successive positive units pulses produced along any particular zero potential reference line, such, for example, as those occurring during the units pulse periods 62a, 62b, 62c, etc., along the potential reference line 62, are separated by a time interval equaling the sum of nine units pulse time positions and during which units pulses are produced successively along each of the 9 other zero potential reference lines.

The positive tens pulses successively produced by the tens pulse ring circuit 21 on the tens pulse conductors 32a, 32b–32j, inclusive, are illustrated as appearing on the tens zero potential reference lines 72 to 81, inclusive. It will be noted that each tens pulse exists for a time interval exactly equaling the time required to produce ten units pulses. Thus, the tens pulse period 72*a* persists for the duration orf the interval in which the ten units pulses 62*a*–71*a*, inclusive, are successively produced by the units pulse ring circuit 20. It will also be noted that the starting point of each tens pulse period 72*a*, 73*a*, 74*a*, etc. is exactly coincident with the starting points of the units pulses 62*a*, 62*b*, 62*c*, etc. appearing on the zero potential reference line 62 and impressed upon the units pulse conductor 31*a* by the units pulse ring circuit 20.

The channel pulses which are successively produced on the ten channel pulse conductors 34*a*, 34*b*–34*j*, inclusive, by the channel pulse commutator 22, and are transmitted to the multiplexers 11*b*–11*j*, inclusive, for signal bearing purposes in the manner indicated generally above, and to different ones of the acceptors of the system for idle pulse generation in the manner described generally above, are of positive polarity, are produced along the zero potential reference lines 82 to 91, inclusive, and occur in timed coincidence with the commutator drive pulses 96*a* appearing along the zero potential reference line 96. Like the units pulses, the channel pulses are produced at the fundamental frequency rate of one megacycle, but due to the action of the commutator 22 in diverting these pulses successively to the conductors 34*a*, 34*b*–34*j*, inclusive, recur only on each of these conductors at the rate of 100 kilocycles. Thus, the channel pulses 82*a*, 82*b*, 82*c*, etc. appearing along the reference line 82 and impressed on the conductor 34*a*, are spaced apart time-wise by like intervals each of which exactly equals the sum of ten units pulse time positions. During this spacing interval, nine additional channel pulses are successively produced along the reference lines 83, 84–91, inclusive, to appear on the conductors 34*b*, 34*c*–34*j*, inclusive.

With the above general description of the pulse chart illustrated in Figs. 24–27, inclusive, in mind, it will readily be understood that each pulse frame is divided into one hundred readily identifiable pulse time positions. Thus, the first ten pulse time positions of each pulse frame are defined by the first tens pulse period 72*a* of the frame, within which the ten units pulse periods 62*a*, 63*a*, 64*a*–71*a*, inclusive, occur. These ten units pulse time positions are respectively assigned to the first ten lines in each hundreds line group of the system, other than the first hundreds line group 12 which is reserved for revertive call trunks. Thus, in the second hundreds group 13 the lines having the directory number designations Nos. 211, 212, 213, 214, 215, 216, 217, 218, 219 and 210 have respectively assigned thereto the ten units pulse periods 62*a*, 63*a*, 64*a*–71*a*, inclusive. Similarly, each first group of ten lines in each hundreds line group has respectively assigned thereto the first ten units pulse periods in each pulse frame. Also, the second ten units pulse time positions are defined by the second tens pulse period 73*a* during which the ten units pulse periods 62*b*, 63*b*, 64*b*–71*b*, inclusive, occur. These units pulse periods are assigned to the second group of ten lines in each of the hundreds groups of the system, other than the first hundreds group which is reserved for revertive call trunks. Thus, in the second hundreds group 13, the second group of ten lines, having the director number designations Nos. 221, 222, 223, 224, 225, 226, 227, 228, 229 and 220 have respectively assigned thereto the ten unit pulse periods 62*b*, 63*b*, 64*b*–71*b*, inclusive.

It will therefore be understood that the pulse time position of each pulse frame which is assigned to the illustrated private line No. 223 in the second hundreds group 13 occurs during the second tens pulse interval 73*a* of each pulse frame and is coincident with the units pulse period 64*b* of each pulse frame. It will also be apparent that the corresponding channel pulse 84*b* occurs well within the time limits of this pulse time position. Similarly, the pulse time position assigned to the illustrated party line No. 232 in the second hundreds group 13 occurs during the third tens pulse time interval 74*a* of each pulse frame and is coincident with the second units pulse period 63*c* of each pulse frame. Here again, each channel pulse 83*c* corresponding to the line No. 232 in the hundreds group 13 occurs well within the limits of the particular time position assigned to the line No. 232 in each pulse frame. Also, the party line No. 032 in the tenth hundreds group 14 has assigned thereto the same units pulse period 63*c* as do the other lines Nos. 332, 432, 532, 632, 732, 832 and 932 in the other hundreds groups of the system.

In addition, each group of ten units time positions which occur during a particular tens pulse interval are assigned to one of the hundreds groups of the system to identify individual ones of the ten acceptor-connector links serving each hundreds group, or in the case of the first hundreds group, individual ones of the ten revertive call trunks in this hundreds group. Thus, in the first hundreds group 12, the first revertive call trunk 121 is arbitrarily assigned the first units pulse period 62*a* which occurs during the first tens pulse period 72*a* of each pulse frame. Likewise, the second revertive call trunk 123 is assigned the second units pulse period 63*a* which occurs during the first tens pulse period 72*a* of each pulse frame. Finally, the last, or tenth revertive call trunk 125 in the first hundreds group 12 is assigned the tenth units pulse period 71*a* which occurs during the first tens pulse period 72*a* of each pulse frame, it being understood that a series of ten revertive call trunks are provided in the hundreds group 12, each of which is assigned one of the ten units pulse periods which occur during the first tens pulse periods 72*a*. In this connection, it will be understood that the assignment of units pulse periods to different revertive call trunks in the first hundreds group 12 is only done on an arbitrary basis within the first tens pulse interval 72*a*, so that this tens pulse interval represents a group of revertive call trunks which serve all of the lines of the system. With this arrangement, access may be had to the revertive call trunks only by selecting the tens pulse interval 72*a* assigned to this group in response to dialing of a first, or hundreds digit of "1" at the calling substation, as will be described in more detail hereinafter.

In the second hundreds group 13 and succeeding hundreds groups, the acceptor-connector links are assigned different units pulse periods which occur during successive tens pulse periods of each pulse frame. Thus, the second hundreds group 13 is assigned the second tens pulse period 73*a* and the acceptor-connector links 131, 133 and 135 in this hundreds group, are individually assigned different units pulse periods which occur during the second tens pulse period 73*a*.

In order further to render the mode of operation of the fully selective or semi-selective harmonic ringing operation in the revertive call trunk system of the present invention more readily understandable, a harmonic code sequence chart is illustrated in Fig. 31 to show the time and phase relationship of the signals developed by the harmonic ringing code forming circuit 99 and the harmonic ringing modulator circuit 100 in the common equipment 17 during one harmonic ringing cycle. As there shown, the code forming circuit 99 develops a series of long ringing pulses 165, 166, 167, 168 and 169 on five different output code buses thereof, which recur in succession during successive ringing cycles of approximately 7½ seconds duration. The long ringing pulses 165–169, inclusive, define a succession of five ringing periods which are separated by guard intervals 186 of relatively short duration. The code forming circuit also operates to produce on five other code buses thereof a pair of short ringing pulses during each ringing period. Thus, the circuit 99 develops short ringing pulses 170 and 171 during the first ringing period, the pulses 172 and 173 during the second ringing period, the pulses 174 and 175 during the third ringing period, and so forth. In addition, the code forming circuit 99 develops the positive code start pulses 180 (Fig. 31 (11)), which occurs substantially at the end of each of the guard intervals 186. The code start pulses 180 are transmitted over the common conductor 5 to the code start circuit 468 in each of the connectors of the system and to the code start circuit 568 in each of the revertive call selectors of the system, to delay the selection of a particular party line ringing signal until the start of a particular ringing period.

The long ringing pulses 165 are employed in the harmonic ringing modulator circuit 100 successively to gate different ringing frequencies to the common output conductor 108 and the composite or multiplexed ringing frequency signal is filtered in the harmonic ringing amplifier and supply circuit 101 so as to provide a ringing voltage wave form substantially as shown in Fig. 31(12). Thus, during the first ringing period the ringing pulse 165 is used to gate a 66⅔ C. P. S. ringing voltage to the common conductor 108. After the guard interval 186, the ringing pulse 166 is employed to gate a 50 C. P. S. ringing voltage to the conductor 108 during the second ringing period. Likewise, the successive ringing pulses 167, 168, and 169 are employed successively to gate to the common output conductor 108 ringing voltages having frequencies of 33⅓ C. P. S., 25 C. P. S., and 16⅔ C. P. S.

In order to produce ringing control signals which may be used to control the application of ringing current to the called line, or the revertive calling line, during the particular ringing period and in accordance with the particular ringing code assigned to the called substation connected thereto, and also to produce concurrently therewith corresponding ringback tone signals which may be used to advise the calling subscriber that the called line is being rung in a particular code sequence on non-revertive calls, the long and short ringing pulses (Figs. 31(1)–(10), inclusive) developed by the harmonic ringing code forming circuit 99 are used individually to gate to the output conductors **48*a*–48*j*, inclusive, a ringback tone signal for the duration of each ringing pulse. Thus, the ringing pulse 165 developed in the code forming circuit 99 is used to develop a ringback tone signal 165*a* which persists for the duration of the first ringing period. Likewise, the short ringing pulses 170 and 171 are employed to produce the ringback tone signals 170*a* and 171*a* which have a duration of ½ second and are separated by a ½ second silent period, the signals 170*a* and 171*a*** also occurring during the first ringing period. In a similar manner, the long and short ringing pulses which are produced during the second, third, fourth and fifth ringing periods are employed to produce the successive interrupted ringback tone signals shown in Figs. 31(15–22), inclusive.

With the above general description of the harmonic code sequence chart illustrated in Fig. 31 in mind, it will readily be understood that each harmonic ringing cycle is divided into five successive ringing periods and during each ringing period there is produced a first party line ringing signal consisting of one long ringing pulse, and a second party line ringing signal consisting of two short pulses, each party line ringing signal being repeated at approximately 7½ second intervals. In the event that a maximum of five substations are associated with any one line of the system, only the long ringing pulses 165–169 inclusive, need be employed, and under these conditions each of the substations would respond to a ringing current of a different frequency. Also, the five substations would be assigned different fourth or ringing digit directory number designations, and one of the ringback tones **165*a*–169*a***, inclusive, would be selected in the connector stage in response to the dialing of a fourth digit at the calling substation.

In the event that more than five substations, up to a maximum of ten substations, are associated with one of the lines of the system, the substations are divided into pairs and each pair of substations is provided with ringing facilities responsive to the same ringing frequency. Thus, the substations F and G associated with the line No. 232 and assigned the directory number designations No. 2321 and 2322 would both be provided with ringing facilities responsive to the same ringing current, for example, a 66⅔ C. P. S. ringing current. On a non-revertive call, if the calling subscriber on one of the other lines of the system wishes to call the substation F, he dials the number 2321 and the connector responds to the fourth digit of "1" by selecting the ringback tone signal **165*a* so that a 66⅔ C. P. S. ringing current is transmitted over the called line No. 232 during the entire first ringing period. Only the ringers at the substations F and G will then be rung for a period of approximately 1½ seconds, and the subscriber at the substation F will know that the call is intended for him. On the other hand, if the calling subscriber wishes to call the substation G associated with the line No. 232, he dials the number 2322 and the connector responds to the fourth digit of "2" by selecting the ringback tone signal consisting of the short pulses 170*a* and 171*a*** which control the application of 66⅔ C. P. S. ringing current to the line No. 232 so that the ringing facilities at both the substations F and G are rung in two short rings. The subscriber at the substation G is then notified that his substation is being rung.

On revertive calls, both the party line ringing signal assigned to the calling party and the party line ringing signal assigned to the called party are transmitted over the revertive calling line, unless the calling and called substations have the same ringing frequency assigned thereto in which case only the party line ringing signal corresponding to the called substation is transmitted over this line. For example, if the subscriber at the substation F associated with the line No. 232 wishes to call the subscriber at the substation G, he dials a special revertive call number which consists of a first digit of "1," corresponding to the hundreds digit of a non-revertive call number, which permits him to gain access to one of the revertive call trunks in the first hundred group 12. The calling subscriber then dials a second digit of "1" which identifies the party line ringing signal assigned to his own substation and thereafter dials a third digit of "2" which identifies the party line ringing signal assigned to the called substation G. Since the substations F and G both respond to the same ringing frequency, it is impossible to transmit both the long ringing signal **165*a* assigned to the substation F and the two short ringing signals 170*a* and 171*a* assigned to the substation G over the line No. 232 since both of these ringing signals occur during the first ringing period. Accordingly, only the called party ringing signal consisting of the two short pulses 170*a* and 171*a* is transmitted over the line 232 during the first ringing period, so that both the calling and called subscribers hear the called subscriber's ring. On the other hand, if the subscriber at the calling substation F wishes to call the substation H also associated with the line No. 232, he dials a third revertive call digit of "3" which identifies the party line ringing signal assigned to the substation H consisting of the long ringing signal 166*a*. Since the ringing signal 166*a* occurs during the second ringing period, both the calling and called party line ringing signals may be transmitted over the revertive calling line since these signals occur during different ringing periods. Accordingly, the calling substation F is rung during the first ringing period at a frequency of 66⅔ C. P. S. for the duration of the ringing signal 165*a*, whereas the substation H is rung during the second ringing period at a frequency of 50 C. P. S. for the duration of the ringing signal 166*a***. It will, of course, be understood that if a maximum of five substations are associated with one of the lines of the system each substation may be assigned a different ringing frequency so that under all conditions the calling and called substations may be rung simultaneously. It will also be understood that certain lines of the system may be adapted for private service, in which case the private lines will have only one substation associated therewith. Thus, in the illustrated embodiment, the line No. 223 is adapted for private service and has associated therewith only the one substation E to which is assigned the directory number designation 2231.

In order to render the mode of operation of the trunk hunting facilities of the present invention more readily understandable, a trunk marking pulse chart has been illustrated in Fig. 32 to show the time and phase relationship of the trunk marking pulses developed by each of the trunk marking pulse generators 194*b*–194*j*, inclusive, individually associated with each hundreds line group, other than the first hundreds line group which is reserved for revertive call trunks. Referring to this figure, the 100 time positions which comprise one pulse frame are illustrated as a series of ten horizontal strings of blocks corresponding to the ten tens digit levels of the lines in each hundreds line group of the system. In each of the blocks there is shown the last two numbers of the line which is assigned a corresponding units time position. Thus, in the second hundreds line group 13, the first units time position 62*a* in each time position frame is assigned to the line No. 211, the second units time position 63*a* in each time position frame is assigned to the line No. 212, the third units time position 64*a* in each time position frame is assigned to the line No. 213, and so forth.

In order to mark certain lines of the second hundreds group 13 as private branch exchange trunks, the trunk marking pulse generator 194*b* selects certain ones of the units pulses supplied thereto over the multiple conductor cable 31 and gates the selected units pulses by means of the appropriate tens pulses supplied thereto over the multiple conductor cable 32 to provide trunk marking pulses which occur once in each time position frame in particular units pulse time positions assigned to the lines which are to be marked. The last line in each trunk group is unmarked. Thus, in Fig. 32, there are shown nine different trunk groups. In the second hundreds group 13 one of these trunk groups is comprised of the lines Nos. 232 to 242, inclusive, and the trunk marking pulse generator 194*b* operates to develop trunk marking pulses during each of the time positions assigned to these lines except the last line No. 242 in this trunk group, which is unmarked. It will be evident from Fig. 32 that the different trunk groups include lines which are positioned in different tens digit levels, and may also include lines in the first and last tens digit level of the hundreds line group. Thus, the eighth trunk group comprises the lines Nos. 205 to 209, inclusive, 200, and 211 to 215, inclusive.

OPERATION OF THE SYSTEM AS A WHOLE

Briefly to consider the general mode of operation of the system, in order to illustrate the operation of the revertive call system of the present invention a revertive call will first be traced in which it is assumed that the party line substation H is called from the party line substation F, both of which substations are associated with the line No. 232 in the second hundreds group 13, during a period when the finder-selector link 130 is idle, and the first revertive call trunk 121 is also idle. In addition, in order to illustrate the compatible operation of the system for non-revertive calls wherein the special service features of trunk hunting and conversation timing are provided, a non-revertive call will be traced in which it is assumed that the private substation K, which is associated with the line No. 032 in the tenth hundreds group 14, is called from the private substation E associated with the line No. 223 in the second hundreds group 13 during a period when the finder-selector link 130 is idle and the acceptor-connector link 141 is also idle. However, the non-revertive call will be described only in sufficient detail to illustrate the different functions of the system components for revertive and non-revertive calls, reference being had to the copending application Serial No. 326,213 identified above, for a complete and detailed description of a similar non-revertive call.

*Revertive call operation*

Considering first the general operations which must be performed by the calling party in order to complete a revertive call in the system of the present invention, it will be understood that each substation associated with a party line has assigned thereto a special revertive call number in addition to the uniform directory number assigned to this substation which latter number is used for non-revertive calls. Accordingly, if the calling party wishes to make a revertive call he must look up the special revertive call number assigned to the other party on his line which he wishes to call and dial this special revertive call number instead of the uniform directory number of the called party. This may be conveniently done by providing a small card associated with each handset on which the special revertive call numbers assigned to the other parties on the same line appear. For example, if the subscriber at the substation F, associated with the line No. 232 in the second hundreds group 13, wishes to call the subscriber at the substation H associated with the same line, he does not dial the directory number 2323 assigned to the substation H for non-revertive calls, but instead dials a special revertive call number which is assigned to this substation. The special revertive call numbers assigned to all of the substations of the system have a first digit of "1" in the illustrated embodiment wherein the revertive call trunks are assigned to the first hundreds group 12 so that dialing of a first digit of "1" permits the calling subscriber to become operatively associated with one of the revertive call trunks 121, 123 and 125, in a manner to be described in more detail hereinafter. In order to permit both the calling and called substations to be rung while employing frequency selective ringing so that the calling party will be informed by termination of ringing that the revertive call has been answered, the second digit of the special revertive call number indicates the party line ringing signal, or digit of the directory number assigned to the calling party, and the third digit of the special revertive call number indicates the party line ringing digit of the directory number assigned to the called subscriber. Accordingly, in the illustrated revertive call, the special revertive call number would have a second digit of "1" corresponding to the #1 ringing signal assigned to the substation F and would also have a third digit of "3" corresponding to the #3 party line ringing signal assigned to the called substation H. Accordingly, the special revertive call number "113" is dialed at the substation F in order to reach the substation H associated with the same line No. 232.

After the calling subscriber has received dial tone and has dialed the special revertive call number assigned to the called substation in the manner described above, the calling subscriber hangs up to permit completion of the revertive call. However, the revertive call trunk which is operatively associated with the revertive calling line, is arranged to hold the linkage operatively associated with this revertive calling line even though a calling condition does not exist on this line, and the line is rung in accordance with the party line ringing signals selected in the revertive call trunk. If a maximum of five substations are associated with the revertive calling line No. 232, each of these substations may have assigned thereto a different ringing frequency, and since these ringing frequencies occur during different ringing periods in each harmonic ringing cycle, both substations may be successively rung during the particular ringing period assigned thereto so that the ringer at the calling substation will be rung as well as the ringer at the called substation. In this case, the calling subscriber at the substation F will be informed by termination of ringing at his substation that the revertive call has been answered and that he can come back off hook to complete the revertive call connection. However, if more than five substations are associated with the same line, it is necessary to provide semiselective harmonic ringing wherein the same ringing frequency is assigned to two substations, so that a maximum of ten substations may be accommodated. Accordingly, if the calling and called substations have the same ringing frequency assigned thereto, the party line ringing signals assigned to these substations are distinguishable by the code sequence of the ring rather than the frequency of the ringing signal and it would be impossible to transmit both one long ring and two short rings at the same ringing frequency and during the same ringing period over the same line. Accordingly, the revertive call trunk is arranged to withhold the party line ringing signal assigned to the calling substation in those situations wherein the calling and called substations have the same ringing frequency assigned thereto. Under these conditions, the party line ringing signal assigned to the called substation actuates the ringers at both the calling and called substations so that the calling substation is rung in accordance with the code ring assigned to the called substation. However, the calling subscriber will again be informed by termination of ringing that the revertive call has been answered so that he will know it is time to come back off hook and complete the connection.

In the event that code ringing is employed wherein all of the substations associated with the revertive calling line respond to the same frequency and are rung in accordance with the party line ringing code assigned to the called substation, cessation of ringing is again an indication to the calling party that the call has been answered at the called substation and that he may come back off hook. However, in the case of code ringing, it is not necessary to dial a separate digit indicating the party line ringing signal assigned to the calling party, since it would not be possible to transmit both party line ringing codes over the same line at the same time. Accordingly, if party line code ringing is employed, the special revertive call number comprises only two digits, of which the first digit indicates the hundreds digit level of the revertive call trunks and the second digit indicates the party line ringing code assigned to the called substation.

The first party to answer the revertive call hears a special revertive tone signal immediately upon answering, this tone lasting only long enough to allow the subscriber to get the receiver to his ear, i. e., about one or two seconds. If the calling party answers first, this special revertive tone signal indicates to him that the call has not yet been answered and that he should wait for the called party to come to the telephone. If the called party answers first, the special revertive tone signal indicates to him that a revertive call is being made and that he should wait until the calling party comes back on the line. After the revertive call is completed and both parties hang up, the entire linkage associated with the revertive calling line is then dropped off.

If the revertive call is abandoned without either party coming back on the line, ringing of the calling and called substations is terminated after a period of from two to four minutes and the entire linkage associated with the revertive calling line is released. Also, shortly after the revertive call is answered, the revertive call trunk is itself released so as to be available for other revertive calls.

Considering now the placement of a revertive call from the substation F to the substation H, when the receiver or handset at the substation F is lifted from its supporting hook or cradle to initiate the call, a loop circuit including the conductors of the line No. 232 is closed to the line circuit 16b with the result that this line circuit immediately operates to change the magnitude of the bias potential which it delivers over the conductor 55b' to the gating circuit of the multiplexer 11b which individually corresponds to the line No. 232. The multiplexer 11b responds to this change in magnitude of the controlling bias potential supplied thereto from the line circuit 16b by opening the gate circuit corresponding to the line No. 232. Accordingly, only the multiplexer signal pulses 83c occurring during the pulse time position 63c assigned to the line No. 232, are permitted to pass over the common conductor 50b to the forward in gate circuits 307 of the selectors 130b, 132b and 134b in the hundreds group 13, and to the calling and called line in gate circuits 407 and 423 of the connectors 131b, 133b, and 135b in the hundreds group 13, in parallel. The multiplexer signal pulses 83c occurring during the pulse time position 63c are also transmitted over the conductor 50b, through the buffer amplifier 190b, and over the conductor 204b to the pulse input circuits 300 of the finders 130a, 132a, and 134a in the hundreds group 13. At this point, the pulses transmitted from the multiplexer 11b over the common conductor 50b in the pulse time position 63c may be regarded as multiplexer signal pulses 83c.

In the illustrated embodiment, the finder-selector links in each hundreds line group of the system are arranged in a predetermined sequence and are allotted one at a time to successive calling lines within each particular hundreds line group by means of the self allotting circuits 306 of each of these finders. Thus, in the second hundreds group 13, only the finder-selector link 130 is conditioned by means of the self-allotting circuit 306 in the finder 130a to handle a call initiated on a calling line within the second hundreds group 13. However, when the link 130 is taken into use, the self-allotting circuit 306 in the finder 130a diverts a supervisory signal over the conductor 36b to the finder 132a of the link 132 to condition this link to handle the next succeeding call arising in the second hundreds group 13. Accordingly, only the link 130 is conditioned to handle the first call in the hundreds group 13 and the selector 130b of this group is as yet inoperative so that only the finder 130a initially responds to the multiplexer pulses 83c delivered thereto from the multiplexer 11b over the above-described path in the pulse time position 63c.

In the finder 130a, the multiplexer pulses 83c are repeated by the pulse input circuit 300 thereof to effect substantially immediate operation of the +B switching circuit 301 embodied in this finder whereby operating potential is delivered to the tubes of the circuits 309, 311, 312, 365, 396, and 397 of the selector 130b over the +B switch conductor 130c, with the result that the selector 130b is conditioned for operation, i. e., conditioned to respond to signal carrying multiplexer pulses delivered thereto from the multiplexer 11b over the conductor 50b. Operation of the +B switching circuit in the finder 130a also has the effect of conditioning the tens and units coincidence tube circuits 303 and 304 of this finder for operation under the joint control of the multiplexer pulses 83c repeated by the input circuit 300, the positive tens pulses developed by the tens pulse ring circuit 21 and the positive units pulses developed by the units pulse ring circuit 20.

In responding to the tens and units pulses impressed thereon coincidentally with the multiplexer pulses 83c, the tens and units coincidence tube circuits 303 and 304 of the finder 138 cooperate with the finder pulse forming circuit 305 and the pulse combining circuit 302 of this finder to produce finder gate pulses which are transmitted over the conductor 130d to the circuits 307, 308 and 326 of the selector 130b and have the effect of initially limiting the response of this selector only to multiplexer pulses 83c appearing in the pulse time position 63*c*. The combining circuit 302 of the finder **130*a* also gates busy pulses in the pulse time position 63*c* which are fed over the common busy pulse out conductor 202*b* to the busy pulse drive circuit 193*b* in the second hundreds group 13 wherein these busy pulses are amplified and are supplied over the common busy pulse in conductor 203*b* to the finders 130*a*, 132*a* and 134*a*, and the connectors 131*b*, 133*b* and 135*b* in the second hundreds group 13 to prevent these finders and connectors in the second hundreds group 13 from responding to multiplexer pulses occurring in this time position. Accordingly, the line No. 232 is guarded against intrusion on an incoming call and is prevented from seizing another line finder in this group. In this connection, it will be noted that the line busying operation is performed independently in each hundreds line group and independently of any linkage busying operation. Thus, when the line No. 232 is taken into use, only the finders in the second hundreds group 13 and the connectors in this hundreds group are informed that the line No. 232 is busy. However, calls intended for lines in this hundreds group can reach these lines only through one of the acceptor-connector links 131, 133 and 135** so that a complete line busying system for all of the lines of the system is provided.

Operation of the +B switching circuit 301 in the finder **130*a* has the further effect of causing the self-allotting circuit 306 of this finder to divert the supervisory control signal, normally supplied thereto over the conductor 39, to the self-allotting circuit in the finder 132*a* of the next succeeding finder-selector link 132 over the conductor 36*b* to condition the link 132 to handle the next incoming call from one of the lines in the second hundreds group 13. After the finder 130*a* has operated to perform the described functions, continued holding of the finder 130*a*, if the call is non-revertive, is dependent upon continued acceptance and transmission of multiplexer pulses 83*c* by the pulse input circuit 300, which of course means that the finder will remain associated with the calling line No. 232 only so long as a calling condition persists on this line. However, in the illustrated revertive call, the finder 130*a* continues to be operatively associated with the calling line No. 232 and continues to transmit busy pulses in the time position 63 assigned thereto and to accept multiplexer pulses only in this time position even though a calling condition does not exist on the calling line No. 232 during certain periods while the revertive call is being set up. Thus, on a revertive call, continued holding of the finder 130*a* is dependent also on the transmission of a revertive call hold potential over the conductor 130*f* from the associated selector 130*b*,** as will be described in more detail hereinafter.

In the event that all of the finder-selector links 130, 132, and 134 in the second hundreds group 13 are simultaneously in use, i. e., in the event that ten lines in the second hundreds group 13 are calling simultaneously, the all-links busy circuit **192*b* operates to transmit busy tone modulated pulses, appearing in the time position assigned to the calling line which is unable to obtain linkage in the hundred group 13, to the distributor 15*b* by way of the distributor coupling circuit 191*b*, and the distributor 15*b*** transmits the busy tone signal to this calling subscriber to inform him that all of the available linkage is taken and that he will be unable to complete the call.

As indicated above, when the +B switching circuit 301 in the finder **130*a* operates to supply operating anode potential to the conductor 130*c*, the circuits 309, 311, 312, 365, 396 and 397 of the selector 130*b* are conditioned for operation. The hundreds digit register 311 in turn supplies a bias potential to the dial tone gate circuit 325 in this selector and the circuit 325 then functions to transmit a dial tone signal, derived from the dial tone generator 29*b* by way of the conductor 47, to the return out gate circuit 326 over the conductor 344. The circuit 326, in responding to the dial tone signal and also to the finder gate pulses delivered thereto over the conductor 130*d* and the commutator drive pulses 96*a* delivered thereto over the conductor 35, functions to repeat over the channel conductor 51*b* and through the distributor coupling circuit 191*b* to the distributor 15*b*, selector signal pulses modulated in accordance with the dial tone signal in the pulse time position 63*c* assigned to the calling line. The distributor 15*b* responds to these selector signal pulses by repeating the same to the gate circuit thereof associated with the line circuit 16*b*, reconstructing the dial tone and transmitting the reconstructed dial tone signal over the conductor 45*b* to the line circuit 16*b*. In the line circuit 16*b*,** the dial tone signal is transmitted over the line No. 232 to signal the calling subscriber at the substation F that the dialing operation may be initiated.

The first digit of dial impulses which is dialed into the selector **130*b* is utilized to effect selection in this selector of the group of time positions assigned to the acceptor-connector link serving the called hundreds line group. However, in the case of a revertive call, the first digit is utilized to effect selection of the group of time positions assigned to the revertive call trunks 121, 123 and 125 in the first hundreds group 12. More particularly, in the illustrated revertive call over the line No. 232, the first digit is employed to select the pulse time positions 62*a*, 63*a*, 64*a*–71*a*, inclusive (Figs. 24 to 27, inclusive) which are assigned to the first hundreds group 12 which contains the revertive call trunks. Since the time positions 62*a*, 63*a*–71*a*, inclusive, are spanned by the single tens pulse interval 73*a*, the selection of the particular hundreds line group is effected by selecting the corresponding tens pulse produced on one of the conductors 32*a*, 32*b*–32*j*, inclusive. Accordingly, a first digit of "1" must be dialed into the selector 130*b* to effect selection of the group of pulse time positions spanned by the tens pulse interval 72*a* assigned to the first hundreds group 12** within which are located the revertive call trunks.

During the open circuit period of each dial impulse, the control potential supplied by the line circuit **16*b* to the gate circuit of the multiplexer 11*b* which corresponds thereto is returned to its on-hook value to interrupt the transmission of multiplexer pulses 83*c* to the pulse input circuit 300 of the finder 130*a* and to the in gate circuit 307 of the selector 130*b*. During the make period of each impulse dialed at the calling substation F, multiplexer signal pulse transmission from the multiplexer 11*b* to the finder 130*a* by way of the buffer amplifier 190*b*, and to the selector 130*b* in the pulse time position 63*c* is resumed. As controlled by the finder gate pulses delivered to the circuits 307 and 308 from the circuit 302 over the conductor 130*c*, the circuits 307 and 308 function to repeat any intelligence or control signals derived from the calling line No. 232 to the dial impulse integrator circuit 309.**

The circuit 309 differentiates between intelligence modulated multiplexer pulses and dial impulse modulated multiplexer pulses in such manner that only the latter appear at the output terminals of this circuit. More specifically, during each dial impulse generated to the calling substation F, the impulse integrator circuit 309 develops coincident impulses which are impressed upon the hundreds register inverter circuit 360 over the conductor 327. The hundreds register inverter circuit 360 transmits therethrough a single impulse impressed thereon by the circuit 309 during dialing of the first digit "1" at the calling substation F, and the hundreds register pulser 310 responds to this impulse by developing a coincident register drive pulse which is supplied to the hundreds digit register 311 and the hundreds sequence timing circuit 312 over the conductor 330. In responding to this register drive pulse thus transmitted thereto, the hundreds digit register 311 is driven to a setting wherein the tens pulses appearing on the positive tens pulse conductor **32*a* in the first tens pulse time position 72*a*** of each pulse frame may be transmitted through the first tens gate of this register and over the conductor 332 to the selector pulse and connector busy pulse forming circuit 317.

Transmission over the conductor 330 of the register drive pulse corresponding to the break period of the single dial impulse dialed at the calling substation F, to the hundreds sequence timing circuit 312 has the effect of conditioning this circuit to block the hundreds register pulser 310 from developing register drive pulses during dialing of succeeding digits and to render the idle pulse gate circuit 395 operative to transmit therethrough those ones of the idle pulses which are produced on the idle pulse in conductor 197 and which occur during the first tens pulse time position 72*a* which is selected in the hundreds digit register 311. The hundreds sequence timing circuit 312 also has the effect of enabling the connector busy lock circuit 396 to initiate a connector busy test interval as will be described in more detail hereinafter.

Immediately the first register drive pulse is repeated to the hundreds digit register 311 to drive this register off normal, a control potential is developed on the conductor 333 which biases the gate tube of the dial tone gate circuit 325 beyond cutoff so that dial tone transmission through this gate tube to the return out gate circuit 326 over the conductor 344 is terminated. Thus, transmission of the dial tone signal to the calling substation F is arrested.

While the hundreds digit register 311 is operative to select the hundreds line group which contains the called line, or, in the case of a revertive call, to select the hundreds line group containing the revertive call trunks, there remains to be performed the further operation of selecting an idle one of the acceptor-connector links in the called hundreds line group, or, in the case of a revertive call, to select an idle one of the revertive call trunks in the hundreds line group assigned thereto. Furthermore, this selection of an idle acceptor-connector link or revertive call trunk must be performed during the inter-digit pause between the first and second digit so that the dial impulses during succeeding digits may be employed in the seized revertive call trunks to select the party line ringing signals assigned to the calling and called substations.

To perform seizure of either an idle acceptor-connector link within the called hundreds line group in the case of a non-revertive call, or an idle revertive call trunk in the case of a revertive call, there is provided an idle pulse channel common to all of the lines of the system, by means of which the idle condition of the acceptor-connector links and revertive call trunks of the system is indicated to all of the selectors of the system. More specifically, the acceptor-connector links serving a given hundreds line group are individually assigned different ones of the total number of time positions assigned to each hundreds line group. In the illustrated embodiment, each hundreds line group is assigned a series of ten consecutive pulse time positions so that a maximum of ten acceptor connector links may be employed in each hundreds line group, and a maximum of ten revertive call trunks may be employed in the first hundreds line group. Furthermore, each acceptor-connector link serving a given hundreds line group is permanently assigned a different one of these ten pulse time positions as is each one of the revertive call trunks within the first hundreds group 12. Thus, in the first hundreds group 12 the first revertive call trunk 121 is assigned the first pulse time position in each frame, i. e., the pulse time position 62*a*, the second revertive call trunk 123 is assigned the second pulse time position 63*a*, and the last or tenth revertive call trunk 125 is assigned the tenth pulse time position 71*a* in each pulse frame. In a similar manner, the acceptor-connector links in the second hundreds group 13 are assigned the time positions 62*b*–71*b*, inclusive, which occur during the second tens pulse period of each pulse frame. It will, therefore, be understood that in the overall system, the total number of acceptor-connector links and revertive call trunks which may be employed is 100, each of these units being assigned a different pulse time position within the basic time position frame.

In order to indicate the idle condition of each acceptor-connector link and revertive call trunk, the acceptor associated with each link or trunk is equipped to produce idle pulses on the common idle pulse out conductor 198 in the time positions individually assigned thereto. In the illustrated embodiment, these idle pulses appear on the common conductor 198 when the corresponding link or trunk is idle and disappear immediately upon seizure of the link or trunk by a call forwarding selector. The idle pulses produced on the conductor 198 are coupled through the idle pulse coupling circuit 187, and are transmitted over the idle pulse in conductor 197 to the idle pulse gate circuit 395 of all of the selectors of the system. With no calls in progress and ten links or trunks in each hundreds group, the idle pulse in conductor 197 carries idle pulses which identify ten groups of ten links or trunks, these idle pulses occurring in the 100 time positions of the basic pulse frame.

Since the call forwarding selector 130*b* is not called upon to select an idle link or trunk in any group other than the selected hundreds group, the idle pulse gate circuit in the selector 130*b* is provided to transmit therethrough only those idle pulses appearing on the idle pulse in conductor 197 which occur during the selected tens pulse time position 72*a* assigned to the hundreds group 12, and the selected idle pulses which occur during the tens pulse time position 72*a* are transmitted over the conductor 395*a* to the connector coincidence tube circuit 397. The connector coincidence tube circuit 397 selects at random one of the idle pulses transmitted thereto over the conductor 395*a* from the idle pulse gate circuit 395 and gates to the output conductor 345 thereof units pulses which occur in the same time position as the selected idle pulse.

In the illustrated revertive call, if no idle pulses are transmitted through the idle pulse gate circuit 395, i. e., if all of the revertive call trunks in the hundreds group 12 are busy, the connector coincidence tube circuit 397 remains continuously conditioned for response to an idle pulse from these trunks until the end of the connector busy test interval, preferably in the order of one quarter of a second. At the end of the connector busy test interval, the connector busy lock circuit 396 functions to close the idle pulse gate circuit 395 so that idle pulses are no longer transmitted through this circuit to the connector coincidence tube circuit 397 and hunting for an idle revertive call trunk ceases. Also, at the end of the connector busy test interval, the connector busy lock circuit 396 supplies an enabling bias potential to the busy tone gate circuit 325*a*, and this circuit then functions to transmit a busy tone signal, preferably of 120 impulses per minute, which is derived from the busy tone generator 29*a* by way of the conductor 49, to the return out gate circuit 326 over the conductor 344. The circuit 326 functions to repeat to the distributor 15*b* selector signal pulses modulated in accordance with this busy tone signal in the pulse time position 63*c* assigned to the calling line so that the calling subscriber is informed that all of the revertive call trunks are busy and that he will be unable to complete the revertive call.

In the event that one or more idle pulses are transmitted through the idle pulse gate circuit 395, indicating that one or more revertive call trunks are idle, the connector coincidence tube circuit 397 responds to one of these idle pulses by gating units pulses to the output conductor 345 thereof in the same pulse time position. Also, when one of the coincidence tubes in the circuit 397 is fired by an idle pulse, a disabling potential is transmitted over the conductor 397*a* to the connector busy lock circuit 396, thereby disabling the circuit 396 and permitting further progress of the call.

The selector pulse and connector busy pulse forming circuit 317 operates to combine the tens and units pulses respectively transmitted thereto from the hundreds digit register 311 and the connector coincidence tube circuit 397 to produce a resultant selector pulse which appears on the conductor 339. More specifically, the positive tens pulses 72*a*, which are transmitted to the circuit 317 over the conductor 332 and represent the block of time positions assigned to the revertive call trunks in the hundreds group 12, are combined with the positive units pulses appearing on the conductor 31*a*, which are gated by the coincidence tube circuit 397, and, in the illustrated embodiment represent the units pulse time position assigned to the idle first revertive call trunk 121 in the hundreds group 12. Mixing of these pulses in the circuit 317 results in the production of a selector pulse which occurs once during each pulse frame in the pulse time position 62*a* assigned to the selected idle revertive call trunk 121. In this connection, it will be understood that if all of the revertive call trunks are busy, no units pulses are impressed upon the circuit 317 from the connector coincidence tube circuit 397 and hence no selector pulses are produced on the output conductor 339 of the selector pulse and connector busy pulse forming circuit 317 under these conditions.

The selector pulses developed by the circuit 317 are transmitted over the conductor 339 to the selector components 322, 323, 324 and 365. The forward out gate circuit 324 responds to these selector pulses by gating certain linkage sampling pulses 96*b* derived from the linkage sampling pulse drive circuit 40*a* over the conductor 40*b*. More specifically, the linkage sampling pulses transmitted over the conductor 40*b* are gated by the selector pulses produced on the conductor 339 in the pulse time position 62*a* assigned to the selected revertive call trunk 121, whereby very narrow selector forward signal pulses are released over the conductor 195 to the selector forward coupling circuit 186. From the selector forward coupling circuit 186 these selector forward signal pulses are transmitted over the conductor 196 to all of the connectors and revertive call selectors of the system. The forward out gate circuit 324 in the selector 130*b* also responds to voice and supervisory signals originating at the calling substation F and detected or reconstructed and stored in the forward reconstructor circuit 308 by modulating these voice or supervisory signals derived from the circuit 308 upon the selector forward signal pulses developed by the out gate circuit 324 in the pulse time position 62*a* assigned to the selected revertive call trunk 121. Accordingly, the supervisory signals, including the dial impulses constituting the second and third revertive call digits dialed at the substation F, are modulated upon the selected forward signal pulses produced by the circuit 324 and are impressed upon all of the connectors and revertive call selectors of the system by way of the conductor 196. In addition to being transmitted to all of the connectors of the system, the selector forward signal pulses are transmitted in modified form to all of the acceptors of the system over a path which includes the conductor 195, the selector forward coupling circuit 186, the conductor 196, the acceptor drive circuit 189 and the conductor 201, these modified selector forward signal pulses being referred to as acceptor drive pulses.

The selector pulse and connector busy pulse forming circuit 317 also operates to impress connector busy pulses appearing in the time position assigned to the selected revertive call trunk 121 upon the connector busy pulse out conductor 205*a* and these connector busy pulses are transmitted through the coupling circuit 205 and over the conductor 205*b* to all of the acceptors of the system. At the same time, the circuit 317 transmits selector pulses over the conductor 339 to the revertive call control circuit 365 to condition this latter circuit to respond to a first revertive call signal transmitted to the circuit 365 from the selected revertive call trunk by way of the conductor 207*a*, the revertive call signal coupling circuit 207 and the conductor 207*b*, as will be described in more detail hereinafter.

Considering now the manner in which the selected revertive call trunk becomes operatively associated with the call forwarding selector **130*b*, it is pointed out that the revertive call acceptor 121*a* functions in a manner which is generally similar to the line finders of the system to condition the associated revertive call selector 121*b* for operative association with the call forwarding selector 130*b*. However, unlike a line finder, the revertive call acceptor 121*a* is conditioned to accept only acceptor drive pulses which occur in the particular pulse time position which is assigned to and identifies the revertive call trunk 121, both as to the hundreds group position of this trunk and the order in which the revertive call trunk occurs within its own hundreds group 12. In this connection, it will be noted that the acceptors of the system are all continuously conditioned to accept acceptor drive pulses occurring in the respective time positions assigned thereto. Thus, in the illustrated embodiment, a fixed allotment of the acceptors to individual pulse time positions is provided instead of the shifting allotment of finders to successive calling lines as described heretofore in connection with the finder 130*a***.

In the revertive call acceptor **121*a*, the connector busy pulses which are transmitted thereto over the conductor 205*b* from the connector busy pulse coupling circuit 205, are impressed upon the idle pulse circuit 503 (Fig. 5A) to effect the immediate termination of the transmission of pulses to the common idle pulse out conductor 198 from the idle pulse circuit 503 in this acceptor. As a result, idle pulses appearing in the time position 62*a* assigned to the revertive call trunk 121, are removed from the common idle pulse out conductor 198 immediately upon selection of the trunk 121 by the call forwarding selector 130*b*. Removal of these idle pulses from the conductor 198 is recognized by the other selectors of the system as an indication that the revertive call trunk 121 is occupied with a revertive call and these other selectors are, therefore, prevented from seizing the revertive call trunk 121** in connection with another revertive call.

In the revertive call acceptor **121*a*, the acceptor drive pulses are repeated by the acceptor control gate circuit 500 to effect substantially immediate operation of the +B switching circuit 501 embodied in the acceptor 121*a*, whereby operating potential is delivered to the tubes of the circuits 509, 511, 512, 515, 516, 563, 568 and 599 of the associated revertive call selector 121*b* over the +B switch conductor 121*c* with the result that the revertive call selector 121*b* is conditioned for operation, i. e., conditioned to respond to signal-carrying selector forward pulses delivered thereto from the call forwarding selector 130*b* over a path which includes the conductor 195, the selector forward coupling circuit 186 and the conductor 196**.

The acceptor gate pulse forming circuit 502 in the revertive call acceptor **121*a* is continuously supplied with tens pulses appearing on the conductor 32*a* in the first tens pulse time position of each pulse frame and is also supplied with units pulses appearing on a units pulse conductor 31*a* in the first units pulse time position in each tens pulse period. These tens and units pulses are combined in the pulse forming circuit 502 and produce acceptor gate pulses which occur in the pulse time position 62*a* of each pulse frame and are transmitted over the conductor 121*d* to the circuits 507, 508, 526 and 563 of the revertive call selector 121*b* and have the effect of continuously limiting the response of this revertive call selector only to selector forward signal pulses 82*a* appearing in the pulse time position 62*a*. These acceptor gate pulses are also supplied to the acceptor control gate circuit 500 so as continuously to condition this circuit to accept only acceptor drive pulses from the acceptor drive circuit 189 in the pulse time position 62*a***.

After the revertive call acceptor **121*a* has operated to perform the above-described functions, continued holding of the acceptor 121*a* is dependent upon continued acceptance and transmission of acceptor drive pulses by the acceptor control gate circuit 500 which, of course, means that the acceptor 121***a* will remain associated with the call forwarding selector 130*b* only so long as this selector continues to impress selector forward signal pulses on the conductor 195 in the time position 62*a*. However, during certain periods while the revertive call is being set up, it is necessary to hold the revertive call acceptor 121*a* operatively associated with the call forwarding selector even though this selector does not transmit selector forward signal pulses in the time position 62*a*. Accordingly, the acceptor 121*a* is arranged to respond to a revertive call hold potential transmitted thereto over the conductor 121*f* from the associated revertive call selector 121*b* by remaining operatively associated with the call forwarding selector even though this selector does not impress selector forward signal pulses on the conductor 195 in the time position 62*a* assigned to the revertive call trunk 121. In addition, the revertive call acceptor 121*a* is arranged to respond to cessation of transmission of selector forward signal pulses in the time position 62*a* by transmitting a revertive ring start signal over the conductor 121*e* to the associated revertive call selector 121*b* so as to condition this selector to initiate revertive ringing.

Considering now the operation of the revertive call selector 121*b* in completing the revertive call, it is pointed out that the entire procedure of selecting the hundreds line group containing the revertive call trunks, selecting an idle revertive call trunk within this hundreds line group, transmitting selector forward signal pulses in the time position assigned to the selected revertive call trunk, and operative association of the selected revertive call trunk with the call forwarding selector, takes place during the inter-digit pause between the first and second digits dialed at the calling substation F. Accordingly, by the time the second digit of dial impulses is produced at the calling substation F, the revertive call trunk 121 is operatively associated in tandem relation with the finder-selector link 130 and the revertive call selector 121*b* is conditioned for response to the remaining digits of the revertive call number which is dialed at this calling substation.

The second and third revertive call digits are dialed into the revertive call selector 121*b* by way of the call forwarding selector 130*b* in order to effect selection in the revertive call selector 121*b* of the party line ringing signal assigned to the calling substation F and the party line ringing signal assigned to the called substation H. More particularly, the digits "1" and "3" must be dialed successively into the revertive call selector 121*b* to effect selection of the code #1 party line ringing signal consisting of one long ringing signal 165*a* (Fig. 31 (13)), which occurs during the first ringing period during which a 66⅔ C. P. S. ringing current is developed and which is assigned to the calling substation F, and to effect selection of the code #3 party line ringing signal, which consists of one long ringing signal 166*a* (Fig. 31 (15)), which occurs during the second ringing period during which a 50 C. P. S. ringing current is developed and which is assigned to the called substation H.

During the open circuit period of each dial impulse, the control bias applied by the line circuit 16*b* to the gate circuit of the multiplexer 11*b* which serves the calling line No. 232, is returned to its on-hook value to interrupt the transmission of multiplexer pulses 83*c* to the pulse input circuit 300 in the finder 130*a* and to the in gate circuits 307 and 323 in the selector 130*b*. During the make period of each impulse dialed at the calling substation F, multiplexer signal pulse transmission from the multiplexer 11*b* to the finder 130*a* and the selector 130*b* in the pulse time position 63*c* is resumed. As controlled by the finder gate pulses delivered to the circuits 307 and 308 in the selector 130*b* from the circuit 302 over the conductor 130*d*, the circuits 307 and 308 function to repeat any intelligence or control signals derived from the calling line No. 232 to the forward out gate circuit 324. More specifically, during the dialing operation the reconstructed dial impulses developed by the forward reconstructor circuit 308 in the selector 130*b* are transmitted over the conductor 356*a* to the forward out gate circuit 324 and are employed in the circuit 324 to interrupt, during the corresponding break periods, the transmission of selector forward signal pulses through the circuit 324 to the operatively associated revertive call trunk 121 in the time position 62*a* assigned thereto. The selector 130*b* thus functions to convert the multiplexer pulses 83*c* into the selector forward pulses 82*a* while preserving the interruptions in transmission of these multiplexer pulses during the dialing operation, which interruptions correspond to the dialing impulses originating at the calling substation F. Thus, during each open circuit period of each dial impulse, the interruption in the transmission of the multiplexer pulses 83*c* over the conductor 50*b* is converted into a corresponding interruption in the transmission of selector forward pulses 82*a* over the conductor 195, through the selector forward coupling circuit 186, and over the conductor 196 to all of the acceptor-connector links and revertive call trunks of the system, including the revertive call trunk 121. However, as stated heretofore, only the trunk 121 is conditioned to respond to selector forward signal pulses occurring in the time position 62*a*.

As controlled by the acceptor gate pulses delivered to the circuits 507 and 508 in the revertive call selector 121*b* from the circuit 502 in the revertive call acceptor 121*a*, the circuits 507 and 508 function to repeat any intelligence or control signals derived from the calling line No. 232 by way of the call forwarding selector 130*b* to the dial impulse integrator circuit 509. Accordingly, during each dial impulse of the second and third digits generated at the calling substation F and routed to the revertive call selector 121*b* by way of the call forwarding selector 130*b*, the impulse integrator circuit 509 develops impulses which are impressed upon the calling party inverter circuit 560 and the called party inverter circuit 561 by way of the conductor 527. Pending operation of the calling party sequence timing circuit 512, the called party inverter circuit 561 is held non-responsive to the impulses transmitted thereto by the dial impulse integrator circuit 509 during dialing of the second digit at the calling substation F. However, the calling party register pulser 510 responds to the single impulse constituting the second digit dialed at the calling substation F by developing a coincident register drive pulse which is supplied to the calling party register 511 and the calling party sequence timing circuit 512 over the conductor 530. In responding to this register drive pulse, the calling party register 511 is driven to a setting wherein the first counting stage of this register is opened and an enabling bias potential is supplied over the corresponding conductor 511*a* to the associated ringback tone gate tube in the circuit 562. As a result, this ringback tone gate tube is opened so as to permit the transmission of the code #1 party line ringing signal consisting of the single long ringing pulse 165*a* (Fig. 31 (13)) over the common output conductor 562*a* to the ringback tone gate circuit 525. Transmission of the register drive pulse corresponding to the single break period of the second digit dialed at the calling substation F over the conductor 530 to the calling party sequence timing circuit 512 has the effect of conditioning this circuit to block the calling party register pulse 510 from developing register drive pulses during dialing of the third digit and to render the called party inverter circuit 561 operative to repeat the pulses delivered thereto by the dial impulse integrator circuit 509 during dialing of the third digit at the calling substation F.

During the inter-digit pause which separates dialing of the second and third digits at the calling substation, the calling party sequence timing circuit 512 assumes a stable operating condition wherein a controlling potential is impressed upon the conductor 534 to bias the calling party register pulser 510 against developing further register drive pulses and to render the called party inverter circuit 561 operative to repeat pulses delivered thereto from the circuit 509 to the called party register pulser 514 over the conductor 538.

During dialing of the third digit "3" at the calling substation F, the dial impulse integrator circuit 509 responds by transmitting three impulses to each of the inverter circuits 560 and 561. As noted above, however, the calling party register pulser 510 is now blocked against responding to these impulses. Thus, only the called party inverter circuit 561 repeats these impulses to the called party register pulser 514 over the conductor 538 and this latter circuit responds by developing corresponding register drive pulses which are supplied to the called party register 515 and the called party sequence timing circuit 516 over the conductor 536. As a consequence, the register 515 is driven to a setting at which the third counting stage thereof is opened and an enabling bias potential is developed on the conductor 515c so as to permit transmission of the code #3 party line ringing signal, consisting of the one long ringing pulse 166a (Fig. 31 (15)) assigned to the called substation H, to the third ringback tone gate tube in the circuit 562. Accordingly, the circuit 562 is conditioned to gate to the common output conductor 562a thereof the code #3 party line ringing signal which signal is transmitted over the conductor 562a to the ringback tone gate circuit 525. The three pulses repeated to the called party sequence timing circuit 516 over the conductor 536 serve to condition this circuit for operation at the end of the third digit.

After the third digit has been dialed at the calling substation F, the called party sequence timing circuit 516 assumes a stable operating position wherein a controlling potential is impressed upon the conductor 535 so as to bias the called party register pulser 514 against development of register drive pulses in response to further impulses repeated thereto through the circuit 561 from the integrator circuit 509. This controlling potential is also supplied over the conductor 535 to the revertive call signaling circuit 563 to render this circuit operative to release a first revertive call signal to the revertive call signal out conductor 207a. This revertive call signal is transmitted by way of the revertive call signal coupling circuit 207 and the revertive call in conductor 207b to the revertive call control circuit 365 in each of the selectors of the system. More specifically, the circuit 563 responds to acceptor gate pulses transmitted to this circuit over the conductor 121d in the time position 62a assigned to the revertive call trunk 121, to linkage sampling pulses transmitted to the circuit 563 by way of the conductor 40b, and to the enabling potential developed on the conductor 535, by releasing a short burst of pulses, similar to selector return pulses, to the conductor 207a which occur in the pulse time position 62a assigned to the revertive call trunk 121. While this revertive call signal is transmitted to all of the selectors of the system, only the revertive call control circuit 365 in the call forwarding selector 130b is conditioned to respond to the selector return signal pulses constituting this first revertive call signal, since these selector return signal pulses occur only in the pulse time position 62a assigned to the seized revertive call trunk 121. However, in the selector 130b this revertive call signal has the effect of conditioning the revertive call control circuit 365 so that a revertive call hold potential is transmitted over the conductor 130f to the associated finder 130a. As a result, this finder, and hence the finder-selector link 130, is held operatively associated with the calling line No. 232 after the calling party hangs up to permit completion of the revertive call.

When the calling party hangs up, multiplexer pulse transmission over the conductor 50b in the time position 63c assigned to the calling line No. 232 is terminated. However, due to the above described revertive call hold potential developed on the conductor 130f, the finder 130a is held operatively engaged with this line and this finder continues to impress busy pulses on the conductor 202b in the time position 63c assigned to the line No. 232 to prevent other links in the second hundreds group 13 from seizing the line No. 232 and continues to impress finder gate pulses on the conductor 130d in the time position 63c to hold the selector 130b operatively associated with the finder 130a, the +B switching circuit 301 in this finder continues to supply operating potential over the conductor 130c to the indicated circuits of the selector 130b so that the settings of these circuits will not be destroyed, and the pulse input circuit 300 in the finder 130a continues to be conditioned so as to accept only multiplexer pulses which occur in the time position 63c assigned to the line No. 232 so that the finder 130a remains in a condition to respond to multiplexer pulse transmission in the time position 63c when the revertive call is answered at the calling or called substation and multiplexer pulse transmission in the time position 63c is resumed.

In the selector 130b, the cessation of multiplexer pulse transmission over the conductor 50b in the time position 63c has the effect of blocking the forward in gate circuit 307 in this selector and this termination of multiplexer pulse transmission, which is equivalent to a supervisory signal, is repeated by the forward reconstructor circuit 308 to the forward out gate circuit 324 in the selector 130b with the result that selector forward signal pulse transmission over the conductor 195 is also terminated. In this connection it will be recalled that the selector forward signal pulses impressed upon the conductor 195 are transmitted as corresponding acceptor drive pulses to all of the acceptors of the system. However, only the revertive call acceptor 121a is conditioned to respond to these acceptor drive pulses which occur in the time position 62a assigned to the revertive call trunk 121. Normally, the acceptor 121a is arranged to release in response to termination of acceptor drive pulse transmission to this circuit, so that the trunk 121 may be disengaged from the associated linkage. However, as described above, it is necessary to hold the revertive call trunk operatively associated with the call forwarding selector 130b during the period when the calling party hangs up to permit completion of the revertive call. To accomplish this, the controlling potential developed on the conductor 535 by the called party sequence timing circuit 516 at the end of the called party digit dialed into the revertive call selector 121b, is employed to change the potential on the conductor 121f, this potential change being referred to as a revertive call hold signal, and the revertive call acceptor 121a is arranged to respond to the revertive call hold signal developed on the conductor 121f by remaining operatively associated with the call forwarding selector 130b even though acceptor drive pulse transmission in the time position 62a is terminated. As a result, the +B switching circuit 501 in the revertive call acceptor 121a continues to supply operating potential over the conductor 121c to the controlled circuits of the revertive call selector 121b so that the settings of these circuits will not be destroyed. Also, the acceptor control gate circuit 500 to the acceptor 121a is continuously conditioned so as to accept only acceptor drive pulses which occur in the time position 62a assigned to the revertive call trunk 121 so that the acceptor 121a remains in a condition to respond to pulse transmission in the time position 62a when the revertive call is answered and both multiplexer signal pulse transmission and selector forward signal pulse transmission is resumed. The revertive call acceptor 121a is also arranged to respond to the above-described termination of transmission of acceptor drive pulses in the time position 62a by developing a revertive call ring start signal on the conductor 121e which is transmitted by way of this conductor to the code start circuit 568 in the revertive call selector 121b.

The circuit 568 is normally held inoperative so that it does not respond to code start pulses impressed upon the circuit 568 over the conductor 5 from the harmonic ringing code forming circuit 99 so that the circuit 568 does not function immediately after the called party digit is dialed into the revertive call selector 121b. However, after the calling party hangs up and the revertive call ring start signal is transmitted over the conductor 121e, the circuit 568 responds to this signal by developing a code start potential on the conductor 568a in response to the next code start pulse which appears on the conductor 5 after the revertive call ringing start signal is developed on the conductor 121e. When the code start potential is developed on the conductor 568a the ringing carrier modulator circuit 505 is conditioned to transmit therethrough the party line ringing signals which are selected by the calling party register 511 and the called party register 515 and are transmitted over the common output conductor 562a to the circuit 525. The party line ringing signals which are transmitted through the ringback tone gate circuit 525, which it will be recalled consist of coded ringback tone signals (Figs. 31 (13) and (15)) are rectified to reproduce the original code ringing pulses and these code ringing pulses are impressed upon the ringing carrier modulator circuit 505. The ringing carrier modulator circuit 505 responds to the selected ringing signals impressed thereon by the circuit 525 by transmitting a 4900 cycle ringing carrier wave during the "on" intervals of each selected party line ringing signal to the return out gate circuit 526 by way of the conductor 595, the 4900 cycle ringing carrier wave being derived from the ringing carrier generator 29f by way of the common conductor 47a.

As controlled by the acceptor gate pulses developed on the conductor 121d, and the linkage sampling pulses developed on the conductor 40b, the return outgate circuit 526 responds to the application of operating potential to the conductor 121c when the revertive call trunk 121 is seized by the call forwarding selector 130b by developing selector return signal pulses on the conductor 200. These selector return signal pulses are modulated in accordance with the code ringing pulse modulated ringing carrier wave impressed on the circuit 526 by way of the conductor 595. These selector return signal pulses are transmitted by way of the selector return coupling circuit 188 and the conductor 199 to all of the selectors of the system. However, only the call forwarding selector 130b is conditioned to accept these selector return signal pulses and transmit them through the return in gate circuit 323 thereof.

In the call forwarding selector 130b, the selector return signal pulses which are modulated in accordance with the code ringing pulse modulated ringing carrier wave are repeated through the return in gate circuit 323 to the return reconstructor circuit 322 wherein the code ringing pulse is reconstructed and transmitted to the return out gate circuit 326 in the selector 130b so that the selector signal pulses which are developed by the circuit 326 on the conductor 51b in the time position 63c assigned to the revertive calling line No. 232 are modulated in accordance with the code ringing pulses representing the selected calling and called party line ringing signals. These modulated selector signal pulses are transmitted by way of the distributor coupling circuit 191b to the distributor 15b wherein the code ringing pulses are again reconstructed and are transmitted by way of the conductor 45b to the line circuit 16b and are employed in this line circuit to actuate the line ringing facilities so that a 66⅔ C. P. S. ringing current is transmitted over the line No. 232 for the duration of the long ringing pulse 165 (Fig. 31 (1)), which constitutes the code #1 party line ringing signal assigned to the calling substation F, and during the first ringing period of each harmonic ringing cycle, and a 50 C. P. S. ringing current is transmitted over the line No. 232 for the duration of the long ringing pulse 166a (Fig. 31 (3)), which constitutes the code #3 party line ringing signal assigned to the called substation H, and occurs during the second ringing period in each harmonic ringing cycle. As a result, both the ringer at the calling substation F and the ringer at the called substation H are rung at the ringing frequency at which these ringers are designed to respond and during the ringing period assigned thereto. Since the ringing periods assigned to the substations F and H are different, both the calling and called substations may be rung during each harmonic ringing cycle at the harmonic frequency assigned thereto.

In the event that the called substation is assigned the same ringing period as the calling substation, the ringback tone gates 562 in the revertive call selector 121b are arranged to select only the party line ringing signal assigned to the called substation so that the ringers at both the calling and called substations are rung in accordance with the party line ringing signal assigned to the called substation. Thus, for example, if the substation F, which is assigned the long ringing pulse 165 in the first ringing period, desires to call the substation G which has assigned the two short ringing pulses 170 and 171 in the same first ringing period, the ringback tone gates 562 select only the ringback tone signals 170a and 171a (Fig. 31 (14)) which correspond to the party line ringing signal assigned to the called substation G. Under these conditions, a ringing current of 66⅔ C. P. S. is transmitted over the line No. 232 for the duration of each of the short ringing pulses 170 and 171 which occur during the first ringing period and constitute the code #2 party line ringing signal assigned to the substation G. Since both the ringers at the calling substation F and the called substation G respond to a 66⅔ C. P. S. ringing current, both of these ringers are rung for the duration of the short ringing pulses 170 and 171 and the calling subscriber is again informed by termination of ringing current transmission that the revertive call has been answered and that he can come back on the line to complete the connection.

The code start potential developed on the conductor 568a in the manner described above is also impressed upon the ring trip circuit 521 so as to condition this circuit to respond to a call answering signal when the revertive call is answered by either the calling or called party. More specifically, when the revertive call is answered and the loop circuit including the conductors of the line No. 232 is again closed to the line circuit 16b, multiplexer pulse transmission in the time position 63c assigned to the line No. 232 is again resumed. As stated above, the finder 130a and selector 130b remain continuously conditioned to respond to multiplexer pulse transmission in the time position 63c and the transmission of the multiplexer pulses 83c by way of the conductor 50b through the forward in gate circuit 307 and the forward reconstructor circuit 308 has the effect of conditioning the forward out gate circuit 326 to again resume transmission of selector forward signal pulses over the conductor 195 in the time position 62a assigned to the revertive call trunk 121. It will also be recalled that the revertive call trunk 121 remains conditioned to respond to these selector forward signal pulses which are transmitted through the forward in gate circuit 507 in the revertive call selector 121b and are impressed upon the forward reconstructor circuit 508. When selector forward signal pulses are again repeated to the circuit 508, the change in potential on the output conductor 508a of the circuit 508, which may be called a call answering signal, is transmitted to the ring trip circuit 521 and the circuit 521 responds to this call answering signal by developing a ring trip potential on the conductor 553.

As described above, when the revertive call is answered, multiplexer pulse transmission in the time position 63c over the conductor 50b is resumed and selector forward signal pulse transmission in the time position 62a over the conductor 195 is also resumed. Since the finder 130a responds to multiplexer pulse transmission by holding the finder-selector link 130 operatively associated with the calling line No. 232 and the revertive call acceptor 121a responds to selector forward signal transmission in the time position 62a by holding the revertive call trunk 121 operatively associated with the call forwarding selector 130b, the above-described revertive call hold potentials on the conductors 130f and 121f are no longer required to lock up the linkage. Accordingly, facilities are provided for removing these revertive call hold potentials in response to answering of the revertive call. More particularly, when the ring trip potential is developed on the conductor 553 in the manner described above in response to the call answering signal impressed upon the ring trip circuit 521, this ring trip potential is impressed upon the called party sequence timing circuit 516 so as to change the potential on the conductor 121f back to its original value thereby removing the revertive call hold potential from this conductor. Accordingly, the +B switching circuit 501 in the revertive call acceptor 121a is thereafter conditioned to respond to termination of acceptor drive pulse transmission in the time position 62a by releasing the revertive call trunk 121.

In order to remove the revertive call hold potential from the conductor 130f in the finder-selector link 130, the ring trip potential developed on the conductor 553 is also impressed upon the revertive call signaling circuit 563 in the revertive call selector 121b so that a second revertive call signal is developed by the circuit 563 in response to the ring trip potential developed on the conductor 553. More specifically, this second revertive call signal consists of a short burst of pulses, which occur in the time position 62a assigned to the revertive call trunk 121 and are similar to the selector return pulses developed by the return out gate circuit 526, and these pulses are impressed upon the conductor 207a and are transmitted by way of the revertive call signal coupling circuit 207 and over the conductor 207b to the revertive call control circuit 365 in the call forwarding selector 130b. In this connection it will be understood that whereas the above-described burst of pulses which constitute the revertive call signal are similar to the selector return signal pulses developed by the circuit 526 in that they are relatively narrow and occur in the pulse time position 62a, the revertive call signal pulses are transmitted over a separate signal channel to all of the selectors of the system so that a control channel independent of the selector forward and selector return signal channels is provided beween the revertive call trunks and all of the selectors of the system. In the selector 130b, this second revertive call signal impressed upon the circuit 365 has the effect if conditioning the circuit 365 to change the potential on the conductor 130f back to its original value so that the revertive call hold signal is removed from the conductor 130f and the +B switching circuit 301 in the finder 130a is thereafter conditioned to respond to termination of multiplexer pulse transmission in the time position 63c by releasing the finder-selector link 130. Accordingly, both the finder-selector link 130 and the revertive call trunk 121 are unlocked in response to answering of the revertive call.

Following the above-described operations in the revertive call trunk 121 and the finder-selector link 130, a two-way talking circuit over the line No. 232 between the substations F and H is established. Thus, voice or other signals developed at either one of these substations are transmitted over the conductors of the line No. 232 to the receiver in the subset of the other substation so that a direct wire talking circuit between substations is provided. In this connection it will be understood that a 48 volt battery included in the line circuit 16b provides a suitable energizing current for the transmitters at these substations.

After the revertive call is established in the manner described above, it is necessary to guard the line No. 232 against intrusion on a call incoming thereto. Accordingly, in the illustrated embodiment, the finder-selector link 130 is held operatively associated with the line No. 232 for the duration of the revertive call so that the finder 130a continues to impress busy pulses upon the conductor 203b in the time position 63c assigned to the line No. 232 so as to prevent any of the connectors in the second hundreds group 13 from seizing the line No. 232 on a call incoming thereto. Since the finder-selector link 130 is fully operative to guard the line No. 232 during the revertive call, the revertive call trunk 121 is no longer required after the revertive call connection has been established, and this trunk may be released so as to serve other lines of the system which desire to set up revertive call connections. To accomplish this, the revertive call control circuit 365 in the selector 130b is arranged to respond to the second revertive call signal, repeated to the circuit 365 over the conductor 207b in the manner described above in response to answering of the revertive call, by impressing a negative potential on the conductor 365a which is transmitted to the forward reconstructor circuit 308 and is repeated through this circuit to the forward out gate circuit 324 so as to block the circuit 324 and terminate the transmission of selector forward signal pulses by this circuit.

In the revertive call acceptor 121a, the termination of acceptor drive pulse transmission to this acceptor has the effect of causing the +B switching circuit 501 thereof to remove the +B switch potential from the conductor 121c, after a predetermined time delay interval, so that the revertive call trunk 121 is released. However, this time delay interval is preferably longer than the time delay interval of the +B switching circuit 301 in the line finder 130a so as to give sufficient time to permit the transmission of a revertive call tone signal over the revertive calling line No. 232 after the revertive call is answered and before the revertive call trunk is released. More specifically, when the revertive call is answered and a ring trip potential is developed on the conductor 553 in the manner described above, this potential is impressed upon the revertive call tone gate circuit 597 and the circuit 597 responds thereto by impressing a revertive call tone signal, derived from the revertive call tone generator 29g by way of the common conductor 49b, upon the return out gate circuit 526 over the conductor 595. As a result, the selector return signal pulses developed by the circuit 526 in the manner described above when the revertive call selector 121b is seized, are modulated by the revertive call tone signal, and these revertive call tone signal modulated selector forward signal pulses are transmitted by way of the selector return coupling circuit 188 to the return in gate circuit 323 in the selector 130b. The revertive call tone signal is reconstructed in the return reconstructor circuit 322 and is remodulated upon the selector signal pulses developed by the return out gate circuit 326 on the conductor 51b in the time position 63c assigned to the revertive calling line No. 232 so that the revertive call tone signal is transmitted by way of the distributor 15b to the line circuit 16b and is impressed upon the calling line No. 232. Accordingly, the answering party hears a revertive call tone signal as soon as he picks up the receiver so that he is informed that a revertive call is in progress and that he should wait for the other party to come on the line. However, this revertive call tone signal lasts only for a very brief period until the +B switching circuit 501 in the revertive call acceptor 121a removes operating potential from the conductor 121c at which time the return out gate circuit 526 is blocked so that selector return signal pulse transmission, and hence transmission of the revertive call tone signal, is terminated.

The above-described operation of the revertive call trunk 121 and the finder-selector link 130 has been based upon the assumption that the revertive call is answered, in which case multiplexer pulse transmission and selector forward signal pulse transmission is resumed so that the finder-selector link 130 and the revertive call trunk 121 may be unlocked from their revertive call hold conditions and may be released in the manner described above. However, if the revertive call is not answered at the called substation H and is abandoned at the calling substation F, ringing of these substations would continue indefinitely. Furthermore, since the linkage is locked in a revertive call condition, this linkage would remain tied up in the uncompleted revertive call indefinitely, and the line No. 232 would be incapable of initiating another call. Accordingly, there is provided facilities for terminating ringing after a predetermined ringing timeout interval has expired, and there is also provided facilities for returning the linkage to its unlocked condition after the timeout interval if the revertive call has not been answered. More specifically, when the code start potential is developed on the conductor 568*a* in the manner described above, and revertive ringing is initiated, this code start potential is impressed upon the ringing timeout circuit 599, and has the effect of conditioning the circuit 599 to develop a timeout signal on the conductor 599*a* for a period of from two to four minutes after ringing is initiated, which period may be called a ringing timeout interval.

When the ringing timeout interval has expired and a timeout signal is developed on the conductor 599*a*, this signal is impressed upon the revertive call signalling circuit 563 and has the effect of causing the circuit 563 to release a second revertive call signal in a manner substantially identical to that described above in connection with the development of a ring trip potential on the conductor 553. More specifically, the timeout signal developed on the conductor 599*a* causes the circuit 563 to release a burst of pulses to the conductor 207*a* in the time position 62*a* assigned to the revertive call trunk 121, and these revertive call signal pulses are transmitted by way of the coupling circuit 207 to the revertive call control circuit 365 in the selector 130*b*. The circuit 365 responds to this second revertive call signal in a manner identical to that described above in connection with answering of the revertive call by removing the revertive call hold signal from the conductor 130*f* and blocking the forward out gate circuit 324 so that selector forward signal pulse transmission is terminated. As a result, the finder-selector link 130 is thereafter conditioned to release in response to termination of multiplexer pulse transmission in the time position 63*c* and the revertive call trunk 121 is immediately released after the time delay interval in the +B switching circuit 501 has expired. If the revertive call remains unanswered so that a calling condition does not exist on the line No. 232, the finder-selector link also releases after the revertive call hold signal is removed from the conductor 130*f* so that the entire linkage formerly operatively associated with the line No. 232 is released.

From the foregoing general description of the system, it will be noted that the first revertive call signal is not developed by the revertive call signaling circuit 563 in the revertive call selector 121*b* until after the third digit has been dialed and a controlling potential is developed on the conductor 535 by the called party sequence timing circuit 516. Accordingly, the selector 130*b*, and more particularly the revertive call control circuit 365 thereof, does not go into a revertive call condition, wherein a revertive call hold potential is developed on the conductor 130*f* and the finder-selector link 130 is held operatively associated with the line No. 232 independently of a calling condition on this line, until after the second digit is dialed so that if the call is abandoned before the last digit is dialed the selector is not in a revertive call condition but instead may release in response to multiplexer pulse termination in a normal manner. When the selector 130*b* is released, selector forward signal pulse transmission terminates so that the revertive call trunk 121 is also released on a revertive call which is abandoned before the last digit is dialed.

In order to render the mode of operation of the revertive call system described generally above more readily understandable, there is shown, in Figs. 29 and 30, the time relationships of certain potentials developed on certain conductors of the system during the setting up of a revertive call. Thus, referring to these figures, when the calling party at the substation F comes off hook, as indicated by the arrow 2900, the loop circuit including the conductors of the line No. 232 is completed so that current in the line No. 232 changes from zero to a relatively positive value indicated at 2901 in Fig. 29 (1). When this occurs, the finder 130*a* in the second hundreds group 13 in this finder is changed from zero to a positive value indicated at 2902 in Fig. 11 (2). When the finder 130*a* is seized, the potential on the revertive ring start conductor 130*e* is also changed from a value 2903, substantially equal to ground potential, to a value 2904 which is highly negative with respect to ground.

When the selector 130*b* becomes operatively associated with the line No. 232 by virtue of the +B swicth potential developed on the conductor 130*c* and the finder gate pulses developed on the conductor 130*d*, a dial tone signal 2905, shown in Fig. 29 (6), is gated by the dial tone gate circuit 325 in the selector 130*b* and this dial tone signal is transmitted over the line No. 232 to signal the calling party that he may start dialing. This dial tone signal persists until the first, or hundreds digit, is dialed, which, in the illustrated revertive call consists of a single impulse 2906, is transmitted over the line No. 232 as shown in Fig. 29 (1) and (6). In this connection it will be recalled that the first or selector digit of "1" represents the first hundreds group 12 which in the revertive call system of the present invention is deserved for the revertive call trunks 121, 123 and 125.

After the first digit 2906 has been dialed, the hundreds sequence timing circuit 312 functions to change the potential on the conductor 334 from zero to a relatively positive value 2907 as shown in Fig. 29 (4). When this occurs the idle pulse gate circuit 395 is conditioned to gate therethrough those idle pulses appearing within the selected tens pulse interval 72*a* (Figs. 24 to 27, inclusive) assigned to the first hundreds group 12, which represent idle revertive call trunks in this hundreds group, and these selected idle pulses are transmitted over the conductor 395*a* to the connector coincidence tube circuit 397 wherein one of the idle pulses is selected at random, it being assumed that the idle pulses appearing in the time position 62*a* assigned to the first revertive call trunk 121 are selected. The selector and connector busy pulse forming circuit 317 thereafter functions to develop selector pulses in the time position 62*a* assigned to the selected revertive call trunk 121, and these selector pulses are transmitted over the conductor 339 to the forward out gate circuit 324. As a result, the forward out gate circuit 324 is opened a short time after the potential 2907 is developed on the conductor 334, as shown in Fig. 29 (5). In this connection it will be understood that in Fig. 29 (5) the open condition of the forward out gate circuit 324 is indicated as the value 2908 during which period the circuit 324 functions to impress selector forward signal pulses on the conductor 195 in the time position of the selected revertive call trunk or acceptor-connector link, whereas the value 2909 indicates those periods during which the forward out gate circuit 324 is blocked and hence does not impress selector forward signal pulses on the conductor 195.

At the same time that selector forward signal pulses are impressed upon the conductor 195, the selector pulse and connector busy pulse forming circuit 317 functions to impress connector busy pulses on the conductor 205*a* in the time position 62*a* assigned to the selected revertive call trunk 121 and these connector busy pulses are transmitted by way of the coupling circuit 205 and the conductor 205*b* to all of the acceptors of the system. In this connection, it will be recalled that in the revertive call system of the present invention the connector busy pulses serve to busy the revertive call trunks as well as the acceptor-connector links of the system to all of the selectors of the system.

In the revertive call acceptor 121*a* the corresponding acceptor drive pulses are transmitted through the acceptor control gate circuit 500 and are impressed upon the +B switching circuit 501 so as to cause this circuit to change the potential on the conductor 121*c* from zero to a relatively positive value 2910, as shown in Fig. 29 (7). Also, the idle pulses impressed upon the conductor 205*a* by the circuit 317 in the selector 130*b* are transmitted through the coupling circuit 205 and over the conductor 205*b* to the idle pulse circuit 503 in the revertive call acceptor 121*a* wherein these connector busy pulses have the effect of blocking the idle pulse circuit 503, as shown in Fig. 29 (18), so that idle pulses are removed from the conductor 198 in the time position 62*a* assigned to the revertive call trunk 121, thereby busying this trunk to all of the other selectors of the system.

As soon as acceptor drive pulses are repeated through the circuit 500 to the +B switching circuit 501 in the acceptor 121*a*, the circuit 501 functions to change the potential on the conductor 121*e* from a value 2911 substantially equal to ground potential toa highly negative value 2912, as shown in Fig. 29 (8). Also, when a +B switch potential is impressed upon the conductor 121*c*, the return out gate circuit 526 in the revertive call selector 121*b* is conditioned to impress selector return signal pulses on the conductor 200 in the time position 62*a* assigned to the revertive call trunk 121, as shown in Fig. 29 (14).

After the first trunk digit comprising the impulses 2913, 2914, and 2915 has been transmitted over the line No. 232, the calling party sequence timing circuit 512 operates to change the potential on the conductor 534 from zero to a relatively positive value 2916 as shown in Fig. 29 (9). In this connection it will be understood that the first trunk digit corresponds to the party line ringing signal assigned to the calling substation, and, in the revertive call described above, which is initiated at the substation F, the first trunk digit would comprise only the single impulse 2913, since the substation F has assigned thereto the code #1 party line ringing signal which would be identified by a single dial impulse, i. e., a first trunk digit of "1." It will also be noted that during the open circuit or break period of each dial impulse, the potential on the conductor 130*e* increases positively as shown at 2917 in Fig. 29 (3). However, as shown in this figure, the potential on the conductor 130*e* does not rise at a sufficiently rapid rate to reach ground potential during the break period of any one dial impulse.

During the break period of each dial impulse multiplexer pulse transmission is terminated, and, due to the D. C. connection between the forward in gate 307 and the forward out gate circuit 324 in the selector 130*b*, selector forward signal pulse transmission is also terminated during the break period of each dial impulse transmitted over the line No. 232, as shown in Fig. 29 (5). It will also be noted that the potential on the conductor 121*e*, in the +B switching circuit 501 of the revertive call acceptor 121*a*, increases positively during the break period of each dial impulse, as indicated at 2918 in Fig. 29 (8). However, the rate at which the potential on the conductor 121*e* increases is not sufficient to permit this potential to reach ground potential during the break period of each dial impulse. It will also be noted that the rate at which the potential on the conductor 121*e* increases is substantially less than the rate at which the potential on the conductor 130*e* increases since, as described generally above, the time delay interval of the +B switching circuit 501 in the acceptor 121*a* is preferably in the order of one or two seconds to permit the transmission of the above-described revertive call tone signal over the line No. 232 when the revertive call is answered.

After the second trunk digit, consisting of the dial impulses 2919, 2920 and 2921, is transmitted over the line No. 232, the called party sequence timing circuit 516 functions to change the potential on the conductor 535 from zero to a relatively positive value 2922, as shown in Fig. 30 (10). In this connection, it will be recalled that the second trunk digit corresponds to the party line ringing signal assigned to the called substation and in the revertive call described above, the called substation H has assigned thereto the code #3 party line ringing signal so that a second trunk digit of "3" identifies the party line ringing signal assigned to the called substation H. It will also be noted that the potential on the conductors 130*e* and 121*e* again increase positively during the break periods of the dial impulses 2919, 2920 and 2931, and it will be seen that selector forward signal pulse transmission is interrupted through the forward out gate circuit 324 during the break periods of these dial impulses, as shown in Fig. 30 (5).

As soon as the potential 2922 is developed on the conductor 535, the revertive call signaling circuit 563 is permitted to release a short burst of pulses, illustrated as the single positive pulse 2923, shown in Fig. 30 (11), to the revertive call signal conductor 207*a* in the time position 62*a* assigned to the revertive call trunk 121. In this connection, it will be understood that the pulse signal 2923 actually consists of a short series of narrow pulses which occur once during each pulse frame in the pulse time position 62*a* assigned to the trunk 121. In the selector 130*b*, the revertive call control circuit 365 responds to the first revertive call signal 2923 by changing the potential on the conductor 131*f* from substantially ground potential to a highly negative value 2924, as shown in Fig. 30 (12). This change in potential on the conductor 130*f*, which may be called a revertive call hold signal, prevents the finder 130*a* from releasing the finder-selector link 130 during the period when the calling party hangs up to permit completion of the revertive call. At the same time that the called party sequence timing circuit 516 develops the potential 2922 on the conductor 535, this circuit also functions to reduce the potential on the conductor 121*f* from a value substantially equal to ground potential to a high negative value 2925, as shown in Fig. 30 (13), this change in potential on the conductor 121*f* also being referred to as a revertive call hold signal. Accordingly, the revertive call acceptor 121*a* is held operatively associated with the call forwarding selector 130*b* even though selector forward signal pulses are terminated during the period when the calling party hangs up to permit completion of the revertive call.

When the calling party hangs up, as indicated by the arrow 2926, the loop circuit including the conductors of the line No. 232 is broken so that the current in this line is reduced to zero as indicated at 2930 in Fig. 30 (1), and multiplexer pulse transmission in the time position 63*c* assigned to the line No. 232 is terminated. As a result, the potential on the conductor 130*e* increases positively, as indicated at 2931 in Fig. 30 (3), until the potential on this conductor is equal to ground potential, at which point the potential on the conductor 130*e* is prevented from increasing further positively. When multiplexer pulse transmission ceases in response to the disconnect signal 2930, selector forward signal pulse transmission also terminates due to the direct current connection between the forward in gate circuit 307 and the forward out gate circuit 324 in the selector 130*b*, so that the selector forward signal pulse transmission is terminated when the calling party hangs up, as shown in Fig. 30 (5). When selector forward signal pulse transmission is terminated, the potential on the conductor 121*e* also increases positively, but at a slower rate than the potential increase on the conductor 130*e*, as shown at 2932 in Fig. 30 (8). The potential on the conductor 121*e* rises to ground potential, at which point this potential is prevented from increasing further positively. However, as the potential on the conductor 121*e* approaches ground potential the code start circuit 568 is conditioned to respond to the next occurring code start pulse on the conductor 5 and the circuit 568 responds to this code start pulse by changing the potential on the conductor 568*a* from zero to a relatively positive value 2933, as shown in Fig. 30 (15). When the code start potential 2933 is developed on the conductor 568*a*, the ringback tone gate circuit 525 is enabled and revertive ringing is initiated in the manner described above, as indicated by the arrow 2934.

Revertive ringing persists until the revertive call is answered at either the calling or called substation, as indicated by the arrow 2935, at which time the loop circuit including the conductors of the line No. 232 is again closed so that multiplexer pulse transmission in the time position 63*c* assigned to this line is resumed. When multiplexer pulse transmission is resumed, the potential on the conductor 130*e* is immediately made highly negative again, as illustrated at 2936 in Fig. 30 (3) and selector forward signal pulse transmission is again resumed, as indicated at 2937 in Fig. 30 (5). When selector forward signal pulse transmission is resumed, the potential on the conductor 121*e* is immediately made highly negative, as illustrated at 2938 in Fig. 30 (8). Also, when selector forward signal pulse transmission is resumed in response to answering of the revertive call, this call answering signal causes the ring trip circuit 521 to increase the potential on the conductor 553 from zero to a relatively positive value 2939, as shown in Fig. 30 (16).

When the ring trip potential 2939 is developed on the conductor 553, the revertive call tone gate circuit 597 develops a revertive call tone signal 2940 which is transmitted by way of the return out gate circuit 526, the selector return signal pulse channel, the return in gate circuit 323, the return reconstructor circuit 322, the return out gate circuit 326, the distributor coupling circuit 191*b*, and the distributor 15*b* to the line circuit 16*b* so that this revertive call tone signal is transmitted over the calling line No. 232 to inform the answering party of the nature of the revertive call.

When the ring trip potential 2939 is developed on the conductor 553, this potential is transmitted to the revertive call signaling circuit 563 in the revertive call selector 121*b* and the second revertive call signal 2941, which is similar to the revertive call signal 2923 and consists of a short burst of narrow pulses occurring in the time position 62*a*, which is impressed upon the conductor 207*a* and is transmitted by way of the circuit 207 to the revertive call control circuit 365 in the selector 130*b*. In the circuit 365, this second revertive call signal has the effect of changing the potential on the conductor 130*f* from the relatively high negative value 2924 back to substantially ground potential, as shown in Fig. 30 (12), so that the finder-selector link 130 is unlocked and is conditioned to respond to termination of multiplexer pulse transmission in the time position 63*c* assigned to the revertive calling line No. 232 by releasing from this line.

At the same time, the circuit 365 transmits a signal over the conductor 365*a* to the forward reconstructor circuit 308, this signal having the effect of reducing the potential on the output conductor 356*a* of the circuit 308 so that the forward out gate circuit 324 is blocked and selector forward signal pulse transmission in the time position 62*a* assigned to the revertive call trunk 121 ceases, as indicated at 2942 in Fig. 30 (5). In this connection it will be understood that selector forward signal pulses must be transmitted to the revertive call selector 121*b* when the revertive call is answered to provide a call answering signal which can actuate the ring trip circuit 521 in the selector 121*b*. However, once this is accomplished, it is desirable to release the revertive call trunk since it is not required for the talking circuit of the revertive call. In order to do this, it is necessary to withhold selector forward signal pulses from the revertive call acceptor 121*a*. Hence the selector forward signal pulses are removed a short time interval after they are developed in response to answering of the revertive call, as shown by the delay between the point 2937 at which selector forward signal pulse transmission is resumed, and the point 2942 at which selector forward signal pulse transmission is terminated.

In the revertive call selector 121*a*, the +B switching circuit 501 responds to selector forward signal pulse termination at the time 2942 by increasing the potential on the conductor 121*e* as shown at 2943 in Fig. 30 (8). When the potential on the conductor 121*e* reaches a sufficiently positive value to fire the +B extinguishing tube in the circuit 501, the +B switch potential is removed from the conductor 121*c*, as shown in Fig. 30 (7), so that the controlled circuits in the acceptor 121*a* and the selector 121*b* are returned to their initial or quiescent values, and the revertive call trunk is released from the revertive calling line No. 232. Thus, the potential on the conductors 534 and 535 in the revertive call selector 121*b* are returned to ground potential as shown in Fig. 30 (9) and (10). Also, the return out gate circuit 526 is blocked, as shown in Fig. 30 (14), the code start potential is removed from the conductor 568*a*, as shown in Fig. 30 (15), the ring trip potential is removed from the conductor 553, as shown in Fig. 30 (16), the revertive call tone signal 2940 is terminated, as shown in Fig. 30 (17), and the idle pulse circuit 503 in the revertive call acceptor 121*a* is again conditioned to impress idle pulses on the common idle pulse out conductor 198 in the time position 62*a* assigned to the revertive call trunk 121 so as to indicate to all of the selectors of the system that the revertive call trunk is idle and can handle another revertive call, as shown in Fig. 30 (18). It will therefore be understood that the revertive call trunk 121 is released at the time indicated by the arrow 2944, a predetermined time interval after the revertive call is answered at the time 2935, this time interval being sufficient to permit the transmission of the revertive call tone signal 2940 over the calling line for a second or two to inform the answering party of the nature of the revertive call.

Although the revertive call trunk 121 is released in the manner described above a predetermined time interval after the revertive call is answered, the finder-selector link 130 remains operatively associated with the revertive calling line so as to busy this line to the other linkage in the hundreds group 13. However, when the revertive call is terminated, and both the calling and called parties have hung up, the loop circuit including the conductors of the line No. 232 is broken so that a second disconnect signal 2945 is transmitted over the line No. 232 and multiplexer pulse transmission in the time position 63*c* assigned to this line is terminated. In the finder 130*a*, the +B switching circuit 301 responds to termination of multiplexer pulse transmission by increasing the potential on the conductor 130*e* to such a value that the +B extinguishing tube in the circuit 301 is fired so that the +B switch potential on the conductor 130*c* is removed and the controlled circuits in the finder 130*a* and the selector 130*b* are returned to their initial or quiescent conditions so that the finder-selector link 130 is released from the line No. 232, as indicated by the arrow 2946. When this occurs the potential on the conductor 334 in the selector 130*b* is returned to ground as shown in Fig. 30 (4). In this connection it will be understood that when the potential on the conductor 130*e* increases positively, as shown at 2931 in Fig. 30 (3), when the first disconnect signal 2930 is transmitted over the calling line in response to the calling party's hanging up, the finder 130*a* is prevented from releasing due to the fact that the potential on the conductor 130*f* is at the highly negative value 2924 during this period, as shown in Fig. 30 (12). However, when the revertive call is answered, the potential on the conductor 130*f* is changed back to ground potential so that the second disconnect signal 2945 has the effect of releasing the finder-selector link 130.

In the event that the revertive call is not answered at the called substation, and is abandoned at the calling substation, so that a calling condition does not again appear on the line No. 232, the ringing timeout circuit 599 in the revertive call selector **121*b* functions to release the linkage associated with this line at the end of a ringing timeout interval irrespective of the calling condition on the line. More specifically, the circuit 599 functions to develop a positive enabling bias potential 2948, as shown in Fig. 30 (19) a period of from zero to two minutes after the code start potential is developed on the conductor 568*a*, i. e., a period of from zero to two minutes after revertive ringing is initiated. Two minutes thereafter, the circuit 599 functions to develop a negative control signal 2949, as shown in Fig. 30 (20), which is transmitted over the conductor 599*a* to the revertive call signaling circuit 563 and causes this circuit to develop a second revertive call signal 2941 in a manner substantially identical to that described above in connection with the response of the circuit 563 to the ring trip potential developed on the conductor 553. As a result, the revertive call trunk 121 is released a short time delay interval after the ringing timeout interval has expired and all of the controlled circuits in the acceptor 121*a* and the selector 121*b* are returned to their initial condition, as described above. Since the revertive call hold signals on the conductors 121*f* and 130*f* are removed in response to the second revertive call signal 2941, the finder 130*a* is conditioned to release the finder-selector link 130 in the event that no calling condition exists on the line No. 232. As a result, the finder-selector link 130 is released just slightly before the revertive call trunk 121 is released, since the time delay interval 2947 in the +B switching circuit 301 is somewhat longer than the time delay interval 2943 in the +B switching circuit 501 in the revertive call acceptor 121*a*. Following the described release operations, the finder-selector link 130 is conditioned to handle another call initiated on one of the lines in the hundreds group 13 and the revertive call trunk 121** is conditioned to handle another revertive call initiated on any one of the lines of the system.

*Operation on a non-revertive call*

Considering now the operation of the system on a non-revertive call, it will be understood that the directory numbers individually assigned to the different substations of the system, all have a first, or hundreds digit, which is either "2" or is greater than "2." Accordingly, if the directory number of a called line is dialed at any calling line of the system, the first digit of this number will be "2" or greater than "2" so that the revertive call trunks, which are reached by dialing a first digit of "1" are never called into service. It will also be understood that several lines in different hundreds groups which have the same pulse time positions assigned thereto, may simultaneously reach a plurality of the revertive call trunks in the first hundreds group 12 through their respective call forwarding selectors by dialing a first digit of "1," as described above.

With regard to the operation of the present system on a non-revertive call, it is pointed out that for non-revertive calls the system operates in a manner substantially identical to that described in detail in the copending application Serial No. 326,213 identified above, with the exception that the first one hundred lines in the one thousand system disclosed therein, together with the associated finder-selector links and acceptor-connector links, are replaced by the above-described trunks, 121, 123, and 125, to permit handling of revertive calls on a system of more than 100 lines. However, since the finder-selector links of the present system are used to set up both revertive and non-revertive calls, these links must be capable of functioning properly on either a revertive call, which is directed to one of the revertive call trunks in the first hundreds group 12, or on a non-revertive call directed to one of the other lines of the system, either in the same hundreds group or in a different hundreds group.

Considering, for example, the operation of the finder-selector link 130 in setting up a non-revertive call between the private line substation E associated with the line No. 223 in the second hundreds group 13 and the private substation K associated with the line No. 032 in the tenth hundreds group 14, when the call is initiated and the loop circuit including the conductors of the line No. 223 is closed to the line circuit **10*b*, the multiplexer 11*b* responds thereto by developing multiplexer pulses in the time position 84*b* assigned to the line No. 223 in the second hundreds group 13. The multiplexer pulses 84*b* are transmitted by way of the conductor 50*b* to the selector 130*b*, and by way of the buffer amplifier 190*b* to the finder 130*a* as finder drive pulses. In the finder 130*a*, the mutiplexer pulses 84*b* are transmitted through the pulse input circuit 300 to the +B switching circuit 301 so that a +B switch potential is developed on the conductor 130*c* and finder gate pulses appearing in the time position 64*b* assigned to the line No. 223 are developed on the conductor 130*d*. As a result, the selector 130*b* becomes operatively associated with the line No. 223 in a manner identical to that described above in connection with a revertive call, and the ten impulses constituting the first hundreds digit of "0" of the called line No. 032, are transmitted through the forward in gate circuit 307, are reconstructed in the forward reconstructor circuit 308 and are repeated to the dial impulse integrator circuit 309, this latter circuit responding by developing corresponding control pulses which are transmitted through the hundreds register inverter 360 to the hundreds register pulser 310. The pulser 310 responds to these ten control pulses by developing corresponding register drive pulses which are used to drive the hundreds digit register 311 to a setting indicating the numerical value of "0" of the first digit. As a result, the tens pulses 81*a* appearing on the conductor 32*j* are selected in the register 311 and are transmitted over the conductor 332 to the selector pulse and connector busy pulse forming circuit 317 and the idle pulse gate circuit 395**.

In the idle pulse gate circuit 395 only those idle pulses which appear during the tens pulse interval **81*a* and represent idle acceptor-connector links in the called hundreds group 14 are transmitted through the circuit 395 to the connector coincidence tube circuit 397 wherein one of these idle pulses is selected and transmitted over the conductor 345 to the selector pulse and connector busy pulse forming circuit 317. Assuming that the idle pulse appearing in the time position 62*j* assigned to the acceptor-connector link 141 in the called hundreds group 14 is selected, the circuit 317 functions to develop selector pulses in the time position 62*j* which are transmitted over the conductor 339 to the forward out gate circuit 324, the return in gate circuit 323, the return reconstructor circuit 322, and the revertive call control circuit 365. The forward out gate circuit 324 responds by impressing selector forward signal pulses on the conductor 195 in the time position 62*j* assigned to the acceptor-connector link 141 and these selector forward signal pulses are transmitted through the coupling circuit 186 and over the conductor 196 to all of the acceptors of the system. However, only the acceptor 141*a* is conditioned to accept these selector forward signal pulses and this acceptor responds thereto by operatively associating the acceptor-connector link 141 with the call forwarding selector 130*b***.

While the selector pulses developed on the conductor 339 are impressed upon the revertive call control circuit 365 in the selector **130*b*, the circuit 365 must also receive a revertive call signal over the conductor 207*b* in the same time position as the selector pulses in order for the revertive call control circuit 365 to function in the manner described above in connection with a revertive call. Since each of the revertive call trunks and the acceptor-connector links of the system are individually assigned different time positions in the pulse frame, the selector pulses will not coincide with pulses appearing on the conductor 207***b* since these selector pulses appear in the time position 62*j* assigned to the acceptor-connector link 141, whereas the revertive call trunks of the system are assigned the time positions 62*a*, 63*a*, 64*a*, to 71*a*, inclusive. Accordingly, even though another revertive call is being set up at that time and revertive call pulses appear on the conductor 207*b*, these pulses will not appear in the selected time position 62*j* assigned to the acceptor-connector link 141 so that the revertive call control circuit 365 is not affected during a non-revertive call. As a result, the circuit 365 does not change the potential on the conductor 130*f* so that the finder 130*a* remains continuously conditioned to respond to termination of multiplexer pulse transmission in the time position 64*b* assigned to the line No. 223 by releasing the finder-selector link 130.

After the acceptor-connector link 141 is operatively associated with the call forwarding selector 130*b*, the connector 141*b* responds to the second, third and fourth digits of the directory number dialed at the calling substation E by selecting the time position assigned to the called line No. 032 in the tenth hundreds group 14, i. e., the time position 63*c*, and also selects the code #1 party line ringing signal which is assigned to the substation K, this substation having the party line ringing digit of "1" for uniform directory numbering. The manner in which a two-way talking connection is set up between the substations E and K following the described operations in the acceptor-connector link 141 will be fully apparent from the copending application Serial No. 326,213, identified above. Also, it will be noted that the special service features of trunk hunting, conversation timing, and so forth, are retained in the system of the present invention for non-revertive calls, and these features are fully compatible with the operation of the system in handling revertive calls in the manner described above. It will also be understood that the linkage associated with the calling and called lines is released in a manner identical to that described above in the copending application Serial No. 326,213 identified above, when the non-revertive call is terminated at either the calling or called line.

DETAILED DESCRIPTION OF THE SYSTEM

Figure 1:
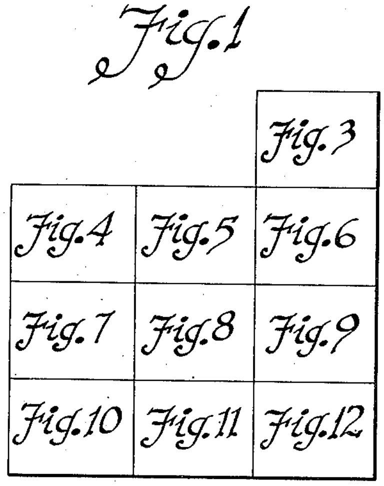
Figure 2:
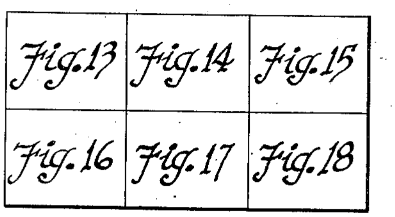
Figure 37:
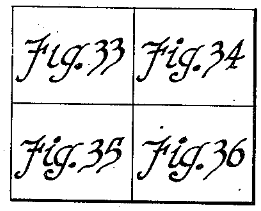
Figure 20:
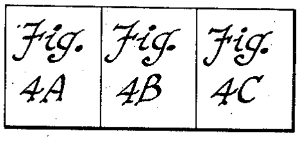
Figure 21:
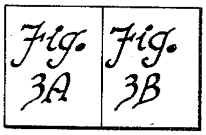
Figure 22:
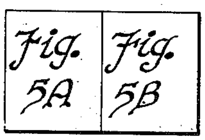
Figure 23:
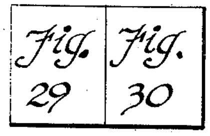
Figure 28:
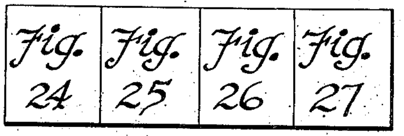

In considering the detailed circuitry of the system components described above, operation of these components will be analyzed in so far as possible in terms of the functions which they perform in establishing the above-described revertive call connection between the substations F and H in response to a revertive call initiated at the substation F. Before considering the details of the system componenets, however, it is pointed out generally that corresponding reference characters have been used throughout the drawings to identify corresponding circuit elements of the system. It is also pointed out that all pulse carrying conductors, such, for example, as the signal pulse transmission conductors 50*b* and 51*b* are in the form of coaxial cables or transmission lines having low pulse attenuating properties at the pulse frequencies employed. In certain instances, the coaxial cables provided to connect two or more components of the systems, have been illustrated. It should also be remembered that all of the other illustrated pulse-carrying conductors are of the proper type. On the other hand, all illustrated conductors which function as direct current potential or audio signal carrying conductors are in the form of open or shielded wire.

Throughout the following detailed description of the system, the tube types employed are specifically identified. Moreover, those tubes of the system which are of the gas-filled or thyratron type are so identified in the drawings through the use of a small dot within the tube envelope circle and opposite the tube cathode to indicate the gas content of the tube. It is also pointed out unless necessary to an understanding of a particular system component, those circuit elements which perform an entirely conventional function in the circuits, namely, functions which will be readily understood by those skilled in the art, have not been identified in the drawings or referred to in the following description of the system components.

As used in this specification, the terms "electronic" and "electronic means" refer to and are intended to define means comprising electron conducting devices such, for example, as electron tubes, gas tubes, crystal rectifiers, semi-conductors and the like, together with interconnecting circuit components therefor, and to exclude all electromechanical devices embodying moving mechanical parts such, for example, as relays, stepping switches, and the like.

Also, in order to reduce the complexity of this specification, those system components which are substantially identical to the corresponding system components of other copending applications identified more specifically hereinafter, will be only briefly described in this specification, reference being had to these copending applications for a complete and detailed description of the particular system components.

*Common equipment 17*

All of the component circuits of the common equipment 17, with the exception of the ringing carrier generator 29*f*, the revertive call tone generator 29*g*, and the timing generator 57 may be substantially identical to the corresponding system components shown and described in detail in the copending application of Frank A. Morris and Robert B. Trousdale, Serial No. 326,213 identified above, and reference may be had to this application for a complete and detailed description of these common equipment system components. With regard to the ringing carrier generator 29*f*, this system component may be substantially identical to the corresponding system component shown and described in detail in my copending application Serial No. 326,453 filed on December 17, 1952 and assigned to the same assignee as the present invention, and reference may be had to this copending application for a complete and detailed description of the generator 29*f*. With regard to the revertive call tone generator 29*g*, this tone generator may be substantially identical to the corresponding system component shown and described in detail in my copending application Serial No. 336,316, filed on February 11, 1953, and assigned to the same assignee as the present invention, and reference may be had to this copending application for a complete and detailed description of the generator 29*g*.

With regard to the timing pulse generator 57, this generator may be identical to the corresponding system component shown and described in detail in the copending application Serial No. 336,316 identified above, and reference may had to this copending application for a complete and detailed description of the generator 57.

It will be understood, however, that the revertive call system of the present invention may be employed in a system wherein code ringing is employed instead of frequency selective ringing to select a particular party line substation. In such case, the harmonic ringing oscillator 97, the harmonic ringing frequency generator 98, the harmonic ringing code forming circuit 99, the harmonic ringing modulator circuit 100, and the harmonic ringing amplifier and supply circuit 101 are replaced by a suitable code-forming circuit, code modulator circuit, and ringing supply circuit as described in detail in my copending application Serial No. 257,712, filed November 23, 1951, and assigned to the same assignee as the present invention. In the copending application Serial No. 257,-712, the code forming circuit is identified by the reference character 27*a*, the code modulator circuit is identified by the reference character 27, and the ringing supply circuit is identified by the reference character 60. In this connection it will be understood that in a code ringing system each party line substation is identified by a uniquely coded signal which is repeated during repetitive code ringing cycles. However, all of the substations are provided with ringers which respond to the same ringing frequency, i. e., the ringing frequency supplied by the ringing supply circuit 60.

*All links busy circuits 192b to 192j, inclusive*

These circuits are individually identical to the corresponding system components shown and described in detail in the copending application of Frank A. Morris, Serial No. 241,351, filed on August 10, 1951, and assigned to the same assignee as the present invention. These all links busy circuits are also described generally in the copending application of Frank A. Morris and Robert B. Trousdale, Serial No. 326,213 identified above, and reference may be had to this copending application for a description of the all links busy circuit in a system of more than 100 lines.

*Buffer amplifiers 190b to 190j, inclusive, and acceptor drive circuit 189*

These circuits are individually identical to the corresponding system component shown and described in my copending application Serial No. 301,087, filed on July 26, 1952, and assigned to the same assignee as the present invention, and reference may be had to this copending application for a complete and detailed description of these circuits. In addition, the operation of these circuits in a large office is described in the copending application Serial No. 326,213, identified above.

*Busy pulse drive circuits 193b to 193j, inclusive*

Each of these circuits is individually identical to the corresponding system components shown and described in the above-identified copending application Serial No. 326,213, identified above, and reference may be had to this application for a description of these circuits.

*Trunk marking pulse generators 194b to 194j, inclusive*

Each of these generators is individually identical to the corresponding system component shown and described in detail in my copending application Serial No. 301,215, identified above, and is provided for the purpose of generating trunk marking pulses which are supplied to the connectors in a particular hundreds group to provide for trunk hunting in that hundreds group. In addition, the operation of these trunk marking pulse generators in a large office is described in the copending application Serial No. 326,213 identified above.

*Selector forward coupling circuit 186, selector return coupling circuit 188, idle pulse coupling circuit 187, connector busy pulse coupling circuit 205, and distributor coupling circuits 191b to 191j, inclusive*

The above identified coupling circuits are each identical to the corresponding system components shown and described in the copending application Serial No. 326,213, identified above, and reference may be had to this copending application for a detailed description of these circuits in a system of more than 100 lines.

*Revertive call signal coupling circuit 207*

This coupling circuit may be identical to any one of the above-enumerated coupling circuits, such as the selector forward coupling circuit 186, and reference may be had to the copending application Serial No. 326,213 for a detailed description of a suitable coupling circuit. It will be recalled from the general description of the system that the revertive call signal coupling circuit 207 is provided for the purpose of coupling the revertive call signals developed by the revertive call trunks of the system to all of the selectors of the system over the separate revertive call signal control channel which interconnects the revertive call trunks and the selectors of the system. The circuit 207 provides a low impedance output circuit suitable for driving a low impedance cable 207b interconnecting the selectors of the system with the revertive call trunks and also amplifies and inverts the revertive call signals, which it will be recalled consist of bursts of pulses occurring in the time position assigned to the selected revertive call trunk.

*Substations F and H*

Figure 4:
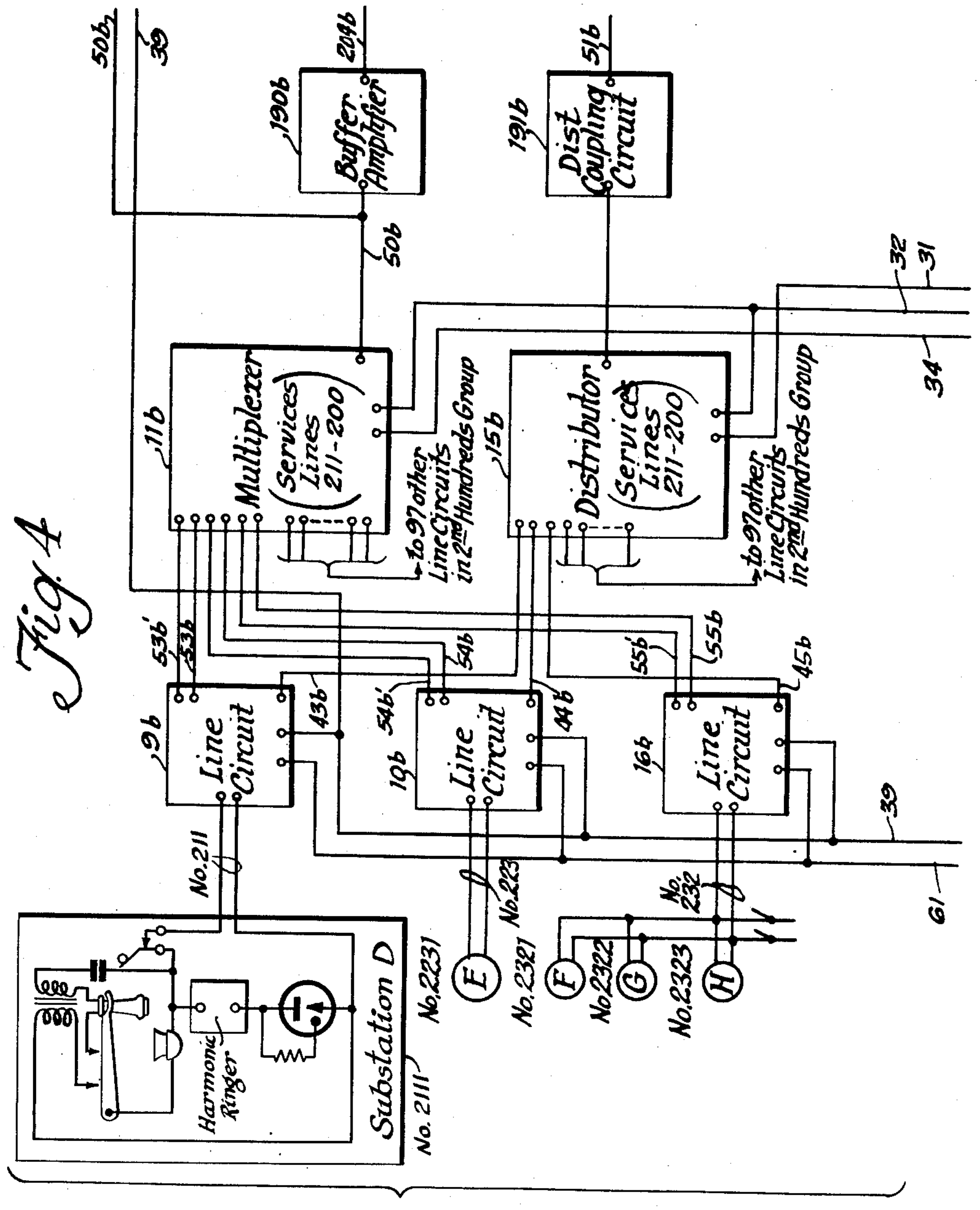

These substations, as well as the other substations of the system, may be identical to the corresponding substations shown and described in detail in my copending application Serial No. 301,215, filed July 28, 1952, and assigned to the same assignee as the present invention, and reference may be had to this application for a complete description thereof, the substation D being shown in detail in Fig. 4. In this connection it will be understood that when more than one substation is associated with one line, the substations are provided with harmonic ringers which are responsive to ringing currents of different frequencies. However, if more than five substations are employed, the substations are paired off and each pair of substations is provided with harmonic ringers which respond to the same ringing frequency, the distinction between these two substations being made on a ringing code basis, as described above. It will also be understood that in the event that party line code ringing is employed wherein all of the ringers respond to the same ringing frequency, distinction is made solely on the basis of the code sequence in which the ringers are rung.

*Line circuit 16b*

This line circuit, as well as the other 899 line circuits of the system, may be identical to the corresponding system component shown and described in the copending application Serial No. 326,213 identified above. As previously indicated, this line circuit terminates the party line No. 232 in the second hundreds group 13 at the exchange end of the system.

*Multiplexers 11b to 11j, inclusive*

As pointed out in the general description of the system, these circuits, which are individually associated with each hundreds line group, are provided for the general purpose of sampling control and intelligence signals developed on calling and called lines in the associated hundreds group in the time positions of each pulse frame individually assigned to the lines from which the signals are respectively derived, and transmitting multiplexer pulses modulated with the sampled control and intelligence signals over the respective multiplexer output conductors 50b to 50j, inclusive, to the associated finder, selectors and connectors in each hundreds group of the system. Each of these multiplexer circuits is capable of sampling signals appearing on each of the hundred lines of the associated hundreds group at a sampling repetition rate of ten kilocycles.

Each of the multiplexers 11b to 11j, inclusive, may be identical to the corresponding system component described in the copending application Serial No. 134,974, identified above, or my copending application Serial No. 205,641, filed January 12, 1951, and assigned to the same assignee as the present invention. However, it will be appreciated from the foregoing general description, that a given type of multiplexer is designed to operate with the intelligence and supervisory signal channels of a given type of line circuit. Thus, the type of line circuit disclosed in the copending application Serial No. 134,974, is adapted to supply the intelligence and control signals over the same conductors to the corresponding gate tube of the associated multiplexer, whereas, in the copending application Serial No. 205,641, the intelligence and control signals are supplied over separate paths to separate control grids of the corresponding gate tube in the associated multiplexer. Since the intelligence and supervisory channels of the line circuits of the present invention are of the latter type, it will be understood that a multiplexer of the type shown in copending application Serial No. 205,641, is to be used with these line circuits. However, it will be understood that either type of line circuit or multiplexer combination may be employed in so far as the system of the present invention is concerned.

*Finder 130a*

The finder 130*a*, as well as all of the other finders of the system of the present invention, may be identical to the corresponding system component shown and described in detail in my copending application Serial No. 336,316 identified above, and is provided for the purpose of identifying the time position of a calling line within the associated hundreds group upon the initiation of a call upon this line, and operatively associating the finder with the calling line by providing a finder gate pulse in the calling line time position which is forwarded to the associated selector 130*b*, providing operating potential for certain circuit components within the finder 130*a* and the associated selector 130*b*, and providing a busy pulse in the calling line time position which is transmitted to all of the other finders and connectors in the same hundreds group. The finder 130*a* also responds to a revertive call hold potential developed on the conductor 130*f* during a revertive call by remaining operatively associated with the revertive calling line even though a calling condition does not exist on this line, develops a revertive call ring start signal on the conductor 130*e* in response to a first disconnect signal transmitted over the associated revertive calling line indicating that the calling party has hung up, and recognizes, after the revertive call hold potential is removed from the conductor 130*f*, an extended on-hook condition at the calling line as abandonment or termination or dismissal of the call, and effects release of the associated selector 130*b* thereafter by removing operating potential from the conductor 130*c*.

In this connection, it will be understood that the line finder disclosed in the above-identified copending application Serial No. 336,316 is disclosed in connection with a 100 line system. The circuitry and mode of operation of the line finder therein disclosed is substantially identical to the line finders of the present system involving more than 100 lines. However, it will be noted that in the above-identified application, Serial No. 336,316 an additional conductor identified as the conductor 12*g* is connected between the +B switching circuit in this finder and the conversation timing control circuit in the associated connector to effect release of the link at the end of the conversation timing interval. In the present system, this conductor is not required between the finder 130*a* and the selector 130*b* because the conversation timing facilities are contained in the acceptor-connector links of the system, and the two-way talking connection is broken in the acceptor-connector stage in a thousand line system. Accordingly, no corresponding conductor is required between the finders and selectors in the system of the present invention.

*Acceptor 141a*

Figure 4A:
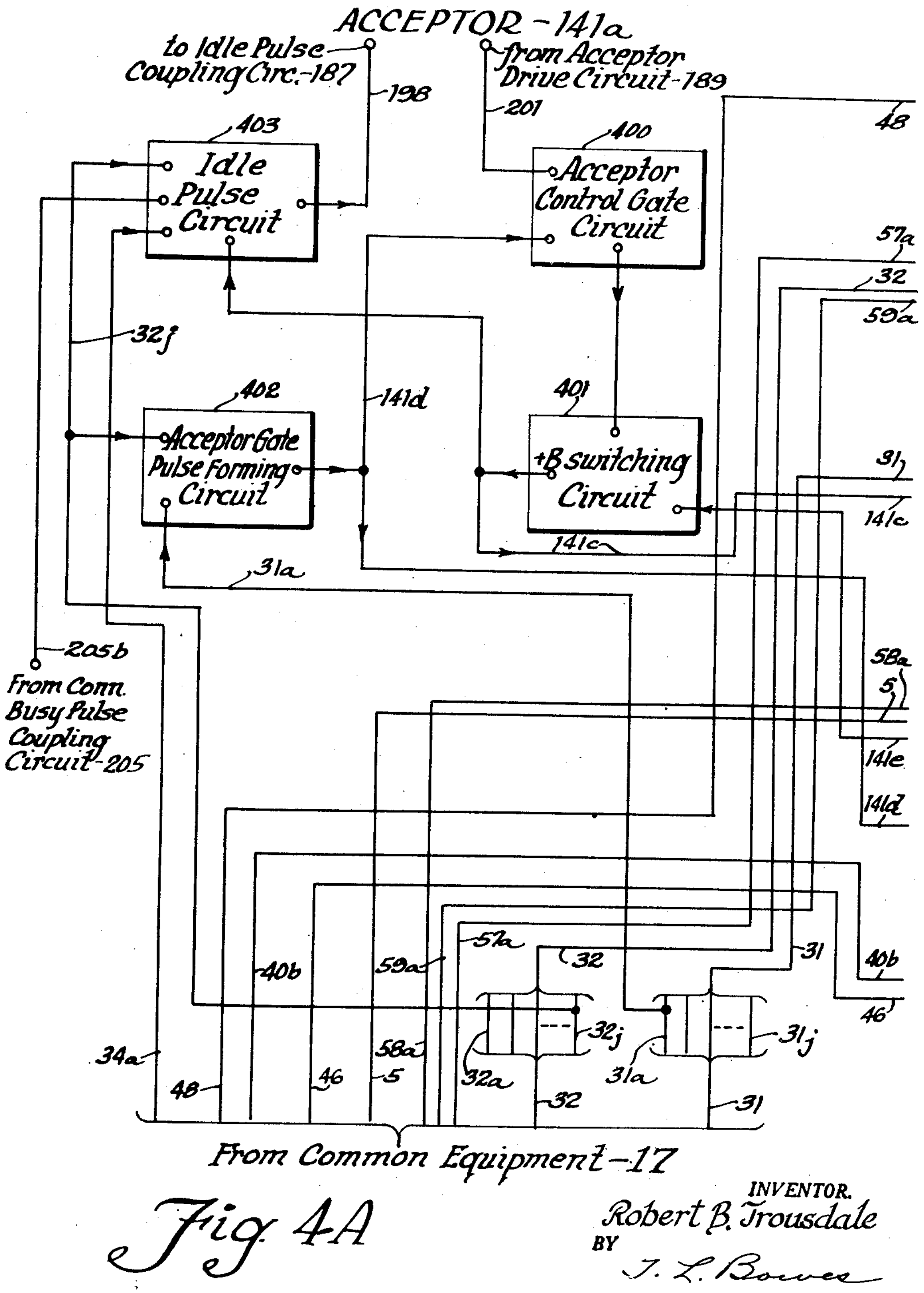
Figure 4B:
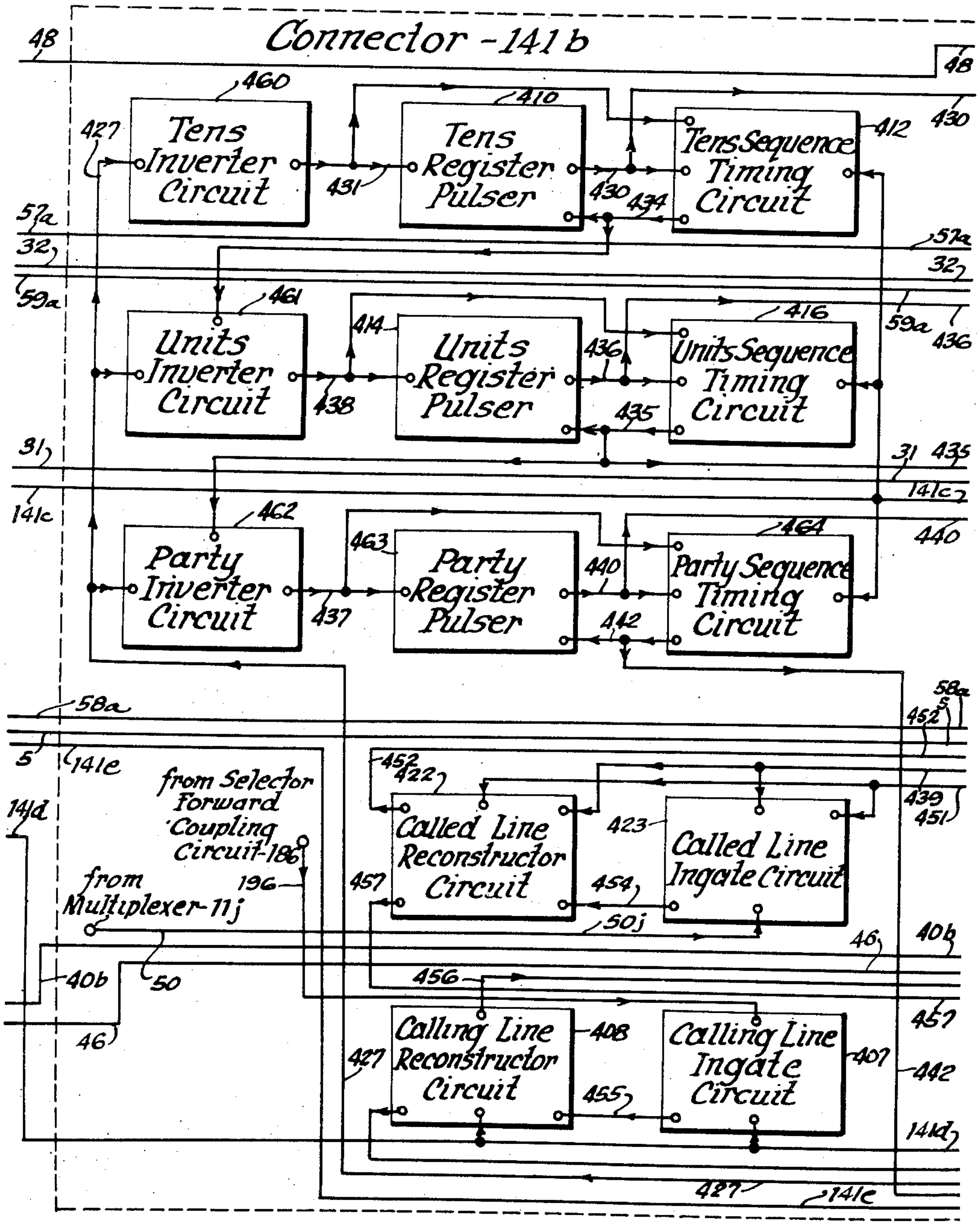
Figure 4C:
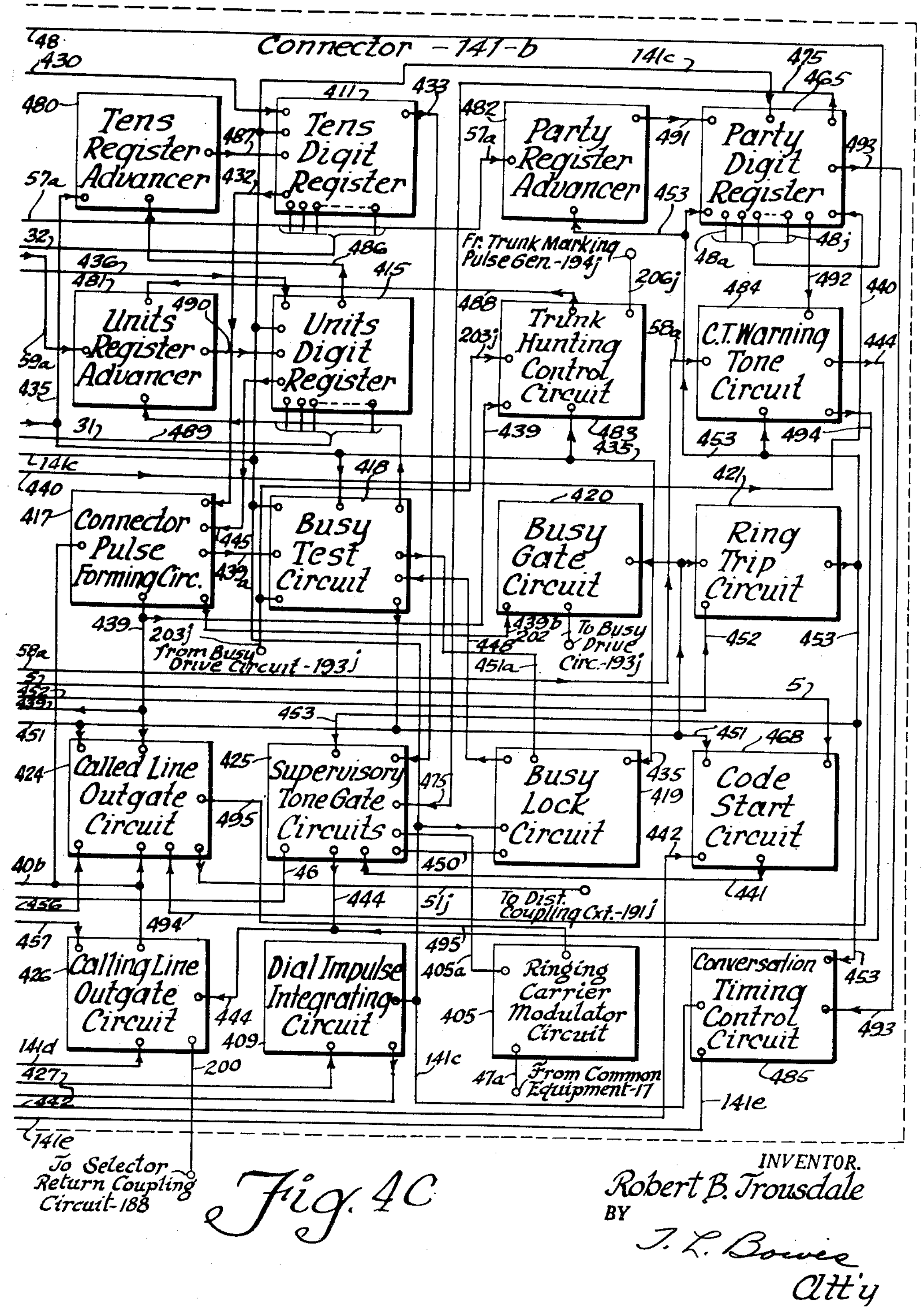

The acceptor 141*a*, as well as all of the other acceptors associated with the acceptor-connector links of the system, may be identical to the corresponding system component shown and described in detail in the copending application Serial No. 326,213 identified above, and reference may be had to this application for a complete and detailed description of the acceptors. In addition, the functions performed by this acceptor and the identified components thereof, are also generally explained above with reference to Fig. 4A of the drawings.

*Connector 141b*

This connector, as well as the other connectors of the system, is substantially identical to the corresponding system component shown and described in detail in my copending application Serial No. 326,453 identified above, and is employed to perform the numerous functions described heretofore in connection with the tracing of a non-revertive call from the calling substation E to the called substation K. However, it will be understood that in a system of more than 100 lines, the acceptor 141*a* is provided instead of a line finder, and supplies acceptor gate pulses and a +B switching potential to the connector 141*b*, which respectively correspond to the finder gate pulses and the +B switching potential furnished by the line finder in the 100 line system shown in my copending application Serial No. 326,453 identified above. Also, in the present system of more than 100 lines, the selector forward conductor 196 replaces the multiplexer output conductor 50 to the calling line in gate circuit and the selector return conductor 200 replaces the distributor input conductor 51 to the calling line out gate circuit of the system shown in copending application Serial No. 326,453, identified above. Furthermore, no dial tone gate tube is required in the connectors of the present system since dial tone is returned by the selectors.

In this connection, it will be understood that the conversation timing facilities in the connector 141*b* may be altered in the manner described in detail in the copending application Serial No. 301,215, identified above, so that the connector 141*b* is made busy at the end of the conversation timing period instead of sending a conversation timing extinguishing pulse over the conductor 141*e* to the associated acceptor 141*a*. With this modification, the conductor 141*e* between the acceptor and connector of the link 141 is not required. Furthermore, with this modification, a busy tone signal is released to the calling subscriber at the same time that the dial tone signal is returned to the called subscriber so that both the calling and called subscribers are informed that the call has been terminated automatically.

*Distributors 15b–15j, inclusive*

Each of these distributors may be identical to the corresponding system component shown and described in the copending application Serial No. 326,213 identified above, and reference may be had to that application for a description of the operation of these circuits in a system of more than 100 lines.

*Revertive call acceptor 121a*

Figure 5:
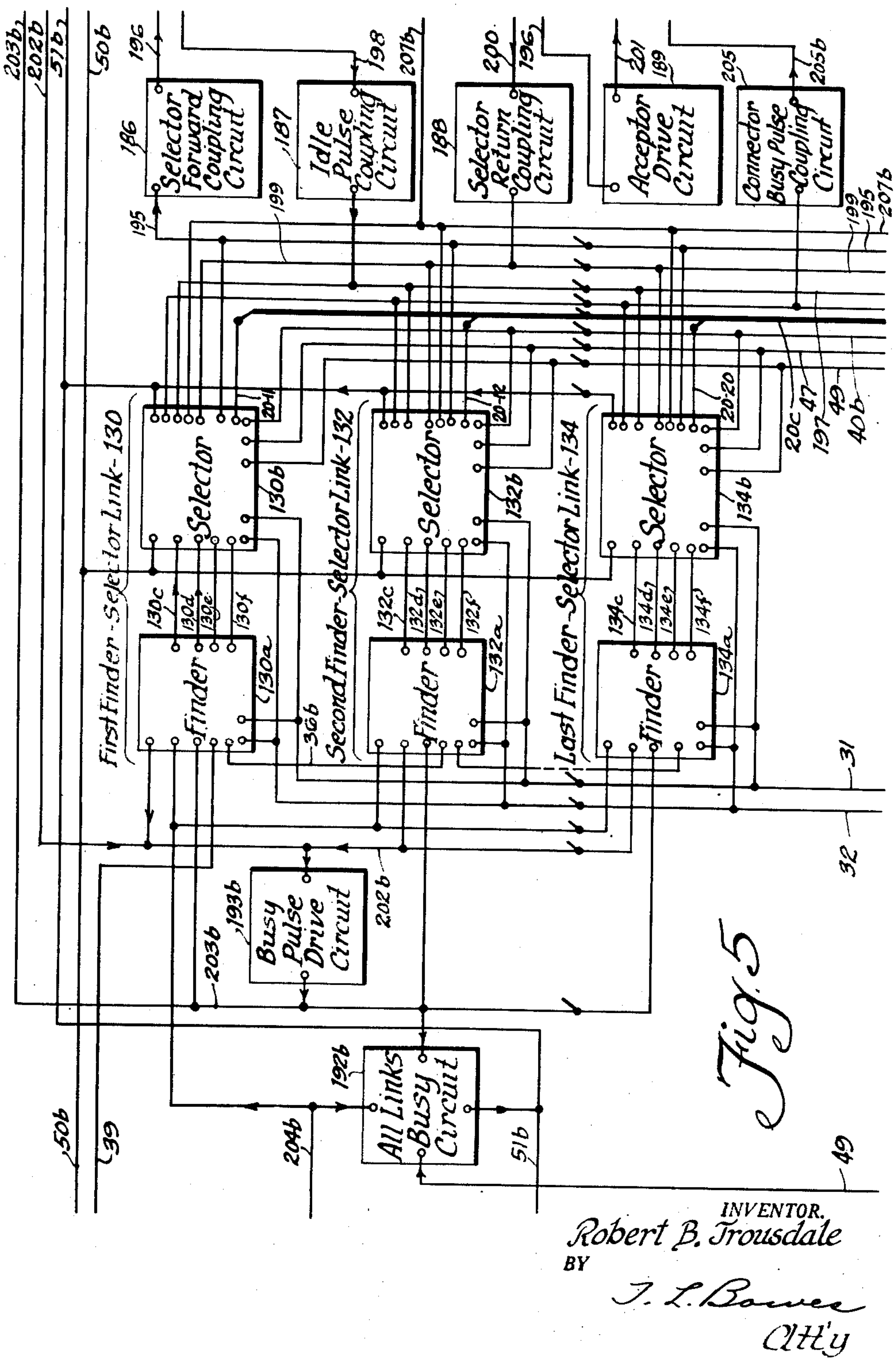
Figure 5A:
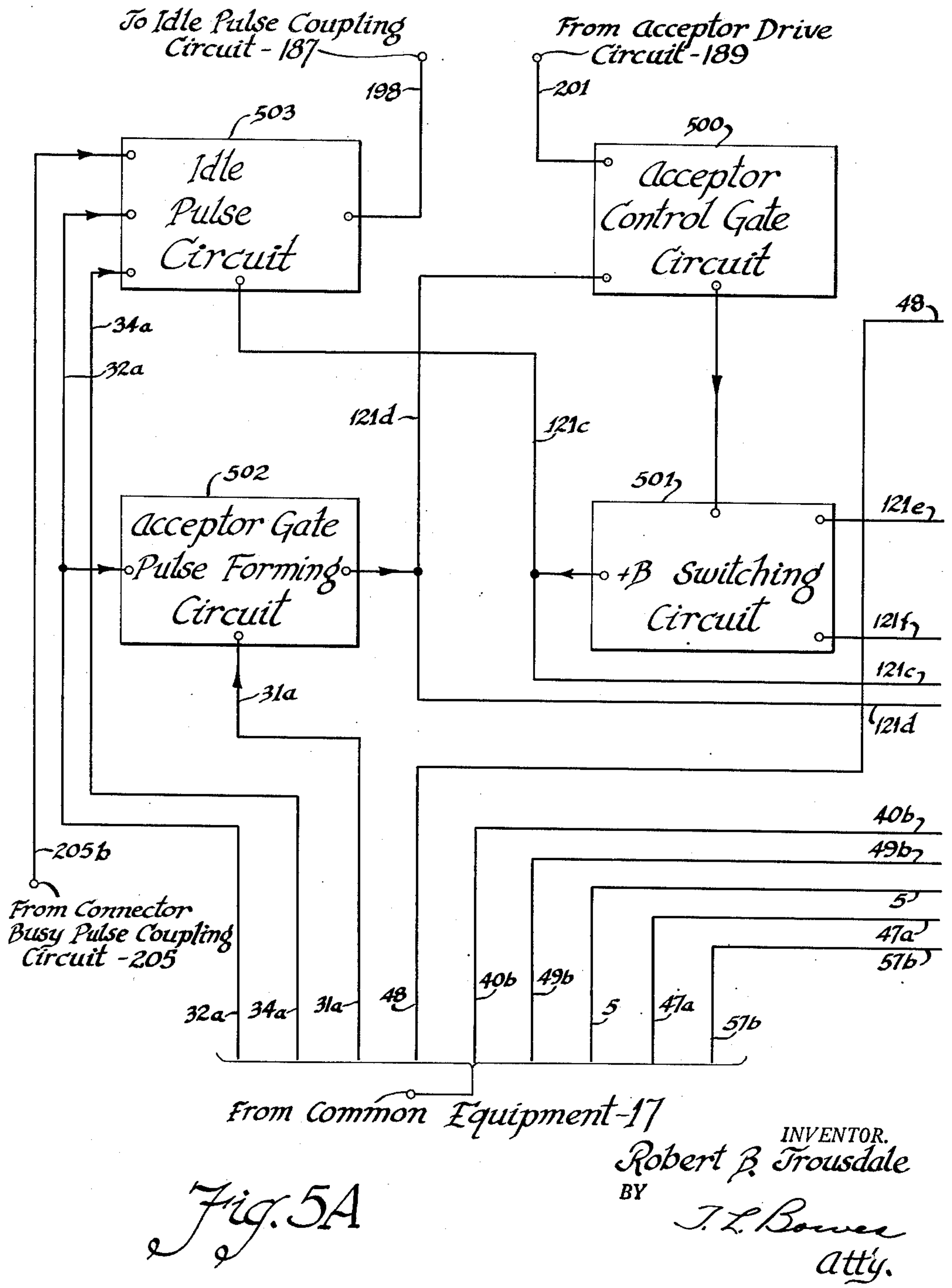

As previously explained in connection with Fig. 5A of the drawings, this acceptor generally comprises an acceptor control gate circuit 500, a +B switching circuit 501, an acceptor gate pulse forming circuit 502, and an idle pulse circuit 503. The functions performed by this acceptor and the identified components thereof in handling a revertive call are also generally explained above with reference to the same figure of the drawings.

Figure 19:
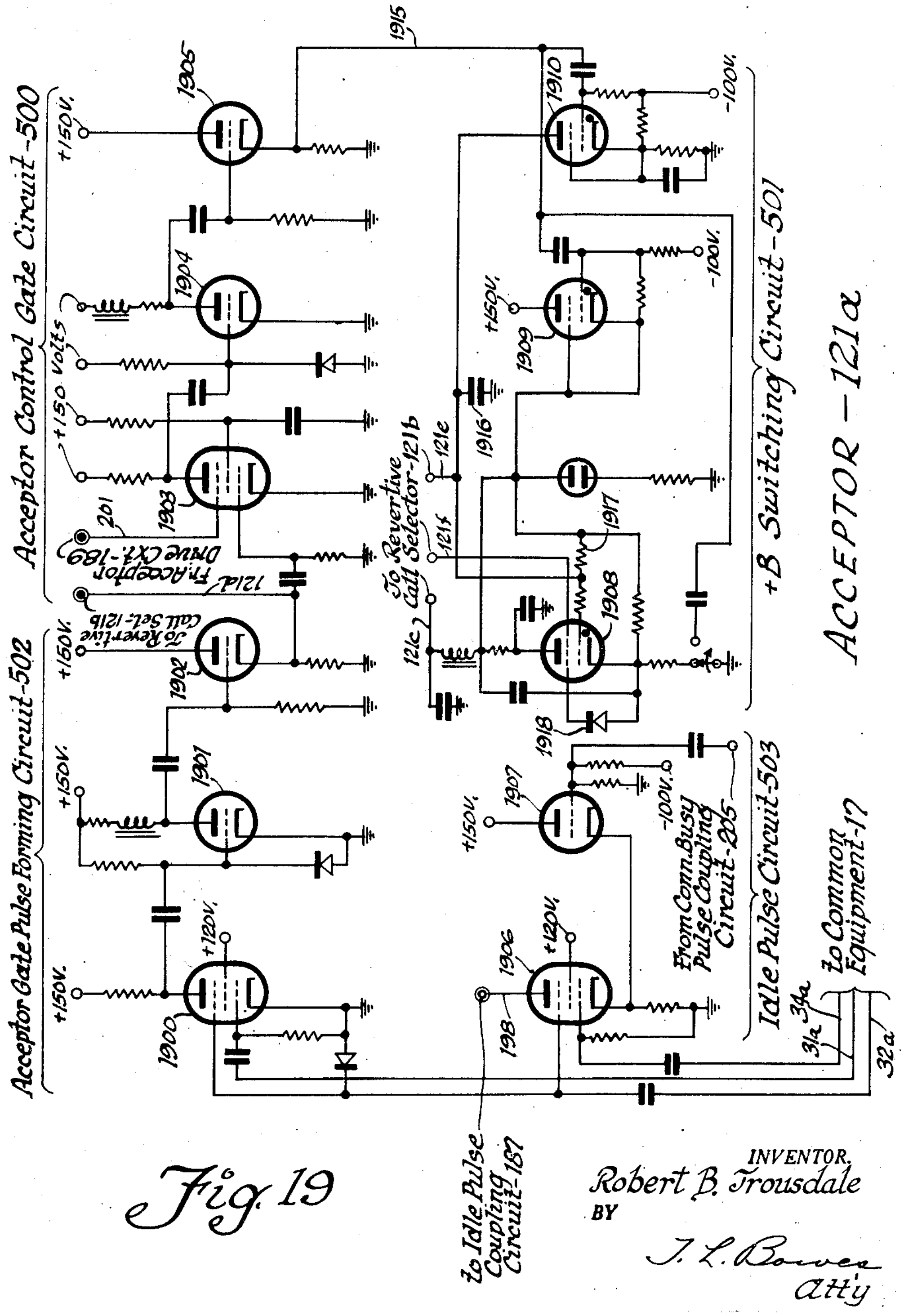
Figure 24:
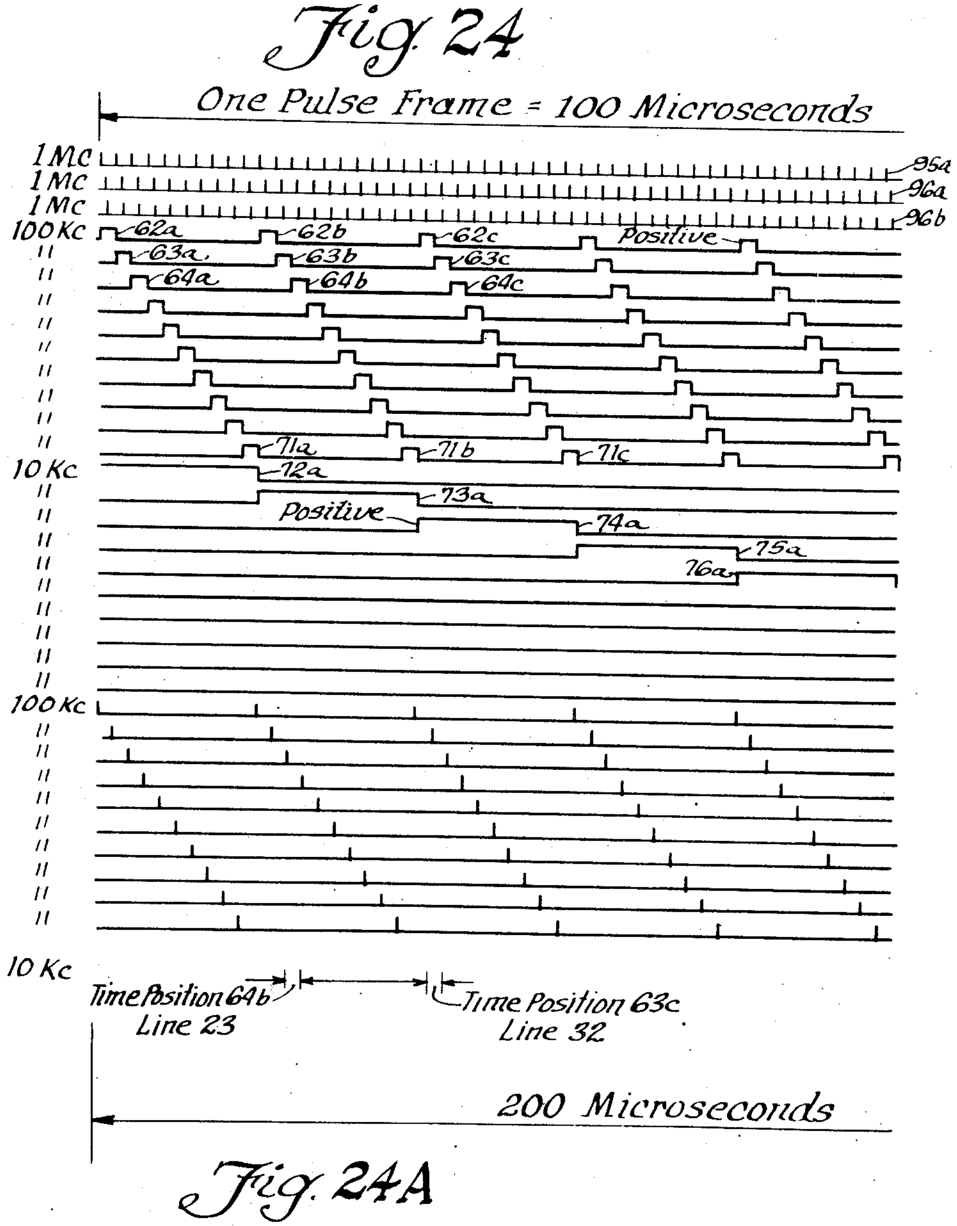
Figure 24A:
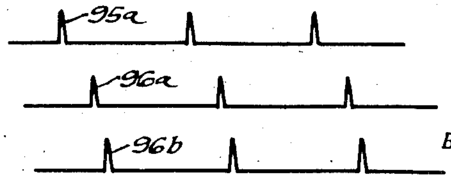
Figure 25:
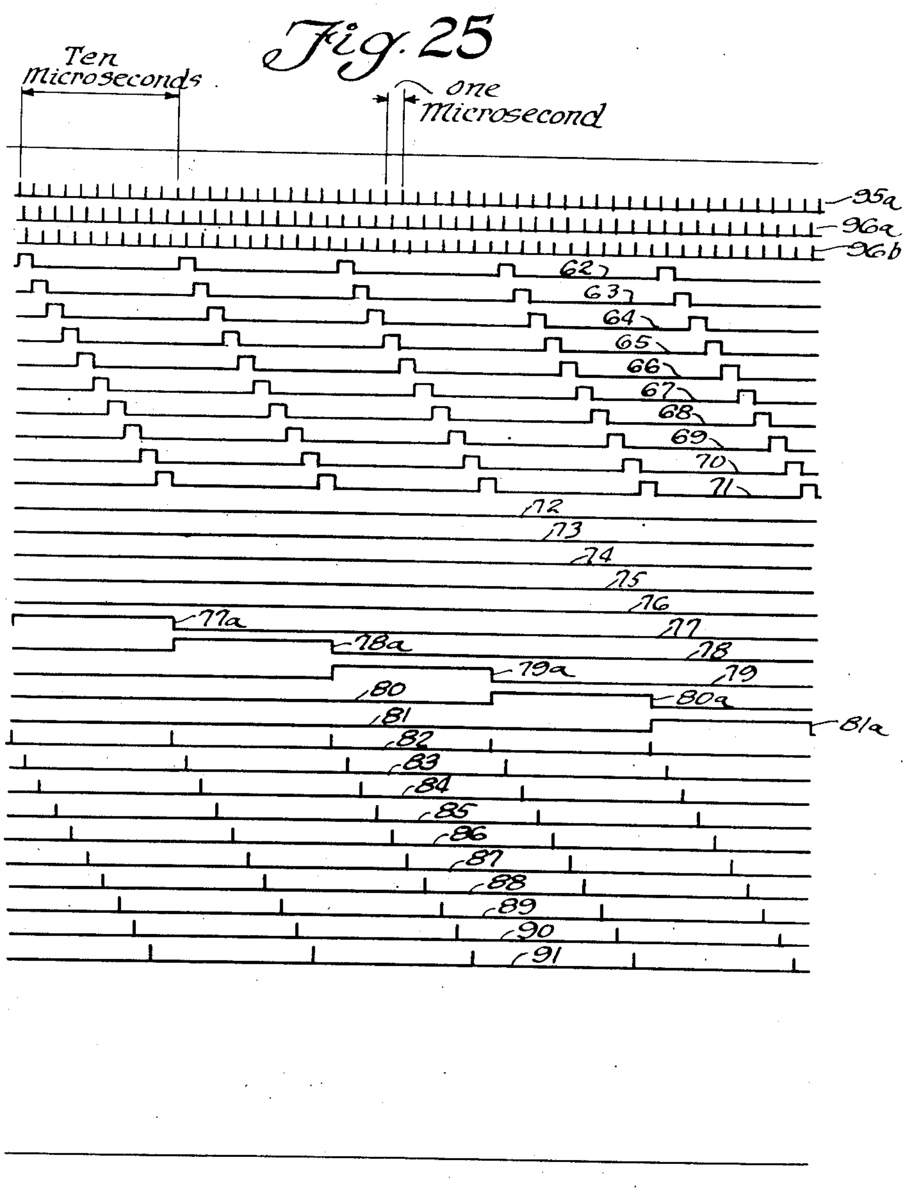
Figure 26:
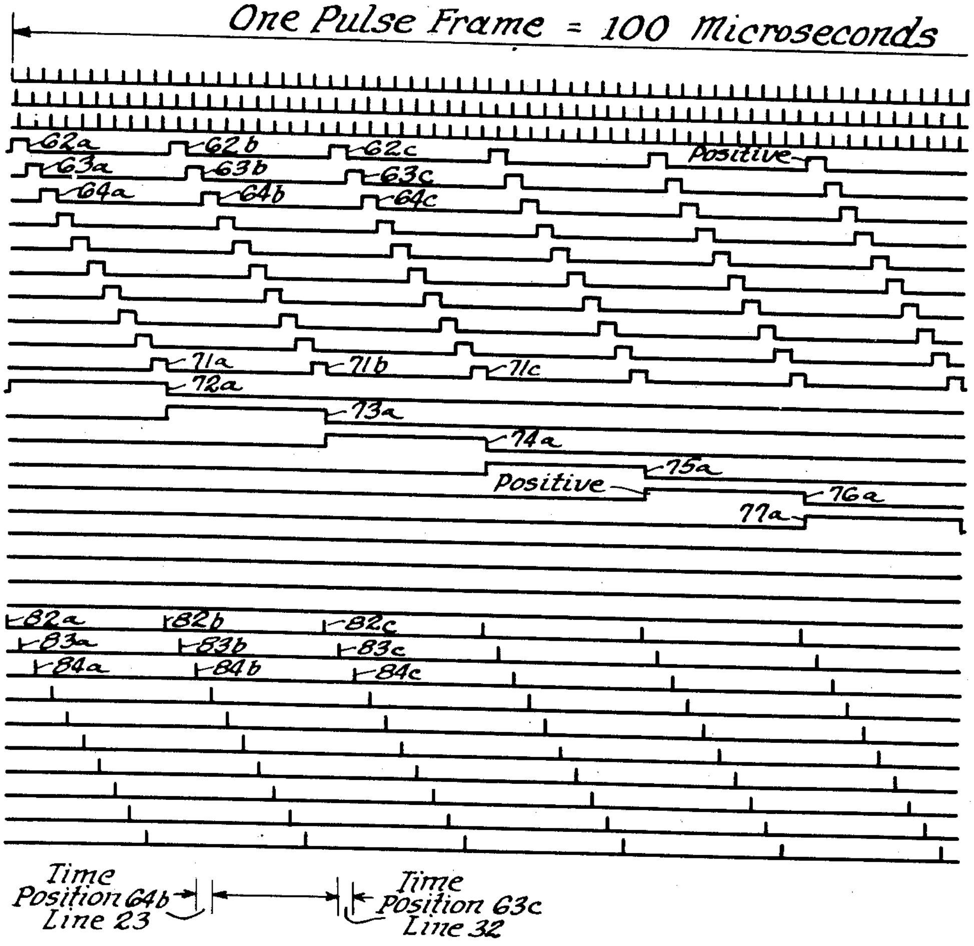
Figure 27:
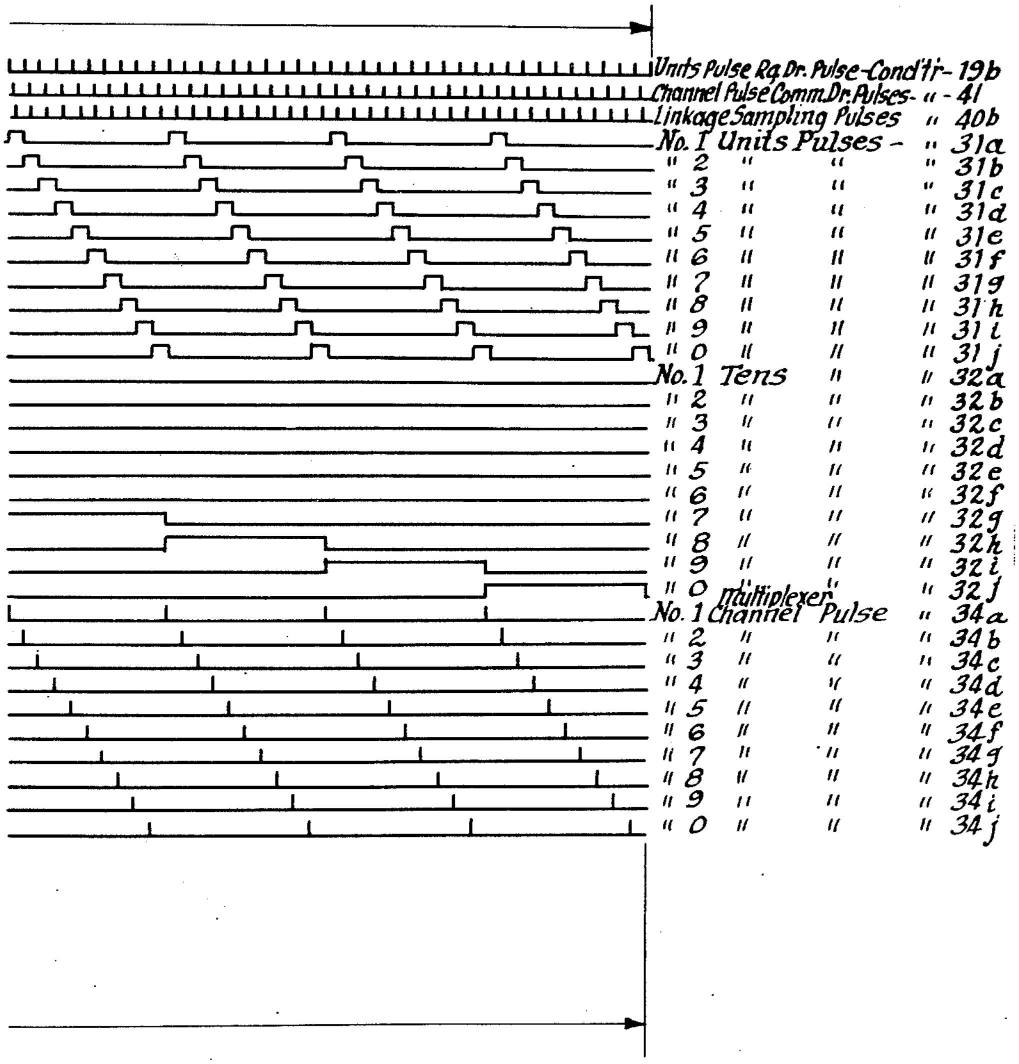

Referring now particularly to Fig. 19 of the drawings, wherein the detailed circuitry of the revertive call acceptor 121 is illustrated, it will be seen that the acceptor control gate circuit 500 comprises an acceptor control gate tube 1903, an inverter tube 1904, and a cathode follower tube 1905 connected in tandem in the order named, and arranged to impress pulses gated therethrough upon the conductor 1915. These pulses are transmitted over the conductor 1915 to the input terminals of the +B switching circuit 501, which circuit comprises a +B switching tube 1909, a +B extinguishing tube 1908, and a +B switch timing tube 1910, interconnected in the manner illustrated.

The acceptor gate pulse forming circuit 502 comprises an acceptor gate pulse forming tube 1900, an inverter tube 1901 and a cathode follower tube 1902, which are connected in tandem in the order named and arranged to impress pulses gated therethrough upon the conductor 121*d*. These pulses are transmitted over the conductor 121*d* to one control grid of the acceptor gate control tube 1903, and to the revertive call selector 121*b* in parallel.

The idle pulse circuit 503 comprises an idle pulse gate tube 1906 and a control tube 1907. This circuit is actuated under the joint control of tens pulses impressed thereon from the conductor **32*a* and channel pulses impressed thereon from the conductor 34*a*, and is arranged to impress idle pulses upon the idle pulse out conductor 198 in the time position 62*a* assigned to the revertive call trunk 121. The three gas tubes 1908, 1909, and 1910 of the +B switching circuit 501 are highly sensitive thyratrons, preferably of the RCA commercial type 5696. The tubes 1900, 1903 and 1906 are preferably of the commercial type 6AS6; and the tubes 1901, 1902, 1904, 1905, and 1907** are preferably of the commercial type 6C4.

In considering the operational details of the revertive call acceptor **121*a*, it is first pointed out that the acceptor control gate circuit 500, the acceptor gate pulse forming circuit 502, and the idle pulse circuit 503 are substantially identical to the corresponding circuit components shown and described in detail in the copending application Serial No. 326,213, identified above, wherein an acceptor is shown in conjunction with an acceptor-connector link. However, it will be understood that the revertive call acceptor 121*a* is assigned to one of the revertive call trunks which has assigned thereto the time position 62*a* in each pulse frame. Accordingly, the circuits 500, 502 and 503** are arranged to respond to pulses in this time position of each pulse frame.

With regard to the +B switching circuit 501, this circuit is in general similar to the corresponding circuit components shown and described in detail in the copending application Serial No. 326,213 identified above, in connection with an acceptor for an acceptor-connector link. However, in accordance with the present invention, the revertive call acceptor **121*a* is arranged to respond to a revertive call hold potential on the conductor 121*f* and is also arranged to impress a revertive call ring start signal on the conductor 121*e*** in the manner described generally above.

With regard to these features, the +B switching circuit 501 is similar to the +B switching circuit 301 in the finder **130*a* and reference may be had to my copending application Serial No. 336,316 identified above, for a detailed description of the manner in which the revertive call ring start signal is produced and the effect of the revertive call hold potential. However, for the purposes of the present invention, it may be stated that acceptor drive pulses, which are gated through the circuit 500 and correspond to selector forward signal pulses appearing in the time position 62*a* assigned to the revertive call trunk 121, are transmitted by way of the conductor 1915 to the first control grid of the +B switch timing tube 1910 and have the effect of firing this tube. At the same time, these acceptor drive pulses are impressed upon the first control grid of the +B switch tube 1909 so that this tube is fired and a +B switch potential is impressed upon the conductor 121*c* and is transmitted by way of this conductor to the revertive call selector 121*b* so that the revertive call trunk 121 becomes operatively associated with the call forwarding selector. When the tube 1910 is fired in the manner described above, the condenser 1916 becomes charged highly negative to a potential of −80 volts, thereby preventing the extinguishing tube 1908 from firing. However, the condenser 1916 starts to charge positively through the resistor 1917 which is connected between the condenser 1916 and the cathode of the +B switch tube 1909. When the potential across the condenser 1916 is reduced to about −60 volts, the timing tube 1910 is again fired by means of the acceptor drive pulses impressed upon the control grid thereof, so that a relaxation type of operation of the tube 1910 and condenser 1916 continues so long as acceptor drive pulses continue to be impressed upon the conductor 1915. However, when the calling party hangs up to permit completion of a revertive call, acceptor drive pulses are terminated in the manner described above in the call forwarding selector 130*b* so that the condenser 1916 charges positively through the resistor 1917 to substantially ground potential. In the revertive call selector 121*b* there is provided means for preventing the potential on the conductor 121*e* from becoming more positive than ground. However, the above-described increase in potential on the conductor 121*a* constitutes a revertive call ring start signal to which the revertive call selector 121*b* responds by initiating revertive ringing in the manner described above. In order to prevent the extinguishing tube 1908 from firing and thereby releasing the revertive call trunk 121 when the calling party hangs up, the revertive call selector 121*b* is arranged to impress a negative revertive call hold potential on the conductor 121*f*, which is transmitted by way of this conductor to the shield grid of the extinguishing tube 1908. Accordingly, when a revertive call hold potential is developed on the conductor 121*f* the shield grid of the tube 1908 is held highly negative so as to prevent this tube from firing even though the control grid of this tube is increased positively due to charging of the condenser 1916. In order to prevent the tube 1908 from firing even though a positive potential is impressed upon the conductor 121*f*, there is provided the rectifier 1918 which is connected between the shield grid and cathode of the tube 1908 and prevents the shield grid potential from becoming positive with respect to the cathode of the tube 1908**.

After the revertive call hold potential is removed from the conductor **121*f*, the +B switching circuit 501 is conditioned to respond to termination of selector forward signal pulses, i. e., acceptor drive pulses, by releasing the trunk 121. More specifically, when acceptor drive pulses cease, the condenser 1916 is charged to a sufficiently positive potential to fire the tube 1908 and when the tube 1908 fires, the potential at the cathode of this tube is additively combined with the potential at the cathode of the +B switch tube 1909 so that the cathode potential of the tube 1909 becomes greater than the anode potential thereof and the tube is extinguished. Accordingly, +B switch potential is removed from the conductor 121*c* and the revertive call trunk 121** is released.

*Selector 130b*

Figure 3:
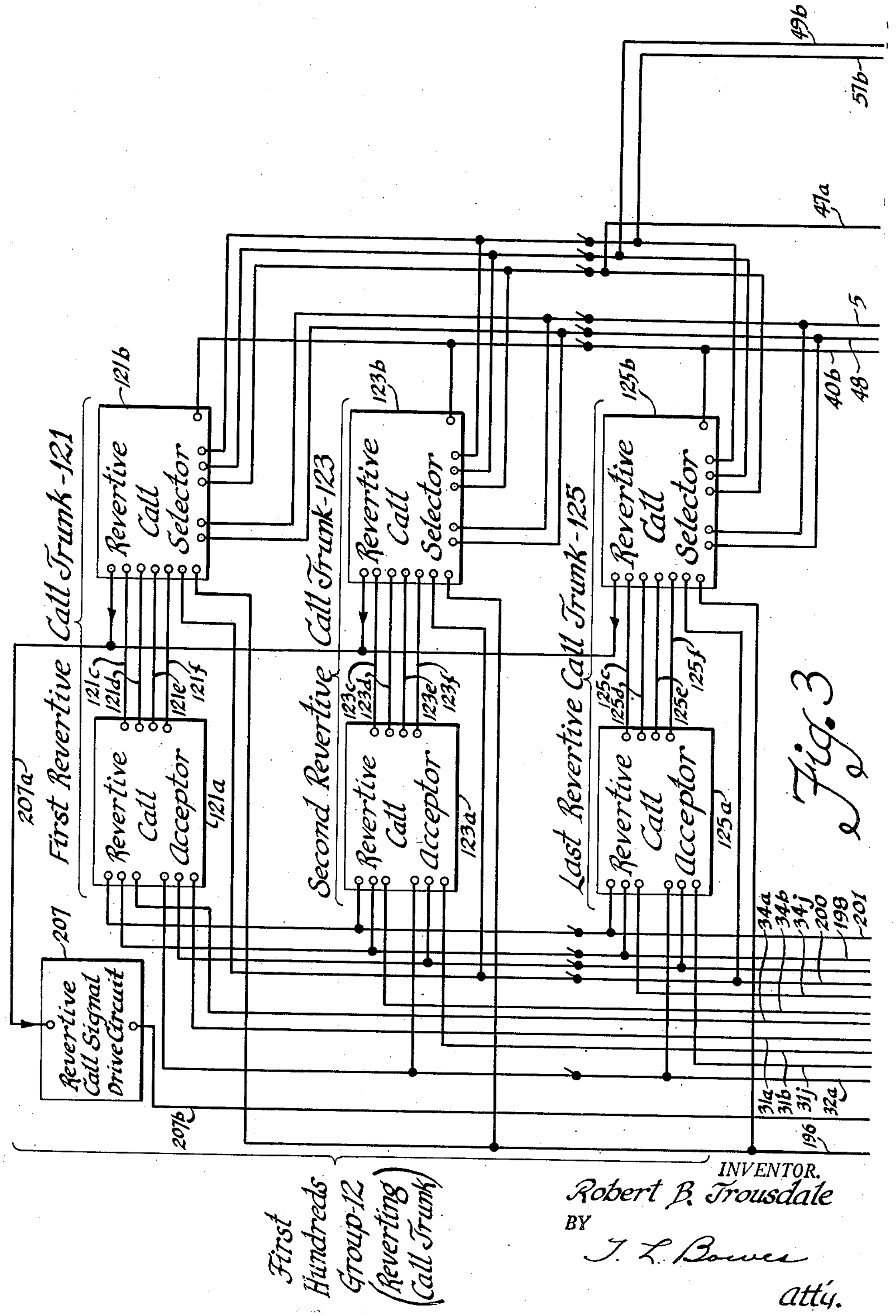
Figure 3A:
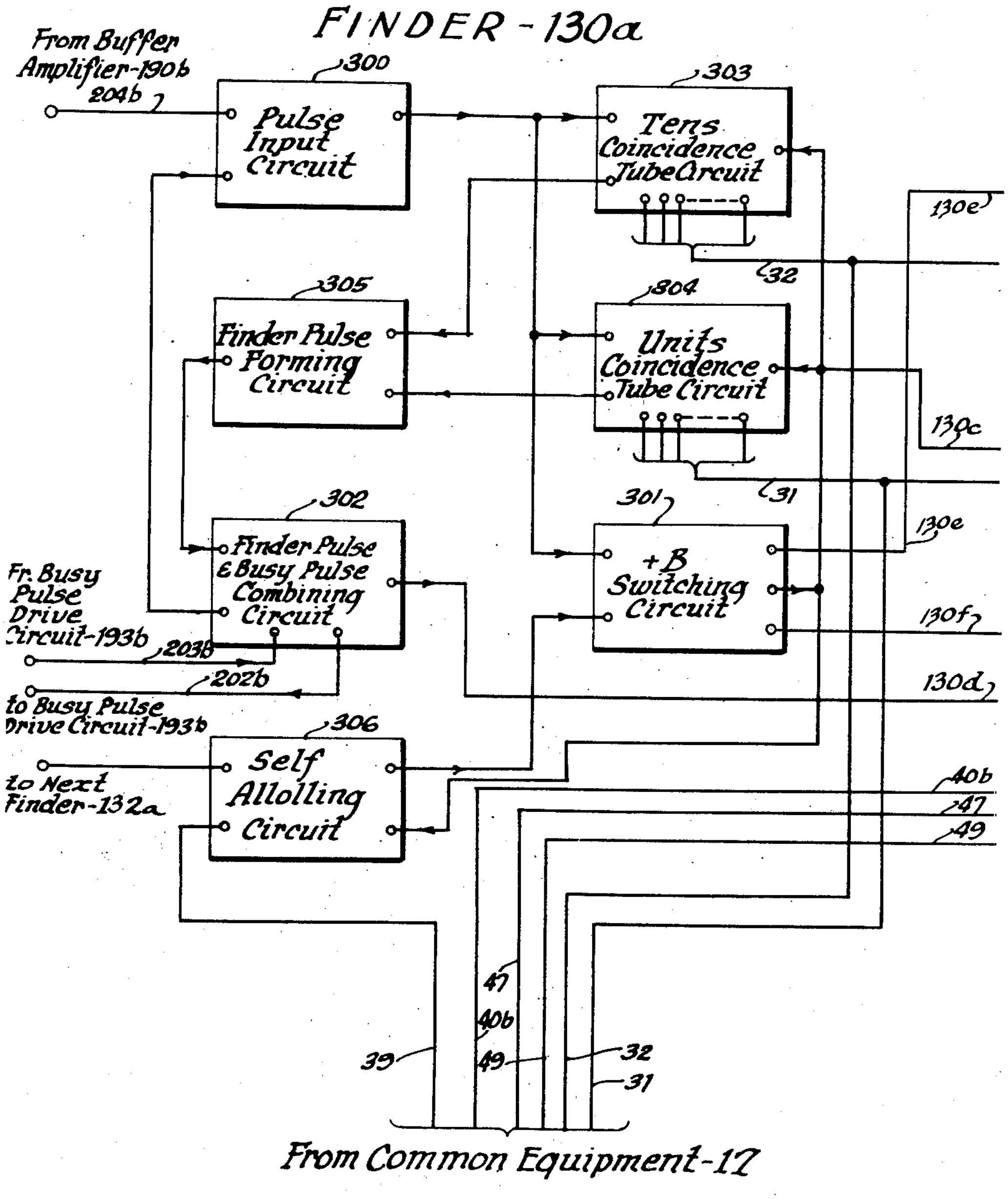
Figure 3B:
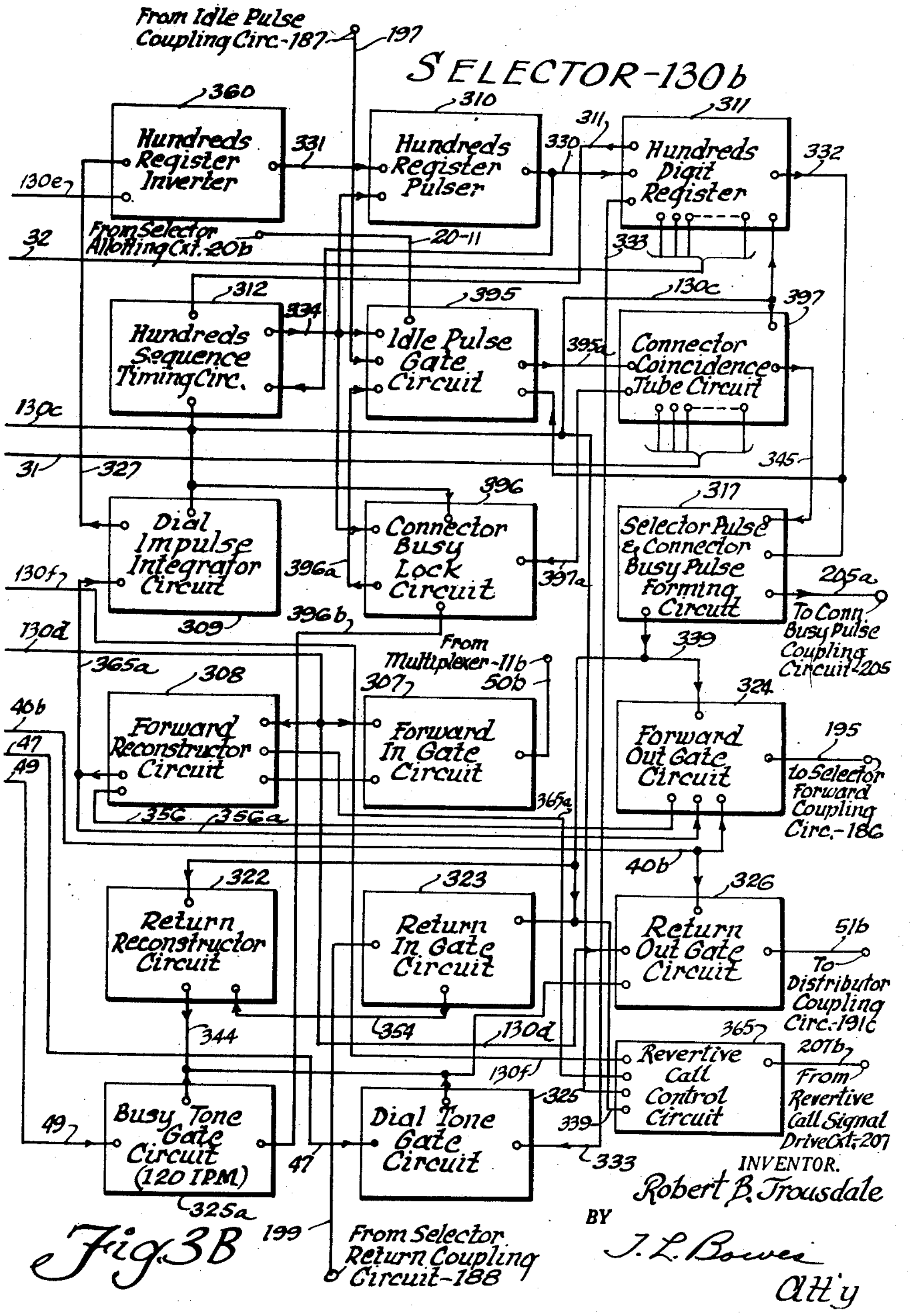

As previously explained in connection with Fig. 3B of the drawings, this selector generally comprises a dial impulse integrator circuit 309, a hundreds register pulser 310, a hundreds digit register 311, a hundreds sequence timing circuit 312, a hundreds register inverter 360, an idle pulse gate circuit 395, a connector busy lock circuit 396, a connector coincidence tube circuit 397, a selector pulse and connector busy pulse forming circuit 317, a forward in gate circuit 307, a forward reconstructor circuit 308, a forward out gate circuit 324, a return in gate circuit 323, a return reconstructor circuit 322, a return out gate circuit 326, a dial tone gate circuit 325, a busy tone gate circuit **325*a* and a revertive call control circuit 365**. The functions performed by this circuit and the identified components thereof are also generally explained above with reference to the same figure of the drawings.

Figure 13:
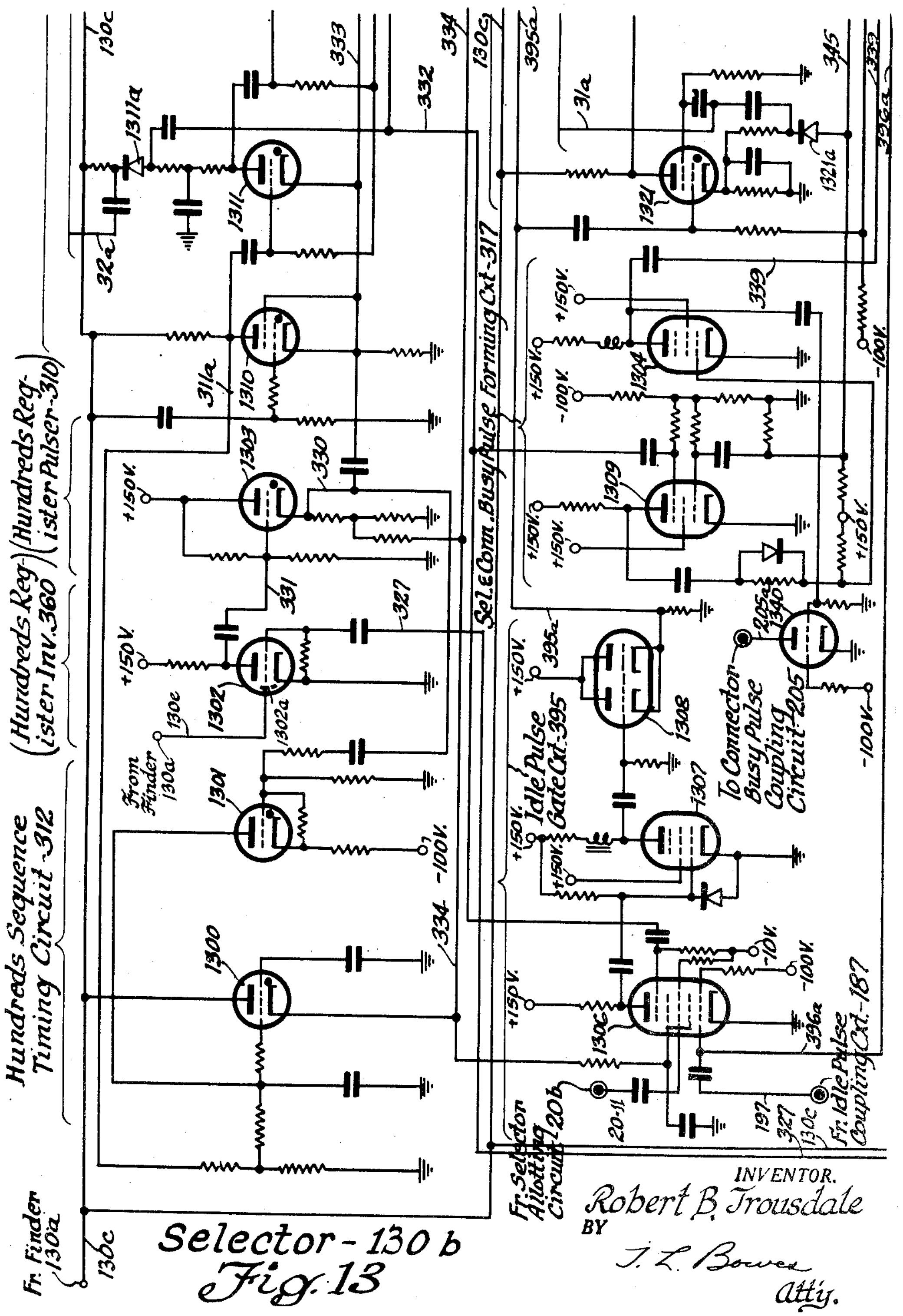
Figure 14:
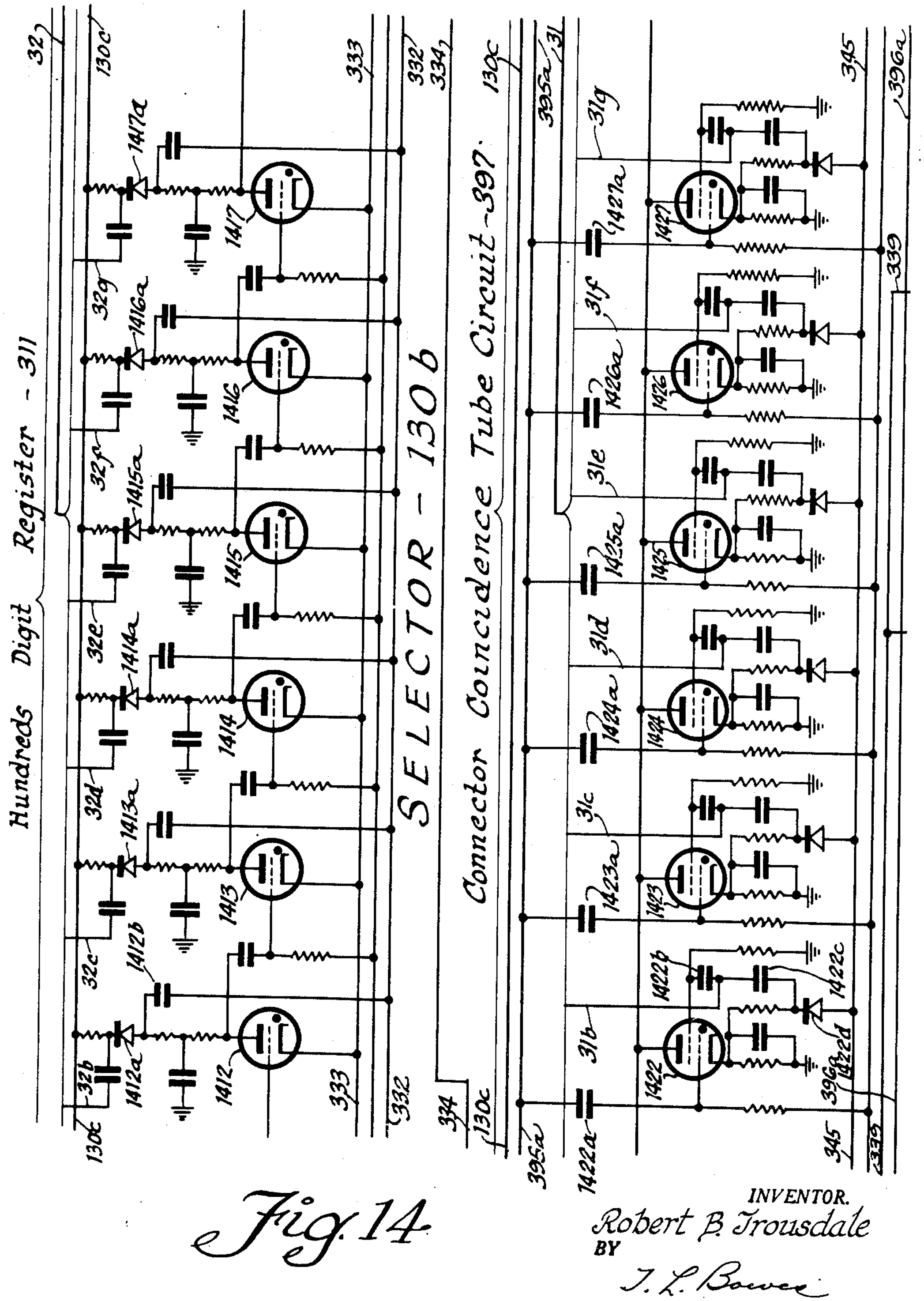
Figure 15:
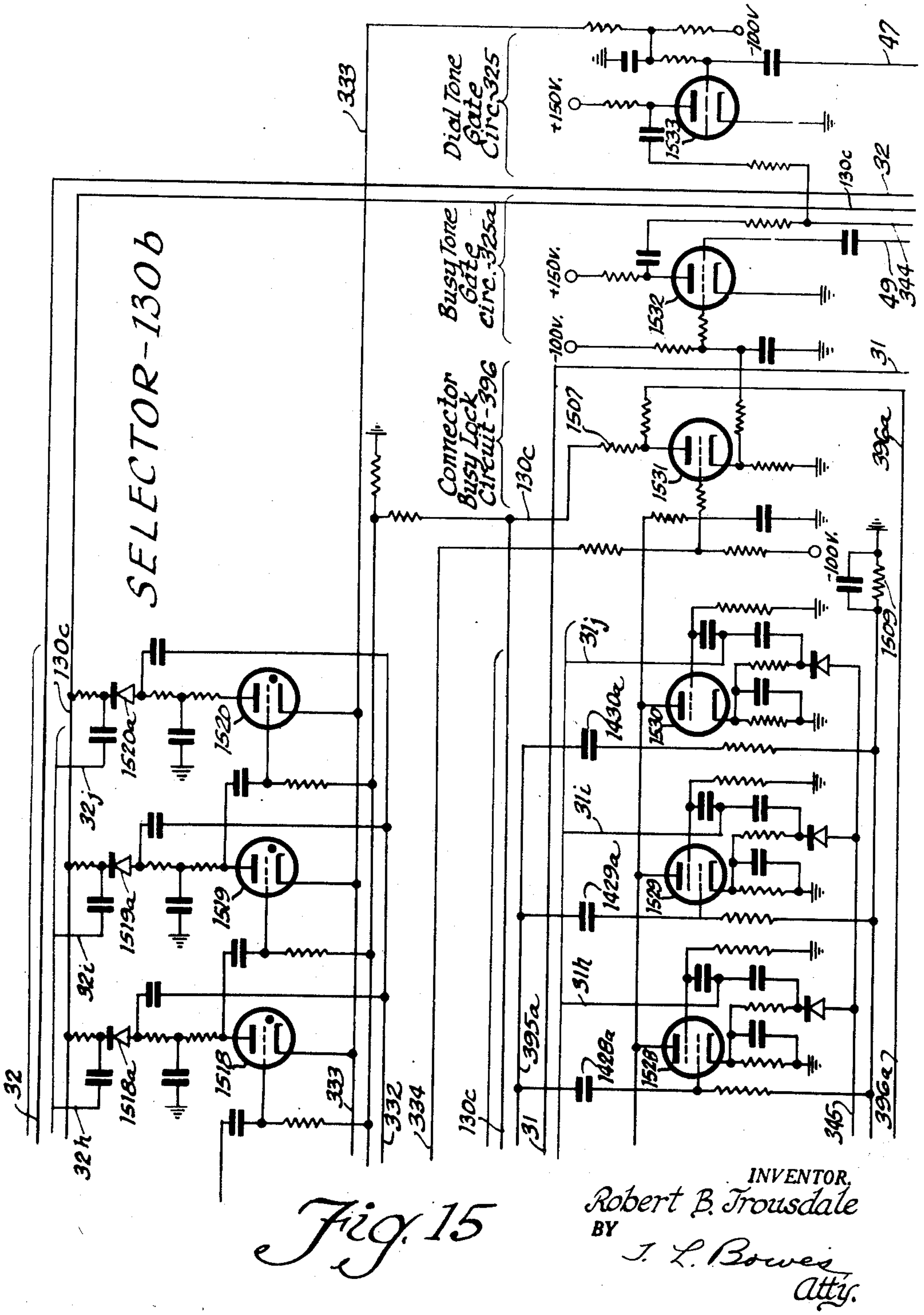
Figure 16:
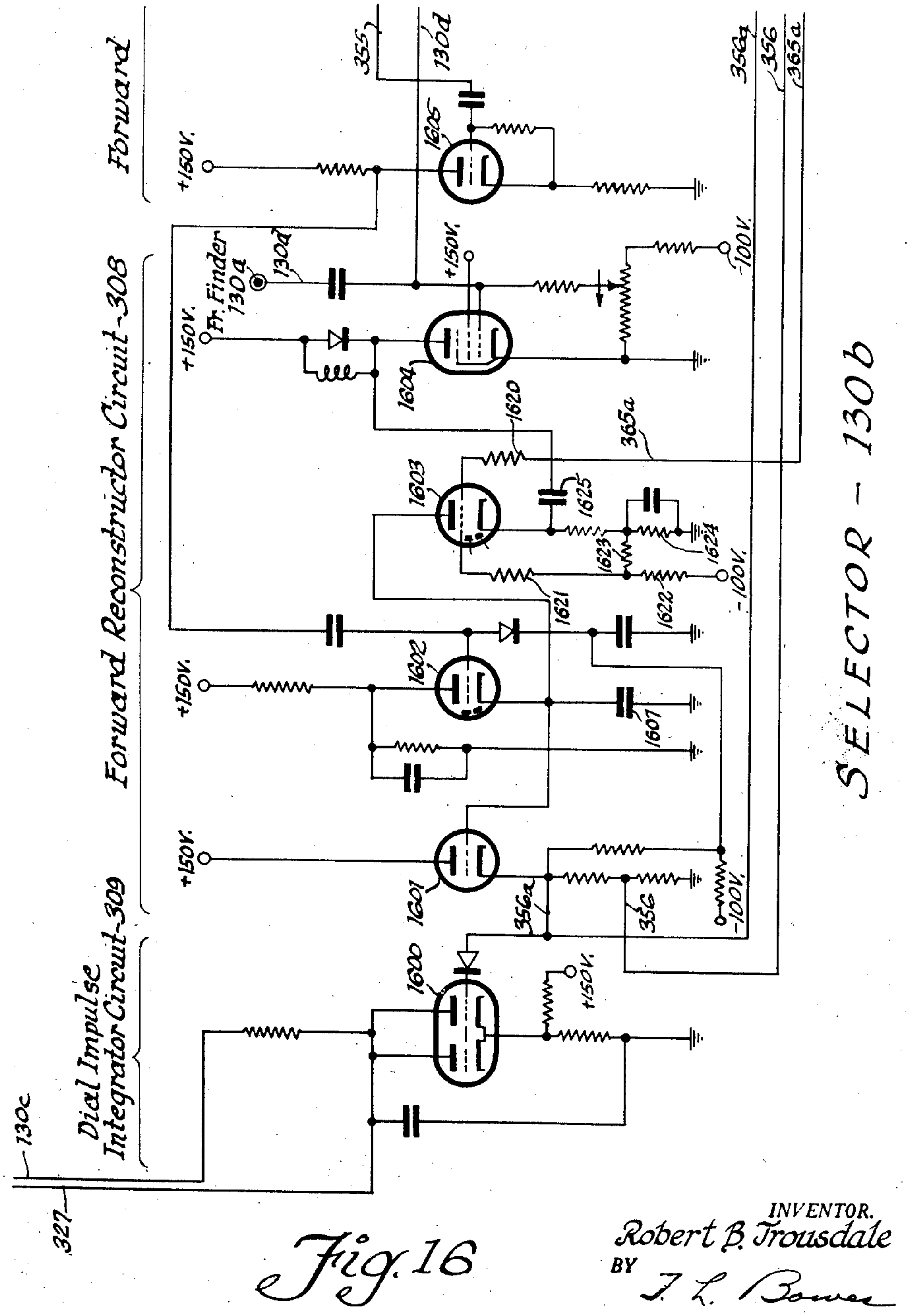
Figure 17:
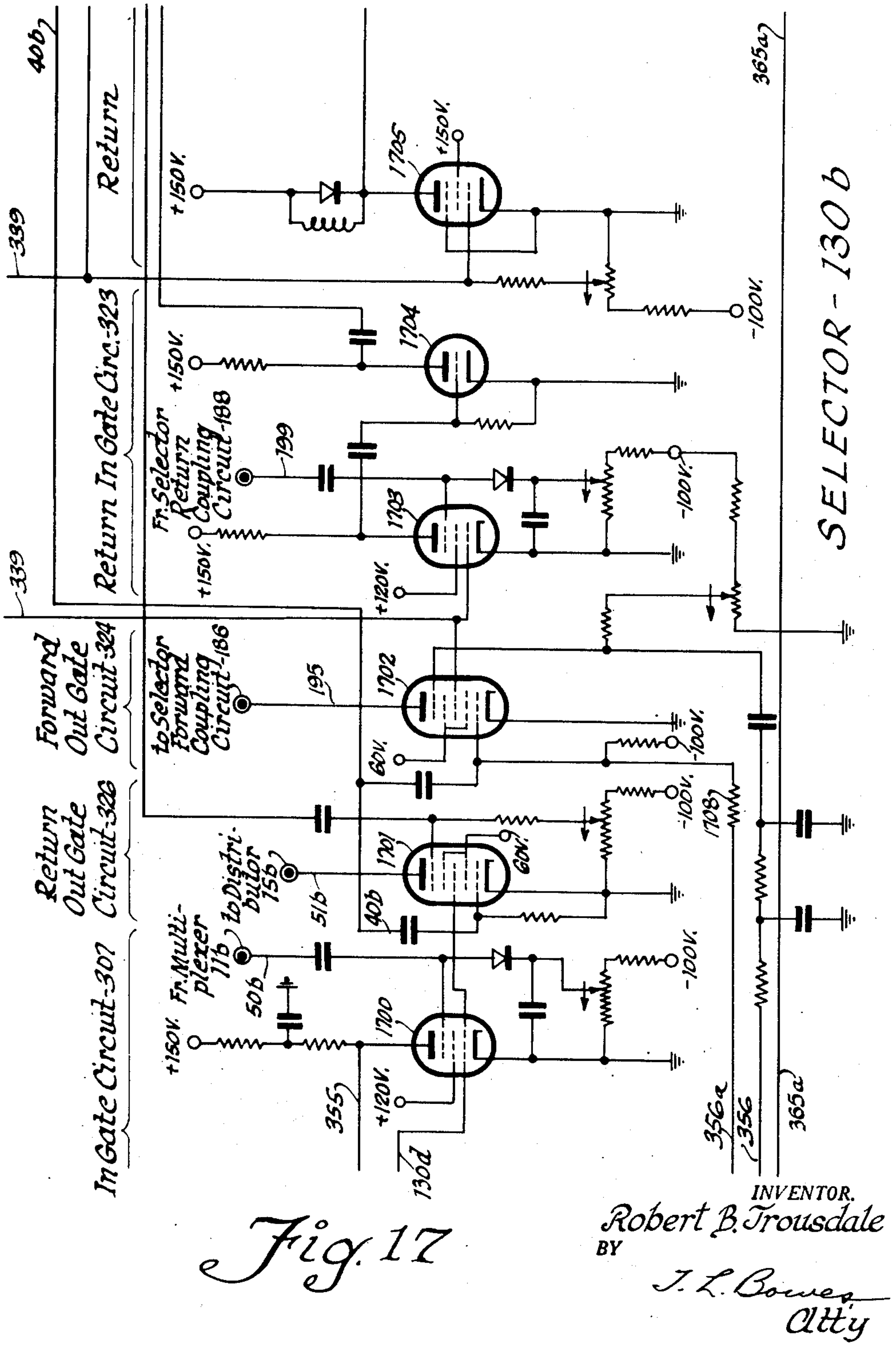
Figure 18:
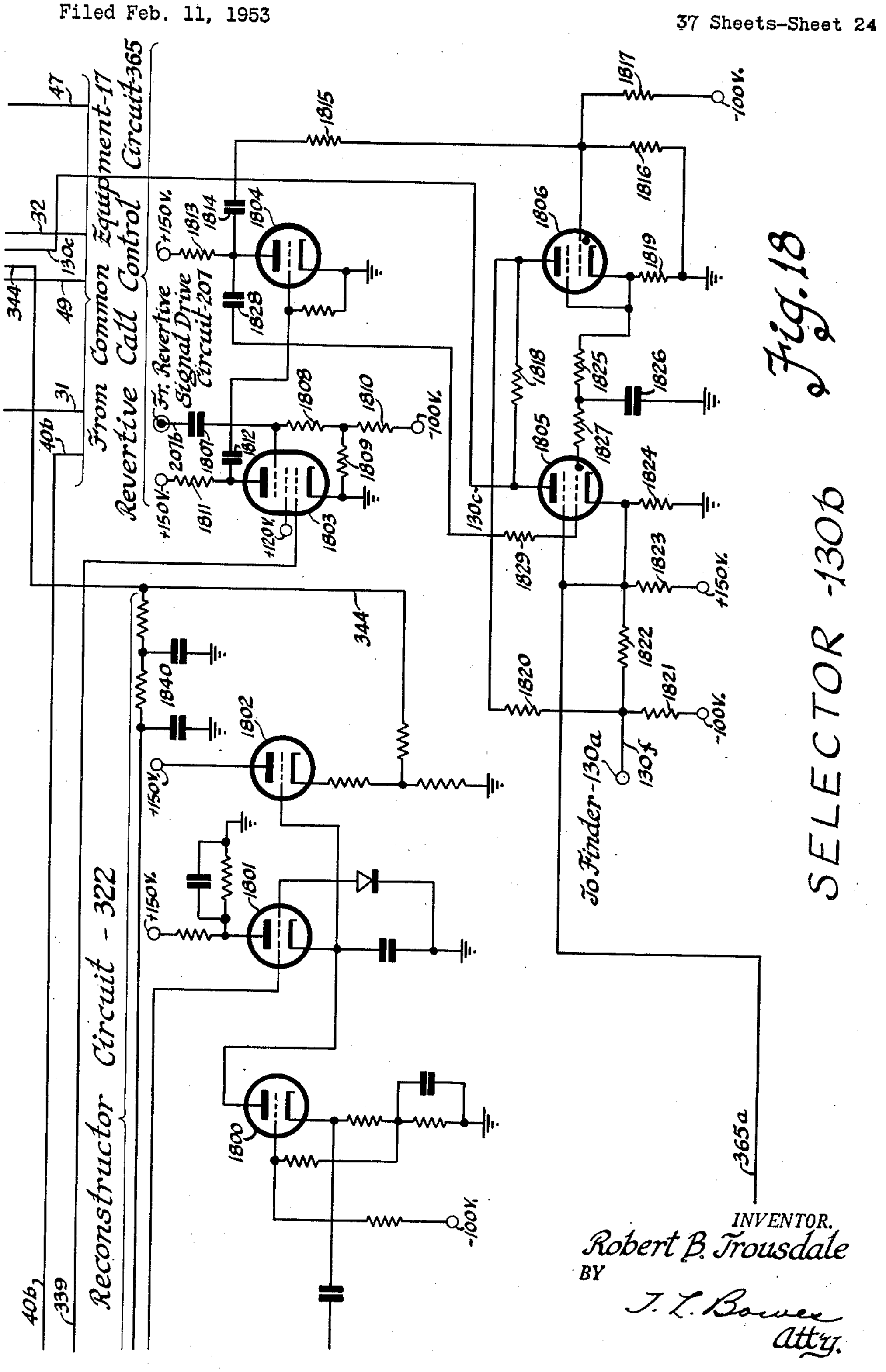

Referring now more particularly to Figs. 13 to 18, inclusive, wherein the detailed circuitry of the selector **130*b* is illustrated, it will be readily understood that details of the selector may best be understood in terms of the functional significance of the various circuit components thereof. In order to correlate these six figures with the schematic showing in Fig. 3B, it is pointed out that the hundreds sequence timing circuit 312 is shown in Fig. 13 as comprising a hundreds sequence timing tube 1300 and a hundreds sequence discharge tube 1301; the hundreds register inverter circuit 360 is shown in Fig. 13 as comprising an inverter tube 1302; the hundreds register pulser 310 is shown in Fig. 13 as comprising a single pulser tube 1303; the hundreds digit register 311 is shown in Fig. 13, 14 and 15, as comprising the primer tube 1310, and the ten cold cathode counting tubes 1311**, 1412 to 1417, inclusive, and 1518 to 1520, inclusive; the idle pulse gate circuit 395 is shown in Fig. 13 of the drawings as comprising an idle pulse gate tube 1306, an idle pulse inverter tube 1307 and an idle pulse follower tube 1308; the selector pulse and connector busy pulse forming circuit 317 is shown in Fig. 13 of the drawings as comprising the selector pulse mixer tube 1309, the selector pulse inverter tube 1304 and the connector busy pulse follower tube 1340; the connector coincidence tube circuit 397 is shown in Figs. 13, 14 and 15 of the drawings as comprising the ten coincidence tubes 1321, 1422 to 1427, inclusive, and 1528 to 1530, inclusive; the connector busy lock circuit 396 is shown in Fig. 15 of the drawings as comprising the single connector busy lock tube 1531, the busy tone gate circuit 325*a* is shown in Fig. 15 of the drawings as comprising the single busy tone gate tube 1532; the dial tone gate circuit 325 is shown in Fig. 15 of the drawings as comprising the single dial tone gate tube 1533; the dial impulse integrator circuit 309 is shown in Fig. 16 of the drawings as comprising the single dial impulse integrator tube 1600; the forward reconstructor circuit 308 is shown in Fig. 16 of the drawings as comprising a peaker tube 1604, a condenser charging tube 1602, a condenser discharging tube 1603 and a cathode follower output tube 1601; the forward in gate circuit 307 is shown in Figs. 16 and 17 as comprising the forward in gate tube 1700 and the forward in gate inverter tube 1605; the return out gate circuit 326 and the forward out gate circuit 324 are shown in Fig. 17 as respectively comprising the single gate tubes 1701 and 1702; the return in gate circuit 323 is shown in Fig. 17 of the drawings as comprising the return in gate tube 1703 and the return in gate inverter tube 1704; the return reconstructor circuit 322 is shown in Figs. 17 and 18 as comprising a peaker tube 1705, a condenser discharging tube 1800, a condenser charging tube 1801, and a cathode follower output tube 1802; and the revertive call control circuit 365 is shown in Fig. 18 as comprising a revertive call signal gate tube 1803, an inverter tube 1804, a first revertive call control tube 1806, and a second revertive call control tube 1805.

The manner in which the identified tubes of the selector are interconnected is pointed out more fully below with reference to the functions of the individual circuits. Although the identified tubes may be of any commercial type having the desired operating characteristics, it is pointed out that preferably the tubes 1302, 1602, 1603, 1800 and 1801 are commercial type 6AQ6 dual-diode triodes, the tubes 1306, 1701, and 1702 are of the RCA experimental type A–5727 triple grid tubes wherein each of the three grids have a substantial mutual conductance when operated at a potential which is negative with respect to the cathode potential of the tube, the tubes 1307, 1304, 1604 and 1705 are commercial type 6AU6 pentodes, the tubes 1309, 1700 and 1703 and 1803 are of the commercial type 6AS6 pentodes, and the tubes 1532, 1533, 1601, 1605, 1704, 1802 and 1804 are of the commercial type 6C4 triodes. Preferably, the gas filled thyratrons of the hot cathode type included in the selector 130*b*, namely, the tubes 1310, 1321, 1422 to 1427, inclusive, 1528 to 1530, inclusive, 1805 and 1806 are of the RCA commercial 5696 type. The code cathode gas tubes are preferably of the RCA commercial type 5823. This group includes the tubes 1300, 1301, 1303, 1311, 1412 to 1417, inclusive, 1518 to 1520, inclusive, and 1531.

In considering the operation of the selector 130*b*, it is pointed out that this selector is in general similar to the non-revertive call selector described in detail in the copending application Serial No. 326,213 identified above, and reference may be had to this copending application for a complete and detailed description of most of the circuits of the selector 130*b*. However, in accordance with the present invention, there is provided the revertive call control circuit 365 which functions in the manner described generally above to permit the selector to forward calls to a revertive call trunk and to respond to certain signals developed during the revertive call to hold itself operatively associated with the revertive calling line until the revertive call is completed. Specifically, the circuits 310, 311, 312, 360, 395, 396, 397, 317, 307, 308, 324, 323, 322, 326, 325, and 325*a* may all be substantially identical to the corresponding system components shown and described in detail in the above-identified copending application. However, it will be understood that certain of these circuits are interconnected in a particular manner to perform the necessary revertive call functions.

Considering now the revertive call control circuit 365, reference is again made to the above-described revertive call originating at the substation F and routed by way of the finder-selector link 130 and the revertive call trunk 121 to the called party line substation H associated with the same line No. 232. From the description pertaining to this call, it will be recalled that the finder-selector link 130 is seized by the calling line No. 232 and the finder 130*a* functions to impress a +B switch potential on the conductor 130*c* and also impresses finder gate pulses on the conductor 130*d*. After the dial tone has been received by the calling subscriber, the first digit is dialed, which in the case of revertive calls comprises a digit of "1," i. e., one impulse corresponding to the first hundreds level to which are assigned the revertive call trunks of the system, and this first digit of "1" has the effect of firing the first counting tube 1311 in the hundreds digit register 311 so that tens pulses appearing on the conductor 32*a* are gated through the rectifier 1311*a* and are transmitted by way of the conductor 332 to the selector and busy pulse forming circuit 317 and the idle pulse gate circuit 395. In the circuit 395, these tens pulses which appear in the first tens pulse interval 72*a* of each pulse frame, have the effect of causing the idle pulse gate tube 1306 to conduct for this first tens pulse interval so that those idle pulses appearing upon the conductor 197 during this tens pulse interval are gated through the tube 1306 and are inverted in the tube 1307 and coupled over the conductor 395*a* to the connector coincidence tube circuit 397. In the circuit 397, one of these idle pulses is selected at random.

In the illustrated embodiment, it is assumed that the revertive call trunk 121 is idle so that idle pulses appearing in the time position 62*a* are present on the conductor 197 and that these pulses are selected in the coincidence tube circuit 397. Under these assumptions, the first coincidence tube 1321 is fired due to coincidence of the idle pulses and units pulses impressed upon this tube, with the result that units pulses appearing on the conductor 31*a* are gated through the rectifier 1321*a* and are transmitted over the conductor 345 to the selector and connector busy pulse forming circuit 317. In the circuit 317, the tens pulses appearing on the conductor 332 and the units pulses appearing on the conductor 345 are combined so as to produce selector pulses on the output conductor 339 of the circuit 317 which appear in the time position 62*a* assigned to the selected revertive call trunk 121. These selector pulses are transmitted by way of the conductor 339 to the circuits 323, 324 and 322 and are also transmitted by way of the conductor 339 to the first control grid of the revertive call signal gate tube 1803.

It will thus be understood that after the first digit is dialed into the selector 130*b* and an idle revertive call trunk is selected in the manner described above, the revertive call signal gate tube 1803 is conditioned by the above-described selector pulses appearing on the conductor 339 to respond to pulses in the time position 62*a* assigned to the revertive call trunk 121. The suppressor grid of the tube 1803 is coupled to the conductor 207*b* through the condenser 1807, and this suppressor grid is connected through the resistor 1808 to a voltage divider network including the resistors 1809 and 1810 connected between the −100 volt supply and ground potential. Accordingly, the suppressor grid of the tube 1802 has impressed thereon any revertive call signals developed by the revertive call trunks of the system and impressed upon the conductor 207b by way of the revertive call signal coupling circuit 207. However, since the tube 1803 is also controlled by the selector pulses appearing upon the conductor 339, the gate tube 1803 does not pass these revertive call signal pulses unless they appear in the time position assigned to the revertive call trunk which is selected in the selector 130b, as indicated by the time position of the selector pulses on the conductor 339. Accordingly, in the illustrated call wherein the selector pulses appear in the time position 62a, the tube 1803 responds only to revertive call signal pulses which are developed in the revertive call selector 121b in the time position 62a assigned thereto. In effect, therefore, the revertive call signal channel constitutes a separate control channel by means of which the revertive call trunk may control the selectors of the system so as to permit setting up of revertive calls.

When the forward out gate circuit 324 in the selector 130b impresses selector forward signal pulses on the conductor 195 in response to the development of selector pulses in the circuit 317, these selector forward signal pulses have the effect of seizing the revertive call trunk 121 so that this trunk becomes operatively associated with the call forwarding selector 130b in the manner described above.

It will be observed that a direct current connection exists between the forward in gate circuit 307 and the forward out gate circuit 324 so that dial impulses dialed into the selector 130b after the first digit has been selected therein, may pass through this selector and be repeated from the forward out gate circuit 324 to the revertive call trunk operatively associated with this selector. This direct current connection is established because the dial impulses are reconstructed across the storage condenser 1607 in the cathode circuit of the condenser charging tube 1602 in the forward reconstructor circuit 308 and the voltage developed across the condenser 1607 is directly coupled by way of the cathode follower tube 1601, the conductor 365a and the resistor 1708 to the first control grid of the forward out gate tube 1702. Accordingly, when multiplexer pulse transmission over the conductor 50b terminates, and, may in fact be charged negatively with respect to ground, so that the potential on the first control grid of the forward out gate tube 1702 is made highly negative thereby preventing this tube from releasing selector forward signal pulses to the conductor 195. Accordingly, the multiplexer pulse interruptions corresponding to dial impulses are repeated through the selector and are transmitted to the revertive call acceptor 121a and the revertive call selector 121b. In this connection it will be understood that even though the revertive call trunk is seized by the call forwarding selector 130b in the manner described immediately above, the revertive call selector 121b does not immediately function to develop revertive call signal pulses constituting a first revertive call signal on the conductor 207a so that no pulses are immediately transmitted by way of this conductor to the suppressor grid of the revertive call control gate tube 1803 in the circuit 365.

After the second and third digits have been dialed at the calling substation and the numerical values of these digits have been registered in the calling and called party registers 511 and 515 in the revertive call selector 121b, the selector 121b functions to develop a first revertive call signal consisting of a short burst of pulses individually appearing in the time position 62a assigned to the revertive call trunk 121 and these revertive call signal pulses are transmitted by way of the conductor 207a, the coupling circuit 207 and the conductor 207b to the suppressor grid of the gate tube 1803 in the call forwarding selector 130b. Since the first control grid of the tube 1803 is controlled by selector pulses also appearing in the time position 62a, the revertive call signal pulses are transmitted through the tube 1803 and appear as negative pulses across the anode resistor 1811 of this tube. These negative revertive call signal pulses are coupled through the condenser 1812 to the control grid of the inverter tube 1804 wherein they are amplified and inverted and appear as positive pulses across the anode resistor 1813 of the tube 1804.

The positive revertive call signal pulses developed across the resistor 1813 are coupled through the condenser 1814 and the resistor 1815 to the first control grid of the first revertive call control tube 1806, and this control grid is connected to ground through the resistor 1816 and to the −100 volt supply through the resistor 1817. The anode of the tube 1806 is connected through the resistor 1818 to the +B switch conductor 130c so that operating anode potential is available for the tube 1806 as soon as the selector 130b becomes operatively associated with the calling line. Accordingly, when the revertive call signal pulses constituting the first revertive call signal are gated through the tube 1803 and are transmitted through the tube 1804 to the first control grid of the tube 1806, they have the effect of firing the tube 1806 so as to produce a relatively large positive potential across the cathode resistor 1819 of the tube 1806. At the same time, the anode potential of the tube 1806 is decreased by flow of current through the anode resistor 1818 thereof, and this potential decrease is coupled through the resistor 1820 to the conductor 130f. The conductor 130f is connected to the −100 volt supply through the resistor 1821 and is connected to the +150 volt supply through the series connected resistors 1822 and 1823. When the tube 1806 is not conducting so that the anode potential of this tube is approximately equal to 140 volts, positive, i. e., the potential on the conductor 130c, and with the tube 1805 non-conductive so that no tube current flows through the cathode resistor 1824 of this tube, the values of the resistors 1820, 1821, 1822, 1823, and 1824 are so chosen that the potential on the conductor 130f is substantially equal to ground potential. Under these conditions, the +B extinguishing tube in the +B switching circuit 301 in the finder 130a is conditioned to respond to multiplexer pulse termination by releasing the finder-selector link 130.

However, during a revertive call, it is necessary to hold the finder-selector link 130 operatively associated with the calling line even though a calling condition does not exist on this line, and the revertive call selector 121b releases the above-described first revertive call signal after the last digit has been dialed at the calling substation to condition the finder-selector link 130 to remain operatively associated with the calling line while the calling party hangs up to permit completion of the revertive call. More particularly, when the first revertive call signal is received by the circuit 365, the first revertive call control tube 1806 is fired so that a potential decrease is produced at the anode of this tube. The values of the resistors 1820, 1821, 1822, 1823 and 1824 are so chosen that with a potential drop across the resistor 1818 and no tube current flow through the cathode resistor 1824 of the tube 1805, the potential on the conductor 130f is made highly negative so as to prevent the +B extinguishing tube in the +B switching circuit 301 in the finder 130a from firing when multiplexer pulse transmission ceases in response to the calling party's hanging up. As a result, the finder-selector link 130 is held operatively associated with the calling line during periods when a negative potential is developed on the conductor 130f in the manner described above.

The positive potential developed across the cathode resistor 1819 of the tube 1806 when this tube is fired in response to the first revertive call signal, is integrated in the network including the resistor 1825 and the condenser 1826 and is transmitted through the resistor 1827 to the first control grid of the tube 1805. The revertive call signal pulses developed across the resistor 1813 are also coupled through the condenser 1828 and the resistor 1829 to the first control grid of the tube 1805. However, the described integration network 1825, 1826, provides a sufficient time delay that the positive potential developed across the cathode resistor 1819 is not impressed upon the control grid of the tube 1805 until after the first revertive call signal pulses have ceased, i. e., until after the first revertive call signal has been terminated. Accordingly, only the tube 1806 is fired in response to the first revertive call signal received by the circuit 365 and the tube 1805 is conditioned by means of the above-described positive potential derived from the cathode resistor 1819 of the tube 1806 to be fired in response to a second revertive call signal transmitted to the control grid of the tube 1805. It will therefore be understood that the burst of revertive call signal pulses constituting the revertive call signal lasts for a relatively short period of time so that these pulses have disappeared before the potential on the control grid on the tube 1805 is enabled in response to firing of the tube 1806, so that the same revertive call signal does not fire both of the tubes 1805 and 1806.

When the revertive call is answered, it is desirable to release the associated revertive call trunk while at the same time conditioning the finder-selector link 130 to release at the end of the revertive call so that all linkage associated with the calling line may be released. Accordingly, the revertive call trunk is arranged to impress a second revertive call signal, consisting again of a short burst of pulses appearing in the time position **62*a* assigned to the trunk 121, on the conductor 207*a*, and these second revertive call signal pulses are again gated through the tube 1803 and repeated through the tube 1804 and are impressed upon the first control grid of the second revertive call control tube 1805 in the circuit 365. As a result, the tube 1805 is fired since the control grid potential of this tube is enabled after the tube 1806 has been fired in response to the first revertive call signal. When the tube 1805 is fired, a large positive potential is developed across the cathode resistor 1824 of the tube 1805. When both of the tubes 1805 and 1806 are conducting so that the cathode of the tube 1805 is at a high positive potential and the anode of the tube 1806 is at a relatively low positive potential, the values of the resistors 1820, 1821, 1822, 1823 and 1824 are so chosen that the potential on the conductor 130*f* is returned to ground potential so as to condition the finder 130*a* to release the link 130 in response to termination of the revertive call. In effect, therefore, the circuit 365 responds to the second revertive call signal impressed upon this circuit by removing the revertive call hold potential from the conductor 130*f* thereby permitting the finder-selector link to be released in a normal manner at the end of the revertive call. In this connection, it will be understood that the revertive call trunk is arranged to impress a second revertive call signal on the revertive call control circuit 365** at the end of a ringing timeout interval even though the revertive call is not answered, so that the linkage associated with the revertive calling line is released in the manner described above even though the revertive call is abandoned.

In order to release the revertive call trunk 121 after the revertive call is answered, it is necessary to terminate selector forward signal pulse transmission by the selector **130*b* in the time position 62*a* since the revertive call trunk 121 remains operatively associated with the call forwarding selector 130*b* as long as such selector forward signal pulse transmission continues. Accordingly, there is provided means responsive to the second revertive call signal developed by the revertive call trunk 121 for terminating selector forward signal pulse transmission to the revertive call trunk 121 even though the revertive call has been answered and a calling condition again exists on the revertive calling line. More particularly, when the second revertive call signal is impressed upon the circuit 365, and the tube 1805 in this circuit is fired in the manner described above, the positive potential developed across the cathode resistor 1824 of the tube 1805 is transmitted by way of the conductor 365*a* and the resistor 1620 to the control grid of the condenser discharging tube 1603 in the forward reconstructor circuit 308, this control grid also being connected by way of the resistor 1621 to a point of negative potential on the voltage divided network 1622, 1623 and 1624 connected between the −100 volt supply and ground potential. Accordingly, when the tube 1805 in the circuit 365 is fired, the control grid potential on the condenser discharging tube 1603 is increased positively so as to render the tube 1603** conductive.

When the tube 1603 is rendered conductive, the storage condenser 1607 is discharged through the tube 1603 so that the potential across the condenser 1607 approaches the cathode potential of the tube 1603 which potential is negative with respect to ground. Accordingly, the potential across the condenser 1607 is made highly negative and this potential drop is coupled through the cathode follower tube 1601, and is transmitted over the conductor **356*a* and through the resistor 1708 to the first control grid of the forward out gate tube 1702, so that the tube 1702 is held well beyond cutoff and selector forward signal pulse transmission in the time position 62*a* is terminated. In this connection, it will be understood that the resistors 1620 and 1621 are so chosen that when the tube 1805 is non-conducting, the control grid potential on the tube 1603 is such as to permit this tube to respond to the negative condenser discharge pulses developed at the anode of the peaker tube 1604 and coupled through the condenser 1625 to the cathode of the tube 1603. Accordingly, the operation of the forward reconstructor circuit 308 in reconstructing and storing signal information during non-revertive calls is completely compatible with the operation of the circuit 308** in effecting termination of selector forward signal pulse transmission in the manner described above, when the revertive call is answered.

When selector forward signal pulse transmission is terminated in the manner described above in response to the second revertive call signal impressed upon the circuit 365, the revertive call acceptor **121*a* responds to termination of selector forward signal pulse transmission by removing operating anode potential from the conductor 121*c* so that the revertive call trunk 121** is released and is free to set up another revertive call.

When a revertive call hold potential is developed on the conductor **130*f* by the circuit 365 in the manner described above, and this revertive call hold potential is impressed upon the suppressor grid of the +B extinguishing tube in the +B switching circuit 301 in the finder 130*a*, this +B extinguishing tube is prevented from firing even though multiplexer pulse transmission is terminated, so that the finder 130*a* remains operatively associated with the calling line even though a calling condition does not exist on this line. However, the potential on the conductor 130*e* increases positively during periods when no multiplexer pulses are impressed upon the circuit 301, and, if the potential on the conductor 130*e* increases positively by a sufficient amount, the +B extinguishing tube in the circuit 301 may be fired even though a revertive call hold potential is present on the conductor 130*f*. Accordingly, there is provided means for preventing the potential on the conductor 130*e* from increasing positively with respect to ground potential. More particularly, the conductor 130*e* is connected to the anode 1302*a* of one of the diode sections of the duo-diode triode 1302, the cathode of this diode being connected to ground potential. Therefore, when the potential on the conductor 130*e* reaches ground potential, the diode section 1302*a* conducts and prevents the potential on this conductor from increasing positively with respect to ground. In this connection, it will be understood that a suitable diode may be provided in the finder 130a itself so that the separate conductor 130e between the finder 130a and the selector 130b would not be required. It will also be understood that in my above-identified application Serial No. 336,316 the potential increase on the conductor 130e is employed as a revertive call ring start signal for the associated 100-line connector disclosed in that application, whereas in the present system of more than 100 lines, the potential increase on the conductor 130e is not so employed, this function being provided by the acceptor 121a associated with the revertive call selector 121b**.

As described generally above, the selected party line ringing signals are modulated on a ringing carrier wave, preferably of 4900 cycles, which is itself superimposed upon the selector return pulses which are transmitted from the revertive call trunk 121 back to the call forwarding selector 130b. These ringing carrier waves must be transmitted back through the call forwarding selector 130b to the line circuit 16b associated with the calling line without substantial attenuation so as to provide for proper operation of the line ringing facilities in the line circuit 16b. Accordingly, the transmission channel through the selector 130b in the revertive trunk-to-calling line direction should be capable of transmitting a 4900 cycle signal. Therefore, the low pass filter 1840 which is connected between the return reconstructor circuit 322 and the return out gate circuit 326 must be capable of passing the ringing carrier wave so that transmission of the selected party line ringing signals will not be attenuated in the selector 130b.

*Revertive call selector 121b*

Figure 5B:
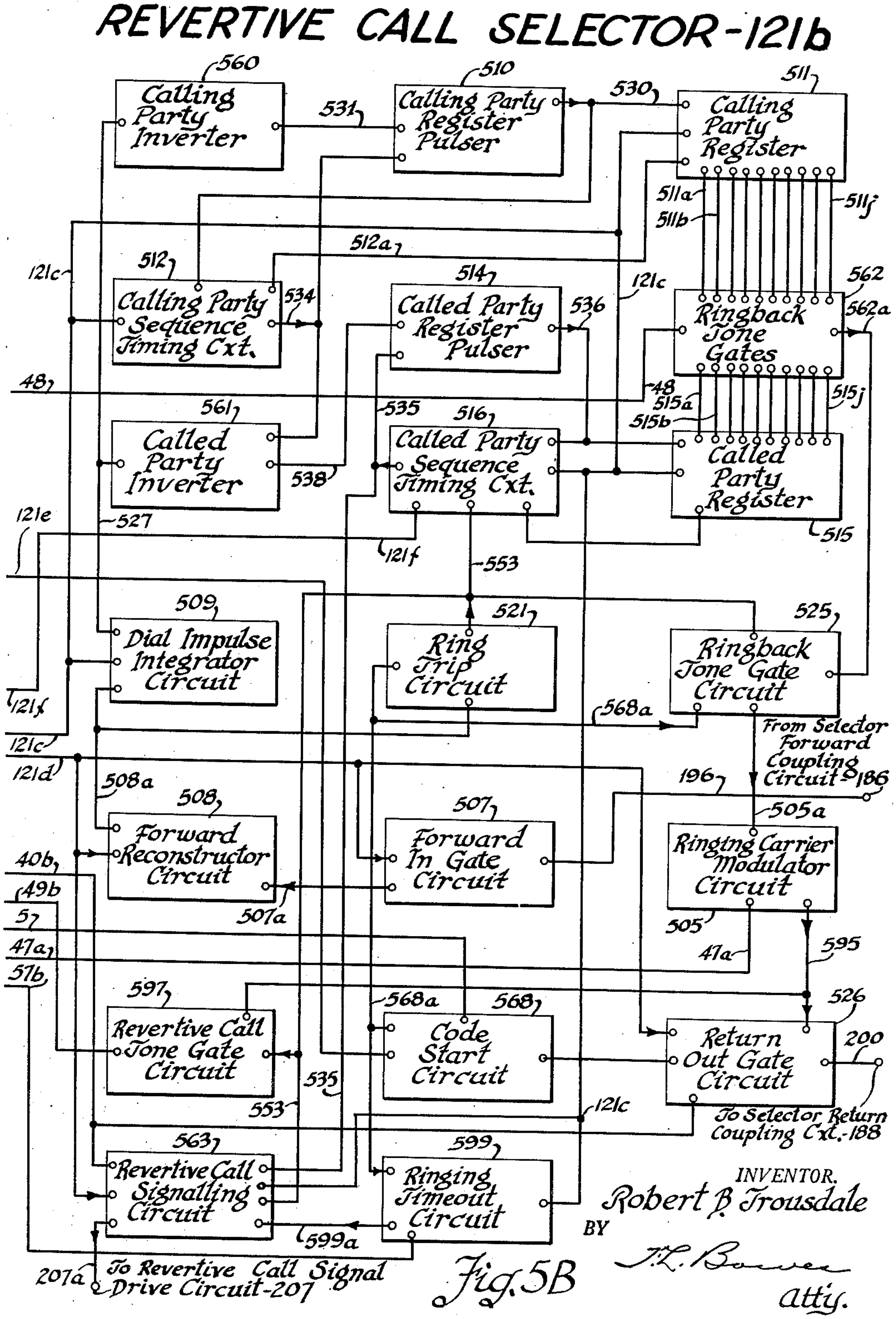
Figure 6:
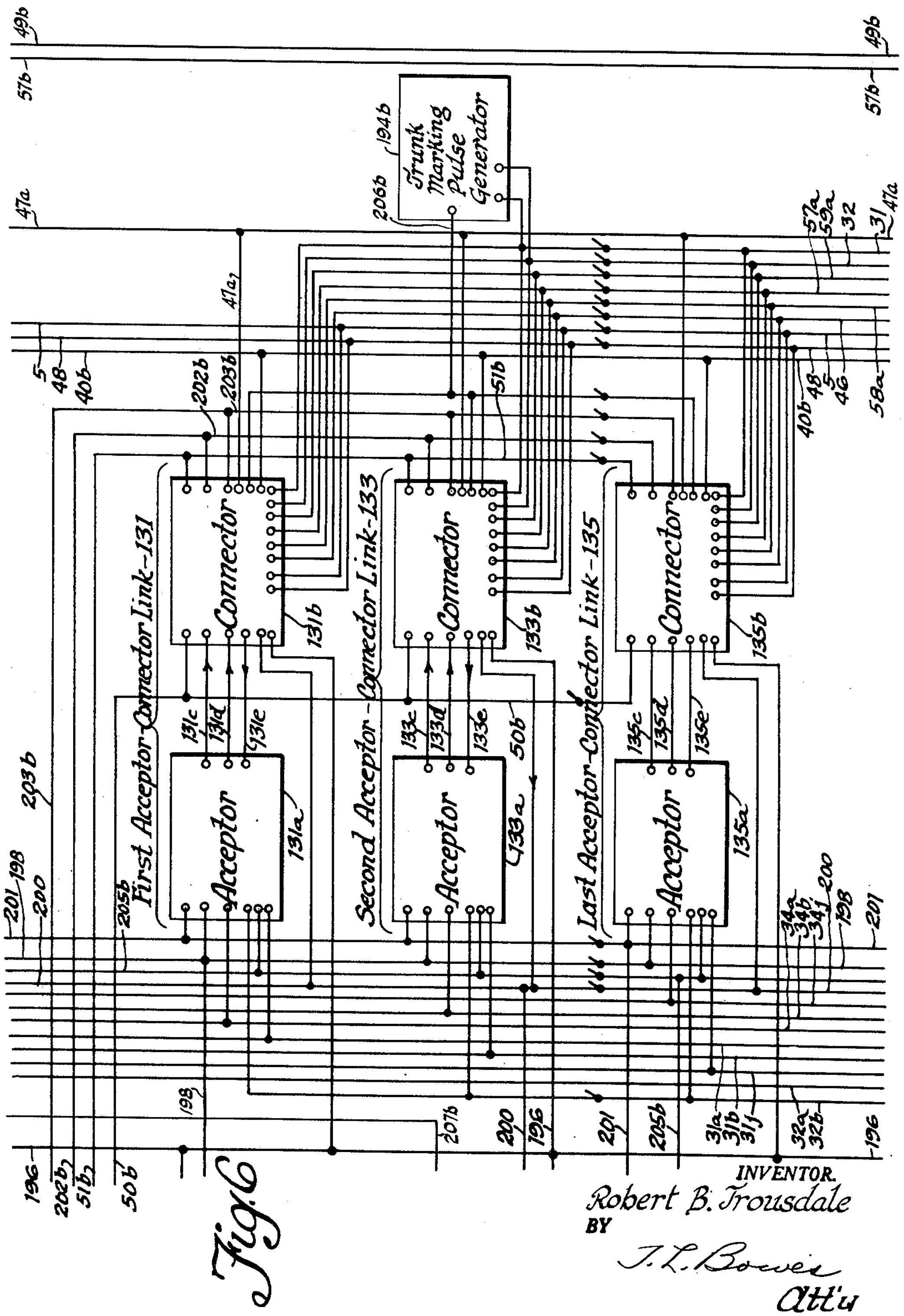
Figure 7:
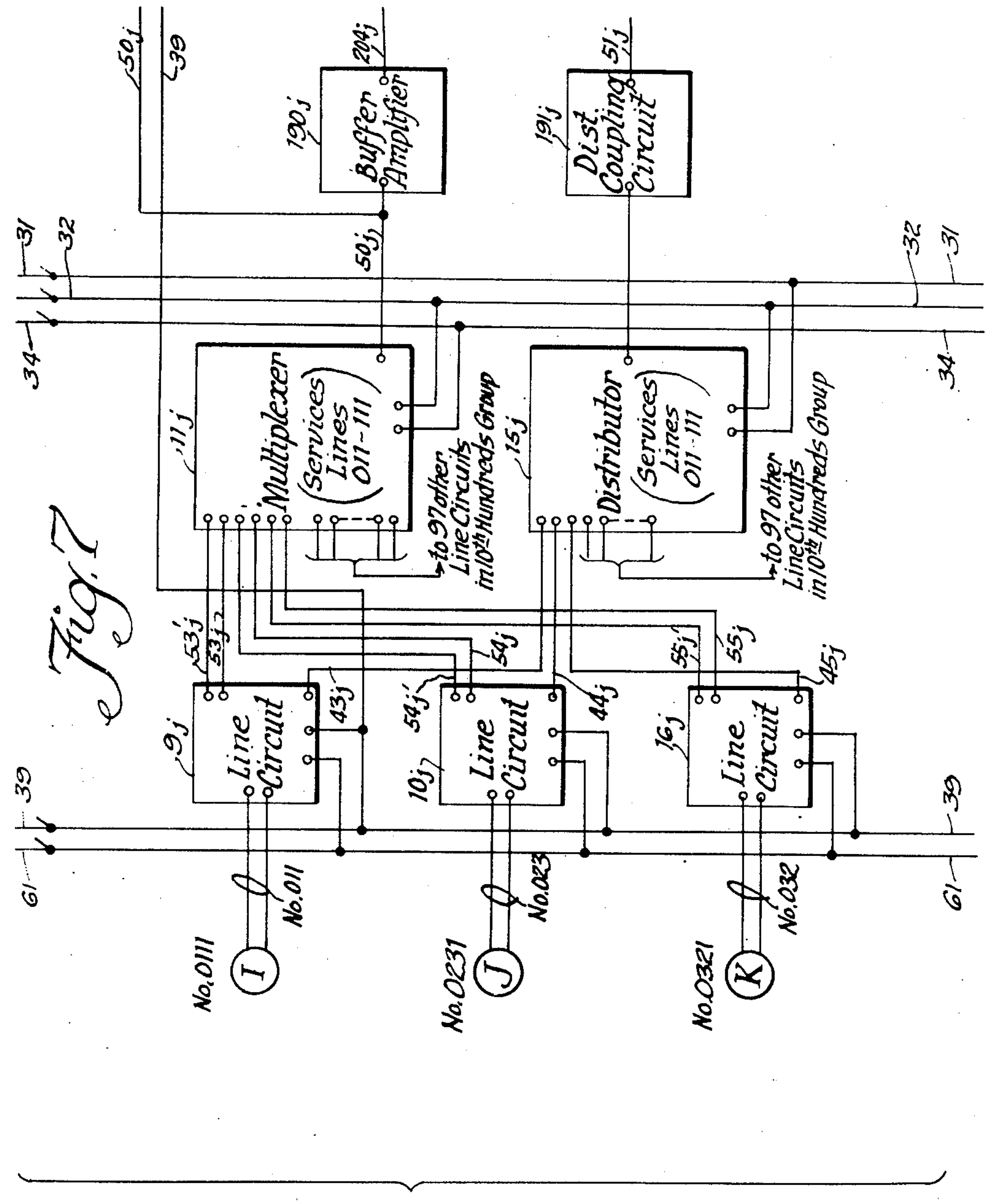
Figure 8:
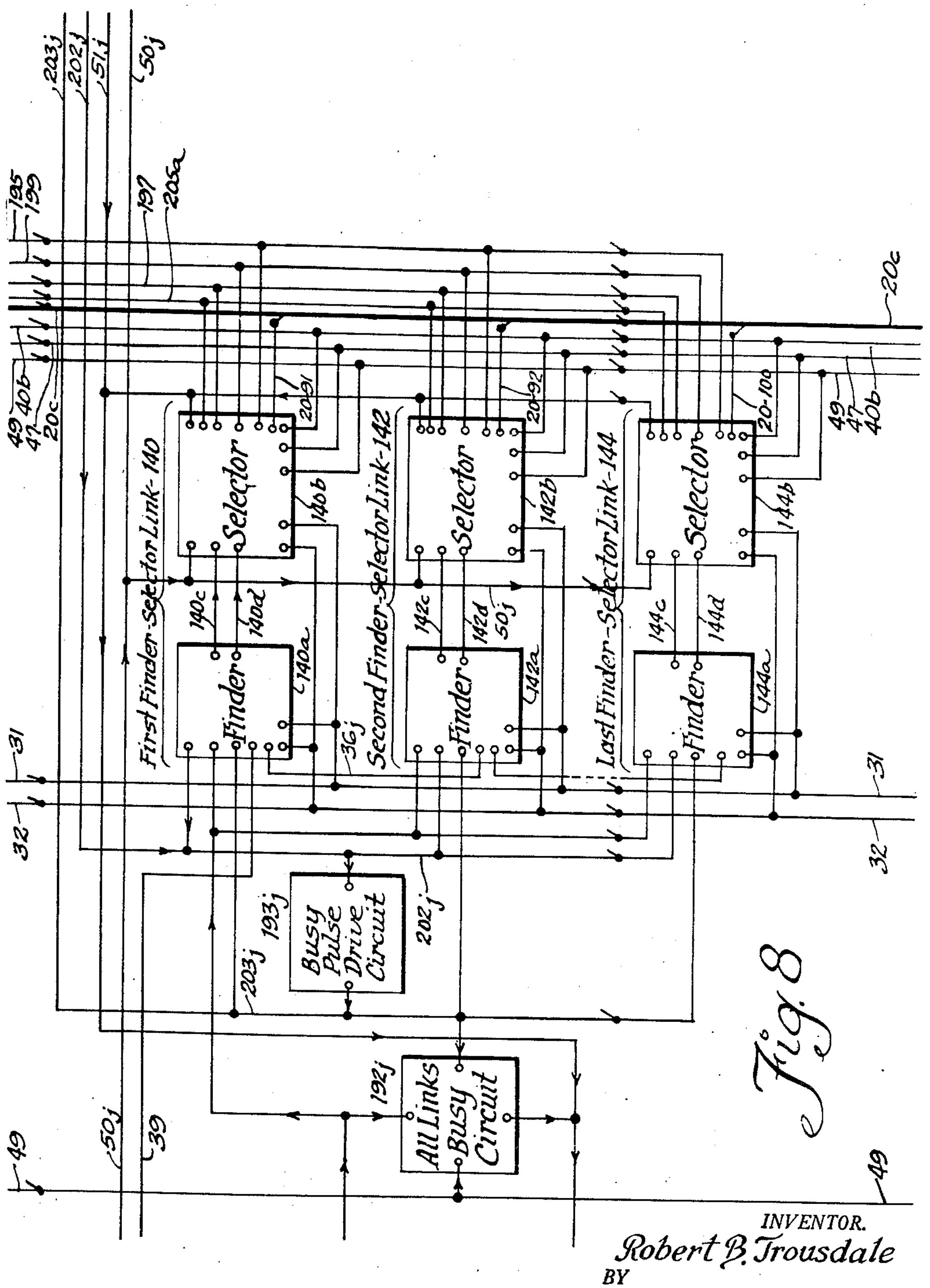
Figure 9:
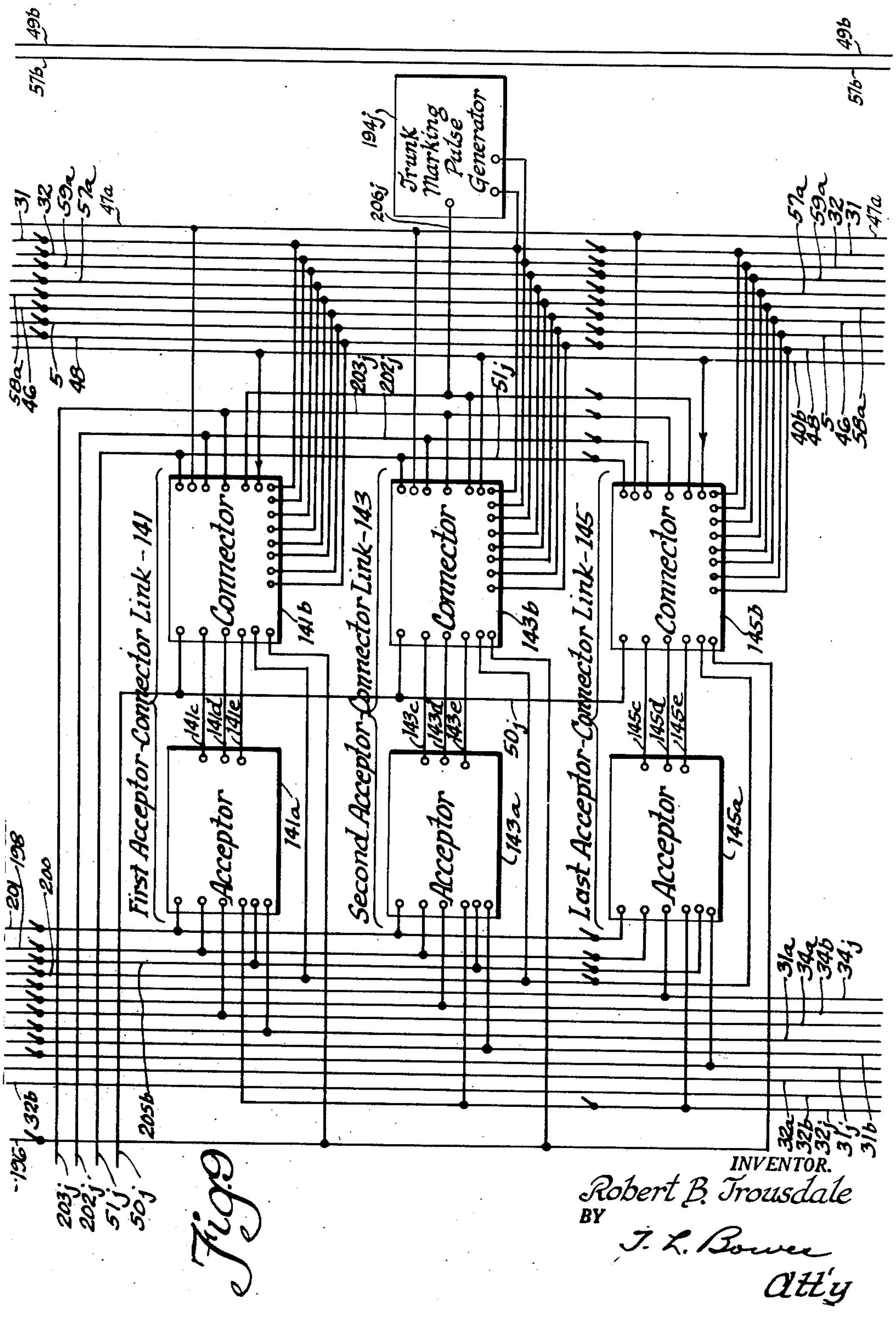
Figure 10:
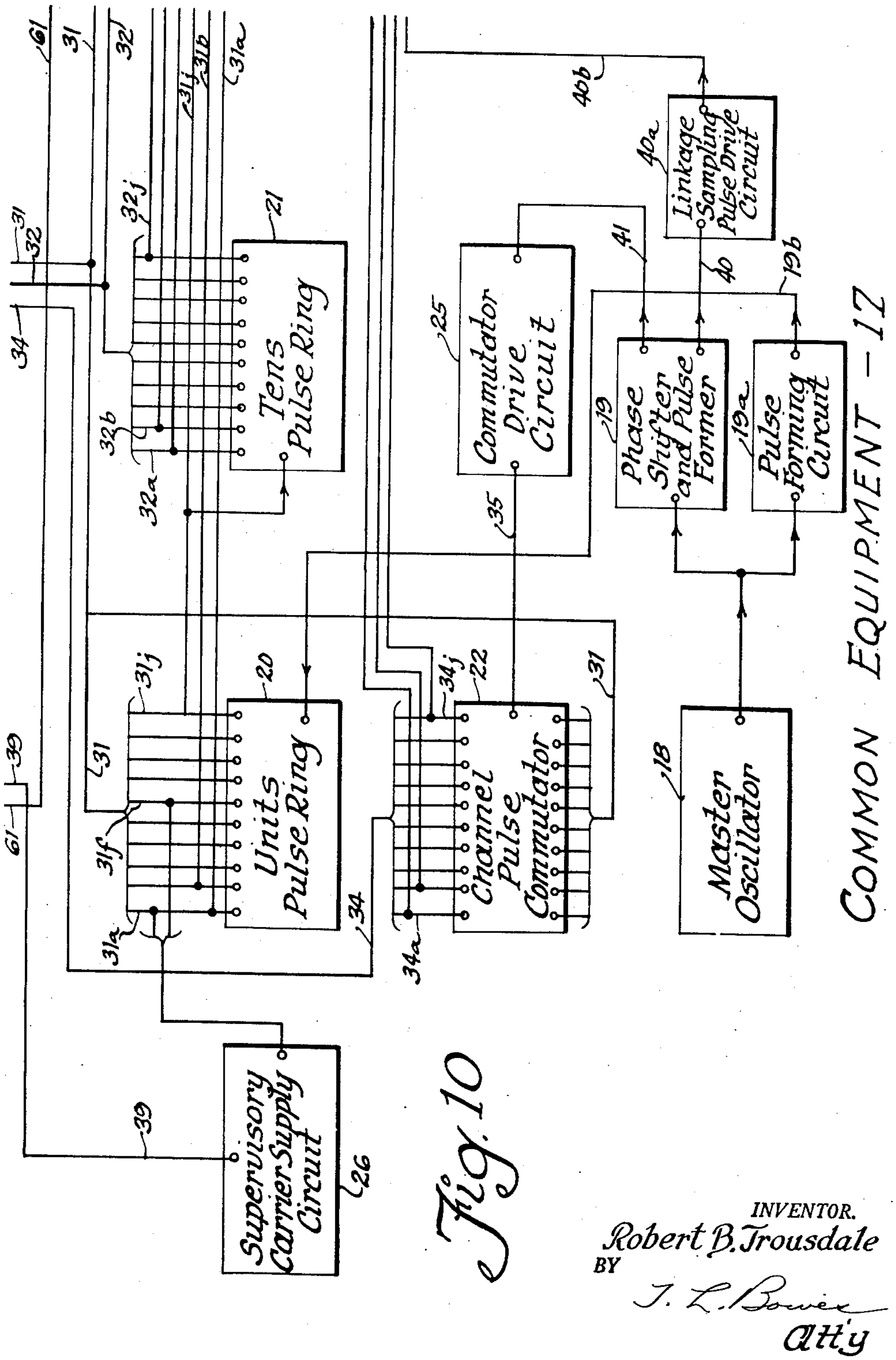
Figure 11:
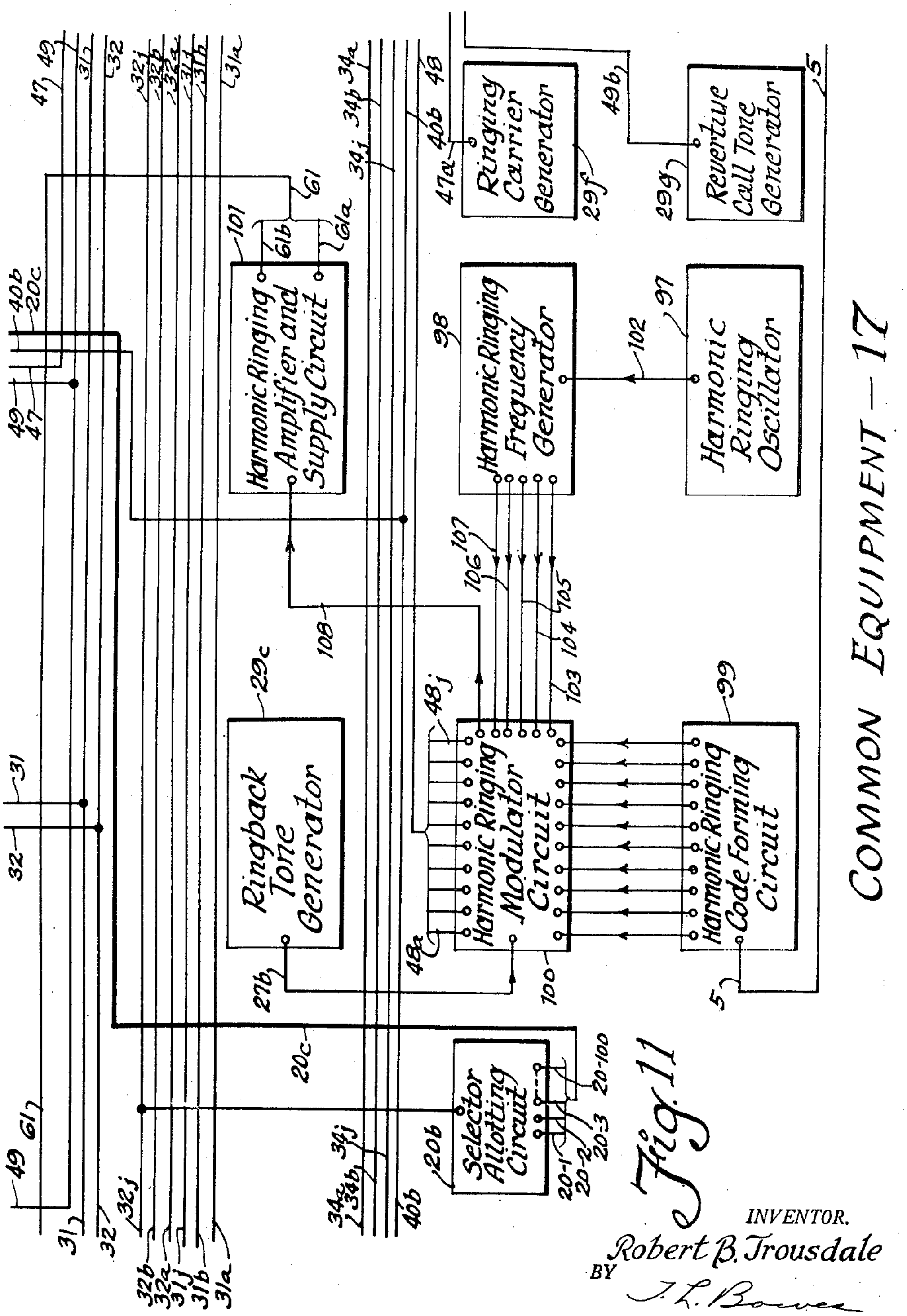
Figure 12:
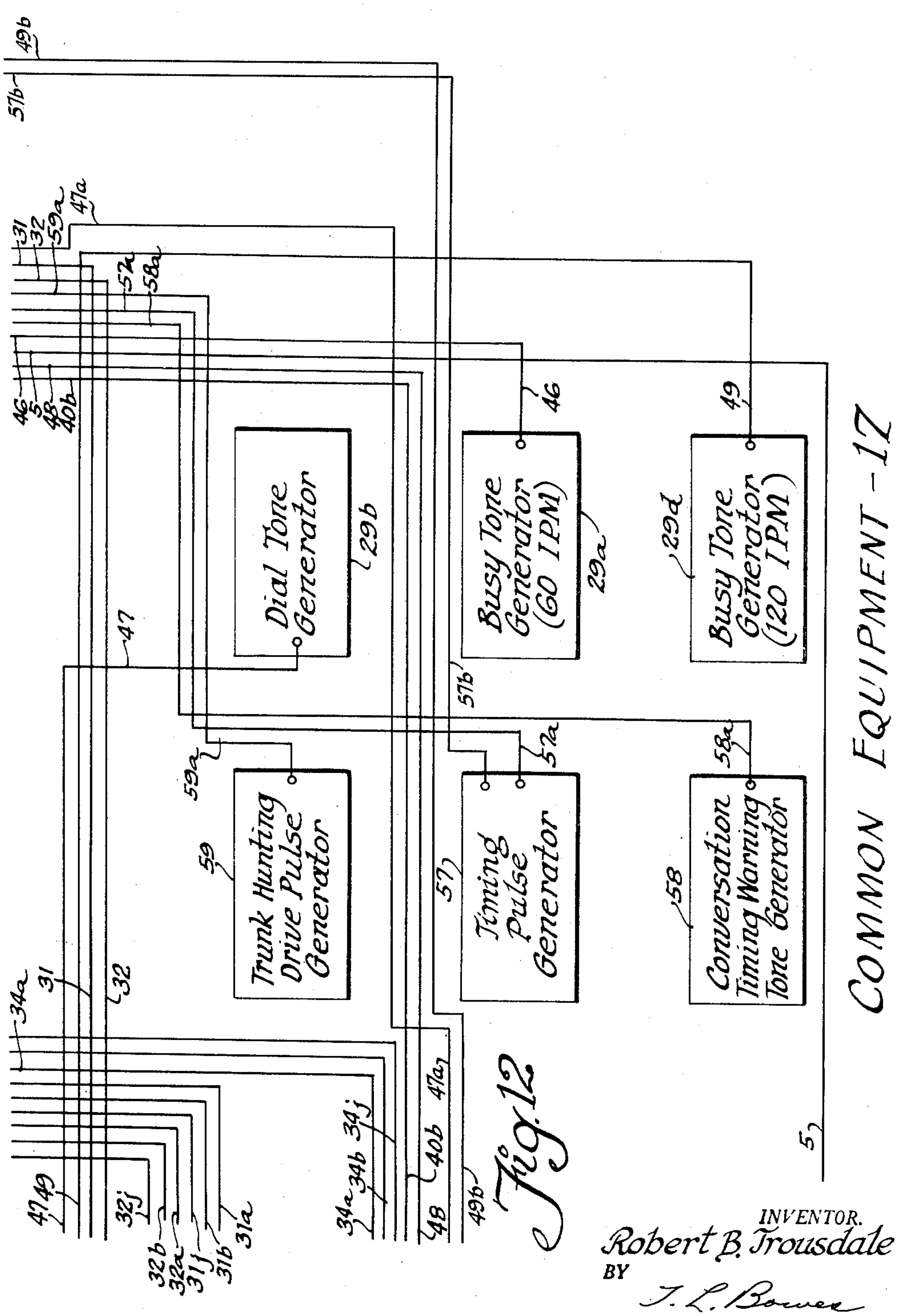

As previously explained in connection with Fig. 5B of the drawings, the revertive call selector 121b generally comprises a dial impulse integrator circuit 509, a calling party inverter circuit 560, a calling party register pulser 510, a calling party register 511, a calling party sequence timing circuit 512, a called party inverter 561, a called party register pulser 514, a called party register 515, a called party sequence timing circuit 516, ringback tone gates 562, a ring trip circuit 521, a ringback tone gate circuit 525, a forward in gate circuit 507, a forward reconstructor circuit 508, a return out gate circuit 526, a ringing carrier modulator circuit 505, a code start circuit 568, a revertive call tone gate circuit 597, a ringing timeout circuit 599, and a revertive call signaling circuit 563.

Figure 33:
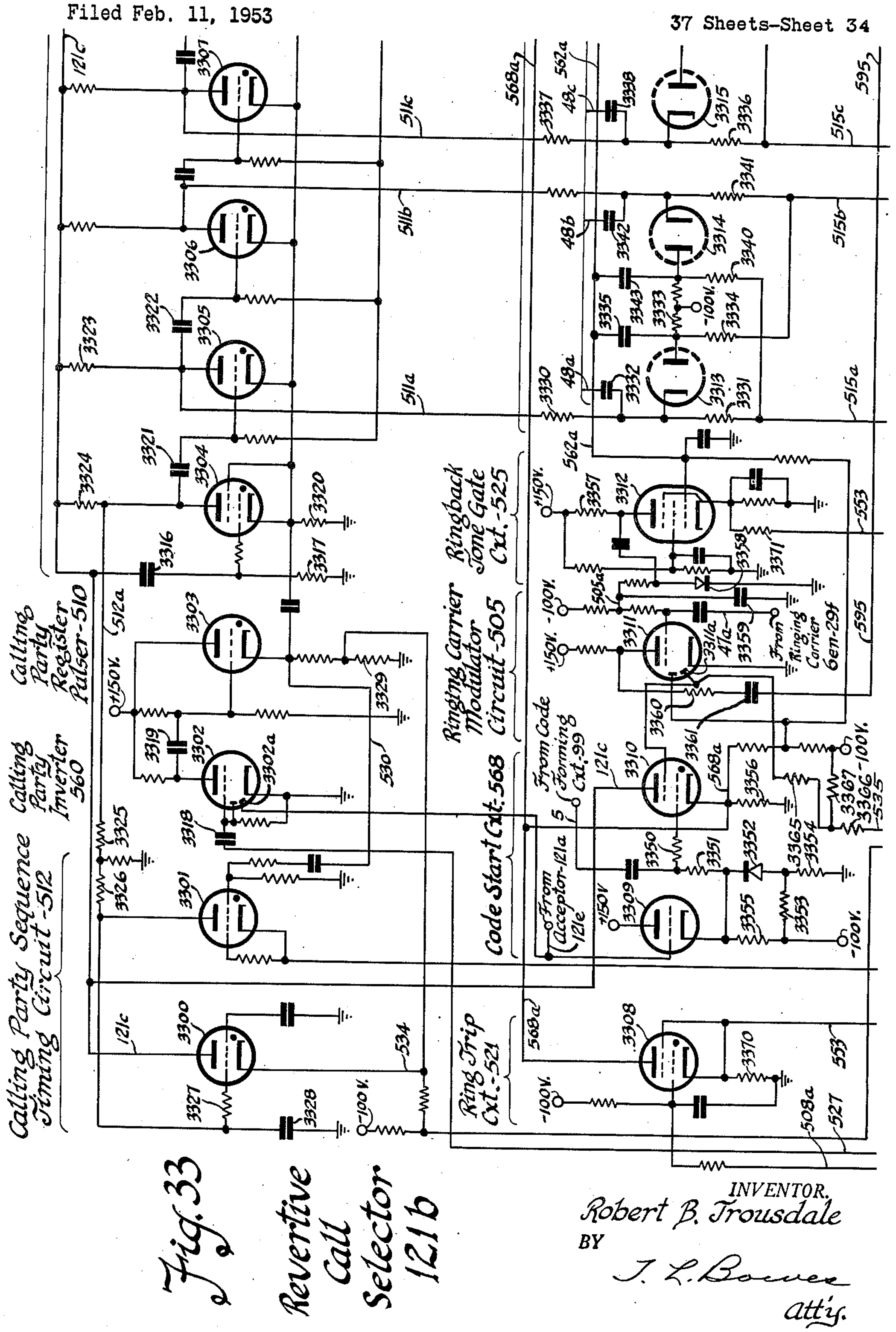
Figure 34:
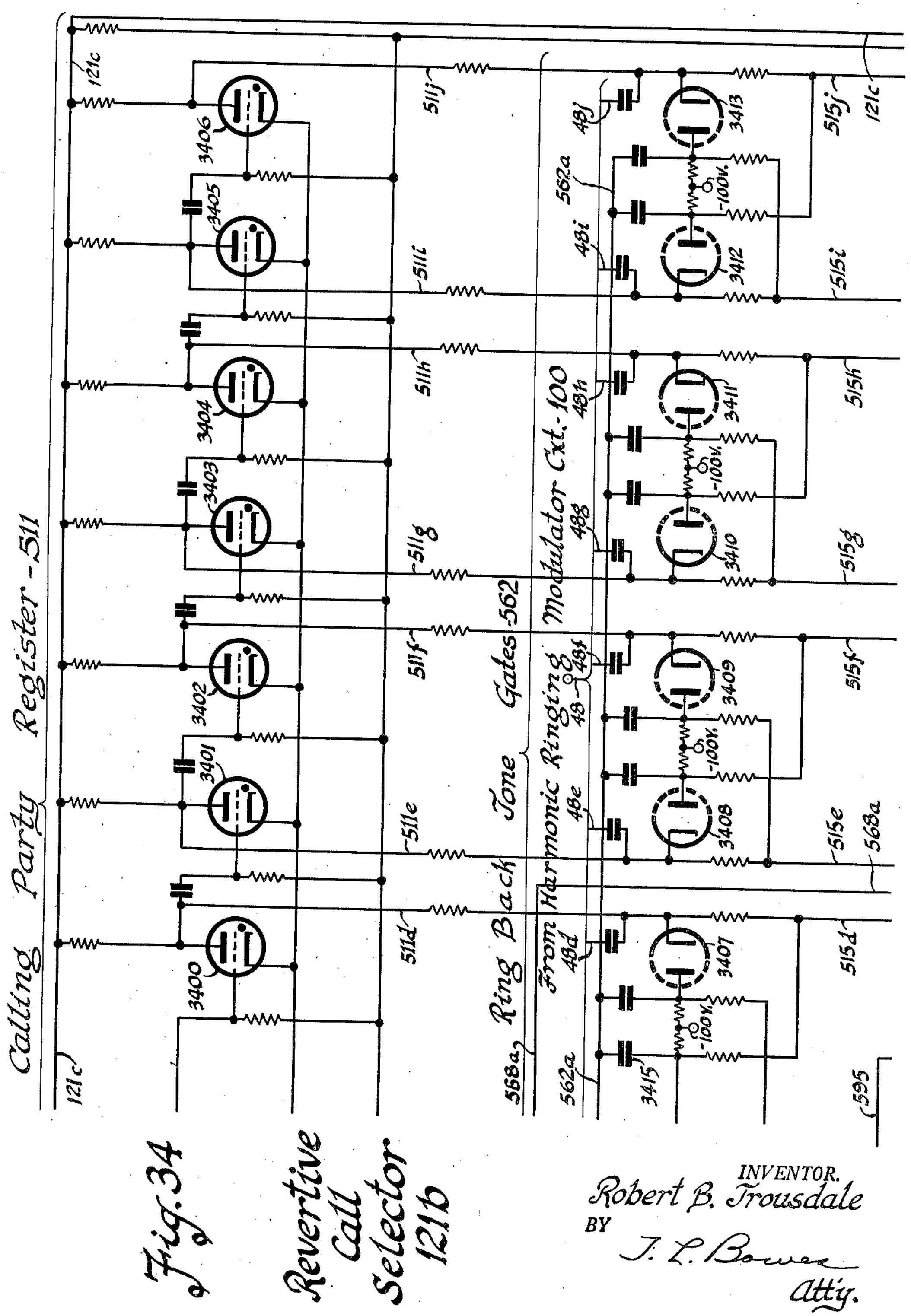
Figure 35:
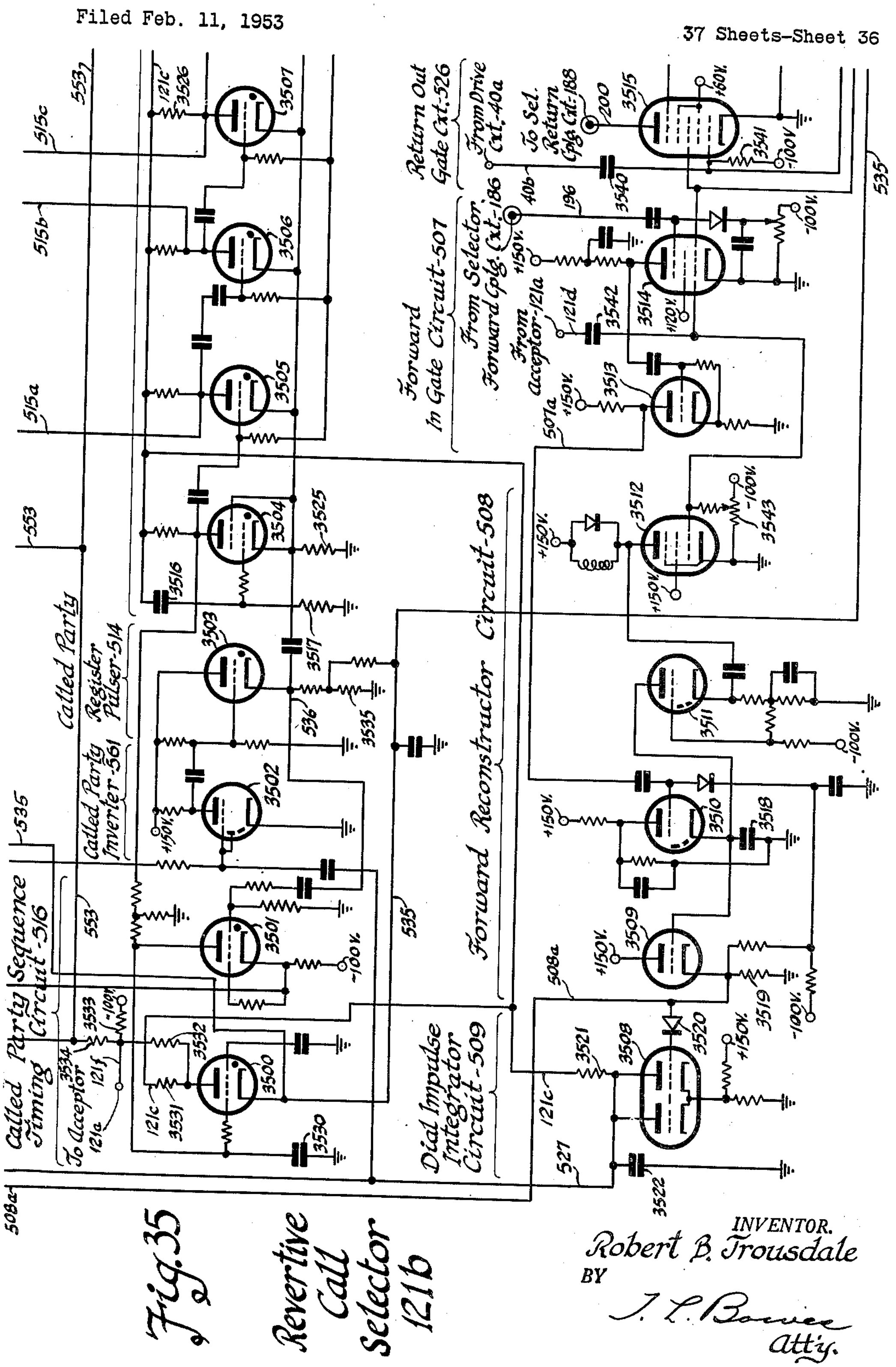
Figure 36:
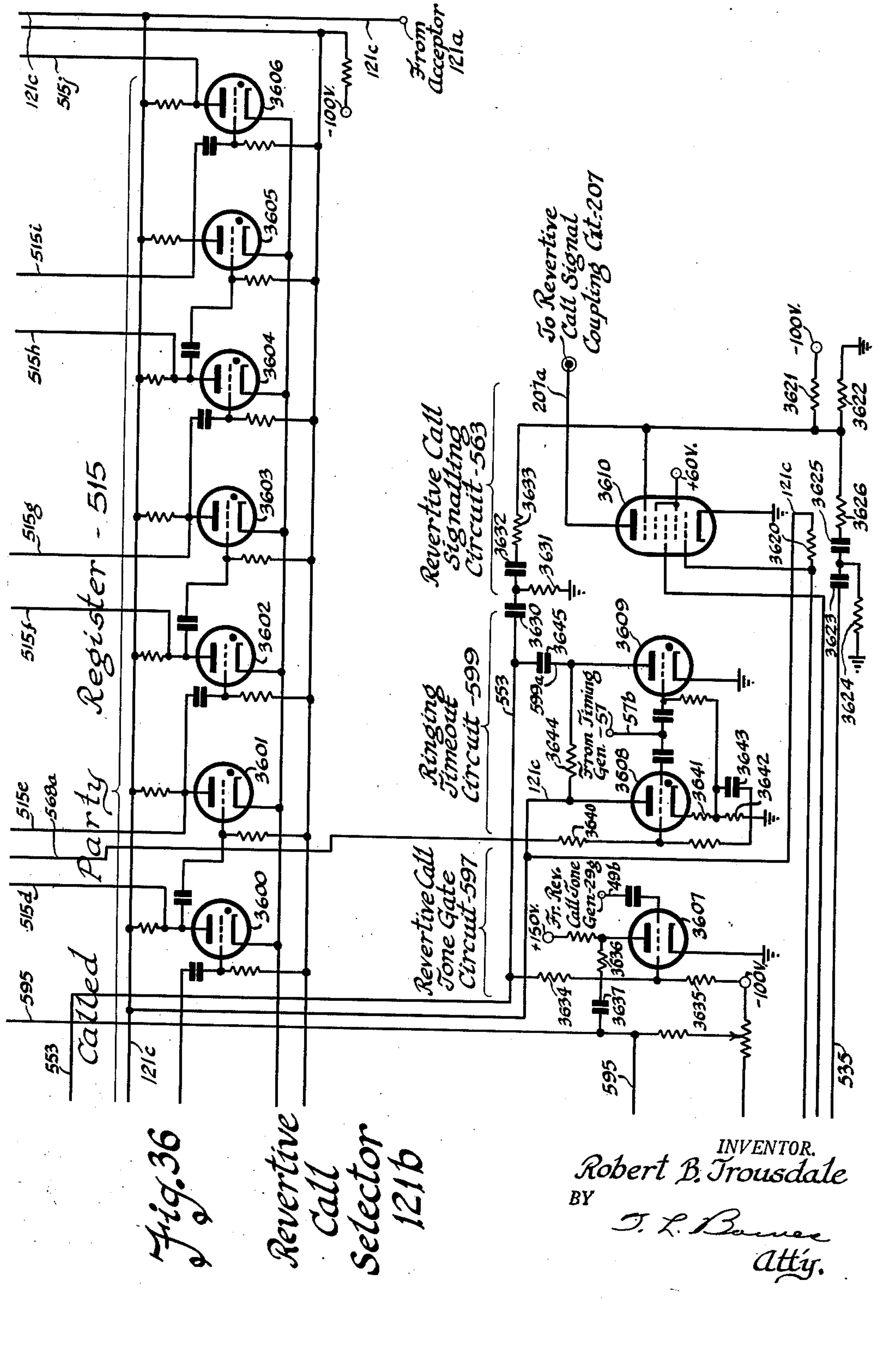

Referring now more particularly to Figs. 33 to 36 inclusive of the drawings, wherein the detailed circuitry of the revertive call selector 121b is illustrated, it will be readily understood that the details of this selector may best be understood in terms of the functional significance of the various circuit components thereof. In order to correlate these four figures with the schematic showing of Fig. 5B, it may be pointed out that the calling party sequence timing circuit 512 is shown in Fig. 33 of the drawings as comprising a calling party sequence timing tube 3300 and a calling party sequence discharge tube 3301; the calling party inverter circuit 560 is shown in Fig. 33 as comprising the single inverter tube 3302; the calling party register pulser 510 is shown in Fig. 33 as comprising the single pulser tube 3303; the calling party register 511 is shown in Figs. 33 and 34 as comprising the primer tube 3304 and the ten counting tubes 3305 to 3307, inclusive, and 3400 to 3406, inclusive; the ring trip circuit 521 is shown in Fig. 33 as comprising the ring trip tube 3308; the code start circuit 568 is shown in Fig. 33 as comprising the code start tube 3310 and the code start control tube 3309; the ringing carrier modulator circuit 505 is shown in Fig. 33 as comprising the modulator tube 3311; the ringback tone gate circuit 525 is shown in Fig. 33 as comprising the ringback tone gate tube 3312; the ringback tone gates 562 are shown in Figs. 33 and 34 as comprising the ten diode gate tubes 3313 to 3315, inclusive, and 3407 to 3413, inclusive; the called party sequence timing circuit 516 is shown in Fig. 35 as comprising the called party sequence timing tube 3500 and the called party sequence discharge tube 3501; the called party inverter circuit 561 is shown in Fig. 35 as comprising the inverter tube 3502; the called party register pulser 514 is shown in Fig. 35 as comprising the pulser tube 3503; the called party register 515 is shown in Figs. 35 and 36 as comprising the primer tube 3504 and the ten counting tubes 3505 to 3507, inclusive, and 3600 to 3606, inclusive; the dial impulse integrator circuit 509 is shown in Fig. 35 as comprising the dial impulse integrator tube 3508; the forward reconstructor circuit 508 is shown in Fig. 33 as comprising a peaker tube 3512, a condenser discharging tube 3511, a condenser charging tube 3510, and a cathode follower output tube 3509; the forward in gate circuit 507 is shown in Fig. 35 as comprising the forward in gate tube 3514 and the inverter tube 3513; the return out gate circuit 526 is shown in Fig. 35 as comprising the return out gate tube 3515; the revertive call tone gate circuit 597 is shown in Fig. 36 as comprising the revertive call tone gate tube 3607; the ringing timeout circuit 599 is shown in Fig. 36 as comprising the primer tube 3608 and the control tube 3609; and the revertive call signaling circuit 563 is shown in Fig. 36 as comprising the revertive call signal gate tube 3610.

The manner in which the identified tubes of the revertive call selector 121b are interconnected is pointed out more fully below with reference to the function of the individual circuits. Although the identified tubes may be of any commercial type having the desired operating characteristics, it is pointed out that preferably the tubes 3302, 3311, 3502, 3510, and 3511 are duo-diode triodes of the commercial type 6AQ6, the tubes 3312 and 3512 are pentodes of the commercial type 6AU6; the tubes 3515 and 3610 are of the RCA experimental type A–5727 triple grid tubes wherein each of the three control grids has a substantial mutual conductance when operated at a potential which is negative with respect to the cathode potential of the tube; the tubes 3309, 3509, 3513 and 3607 are triodes of the commercial type 6C4, the tube 3408 is a double triode of the commercial type 6J6, the tube 3514 is a pentode of the commercial type 6AS6 and the tubes 3313 to 3315, inclusive, and 3407 to 3412, inclusive, are duo-diodes of the commercial type 6AL5. Preferably the gas-filled thyratrons of the hot cathode type included in the selector 121b, namely, the tubes 3304, 3308, 3310 and 3504, are of the RCA commercial type 5696. The cold cathode gas tubes preferably are of the RCA commercial type 5823. This group includes the tubes 3300, 3301, 3303, 3305 to 3307, inclusive, 3400 to 3406, inclusive, 3500, 3501, 3503, 3505, to 3507, inclusive, 3600 to 3606, inclusive, 3608 and 3609.

In considering the operation of the revertive call selector 121b, reference is again made to the above-described revertive call originating at the substation F and routed by way of the finder-selector link 130 and the revertive call trunk 121 to the called party line substation H associated with the same line No. 232. From the description pertaining to this call, it will be recalled that when the finder-selector link 130 has been seized, and a first digit has been dialed into the selector, the selector 130b releases selector forward signal pulses in the time position 62a assigned to the selected idle revertive call trunk 121. The revertive call acceptor 121a responds to pulses appearing in this time position by developing operating anode potential on the conductor 121c so that the revertive call selector 121b becomes operatively associated with the call forwarding selector 130b. When operating potential is impressed upon the conductor 121c, this potential is impressed upon the series connected condenser 3316 and resistor 3317, in the calling party register 511, so that the primer tube 3304 in the register 511 is fired and this register is reset and the ten impulse counting tubes of this register are prevented from prematurely firing in response to extraneous signals. At the same time, the postive potential on the conductor **121*c* is impressed upon the condenser 3516 and the resistor 3517 connected between the conductor 121*c* and ground so that a large positive potential is developed across the resistor 3517 and the primer tube 3504 in the called party register 515 is also fired so that the ten impulse counting tubes in the register 515** are extinguished and are prevented from firing prematurely.

Referring now more particularly to the forward in gate circuit 507, it is pointed out that this circuit is substantially identical to the forward in gate circuit 307 in the selector **130*b* and reference may be had to the copending application Serial No. 326,213 identified above, for a description of a circuit of this type. However, it is pointed out that the forward in gate circuit 507 in the revertive call selector 121*b* is arranged to respond to acceptor gate pulses appearing on the conductor 131*d* and selector forward signal pulses appearing on the conductor 196, whereas the forward in gate circuit 307 in the selector 130*b* is arranged to respond to finder gate pulses on the conductor 130*d* and multiplexer pulses appearing on the conductor 50*b*. The circuit 507 is controlled in accordance with the acceptor gate pulses appearing on the conductor 121*d* to gate those selector forward signal pulses which occur in the same time position, i. e., the time position 62*a* assigned to the revertive call trunk 121, and these gated selector forward signal pulses are impressed upon the forward reconstructor circuit 508 by way of the conductor 507*a***.

In considering the operating details of the forward reconstructor circuit 508, it is pointed out that this circuit is substantially identical to the forward reconstructor circuit 308 in the selector **130*b* and reference may be had to the copending application Serial No. 326,213 identified above, for a detailed description of a circuit of this type. However, for purposes of the present invention, it may be stated that the circuit 508 functions to store the amplitude of the signal modulated selector forward signal pulses for an interval equal to the duration of one pulse frame. In general, this is accomplished by charging the condenser 3518 through the charging tube 3510 in accordance with the amplitude of each selector forward signal pulse repeated by the forward in gate circuit 507 and discharging this condenser through the tube 1511 just prior to each such condenser charging operation. It will also be understood that since the revertive call trunk is employed only to set up a revertive call connection and is not employed for speech transmission, the only signals reconstructed by the circuit 508 are the dial impulses constituting the second and third digits which are dialed into the revertive call selector 121*b*** to effect selection of the calling and called party line ringing signals in a manner to be described in more detail hereinafter.

The signals reconstructed by the circuit 508 are reproduced across the cathode resistor 3519 of the tube 3509 and are transmitted by way of the conductor 508 to the dial impulse integrator circuit 509 and the ring trip circuit 521. During dialing at the calling substation F, the flow of multiplexer pulses to the finder selector link 130 is interrupted during the break periods of each dial impulse. In the selector **130*b* these interruptions are faithfully reproduced as corresponding interruptions in the transmission of selector forward signal pulses to the revertive call selector 121*b*. As a result, the make and break periods of the dial impulses dialed at the calling substation F are reproduced across the cathode resistor 3519 in the circuit 508**.

Considering now the operation of the dial impulse integrator circuit 509, it is pointed out that this circuit is substantially identical to the dial impulse integrator circuit 309 in the selector **130*b* and reference may be had to the copending application Serial No. 326,213 identified above, for a detailed description of this circuit. For the purposes of the present invention, it may be stated that this circuit performs the function of discriminating between dial impulses and all other signals developed on the output conductor 508*a* of the circuit 508, this discrimination being accomplished on a width basis, i. e., only impulses which have substantially the width of dial impulses cause a large output in the circuit 509. More specifically, the dial impulses developed on the conductor 508*a* are coupled through the rectifier 3520 to the control grids of the two triodes comprising the tube 3508 so that there is produced across the anode resistor 3521 of these tubes and the charging condenser 3522 a series of saw-tooth voltage pulses individually corresponding to each dial impulse developed at the calling substation F during the second and third digits. The control pulses developed across the condenser 3522 during the second or calling party digit dialed at the calling substation F are transmitted over the conductor 527 and through the condenser 3318 to the control grid of the inverter tube 3302 wherein they are amplified and inverted and are coupled through the condenser 3319 to the control grid of the pulser tube 3303 and the calling party register pulser 510**.

In considering the operation of the calling party register pulser 510, it is pointed out that this circuit is substantially identical to the hundreds register pulser 310 in the selector **130*b* and reference may be had to the copending application Serial No. 326,213 identified above, for a complete and detailed description of a circuit of this type. However, for the purposes of the present invention, it may be stated that the cold cathode gas tube 3303 is operated as a triggered relaxation oscillator and develops uniform amplitude register drive impulses across the common cathode resistor 3320 in the calling party register 511** in response to each dial impulse of the second, or calling party digit dialed at the calling substation F.

In considering the operation of the calling party register 511, it is pointed out that this circuit is similar in many respects to the party digit register 465 in the connector **141*b* and reference may be had to my copending application Serial No. 301,215, identified above, for a detailed description of a similar register arrangement. However, the calling party register 511 of the present invention is employed merely to develop a control potential on one of the output conductors 511*a*, 511*b* to 511*j*, inclusive, of the register 511, and this control potential is employed in the ringback tone gates 562 to effect selection of the desired party line ringing signal. More specifically, the register 511 is driven by the large positive register drive pulses produced across the resistor 3320 by the pulser tube 3303 to register the numerical value of the first digit dialed into the revertive call selector 121*b*, i. e., the second or calling party digit dialed at the calling substation F. Thus, the first register drive pulse appearing across the resistor 3320 extinguishes the primer tube 3304 and after this register drive pulse has disappeared the negative potential produced in the anode circuit of the tube 3304 is coupled through the condenser 3321 to the control grid of the first impulse counting tube 3305 so that this tube is fired. The second register drive pulse developed across the resistor 3320 has the effect of extinguishing the tube 3305 and after this register drive pulse has disappeared, the negative pulse developed at the anode of the tube 3305 is coupled through the condenser 3322 to the second impulse counting tube 3306 so as to fire this tube. In the particular call under consideration, the calling substation F has assigned thereto the code #1 party line ringing signal and this party line ringing signal is identified by a calling party digit having the numerical value of "1." Accordingly, the first impulse counting tube 3305 in the register 511 is ionized in response to the first dial impulse constituting the calling party digit and will remain conductive as long as the revertive call trunk remains operatively associated with the calling line No. 232. All other counting tubes of the register 511 remain non-conductive for the same time interval. When the tube 3305 is fired, the anode potential of this tube is reduced due to the voltage drop through the anode resistor 3323 of the tube 3305 so that the potential on the conductor 511***a* is reduced from the +B switch potential appearing on the conductor 121*c* to a smaller positive value when the tube 3305 remains conductive at the end of the calling party digit. However, the potentials on all of the other output conductors 511*b* to 511*j*, inclusive, of the register 511 remain at the relatively high positive value of the potential on the conductor 121*c*.

Referring now more particularly to the calling party sequence timing circuit 512, it is pointed out that this circuit is substantially identical to the hundreds sequence timing circuit 312 in the selector 130*b* and reference may be had to the copending application Serial No. 326,213 identified above, for a detailed description of a timing circuit of this character. However, for the purposes of the present invention, it may be stated that when operating potential is impressed upon the conductor 121*c* and the primer tube 3304 in the register 511 is fired in the manner described above, a potential drop is produced through the anode resistor 3324 of this tube and this potential decrease is transmitted over the conductor 512*a* and through the series connected resistors 3325, 3326, and 3327 to the control grid of the timing tube 3300 to prevent the tube 3300 from firing. However, the condenser 3328 starts to charge positively through the resistor 3326 as soon as the priming tube 3304 is extinguished upon the occurrence of the first dial impulse. The anode of the discharge tube 3301 is connected through the condenser 3328 so as to discharge this tube in response to each register drive pulse developed by the pulser 510.

At the end of the first digit, the pulser 510 ceases to produce register drive pulses so that the tube 3301 is not again fired and the condenser 3328 is permitted to charge positively by an amount sufficient to fire the timing tube 3300. Accordingly, at the end of the calling party digit, the tube 3300 is ionized and a positive potential is developed across the cathode resistor 3329 of the pulser tube 3303 so as to prevent this tube from responding to further dial impulses during the next succeeding digit. In addition, the positive potential developed at the cathode of the tube 3300 is impressed upon the control grid of the called party inverter tube 3502 so as to permit this tube to respond to control pulses developed by the dial impulse integrator circuit 509 during the third, or called party digit.

In considering the operation of the called party inverter circuit 561, the called party register pulser 514 and the called party register 515, it is pointed out that these circuits are substantially identical to the circuits 560, 510, and 511, described above. More specifically, during the third, or called party digit, the control pulses developed by the circuit 509 are repeated through the inverter tube 3502 and are impressed upon the control grid of the pulser tube 3503 so as to cause this tube to develop corresponding register drive pulses across the common cathode resistor 3525 in the register 515. As a result, the first impulse extinguishes the primer tube 3504 and fires the first impulse counting tube 3505, these impulse counting tubes being fired in sequence in accordance with the numerical value of the called party digit. In the illustrated revertive call, the substation H is assigned the code #3 party line ringing signal so that the third impulse counting tube 3507 remains ionized at the end of the called party digit and until the revertive call trunk 121 is released. When the tube 3507 is ionized, a relatively large potential drop is developed across the anode resistor 3526 thereof so that the potential on the conductor 515*c* is reduced from the value of the potential on the conductor 121*c* by the amount of the voltage drop across the resistor 3526. However, the potentials on all of the other conductors 515*a*, 515*b*, and 515*d* to 515*j*, inclusive, of the register 515, remain equal to the potential on the conductor 121*c*.

Figure 31:
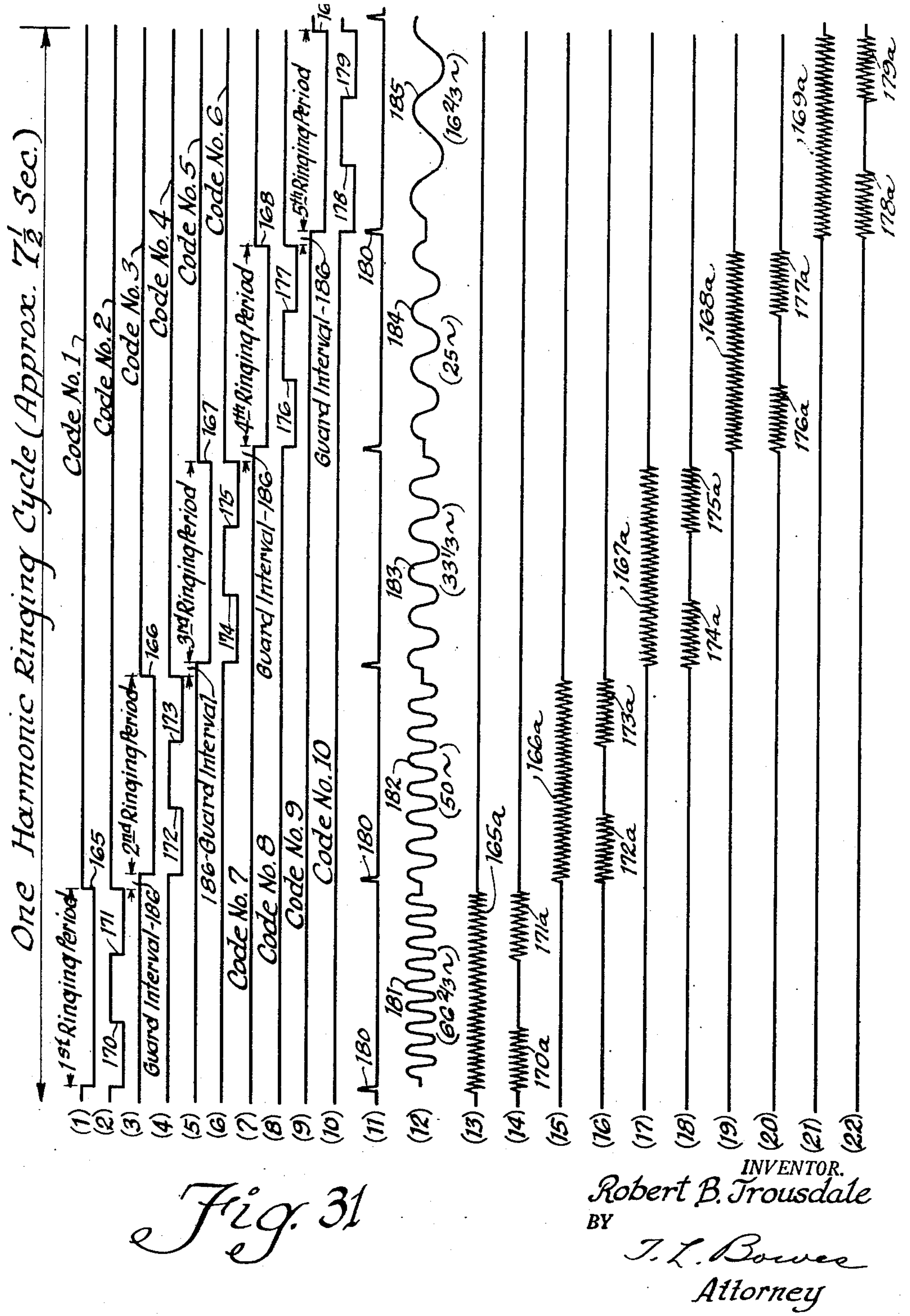
Figure 32:
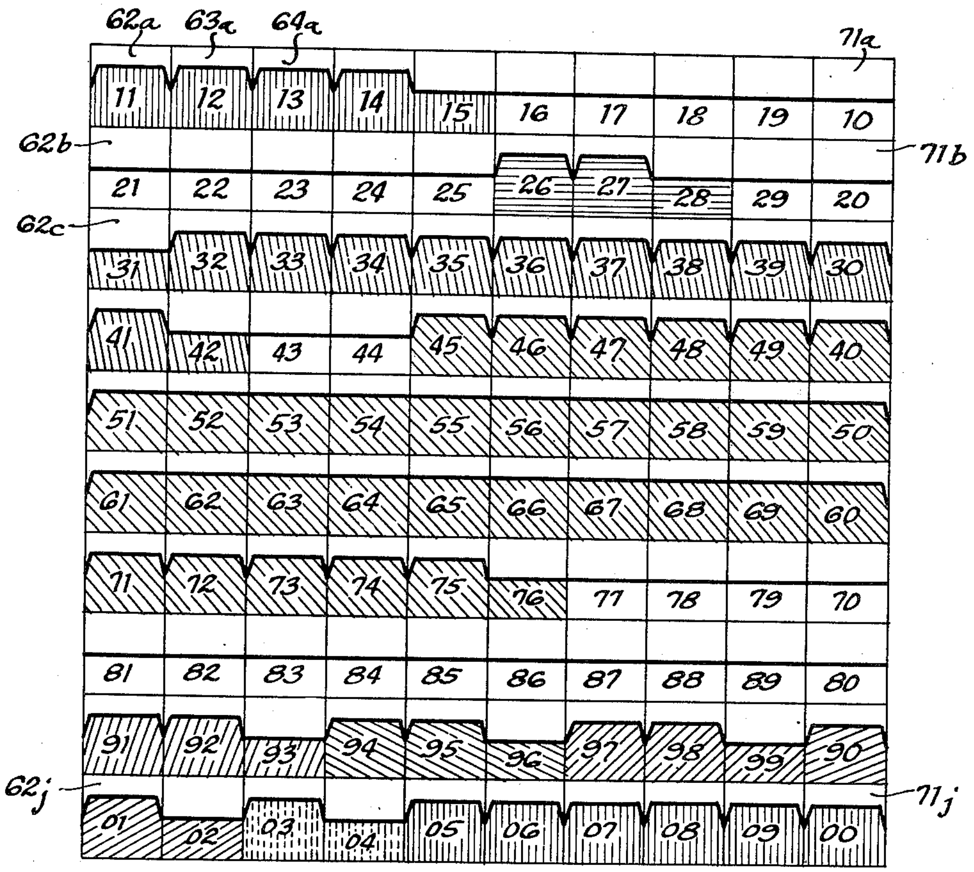

Considering now the operation of the ringback tone gates 562, it will be recalled from the general description of the system that these gates perform the function of selecting the particular party line ringing signals assigned to the calling and called party line substations in accordance with the potentials developed on the output conductors of the registers 511 and 515. More particularly, the ten party line ringing signals developed on the conductors 48*a*, 48*b*, 48*c* to 48*j*, inclusive, by the harmonic ringing modulator circuit 100 in the common equipment 17, are individually impressed upon the cathodes of the tone gate diodes 3313 to 3315, inclusive, and 3407 to 3413, inclusive. In this connection, it will be recalled that these ten party line ringing signals are actually periodically recurring ringback tone signals which are coded in accordance with the ringing pulses constituting the party line code ring assigned to a particular substation, as shown in Figs. 31 (13) to (22) inclusive. Thus, the substation F, which is assigned the code #1 ringing signal is identified by the party line ringing signal shown in Fig. 31 (13), wherein the ringback tone signal 165*a* is developed for a duration of 1½ seconds during the first ringing period, thereby constituting one long ringing pulse which identifies the substation F. On the other hand, the substation H is identified by the ringback tone signal 166*a* shown in Fig. 31 (15) which lasts for 1½ seconds during the second ringing period of each harmonic ringing cycle.

Considering first the manner in which the code #1 party line ringing signal is selected in response to a potential decrease developed on the conductor 511*a* of the register 511, this potential decrease is coupled through the resistor 3330 to the cathode of the tone gate tube 3313. This cathode is also connected through the resistor 3331 to the conductor 515*a* of the register 515 and the code #1 party line ringing signal appearing upon the conductor 48*a* is coupled through the condenser 3332 to the cathode of the tube 3313. The anode of the tube 3313 is connected through the resistor 3333 to the −100 volt supply and is also connected through the resistor 3334 to the output conductor 515*b* of the register 515. If the second counting tube 3506 in the register 515 is not fired the potential on the conductor 515*b* remains equal to the +B switch potential on the conductor 121*c*. Accordingly, the values of the resistors 3330, 3331, 3333 and 3334 are so chosen that when the potentials on the conductors 515*a* and 515*b* are equal to the +B switch potential on the conductor 121*c* and the potential on the conductor 511*a* is decreased by the voltage drop through the resistor 3323, the cathode potential of the tone gate tube 3313 is made negative relative to the anode of this tube so that this tube conducts. When the tube 3313 conducts, the code #1 party line ringing signal appearing upon the conductor 48*a* is coupled through the condenser 3332, the space current path of the tube 3313, and the condenser 3335 to the output conductor 562*a* of the circuit 562.

In an entirely similar manner, when the third counting tube 3507 in the register 515 is fired in response to a called party digit of "3," thus identifying the code #3 party line ringing signal assigned to the called substation H, the potential decrease produced on the conductor 515*c* is connected through the resistor 3336 to the cathode of the tone gate tube 3315, this cathode also being connected through the resistor 3337 to the output conductor 511*c* of the register 511. Since the potential on the conductor 511*c* is equal to the +B switch potential on the conductor 121*c* unless the tube 3307 in the register 511 is fired, a potential decrease on the conductor 515*c* functions to reduce the cathode potential of the tube 3315 so that this tube is also rendered conductive. When the tube 3315 is rendered conductive, the code #3 party line ringing signal appearing upon the conductor 48*c* is connected by way of the condenser 3338, the space current path of the tube 3315, and the condenser 3415 to the output conductor 562*a*. Accordingly, the code #3 party line ringing signal appearing upon the conductor 48*c* is also selectively impressed upon the output conductor 562a by conduction of the tone gate tube 3315.

In this connection it will be understood that since the code #1 and code #3 party line ringing signals occur during different ringing periods, both of these party line ringing signals may be impressed upon the same output conductor 562a and may be employed to actuate the ringing facilities at the calling and called substations during the ringing periods assigned thereto. Thus, the 66⅔ C. P. S. harmonic ringer provided at the substation F is rung for the duration of the ringing signal 165a (Fig. 31 (13)), which occurs during the first ringing period of each harmonic ringing cycle and the 50 C. P. S. harmonic ringer provided at the substation H is rung for the duration of the party line ringing signal 166a, shown in Fig. 31 (15), which occurs during the second ringing period, each of these signals consisting of one long ring which is repeated every 7½ seconds.

In the illustrated embodiment wherein more than five substations may be associated with the same line and different pairs of substations are assigned the same ringing frequency and the same ringing period in each harmonic ringing cycle, a situation may arise wherein the calling and called substations are both assigned the same ringing period in which case facilities are provided for selecting only the party line ringing signal assigned to the called substation. More specifically, if the calling substation F wishes to call the substation G, both of these substations are assigned the first ringing period, the difference between the party line ringing signals assigned to these substations being on a code basis rather than on a frequency selective basis. Thus, the ringing signal 165a assigned to the substation F consists of one long ring whereas the ringing signal assigned to the substation G consists of the two short ringing signals 170a and 171a (Fig. 31 (14)). Since the one long ring constituting the code #1 party line ringing signal and the two short rings constituting the code #2 party line ringing signal both occur during the first ringing period during which a 66⅔ C. P. S. ringing current is available and both of the harmonic ringers at the substations F and G are responsive to a 66⅔ C. P. S. ringing current, it will be evident that it is impossible to transmit both the calling and called party line ringing signals during the particular situation when both signals occur during the same ringing period.

In order to select only the called party line ringing signal in the situation described above, the potentials developed on the output conductors of the register 515 are given preference over the potentials developed on the conductors of the register 511 so that only the called party line ringing signal will be impressed upon the output conductor 562a. Thus, considering for example the situation wherein the substation F wishes to call the substation G, the first impulse counting tube 3305 in the register 511 will be fired in response to the calling party digit of "1" and the second impulse counting tube 3506 in the register 515 will be fired in response to the called party digit of "2." It will be observed that each of the output conductors of the register 515 is connected to the cathode of the corresponding tone gate tube and is also connected to the anode of the oppositely paired tone gate tube. Thus, the conductor 515a is connected through the resister 3331 to the cathode of the tone gate tube 3313 and this conductor is also connected through the resistor 3340 to the anode of the oppositely paired tone gate tube 3314 which controls the selection of the #2 party line ringing signal. In a similar manner the conductor 515b is connected through the resistor 3341 to the cathode of the tone gate tube 3314 and is also connected through the resistor 3334 to the anode of the oppositely paired tone gate tube 3313 which controls the code #1 party line ringing signal.

When the tube 3305 in the register 511 is fired, the potential decrease on the conductor 515a normally operates to reduce the cathode potential of the tone gate tube 3313 with the result that the code #1 party line ringing signal appearing upon the conductor 48a is transmitted through the tube 3313 to the output conductor 562a. However, when the second impulse counting tube 3506 in the register 511 is fired, a potential decrease is produced on the conductor 515b which is impressed upon the cathode of the tube 3314 through the resistor 3341 so as to render the tube 3314 conductive and is also impressed upon the anode of the oppositely paired tube 3313 through the resistor 3334 so that the anode potential of this tube is decreased. Accordingly, the potential decrease produced at the cathode of the tube 3313 in response to a potential decrease on the conductor 515a is balanced by a corresponding decrease in the anode potential of the tube 3313 in response to the potential decrease on the conductor 515b with the result that the tube 3313 remains non-conductive and the code #1 party line ringing signal is not transmitted through this tube and is therefore not impressed upon the output conductor 562a. Therefore, when a potential decrease is developed on both the conductors 511a and 515b, the tube 3314 is rendered conductive but the tube 3313 is held non-conductive so that only the code #2 party line ringing signal appearing upon the conductor 48b is coupled through the condenser 3342, through the space current path of the tube 3314, and through the condenser 3343 to the output conductor 562a.

It will be evident that a similar condition is set up when the substation G wishes to call the substation F. Thus, if a potential decrease is produced on the conductor 511b in response to a calling party digit of "2," and a potential decrease is produced on the conductor 515a in response to a called party digit of "1," the potential decrease on the conductor 515a is coupled through the resistor 3340 to the anode of the tube 3314 so as to balance the decrease in potential at the cathode of this tube and prevent this tube from conducting. Accordingly, only the tube 3313 is rendered conductive and the code #1 party line ringing signal is the only signal transmitted to the output conductor 562a. It will also be observed that the output conductors of the register 515 control only the paired tone gate tubes which control the party line ringing signals which occurred during the same ringing period. Thus, the output conductors 515a and 515b control only the tone gate tubes 3313 and 3314, which are associated with the code #1 and code #2 party line ringing signals occurring during the first ringing period. In a similar manner the conductors 515c and 515d control the tone gate tubes 3315 and 3407 which are provided to select the code #3 and code #4 party line ringing signals which occur during the second ringing period. In this connection it will be understood that if more than two party line ringing signals are provided during a given ringing period the connection of the output conductors of the register 515 may be modified in accordance therewith so as to control all of the tone gate tubes used to gate party line ringing signals which occur during the same ringing period. It will also be understood that if a code ringing system is employed wherein all ringers are tuned to the same frequency, the circuits 560, 510, 511 and 512 are not required since the calling party's ringer will be rung regardless of the code selected and it is not necessary to dial or register the calling party ringing digit.

The selected party line ringing signals which are impressed upon the output conductor 562a of the circuit 562 in the manner described above are transmitted by way of this conductor to the first control grid of the ringback tone gate tube 3312 in the circuit 525. It will be recalled that these party line ringing signals are impressed upon the conductor 562a as soon as the corresponding digit is dialed at the calling substation F. Thus, in the illustrated call the code #1 party line ringing signal is impressed upon the conductor 562a as soon as the calling party digit is completed and the code #3 party line ringing signal assigned to the called substation H is impressed upon the conductor 562*a* as soon as the called party digit is completed. However, revertive ringing of the calling line No. 232 cannot be initiated until the calling party hangs up so that the shunting effect of the switch hook at the calling substation F is removed from the line No. 232 thereby permitting the harmonic ringers connected to this line to respond to the transmission of ringing currents of different frequencies over this line. Accordingly, pending operation of the code start circuit 568, the ringback tone gate tube 3312 is biased beyond cutoff so as to prevent transmission therethrough of the party line ringing signals appearing on the conductor 562*a*.

Considering now the operation of the called party sequence timing circuit 516, it is pointed out that this circuit is in general similar to the calling party sequence timing circuit 512 described immediately above. However, the circuit 516 is provided with additional facilities for conditioning the revertive call acceptor 121*a* to hold the revertive call trunk 121 operatively associated with the call forwarding selector 130*b* while the calling party hangs up to permit completion of the call and selector forward signal pulse transmission ceases. More specifically, at the end of the last digit dialed into the selector 121*b*, i. e., the called party digit of the special revertive call number, the condenser 3530 in the circuit 516 is permitted to charge sufficiently positively to fire the timing tube 3500 so that this tube remains ionized for the remainder of the interval during which the revertive call trunk 121 is held operatively associated with the calling line.

When the tube 3500 is ionized the flow of tube current through the anode resistor 3531 of this tube produces a potential decrease at the anode of the tube 3500 which is connected through the resistor 3532 to the conductor 121*f*. This conductor is also connected by way of the resistor 3533 to the —100 volt supply and by way of the resistor 3534 to the ring trip output conductor 553 of the ring trip circuit 521. The potential on the conductor 553 is substantially equal to ground potential until the ring trip circuit is actuated in response to a call answering signal, or a timeout signal at the end of the ringing timeout interval. Accordingly, the values of the resistors 3532, 3533 and 3534 are so chosen that with zero potential on the conductor 553 and the above-described voltage drop through the resistor 3531, the potential on the conductor 121*f* is highly negative with respect to ground. This potential decrease, which may be called a revertive call hold potential, is transmitted to the revertive call acceptor 121*a* and has the effect of preventing the +B switching circuit 501 in this acceptor from releasing the revertive call trunk 121 when selector forward signal pulse transmission ceases as described generally heretofore in connection with the general description of the system. When the tube 3500 is fired a positive potential is also developed at the cathode of this tube which is impressed upon the cathode resistor 3535 of the pulser tube 3503 so as to block this tube and prevent it from responding to any further extraneous impulses so that the setting of the called party register 515 cannot be changed thereafter. The positive potential developed at the cathode of the tube 3500 when this tube is fired is also connected by way of the conductor 535 to the revertive call signaling circuit 563 and the code start circuit 568.

Considering now the operation of the revertive call signaling circuit 563, it will be recalled from the general description of the system that this circuit performs the function of developing a first revertive call signal in response to completion of the last digit in the special revertive call number, this first revertive call signal being transmitted to the selector 130*b* to condition the finder-selector link 130 to remain operatively associated with the calling line after the calling party hangs up, and the circuit 563 is also employed to develop a second revertive call signal when either the revertive call is answered or the ringing timeout interval has expired so as to restore the selector 130*b* to its original or nonrevertive condition so that it may be released from the calling line with which it is operatively associated.

More specifically, the linkage sampling pulses appearing upon the conductor 40*b* are coupled through the condenser 3540 to the first control grid of the triple grid revertive call signal gate tube 3610, this control grid being connected to the —100 volt supply through the resistor 3541 and to the +B switch conductor 121*c* through the resistor 3620. The acceptor gate pulses which are continuously developed by the revertive call acceptor 121*a* on the conductor 121*d*, are coupled through the condenser 3542 to the second control grid of the gate tube 3610, the bias potential for this control grid being derived from the bias potentiometer 3543, shown associated with the peaker tube 3512 in the circuit 508, which provides bias potential for the control grids of the tubes 3512, 3514, 3515 and 3610 in parallel. The bias potential for the third control grid of the gate tube 3610 is derived from the voltage divider network including the resistors 3621 and 3622 connected between the —100 volt supply and ground.

After the revertive call trunk becomes operatively associated with the call forwarding selector 130*b*, a +B switch potential is developed on the conductor 121*c* with the result that the first control grid of the gate tube 3610 is biased to its normal operating point by means of the voltage divider network 3620 and 3541. Also, the second control grid of the gate tube 3610 is continuously operated at its normal operating point by means of the bias potentiometer 3543. However, the third control grid of the gate tube 3610 is normally biased highly negatively by means of the voltage divider network 3621 and 3622 so that this tube is prevented from transmitting pulses therethrough after the revertive call selector 121*b* is seized and a positive +B switch potential is developed on the conductor 121*c*. Accordingly, it is neeceessary to increase the potential of the third control grid of the gate tube 3610 positively before this tube will transmit any pulses therethrough.

When the positive potential is developed on the conductor 535 by the called party sequence timing circuit 516 at the end of the revertive call number, this positive potential is differentiated in the network including the condenser 3623 and the resistor 3624 so as to provide a positive pulse the duration of which is dependent upon the time constant of the condenser 3623 and the resistor 3624, this positive pulse being coupled through the mixing network including the condenser 3625 and the resistor 3626 to the third control grid of the gate tube 3610. As a result, the potential on the third control grid of the tube 3610 is increased positively for the duration of the positive pulse developed by the network 3623 and 3624 so that during this interval the tube 3610 is conditioned to gate therethrough that one of the linkage sampling pulses appearing upon the conductor 40*b* which coincides in time with the acceptor gate pulses appearing on the conductor 121*d* in the time position 62*a* assigned to the revertive call trunk 121. Accordingly, there is released to the output conductor 207*a* a short burst of relatively narrow revertive call signal pulses, which occur in the time position 62*a* and collectively comprise a first revertive call signal.

These revertive call signal pulses are developed across the common anode resistor for the tube 3610 in the revertive call signal coupling circuit 207, this anode resistor being common to the other revertive call signal gate tubes in the revertive call selectors of the system, and the revertive call signal pulses are transmitted by way of the conductor 207*b* to revertive call control circuit 365 in in each of the selectors of the system. However, only the circuit 365 in the call forwarding selector 130*b* is conditioned to respond to revertive call signal pulses appearing in the time position 62*a* assigned to the revertive call trunk 121 so that these revertive call signal pulses are transmitted through the gate tube 1803 in the circuit 365 and have the effect of firing the first revertive call control tube 1806 in a manner described in detail heretofore in connection with the selector **130*b*. Accordingly, a revertive call hold potential is developed on the conductor 130*f* which has the effect of conditioning the finder 130*a* to remain operatively associated with the calling line while the calling party hangs up to permit completion of the revertive call. It will thus be evident that when the timing tube 3500 in the called party sequence timing circuit 516 is fired at the end of the revertive call number, both the finder-selector link 130 and the revertive call trunk 121** are conditioned to remain operatively associated with the calling line while the calling party hangs up to permit revertive ringing over this line.

In order to prevent both of the control tubes 1806 and 1805 in the circuit 365 from firing in response to the first revertive call signal transmitted to this circuit in the manner described above, the time constant of the differentiation network 3623 and 3624 in the circuit 563 is made less than the time constant of the integration network 1825 and 1826 in the circuit 365 so that the first revertive call signal disappears from the conductor **207*a* before the first control grid of the second revertive call control tube 1805 is enabled by means of the positive bias potential developed across the condenser 1826. Accordingly, the second control tube 1805** is not fired in response to the first revertive call signal but instead is conditioned by this signal to respond to a second revertive call signal.

When the calling party hangs up, multiplexer pulse transmission in the time position **63*c* assigned to the line No. 232 ceases and immediately thereafter selector forward signal pulse transmission in the time position 62*a* assigned to the revertive call trunk 121 also ceases, as described above in connection with the selector 130*b*. Also, acceptor drive pulse transmission through the drive circuit 189 also ceases so that the acceptor control gate circuit 500 no longer transmits therethrough acceptor drive pulses appearing in the time position 62*a* assigned to the trunk 121. The +B switching circuit 501 in the revertive call acceptor 121*a* responds to acceptor drive pulse termination by developing a revertive ring start signal on the conductor 121*e*, as described heretofore in connection with the acceptor 121*a*. Thus, the condenser 1916 is charged positively through the resistor 1917 so as to increase the potential on the conductor 121*e* from a highly negative value to ground potential. When the potential on the conductor 121*e* reaches ground potential the diode section including the diode anode 3302*a* of the tube 3302, which is connected to the conductor 121*e* in the revertive call selector 121*b*, conducts so as to prevent the potential on the conductor 121*e*** from becoming positive with respect to ground.

Considering now the operation of the code start circuit 568, it is pointed out that this circuit is similar in some respects to the code start circuit identified by the reference character 268 in my copending application Serial No. 336,316, identified above, and reference may be had to this application for a description of a code start circuit of this type. However, in the present invention, the anode potential for the code start tube 3310 is derived from the conductor **121*c* so that until operating potential is impressed upon this conductor, the tube 3310 is completely inoperative. The control grid of the tube 3310 is connected through the resistors 3350 and 3351 and the crystal rectifier 3352 to a voltage divider network including the resistors 3353 and 3354 connected between the −100 volt supply and ground potential. The potential established at the junction point of the resistors 3353 and 3354 is sufficiently negative to prevent the tube 3310 from responding to code start pulses impressed upon the conductor 5 by the code forming circuit 99, these code start pulses occurring at the start of each ringing period. Accordingly, the tube 3310 is prevented from responding to code start pulses when the potential on the conductor 121*e* is highly negative even though operating potential is applied to the conductor 121*c***.

When the calling party hangs up and the +B switching circuit 501 functions to increase the potential on the conductor **121*e*, this potential is repeated through the control tube 3309 and is reproduced across the cathode resistor 3355 of this tube. Accordingly, the bias potential on the first control grid of the code start tube 3310 is increased positively by an amount sufficient to permit this control grid to respond to code start pulses appearing on the conductor 5 with the result that the tube 3310 is fired in response to the first code pulse which occurs after the ring start potential increase is developed on the conductor 121*e***.

Figure 29:
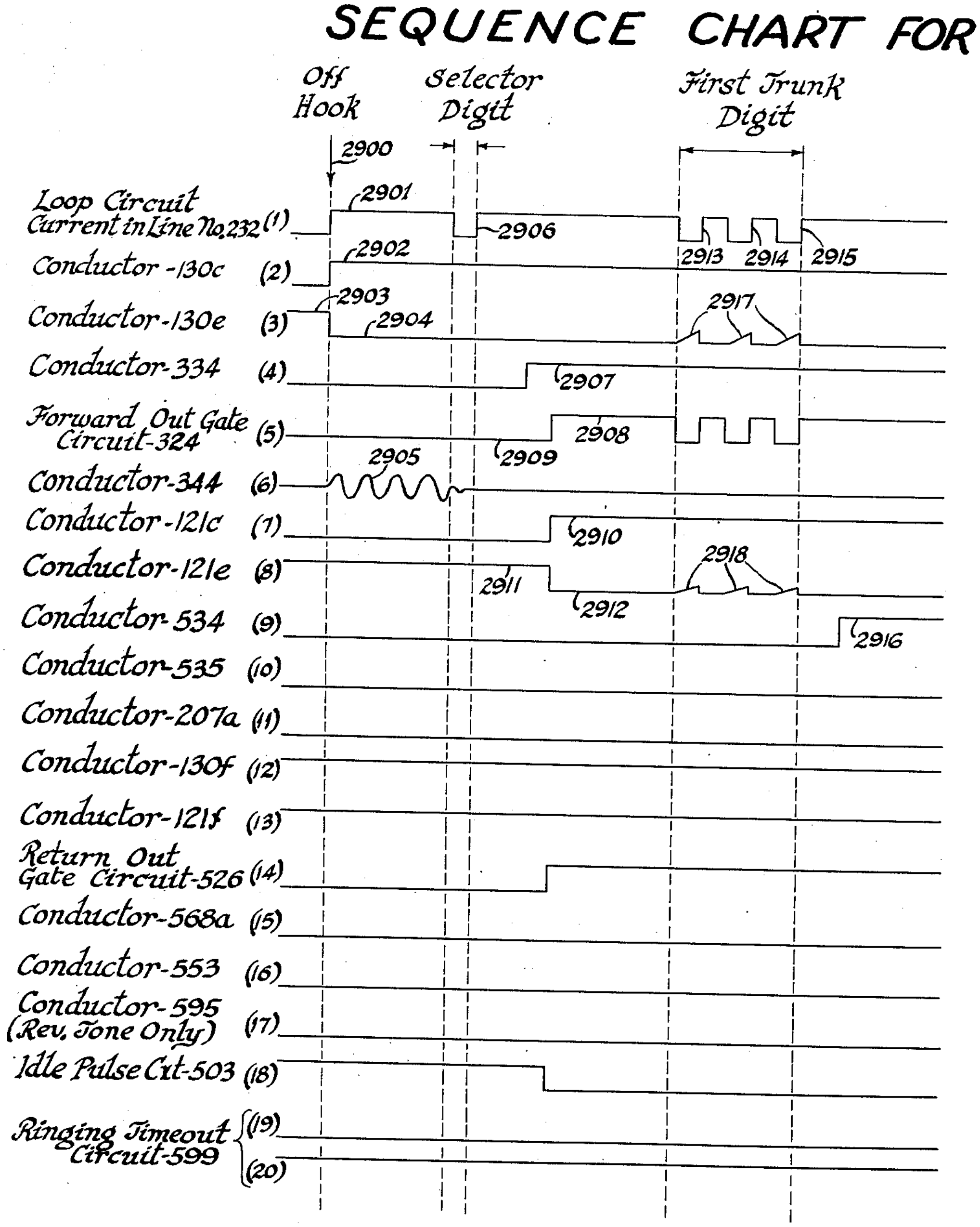
Figure 30:
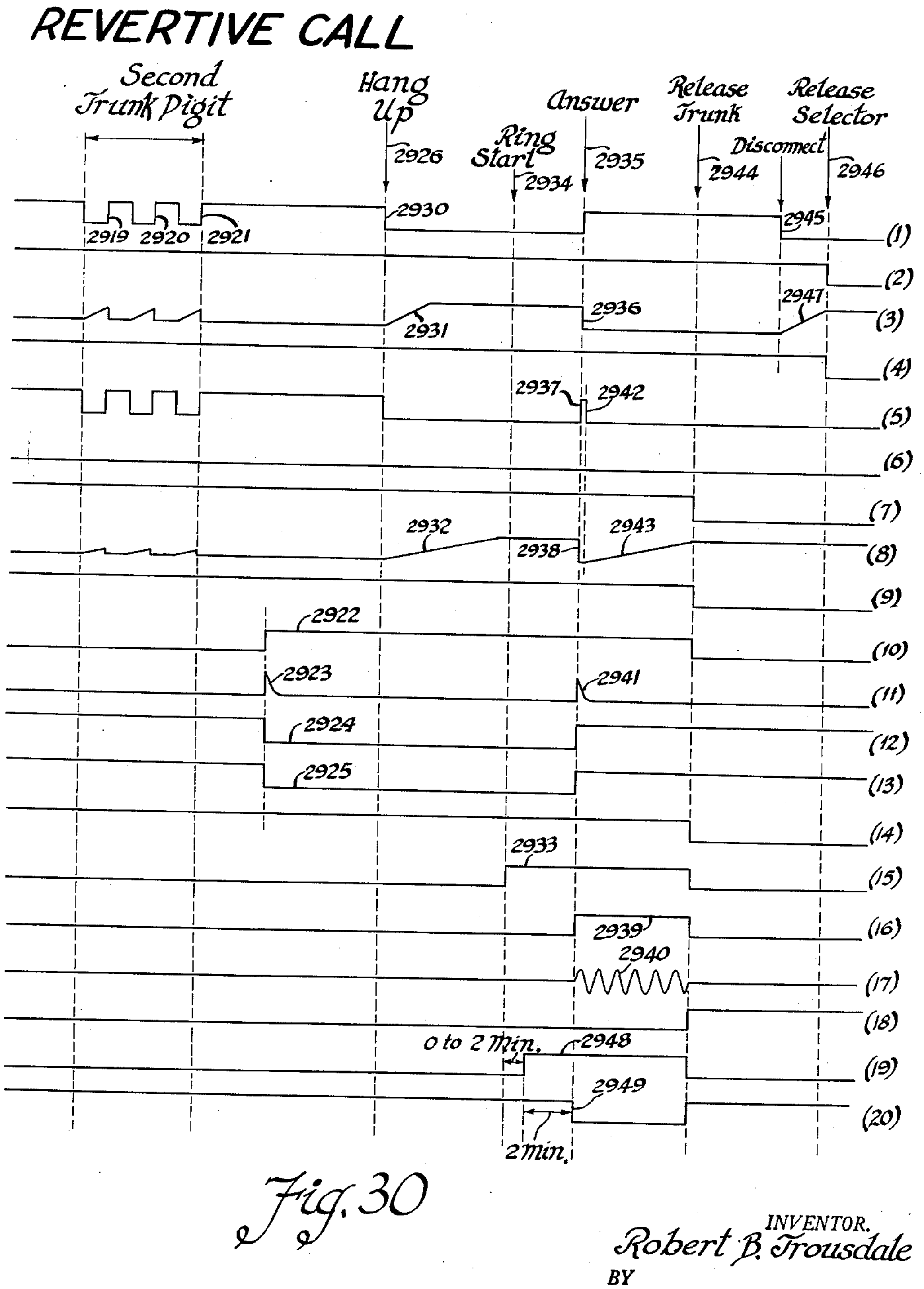

When the revertive call trunk 121 is initially seized by the call forwarding selector **130*b*, the potential on the conductor 121*e* changes from the value 2911 (Fig. 29 (8)) substantially equal to ground potential, to the highly negative value 2912 at the same time that the +B switch potential 2910 (Fig. 29 (7)) is applied to the conductor 121*c*. Accordingly, a condition may arise in which the anode of the code start tube 3310 may be energized over the conductor 121*c* before the control grid of this tube is made highly negative by the potential 2912 on the conductor 121*e*, with the result that the tube 3310 may be fired erroneously when the trunk 121 is seized. To prevent this erroneous firing of the tube 3310, the shield grid of this tube is held highly negative until after the called party digit is dialed into the trunk so that firing of the tube 3310 when +B switch potential is applied to the conductor 121*c* is positively prevented. More specifically, the shield grid of the tube 3310 is connected through the resistors 3365 and 3366 to the conductor 535, a resistor 3367 being connected between the junction of the resistors 3365 and 2366 and the −100 volt supply. The shield grid of the tube 3310 is also connected to the anode of the diode section 3311*a* of the tube 3311, the cathode of this section being connected to ground. Before the end of the called party digit dialed into the selector 121*b*, the potential on the conductor 535 is substantially equal to ground potential and the values of the resistors 3365, 3366 and 3367 are so chosen that the potential on the shield grid of the tube 3310 is highly negative and prevents this tube from firing even though the control grid of this tube is positive. However, after the end of the called party digit, the tube 3500 is fired in the manner described above so that a large positive potential is produced on the conductor 535. The positive potential on the conductor 535 raises the potential of the shield grid of the tube 3310 until the diode section 3311*a* conducts and holds the shield grid potential equal to ground potential. The tube 3310 is thereafter conditioned to respond to the above described ring start potential increase on the conductor 121*e* in the manner described above. It will be understood that any other suitable potential may be employed to hold the shield grid of the tube 3310 negative while anode potential is applied to this tube. For example, the conductor 534 may be used instead of the conductor 535. When the tube 3310 is fired a large positive potential is developed across the cathode resistor 3356 of this tube and this code start potential is transmitted by way of the conductor 568*a* to the ring trip circuit 521 to condition this circuit to respond to a call answering signal, to the ringing timeout circuit 599 to initiate the ringing timeout interval, and to the ringback tone gate circuit 525 to initiate revertive ringing. More particularly, when a positive potential is developed on the conductor 568*a*, the bias potential on the first control grid of the ringback tone gate tube 3312 is increased positively by an amount sufficient to permit the tube 3312 to transmit therethrough the selected party line ringing signals developed on the conductor 562*a*. Accordingly, the selected party line ringing signals are developed across the anode resistor 3357 of the tube 3312 and are rectified in the crystal rectifier 3358** so as to reproduce the envelope of the selected ringback tone signals, i. e., the ringing pulses constituting the selected party line ringing signals.

It will be noted that the code start circuit 568 is not permitted to respond to code start pulses appearing upon the conductor 5 until the potential on the conductor 121*e* is increased from its normally highly negative value to substantially ground potential, which involves an appreciable time delay. Accordingly, the code start tube 3310 cannot fire for a predetermined time delay interval after the calling party has hung up. With this arrangement, switch hook fumbling on the part of the calling subscriber in hanging up to permit completion of the revertive call will not cause the code start tube 3310 to be fired. In this connection it will be understood that the code start tube 3310 provides operating anode potential for the ring trip tube 3308 so that if the tube 3310 is fired prematurely, i. e., during a switch hook fumble on the part of the calling subscriber, the ring trip tube 3308 might be conditioned thereby and would interpret the switch hook fumble as a call answering signal and would function to terminate revertive ringing before it is started. By delaying the time at which the code start tube 3310 can be fired in the manner described above the system is made insensitive to switch hook fumbling on the part of the calling subscriber when he is hanging up to permit completion of the revertive call.

Considering now the ringing carrier modulator circuit 505, it is pointed out that this circuit is substantially identical to the corresponding circuit component shown and described in detail in my copending application Serial No. 326,453, identified above, and reference may be had to this application for a complete and detailed description of a similar modulator circuit. However, for the purposes of the present invention, it may be stated that the control grid of the modulator tube 3311 is normally held highly negative so as to prevent this tube from transmitting therethrough the ringing carrier wave impressed upon this control grid from the conductor 47*a*. However, during the "on" intervals of the ringing pulses developed across the output condenser 3359 of the rectifier circuit including the rectifier 3358, the bias potential on the control grid of the tube 3311 is increased by an amount sufficient to permit this tube to transmit a ringing carrier wave for the duration of the "on" intervals of each of the selected party line ringing signals. Thus, the tube 3311 transmits therethrough the 4900 cycle ringing carrier wave appearing on the conductor 47*a* for the duration of the ringing pulse 165 (Fig. 31 (1)), which occurs during the first ringing period and constitutes the code #1 party line ringing signal, and the tube 3311 transmits the carrier wave for the duration of the ringing pulse 166 which occurs during the second ringing period and constitutes the code #3 party line ringing signal assigned to the called substation H. The carrier wave signals transmitted through the tube 3311 are coupled through the mixing circuit including the resistor 3360 and the condenser 3361 to the conductor 595 and are transmitted by way of this conductor to the third control grid of the return out gate tube 3515 in the circuit 526.

In considering the operation of the return out gate circuit 526, it is pointed out that this circuit is generally similar to the return out gate circuit 326 in the selector 130*b* and reference may be had to the copending application Serial No. 326,213, identified above, for a detailed description of a circuit of this type. However, the return out gate tube 3515 in the revertive call selector 121*b* is normally blocked by means of the voltage divider network including the resistors 3541 and 3620 which holds the first control grid of the tube 3515 highly negative until the revertive call selector 121*b* becomes operatively associated with a call forwarding selector. At this time, a positive potential is impressed upon the +B switch conductor 121*c* so that the first control grid of the tube 3515 is brought up to the correct operating point to permit the tube 3515 to respond to linkage sampling pulses impressed upon this control grid over the conductor 40*b*. The second control grid of the tube 3515 derives bias potential from the bias potentiometer 3543 and has impressed thereon the acceptor gate pulses continuously appearing on the conductor 121*d* so that the tube 3515 develops at the anode thereof selector return signal pulses which are very narrow and occur during the time position 62*a* assigned to the revertive call trunk 121.

It will be understood that these selector return signal pulses are unmodulated until a tone signal is impressed upon the third control grid of the tube 3515. However, when the ringing carrier waves are impressed upon the conductor 595 in the manner described above, these ringing carrier waves are transmitted to the third control grid of the gate tube 3515 and cause modulation of the selector return signal pulses released by the tube 3513 in accordance with the ringing carrier waves which correspond to the selected party line ringing signals. These ringing carrier wave modulated selector return signal pulses are transmitted by way of the selector return coupling circuit 188 and the conductor 199 to the return in gate circuit 323 in the selector 130b and are gated through the circuit 323 to the return reconstructor circuit 322 wherein the 4900 cycle carrier waves are reconstructed or detected. Accordingly, corresponding ringing carrier waves are developed on the output conductor 344 of the circuit 322 and are transmitted through the low pass filter 1840 to the return out gate circuit 326 wherein they are modulated upon selector signal pulses occurring in the time position 63*c* assigned to the calling line No. 232. In this connection it will be understood that the filter 1840 functions to remove the 10 kilocycle component of the step function reconstructed wave developed on the output conductor 344 of the circuit 322, but does not provide any substantial attenuation for the 4900 cycle ringing carrier wave and the 5100 cycle modulation component also produced by modulating a 4900 cycle sine wave on the signal pulses.

The ringing carrier wave modulated selector signal pulses are transmitted by way of the distributor 15*b* to the line circuit 16*b* wherein they are supplied to the line ringing control facilities in this line circuit so as to effect transmission of a ringing current over the line No. 232 in accordance with the selected party line ringing signals. More specifically, the ringing carrier wave developed during the long ringing pulse 165 (Fig. 13 (1)) which constitutes the code #1 party line ringing signal, controls the line ringing control facilities so that the 66⅔ C. P. S. wave 181 (Fig. 31 (12)), is released to the line No. 232 and has the effect of actuating the harmonic ringer at the calling substation F during the first ringing period. Likewise, the ringing carrier wave corresponding to the ringing pulse 166 (Fig. 31 (3)), which constitutes the code #3 party line ringing signal assigned to the substation H, controls the line ringing control facilities so that a 50 C. P. S. ringing current 182 (Fig. 31 (12)), is transmitted over the line No. 232 during the second ringing period. Ringing of the line No. 232 continues in this manner until the revertive call is answered at either the calling substation F or the called substation G, or the ringing timeout interval expires.

Assuming that the revertive call is answered at either the calling substation F or the called substation H before the end of the ringing timeout interval, the loop circuit including the conductors of the line No. 232 is again completed so that multiplexer pulse transmission in the time position 63*c* assigned to the line No. 232 is resumed. This resumption of multiplexer pulse transmission in the time position 63*c*, which may be called a call answering signal, is repeated through the selector 130*b* with the result that selector forward signal pulse transmission in the time position 62*a* assigned to the revertive call trunk 121 is also resumed. In the revertive call selector 121*b* the resumption of selector forward signal pulse transmission, which indicates a call answering operation, causes the selector forward signal pulses to be repeated through the circuit 507 and impressed upon the control grid of the condenser charging tube 3510 in the forward reconstructor circuit 508. During periods when no seelctor forward signal pulses are impressed upon the circuit 508, the storage condenser 3518 is discharged to a relatively negative value through the discharge tube 3511 since this tube continues to be excited by discharge pulses which are derived from the acceptor gate pulses continuously appearing upon the conductor 121*d*, by way of the peaker tube 3512. Accordingly, the potential across the condenser 3518 is increased positively in response to resumption of selector forward signal pulse transmission in the time position 62*a* and this positive increase in potential across the condenser 3518 is repeated through the output tube 3509 and is transmitted over the conductor 508*a* to the control grid of the ring trip tube 3308.

Considering now the operation of the ring trip circuit 521, it is pointed out that the anode of the ring trip tube 3308 is energized from the code start conductor 568*a* so that anode potential is not impressed upon the tube 3308 until after the code start tube 3310 is fired in the manner described above in response to the revertive call ring start signal developed after the calling party has hung up. Accordingly, even though signals reconstructed by the circuit 508 during dialing of the calling and called party digits into the selector 121*b* are transmitted over the conductor 508*a* to the control grid of the ring trip tube 3308, these signals do not have the effect of firing the tube 3308 since this tube is without anode potential until after revertive ringing is initiated. However, as soon as revertive ringing is initiated the code start potential on the conductor 568*a* is employed as anode potential for the ring trip tube 3308 so that this tube is thereafter conditioned to respond to the above-described potential increase developed on the conductor 508*a* in response to answering of the revertive call. Accordingly, the ring trip tube 3308 is fired in response to the positive call answering signal developed on the conductor 508*a* so that a large positive potential is developed across the cathode resistor 3370 of this tube and is transmitted by way of the conductor 553 to the ringback tone gate circuit 525, the called party sequence timing circuit 516, the revertive call tone gate circuit 597 and the revertive call signaling circuit 563.

In the ringback tone gate circuit 525, the positive ring trip potential developed on the conductor 553 is connected through the resistor 3371 to the cathode of the ringback tone gate tube 3312 so as to bias this tube beyond cutoff and prevent transmission therethrough of the selected party line ringing signals. As a consequence, the ringing carrier modulator tube 3311 is biased beyond cutoff so that no further ringing carrier waves are transmitted through the tube 3311 and the line ringing control facilities in the line circuit 16*b* respond to termination of ringing carrier wave transmission by terminating ringing on the line No. 232.

In order to return the revertive call trunk 121 to its unlocked condition after the revertive call is answered so that this trunk may be released shortly thereafter, the ring trip potential developed on the conductor 553 is coupled through the resistor 3534 in the circuit 516 to the conductor 121*f* and has the effect of offsetting the potential drop developed across the resistor 3531 when the called party sequence timing tube 3500 is fired at the end of the revertive call number so that the potential on the conductor 121*f* is returned to substantially ground potential and the revertive call hold potential is removed therefrom. Accordingly, the acceptor 121*a* is thereafter conditioned to respond to termination of selector forward signal pulse transmission by releasing the revertive call trunk 121.

In order to return the finder-selector link 130 to its unlocked condition wherein it may release in a normal manner when the revertive call is completed, the ring trip potential developed on the conductor 553 is impressed upon the revertive call signaling circuit 563 so as to cause this circuit to develop a second revertive signal on the conductor 207*a*. More specifically, the positive ring trip potential on the conductor 553 is coupled through the differentiating network including the condenser 3630 and the resistor 3631 so that a positive pulse is produced, the duration of which is dependent upon the time constant of the condenser 3630 and the resistor 3631. This positive pulse is coupled through the mixing circuit including the condenser 3632 and the resistor 3633 to the third control grid of the revertive call signal gate tube 3610 so that the tube 3610 releases a short burst of pulses for the duration of this positive pulse to the conductor 207*a* in the time position 62*a* assigned to the trunk 121. This burst of pulses, which constitutes a second revertive call signal, is transmitted back to the revertive call control circuit 365 in the selector 130*b* wherein it has the effect of firing the second revertive call control tube 1805 in a manner described above in connection with the selector 130*b*. As a result, the positive potential developed across the resistor 1824 increases the potential on the conductor 130*f* to substantially ground potential so that the revertive call hold potential is removed from this conductor and the finder 130*a* is conditioned thereafter to respond to termination of multiplexer pulse transmission in the time position 63*c* by releasing the link 130. At the same time, the positive potential developed across the resistor 1824 in the circuit 365 is transmitted by way of the conductor 365*a* to the control grid of the discharge tube 1603 in the forward reconstructor circuit 308 with the result that selector forward signal pulse transmission in the time position 62*a* is terminated. The revertive call acceptor 121*a* responds to the corresponding termination of acceptor drive pulses in this time position by removing operating anode potential from the conductor 121*c* so that the revertive call trunk 121 is released from the selector 130*b* and is free to handle another revertive call.

In order to inform the answering party of the nature of the revertive call, the response of the +B switching circuit 501 in the acceptor 121*a* to termination of acceptor drive pulse transmission is delayed by a sufficient time interval to permit the transmission of a revertive call tone signal back through the selector 130*b* to the line No. 232 to inform the answering party that the call is revertive. More specifically, when the ring trip potential is developed upon the conductor 553, this potential is impressed upon the control grid of the revertive call tone gate tube 3607 through the voltage divider network including the resistors 3634 and 3635 connected between the conductor 553 and the −100 volt supply. As a result, the tube 3607 is conditioned to transmit therethrough a revertive call tone signal signal appearing upon the conductor 49*b* and this revertive call tone signal is transmitted through the mixing network including the resistor 3636 and the condenser 3637 to the third control grid of the return out gate tube 3515. Since the tube 3515 continuously develops selector return signal pulses after the selector 121*b* is operatively associated with the call forwarding selector 130*b*, this revertive call tone signal is modulated on these selector return signal pulses which are transmitted by way of the coupling circuit 188 to the selector 130*b* and the signal is reconstructed in the return reconstructor circuit 322 and is re-modulated upon the selector signal pulses developed by the return out gate circuit 326 which are transmitted through the distributor 15*b* to the line circuit 16*b* so as to transmit the revertive call tone signal over the calling line as soon as the revertive call is answered. The time delay in the +B switching circuit 501 in the acceptor 121*a* is preferably in the order of several seconds so as to permit the transmission of this revertive call tone signal for a few seconds after the revertive call is answered so that the answering subscriber is given time to get the receiver to his ear before the signal disappears.

Following the described operations in the selector **130*b*, the acceptor 121*a* and the revertive call selector 121*b*, the revertive call trunk 121 is released and all of the circuits controlled by the +B switch potential on the conductor 121*c* are returned to their normal or quiescent values. In particular, when operating potential is removed from the conductor 121*c* the return out gate tube 3515 is again biased well beyond cutoff so that transmission of selector return signal pulses which are modulated with the revertive call tone signal derived from the tube 3607** is terminated, thereby terminating transmission of this signal to the answering party.

In the event that the revertive call is abandoned at the calling substation and is not answered at the called substation, the ringing timeout circuit 599 is provided for the purpose of terminating ringing and conditioning the involved linkage so that it may release from the line No. 232. In considering the operation of the ringing timeout circuit 599, it is pointed out that this circuit is substantially identical to the corresponding circuit component identified by the reference character 299 in my copending application Serial No. 336,316, identified above, and reference may be had to this application for a complete and detailed description of a circuit of this type. However, for the purposes of the present invention, it may be stated that when a code start potential is developed on the conductor **568*a* in the manner described above this potential is impressed upon the control grid of the ringing primer tube 3608 through the resistor 3640 and has the effect of conditioning the tube 3608 to respond to the ringing timeout pulses appearing upon the conductor 57*b* at a rate of one pulse every two minutes. Accordingly, a period of from zero to two minutes after the code start potential is developed on the conductor 568*a*, the primer tube 3608 is fired so as to produce a current flow through the cathode resistors 3641 and 3642** of this tube.

The condenser 3643 is provided across the resistor 3642 to delay the development of a positive potential across the condenser 3643 for a sufficient time interval to prevent the control tube 3609 from firing in response to the same ringing timeout pulse which fires the primer tube 3608. However, the tube 3609 is conditioned by means of the positive potential developed across the condenser 3643 to fire in response to the next ringing timeout pulse appearing on the conductor **57*b* so that the tube 3609 is fired a period of two minutes after the primer tube 3608 is fired. When the tube 3609 fires a negative potential drop is developed across the anode resistor 3644 of this tube and this negative control pulse, or signal, is coupled through the condenser 3645 to the ring trip conductor 553. Since the conductor 553 is connected to the cathode of the ring trip tube 3308 and the tube 3308 has operating anode potential impressed thereon after revertive ringing is initiated, the negative control signal coupled to the conductor 553 has the effect of driving the cathode of the tube 3308 negative by a sufficient amount to cause the tube 3308 to be fired. In this connection it will be understood that the ring trip tube 3308 may be fired in response to firing of the control tube 3609 by developing a positive pulse in the cathode circuit of the tube 3609 and impressing this positive pulse on the control grid of the tube 3308 rather than the illustrated connection from the anode of the tube 3609 to the cathode of the tube 3308**.

As soon as the tube 3308 is fired a large positive potential is developed across the cathode resistor 3370 of this tube, this potential being identical to the ring trip potential developed on the conductor 553 in response to a normal call answering signal. Accordingly, when a ring trip potential is developed upon the conductor 553 at the end of the ringing timeout interval established by the circuit 599, this potential is again differentiated in the circuit 3630 and 3631 so as to produce a positive pulse which is impressed upon the third control grid of the gate tube 3610 in the circuit 563 so that a second revertive call signal is released in a manner identical to that described above in connection with the release of a second revertive call signal in response to answering of the revertive call. As a consequence, the revertive call control circuit 365 in the selector **130*b* functions to remove the revertive call hold potential from the conductor 130*f* and at the same time causes the selector to cease transmission of selective forward signal pulses in the time position 62*a* assigned to the trunk 121. Accordingly, the revertive call trunk 121 is released in the manner described above. Also, the finder 130*a* is conditioned to respond in a normal manner and since no calling condition exists on the line No. 232 this finder removes operating potential from the conductor 130*c* so that the finder-selector link 130** is also released and no linkage remains associated with the line No. 232.

While there have been described what are at present considered to be the preferred embodiments of the invention, it will be understood that various modifications may be made therein which are within the true spirit and scope of the invention as defined in the appended claims.

I claim:

1. In an automatic telephone system, a plurality of lines, each of said lines having assigned thereto one of a plurality of time positions which recur in repetitive time position frames, the number of said time positions being less than the number of said lines and at least some of said lines having a plurality of substations associated therewith, means for developing pulses in the time positions assigned to calling ones of said lines, and impulse responsive means controlled in part by the pulses developed by said last named means in the time position assigned to a calling one of said lines for setting up a revertive call connection between different substations associated with said calling line.

2. In an automatic telephone system, a plurality of lines, each of said lines having assigned thereto one of a plurality of time positions which recur in repetitive time position frames, the number of said time positions being less than the number of said lines and at least some of said lines having a plurality of substations associated therewith, means for developing pulses in the time positions assigned to calling ones of said lines, a plurality of impulse responsive links common to all of said lines, and means including said links and controlled in part by the pulses developed by said pulse developing means in the time positions assigned to calling ones of said lines for setting up revertive call connections between different substations associated with said calling lines.

3. In an automatic telephone system, a plurality of lines, each of said lines having assigned thereto one of a plurality of time positions which recur in repetitive time position frames, the number of said time positions being less than the number of said lines and at least some of said lines having a plurality of substations associated therewith, means for developing pulses in the time positions assigned to calling ones of said lines, a plurality of impulse responsive revertive call trunks common to all of said lines, means controlled in part by the pulses developed by said pulse developing means in the time position assigned to a calling one of said lines for operatively associating one of said trunks with said one calling line, and means including said one trunk for setting up a revertive call connection between different substations associated with said one calling line.

4. In an automatic telephone system, a plurality of lines, each of said lines having assigned thereto one of a plurality of time positions which recur in repetitive time position frames, the number of said time positions being less than the number of said lines and at least some of said lines having a plurality of substations associated therewith each identifiable by a different party line ringing signal, means for developing pulses in the time positions asigned to calling one of said lines, a plurality of impulse responsive revertive call trunks common to said lines, means controlled in part by the pulses developed by said pulse developing means in the time position assigned to a calling one of said lines for operatively associating one of said trunks with said one calling line, and means including said one trunk for transmitting a party line ringing signal over said one calling line in accordance with the identity of the called substation associated therewith.

5. In an automatic telephone system, a plurality of lines, each of said lines having assigned thereto one of a plurality of time positions which recur in repetitive time position frames, the number of said time positions being less than the number of said lines and at least some of said lines having a plurality of substations associated therewith each identifiable by a different party line ringing signal, means for developing pulses in the time positions assigned to calling ones of said lines, a plurality of impulse responsive revertive call trunks common to said lines, means controlled in part by the pulses developed by said pulse developing means in the time position assigned to a calling one of said lines for operatively associating one of said trunks with said one calling line, means including said one trunk for transmitting a party line ringing signal over said one calling line in accordance with the identity of the called substation associated therewith, and means for releasing said one trunk from said one calling line when the revertive call is answered.

6. In an automatic telephone system, a plurality of lines, each of said lines having assigned thereto one of a plurality of time positions which recur in repetitive time position frames, the number of said time positions being less than the number of said lines and at least some of said lines having a plurality of substations associated therewith each identifiable by a different party line ringing signal, means for developing pulses in the time positions assigned to calling ones of said lines, a plurality of impulse responsive revertive call trunks common to said lines, means controlled in part by the pulses developed by said pulse developing means in the time position assigned to a calling one of said lines for operatively associating one of said trunks with said one calling line, means including said one trunk for selectively signalling the substations associated with said one calling line in setting up a revertive call connection between different substations associated therewith, and means for releasing said one trunk from said one calling line when the revertive call is answered.

7. In an automatic telephone system, a plurality of lines, each of said lines having assigned thereto one of a plurality of time positions which recur in repetitive time position frames, the number of said time positions being less than the number of said lines and at least some of said lines having a plurality of substations associated therewith each identifiable by a different party line ringing signal, means for developing pulses in the time positions assigned to calling ones of said lines, a plurality of impluse responsive revertive call trunks common to said lines, means controlled in part by the pulses developed by said pulse developing means in the time position assigned to a calling one of said lines for operatively associating one of said trunks with said one calling line, means including said one trunk for selectively signalling the substations associated with said one calling line in setting up a revertive call connection between different substations associated therewith, and means for releasing said one trunk from said one calling line after a ringing timeout interval in the event the revertive call is not answered during said ringing timeout interval.

8. In an automatic telephone system, a plurality of lines, each of said lines having assigned thereto one of a plurality of time positions which recur in repetitive time position frames, the number of said time positions being less than the number of said lines and at least some of said lines having a plurality of substations associated therewith each identifiable by a different party line ringing signal, means for developing pulses in the time positions assigned to calling ones of said lines, a plurality of impulse responsive revertive call trunks common to said lines, means controlled in part by the pulses developed by said pulse developing means in the time position assigned to a calling one of said lines for operatively associating one of said trunks with said one calling line, means including said one trunk for transmitting a party line ringing signal over said one calling line in accordance with the identity of the called substation associated therewith, and means for terminating transmission of said party line ringing signal over said one calling line and releasing said one trunk from said one calling line in response to answering of the revertive call.

9. In an automatic telephone system, a plurality of lines, each of said lines having assigned thereto one of a plurality of time positions which recur in repetitive time position frames, the number of said time positions being less than the number of said lines and at least some of said lines having a plurality of substations associated therewith each identifiable by a different party line ringing signal, means for developing pulses in the time positions assigned to calling ones of said lines, a plurality of impulse responsive revertive call trunks common to said lines, means controlled in part by the pulses developed by said pulse developing means in the time position assigned to a calling one of said lines for operatively associating one of said trunks with said one calling line, means including said one trunk for transmitting a party line ringing signal over said one calling line in accordance with the identity of the called substation associated therewith, means for terminating transmission of said party line ringing signal over said one calling line in response to answering of the revertive call, and means controlled in part by said last named means for releasing said one trunk from said one calling line.

10. In an automatic telephone system, a multiparty subscriber's line having a plurality of substations associated therewith identifiable by ringing signals of different frequencies, a line circuit extending to said multiparty line, a ringing conductor extending to said line circuit, means for successively impressing different ringing frequencies on said conductor during successive ringing periods in a repetitive ringing cycle, and means responsive to switch directing impulses transmitted over said multiparty line for connecting said ringing conductor to said line during the ringing periods corresponding to the ringing frequencies assigned to both the calling and called substations in setting up a revertive call connection between said calling and called substations.

11. In an automatic telephone system, a multiparty subscriber's line, having a plurality of substations associated therewith identifiable by ringing signals of different frequencies, a line circuit extending to said multiparty line, a ringing conductor extending to said line circuit, means for successively impressing different ringing frequencies on said conductor during successive ringing periods in a repetitive ringing cycle, means responsive to switch directing impulses transmitted over said multiparty line for connecting said ringing conductor to said line during the ringing periods corresponding to the ringing frequencies assigned to both the calling and called substations in setting up a revertive call connection between said calling and called substations, and means responsive to a call answering operation at either the calling or called substation for disconnecting said conductor from said line to terminate transmission of ringing frequency signals assigned to both said calling and called substations over said line.

12. In an automatic telephone system, a multiparty subscriber's line having a plurality of substations associated therewith, each of said substations having a different party line ringing signal assigned thereto and at least two of said ringing signals comprising different codes of the same ringing frequency, means responsive to dial impulses transmitted over said line for transmitting over said line the party line ringing signals assigned to both the calling and called substations in setting up a revertive call connection between any pair of substations other than said two substations, and means responsive to initiation of a revertive call at one of said two substations and intended for the other of said two substations for preventing the transmission over said line of the party line ringing signal assigned to said one substation.

13. In an automatic telephone system, a multiparty subscriber's line having a plurality of substations associated therewith, each of said substations having a different party line ringing signal assigned thereto and at least two of said ringing signals comprising different codes of the same ringing frequency, means responsive to dial impulses transmitted over said line for transmitting over said line the party line ringing signals assigned to both the calling and called substations in setting up a revertive call connection between any pair of substations other than said two substations, and means responsive to initiation of a revertive call at one of said two substations and intended for the other of said two substations for transmitting over said line only the party line ringing signal assigned to the called one of said two substations.

14. In an automatic telephone system, a plurality of lines, each of said lines having assigned thereto one of a plurality of time positions which recur in repetitive time position frames, the number of said time positions being less than the number of said lines and at least some of said lines having a plurality of substations associated therewith, and means controlled in accordance with the time position assigned to a calling one of said lines for setting up a revertive call connection between different substations associated with said calling line.

15. In an automatic telephone system, a plurality of lines having individually assigned thereto different time positions in repetitive time position frames, at least some of said lines having a plurality of substations associated therewith, means for developing pulses in the time position assigned to a calling one of said lines, means for modulating switch directing impulses transmitted over said calling line on said developed pulses, and means controlled by said switch directing impulse modulation for registering information concerning the substation associated with said calling line at which said switch directing impulses are initiated.

16. In an automatic telephone system, a plurality of lines having individually assigned thereto different time positions in repetitive time position frames, at least some of said lines having a plurality of substations associated therewith, having individually assigned thereto different party line identification numbers, means for developing pulses in the time position assigned to a calling one of said lines, means for modulating switch directing impulses transmitted over said calling line on said developed pulses, means for detecting the switch directing impulse modulation carried by said developed pulses, and means controlled by said detected switch directing impulse modulation for registering the numerical value of the party line identification number assigned to the substation associated with said calling line at which said switch directing impulses are initiated.

17. In an automatic telephone system, a plurality of lines, at least some of said lines having a plurality of substations associated therewith, a plurality of trunks having individually assigned thereto different time positions in repetitive time position frames, means for operatively associating a calling one of said lines with a free one of said trunks in the time position assigned thereto, and means including said one trunk for setting up a revertive call connection between different substations associated with said calling line.

18. In an automatic telephone system, a plurality of lines, at least some of said lines having a plurality of substations associated therewith, a plurality of trunks having individually assigned thereto different time positions in repetitive time position frames, means for operatively associating a calling one of said lines with a free one of said trunks in the time position assigned thereto, and means included in said one trunk for registering information concerning the calling substation associated with said calling line.

19. In an automatic telephone system, a plurality of lines, at least some of said lines having a plurality of substations associated therewith, a plurality of trunks having individually assigned thereto different time positions in repetitive time position frames, means for operatively associating a calling one of said lines with a free one of said trunks in the time position assigned thereto, and means including said one trunk for selectively signalling the substations associated with said calling line in setting up a revertive all connection between different substations associated with said calling line.

20. In an automatic telephone system, a plurality of lines, at least some of said lines having a plurality of substations associated therewith each identifiable by a different party line ringing signal, a plurality of trunks having individually assigned thereto different time positions in repetitive time position frames, means for operatively associating a calling one of said lines with a free one of said trunks in the time position assigned thereto, means for transmitting switch directing impulses transmitted over said calling line to said one trunk in the time position assigned thereto, means included in said trunk for selecting the party line ringing signal assigned to the called substation associated with said calling line, and means including said trunk for transmitting said selected party line ringing signal over said calling line after the calling party has hung up.

21. In an automatic telephone system, a plurality of lines, at least some of said lines having a plurality of substations associated therewith each identifiable by a different party line ringing signal, a plurality of trunks having individually assigned thereto different time positions in repetitive time position frames, means for operatively associating a calling one of said lines with a free one of said trunks in the time position assigned thereto, means for transmitting switch directing impulses transmitted over said calling line to said one trunk in the time position assigned thereto, means included in said trunk for selecting the party line ringing signal assigned to the called substation associated with said calling line, means including said trunk for transmitting said selected party line ringing signal over said calling line after the calling party has hung up, and means for holding said trunk operatively associated with said calling line while the calling party hangs up to permit transmission of said ringing signal over said calling line.

22. In an automatic telephone system, a plurality of lines, at least some of said lines having a plurality of substations associated therewith, a plurality of trunks having individually assigned thereto different time positions in repetitive time position frames, selector means directively controllable over any calling one of said lines for operatively associating the calling line with a free one of said trunks in the time position assigned thereto, means included in said one trunk for conditioning said selector means to remain operatively associated with said calling line while the calling party hangs up to permit completion of a revertive call, and means including said one trunk for selectively signalling the substation associated with said calling line after the calling party has hung up.

23. In an automatic telephone system, a plurality of lines, at least some of said lines having a plurality of substations associated therewith, a plurality of trunks having individually assigned thereto different time positions in repetitive time position frames, selector means directively controllable over any calling one of said lines for operatively associating the calling line with a free one of said trunks in the time position assigned thereto, a control channel interconnecting said selector means and said trunks, means included in said one trunk for transmitting a revertive call control signal over said channel to said selector means in response to completion of dialing at the calling substation, means included in said selector means and responsive to the revertive call control signal transmitted over said channel for conditioning said selector means to remain operatively associated with said calling line while the calling party hangs up to permit completion of a revertive call, and means including said one trunk for selectively signalling the substations associated with said calling line after the calling party has hung up.

24. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for operatively associating a calling one of said lines with a free one of said selectors in the time position assigned to said calling line, means included in said one selector and responsive to switch directing impulses transmitted over said calling line for operatively associating said one selector with a free one of said trunks in the time position assigned to said one trunk, means included in said one trunk and responsive to switch directing impulses transmitted over said calling line for selecting the party line ringing signal assigned to the called substation, and means including said one trunk and said one selector for transmitting said selected party line ringing signal over said calling line.

25. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for operatively associating a calling one of said lines with a free one of said selectors in the time position assigned to said calling line, means included in said one selector and responsive to switch directing impulses transmitted over said calling line for operatively associating said one selector with a free one of said trunks in the time position assigned to said one trunk, a control channel interconnecting said selectors and said revertive call trunks, means included in said one trunk and responsive to switch directing impulses transmitted over said calling line for selecting the party line ringing signal assigned to the called substation, means included in said one trunk and responsive to completion of dialing at the calling substation for transmitting a revertive call control signal over said channel, means included in said one selector and responsive to the control signal transmitted over said channel for conditioning said one selector to remain operatively associated with the time position assigned to said calling line while the calling party hangs up to permit completion of a revertive call, and means including said one trunk and said one selector for transmitting said selected party line ringing signal over said calling line after the calling party has hung up.

26. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for operatively associating a calling one of said lines with a free one of said selectors in the time position assigned to said calling line, means included in said one selector and responsive to switch directing impulses transmitted over said calling line for operatively associating said one selector with a free one of said trunks in the time position assigned to said one trunk, a control channel interconnecting said selectors and said revertive call trunks, means included in said one trunk and responsive to switch directing impulses transmitted over said calling line for selecting the party line ringing signal assigned to the called substation, means included in said one trunk and responsive to completion of dialing at the calling substation for conditioning said one trunk to remain operatively associated with said one selector while the calling party hangs up to permit completion of a revertive call and for transmitting a revertive call control signal over said channel, means included in said one selector and responsive to the control signal transmitted over said channel for conditioning said one selector to remain operatively associated with the time position assigned to said calling line while the calling party hangs up to permit completion of a revertive call, and means including said one trunk and said one selector for transmitting said selected party line ringing signal over said calling line after the calling party has hung up.

27. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for operatively associating a calling one of said lines with a free one of said selectors in the time position assigned to said calling line, means included in said one selector and responsive to switch directing impulses transmitted over said calling line for operatively associating said one selector with a free one of said trunks in the time position assigned to said one trunk, a control channel interconnecting said selectors and said revertive call trunks, means included in said one trunk and responsive to switch directing impulses transmitted over said calling line for selecting the party line ringing signal assigned to the called substation, means included in said one trunk and responsive to completion of dialing at the calling substation for transmitting a revertive call control signal over said channel, means included in said one selector and responsive to the control signal transmitted over said channel for conditioning said one selector to remain operatively associated with the time position assigned to said calling line while the calling party hangs up to permit completion of a revertive call, means including said one trunk and said one selector for transmitting said selected party line ringing signal over said calling line after the calling party has hung up, and means for releasing said one trunk when the revertive call is answered.

28. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for operatively associating a calling one of said lines with a free one of said selectors in the time position assigned to said calling line, means included in said one selector and responsive to switch directing impulses transmitted over said calling line for operatively associating said one selector with a free one of said trunks in the time position assigned to said one trunk, a control channel interconnecting said selectors and said revertive call trunks, means included in said one trunk and responsive to switch directing impulses transmitted over said calling line for selecting the party line ringing signal assigned to the called substation, means included in said one trunk and responsive to completion of dialing at the calling substation for transmitting a revertive call control signal over said channel, means included in said one selector and responsive to the control signal transmitted over said channel for conditioning said one selector to remain operatively associated with the time position assigned to said calling line while the calling party hangs up to permit completion of a revertive call, means including said one trunk and said one selector for transmitting said selected party line ringing signal over said calling line after the calling party has hung up, and means for releasing said one trunk while maintaining said one selector operatively associated with said calling line when the revertive call is answered.

29. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for operatively associating a calling one of said lines with a free one of said selectors in the time position assigned to said calling line, means included in said one selector and responsive to switch directing impulses transmitted over said calling line for operatively associating said one selector with a free one of said trunks in the time position assigned to said one trunk, a control channel interconnecting said selectors and said revertive call trunks, means included in said one trunk and responsive to switch directing impulses transmitted over said calling line for selecting the party line ringing signal assigned to the called substation, means included in said one trunk and responsive to completion of dialing at the calling substation for transmitting a revertive call control signal over said channel, means included in said one selector and responsive to the control signal transmitted over said channel for conditioning said one selector to remain operatively associated with the time position assigned to said calling line while the calling party hangs up to permit completion of a revertive call, means including said one trunk and said one selector for transmitting said selected party line ringing signal over said calling line after the calling party has hung up, and means for releasing both said one selector and said one trunk if said ringing signal is not answered during a ringing timeout interval.

30. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for operatively associating a calling one of said lines with a free one of said selectors in the time position assigned to said calling line, means included in said one selector and responsive to switch directing impulses transmitted over said calling line for operatively associating said one selector with a free one of said trunks in the time position assigned to said one trunk, a control channel interconnecting said selectors and said revertive call trunks, means included in said one trunk and responsive to switch directing impulses transmitted over said calling line for selecting the party line ringing signal assigned to the called substation, means included in said one trunk and responsive to completion of dialing at the calling substation for transmitting a revertive call control signal over said channel, means included in said one selector and responsive to the control signal transmitted over said channel for conditioning said one selector to remain operatively associated with the time position assigned to said calling line while the calling party hangs up to permit completion of a revertive call, means including said one trunk and said one selector for transmitting said selected party line ringing signal over said calling line after the calling party has hung up, means for initiating a ringing timeout interval concurrently with initiation of transmission of said ringing signal over said calling line, and means for releasing said one trunk and said one selector from said calling line at the end of said ringing timeout interval if the call is not answered at that time.

31. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for operatively associating a calling one of said lines with a free one of said selectors in the time position assigned to said calling line, means included in said one selector and responsive to switch directing impulses transmitted over said calling line for operatively associating said one selector with a free one of said trunks in the time position assigned to said one trunk, a control channel interconnecting said selectors and said revertive call trunks, means included in said one trunk and responsive to switch directing impulses transmitted over said calling line for selecting the party line ringing signal assigned to the called substation, means included in said one trunk and responsive to completion of dialing at the calling substation for transmitting a revertive call control signal over said channel, means included in said one selector and responsive to the control signal transmitted over said channel for conditioning said one selector to remain operatively associated with the time position assigned to said calling line while the calling party hangs up to permit completion of a revertive call, means for transmitting a first disconnect signal over said calling line when the calling party hangs up, means for developing a ring start signal a predetermined time interval after transmission of said first disconnect signal over said calling line, and means controlled in part by said ring start signal for transmitting said selected party line ringing signal over said calling line.

32. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for operatively associating a calling one of said lines with a free one of said selectors in the time position assigned to said calling line, a selector signal channel interconnecting said selectors and said revertive call trunks, means included in said one selector and responsive to switch directing impulses transmitted over said calling line for releasing selector forward pulses to said selector signal channel in the time position assigned to a free one of said trunks, means in said one trunk and responsive to said selector forward pulses for operatively associating said one trunk with said one selector in the time position assigned to said one trunk, a control channel interconnecting said selectors and said trunks, means included in said trunk and responsive to switch directing impulses transmitted over said calling line for selecting the party line ringing signal assigned to the called substation, means included in said one trunk and responsive to completion of dialing at the calling substation for transmitting a revertive call control signal over said control channel, said control signal comprising a series of pulses individually appearing in the time position assigned to said one trunk, means included in said one selector and responsive to said series of pulses transmitted over said control channel for conditioning said one selector to remain operatively associated with the time position assigned to said calling line while the calling party hangs up to permit completion of the revertive call, and means including said one trunk and said one selector for transmitting said selected party line ringing signal over said calling line after the calling party hangs up.

33. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for developing calling line pulses in the time position assigned to a calling one of said lines during periods when an off hook condition exists on said calling line, means controlled in part by said calling line pulses for operatively associating a free one of said selectors with said calling line, a selector signal channel interconnecting said selectors and said revertive call trunks, means included in said one selector and responsive to switch directing impulses transmitted over said calling line for releasing selector forward pulses to said selector signal channel in the time position assigned to a free one of said trunks, means in said one trunk and responsive to said selector forward pulses for operatively associating said one trunk with said one selector in the time position assigned to said one trunk, a control channel interconnecting said selectors and said trunks, means included in said trunk and responsive to switch directing impulses transmitted over said calling line for selecting the party line ringing signal assigned to the called substation, means included in said one trunk and responsive to completion of dialing at the calling substation for transmitting a revertive call control signal over said control channel, said control signal comprising a series of pulses individually appearing in the time position assigned to said one trunk, means included in said one selector and responsive to said series of pulses transmitted over said control channel for conditioning said one selector to remain operatively associated with the time position assigned to said calling line when the calling party hangs up to permit completion of the revertive call and development of said calling line pulses is terminated, and means including said one trunk and said one selector for transmitting said selected party line ringing signal over said calling line after the calling party hangs up.

34. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for developing calling line pulses in the time position assigned to a calling one of said lines during periods when an off hook condition exists on said calling line, means controlled in part by said calling line pulses for operatively associating a free one of said selectors with said calling line, a selector signal channel interconnecting said selectors and said revertive call trunks, means included in said one selector and responsive to switch directing impulses transmitted over said calling line for releasing selector forward pulses to said selector signal channel in the time position assigned to a free one of said trunks, means in said one trunk and responsive to said selector forward pulses for operatively associating said one trunk with said one selector in the time position assigned to said one trunk, a control channel interconnecting said selectors and said trunks, means included in said trunk and responsive to switch directing impulses transmitted over said calling line for selecting the party line ringing signal assigned to the called substation, means included in said one trunk and responsive to completion of dialing at the calling substation for transmitting a revertive call control signal over said control channel, said control signal comprising a series of pulses individually appearing in the time position assigned to said one trunk, means included in said one selector and responsive to said series of pulses transmitted over said control channel for conditioning said one selector to remain operatively associated with the time position assigned to said calling line when the calling party hangs up to permit completion of the revertive call and development of said calling line pulses is terminated, means for terminating transmission of said selector forward pulses over said selector signal channel when the calling party hangs up, means included in said one trunk for holding said one trunk operatively associated with said one selector when selector forward pulse transmission is terminated, and means including said one trunk and said one selector for transmitting said selected party line ringing signal over said calling line after the calling party hangs up.

35. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for developing calling line pulses in the time position assigned to a calling one of said lines during periods when an off hook condition exists on said calling line, means controlled in part by said calling line pulses for operatively associating a free one of said selectors with said calling line, a selector signal channel interconnecting said selectors and said revertive call trunks, means included in said one selector and responsive to switch directing impulses transmitted over said calling line for releasing selector forward pulses to said selector signal channel in the time position assigned to a free one of said trunks, means in said one trunk and responsive to said selector forward pulses for operatively associating said one trunk with said one selector in the time position assigned to said one trunk, a control channel interconnecting said selectors and said trunks, means included in said trunk and responsive to switch directing impulses transmitted over said calling line for selecting the party line ringing signal assigned to the called substation, means included in said one trunk and responsive to completion of dialing at the calling substation for transmitting a revertive call control signal over said control channel, said control signal comprising a series of pulses individually appearing in the time position assigned to said one trunk, means included in said one selector and responsive to said series of pulses transmitted over said control channel for conditioning said one selector to remain operatively associated with the time position assigned to said calling line when the calling party hangs up to permit completion of the revertive call and development of said calling line pulses is terminated, means for terminating transmission of said selector forward pulses over said selector signal channel when the calling party hangs up, means included in said one trunk for holding said one trunk operatively associated with said one selector when selector forward pulse transmission is terminated, means including said one trunk and said one selector for transmitting said selected party line ringing signal over said calling line after the calling party hangs up, means included in said one selector for resuming transmission of said selector forward pulses over said selector signal channel in the time position assigned to said one trunk when the revertive call is answered, and ring trip means included in said one trunk and responsive to resumption of transmission of said selector forward pulses over said selector signal channel for terminating transmission of said selected party line ringing signal over said calling line.

36. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for developing calling line pulses in the time position assigned to a calling one of said lines during periods when an off hook condition exists on said calling line, means controlled in part by said calling line pulses for operatively associating a free one of said selectors with said calling line, a selector signal channel interconnecting said selectors and said revertive call trunks, means included in said one selector and responsive to switch directing impulses transmitted over said calling line for releasing selector forward pulses to said selector signal channel in the time position assigned to a free one of said trunks, means in said one trunk and responsive to said selector forward pulses for operatively associating said one trunk with said one selector in the time position assigned to said one trunk, a control channel interconnecting said selectors and said trunks, means included in said trunk and responsive to switch directing impulses transmitted over said calling line for selecting the party line ringing signal assigned to the called substation, means included in said one trunk and responsive to completion of dialing at the calling substation for transmitting a revertive call control signal over said control channel, said control signal comprising a series of pulses individually appearing in the time position assigned to said one trunk, means included in said one selector and responsive to said series of pulses transmitted over said control channel for conditioning said one selector to remain operatively associated with the time position assigned to said calling line when the calling party hangs up to permit completion of the revertive call and development of said calling line pulses is terminated, means for terminating transmission of said selector forward pulses over said selector signal channel when the calling party hangs up, means included in said one trunk for holding said one trunk operatively associated with said one selector when selector forward pulse transmission is terminated, means including said one trunk and said one selector for transmitting said selected party line ringing signal over said calling line after the calling party hangs up, means included in said one selector for resuming transmission of said selector forward pulses over said selector signal channel in the time position assigned to said one trunk when the revertive call is answered, ring trip means included in said one trunk and responsive to resumption of transmission of said selector forward pulses over said selector signal channel for terminating transmission of said selected party line ringing signal over said calling line, means included in said one trunk and controlled in part by said ring trip means for transmitting a second revertive call control signal over said control channel when transmission of said selected party line ringing signal is terminated, and means included in said one selector and responsive to said second control signal transmitted over said control channel for conditioning said one selector to release from said calling line when an off hook condition no longer exists on said calling line.

37. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for operatively associating a calling one of said lines with a free one of said selectors in the time position assigned to said calling line, a selector signal channel interconnecting said selectors and said revertive call trunks, means included in said one selector and responsive to switch directing impulses transmitted over said calling line for releasing selector forward pulses to said selector signal channel in the time position assigned to a free one of said trunks, means in said one trunk and responsive to said selector forward pulses for operatively associating said one trunk with said one selector in the time position assigned to said one trunk, a control channel interconnecting said selectors and said trunks, means included in said trunk and responsive to switch directing impulses transmitted over said calling line for selecting the party line ringing signal assigned to the called substation, means included in said one trunk and responsive to completion of dialing at the calling substation for transmitting a revertive call control signal over said control channel, said control signal comprising a series of pulses individually appearing in the time position assigned to said one trunk, means included in said one selector and responsive to said series of pulses transmitted over said control channel for conditioning said one selector to remain operatively associated with the time position assigned to said calling line while the calling party hangs up to permit completion of the revertive call, means including said one trunk and said one selector for transmitting said selected party line ringing signal over said calling line after the calling party hangs up, means included in said one trunk and responsive to a call answering signal transmitted over said calling line for transmitting a second control signal over said control channel, and means included in said one selector and responsive to said second control signal transmitted over said control channel for conditioning said one selector to release from said calling line when an off-hook condition no longer exists on said calling line.

38. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for operatively associating a calling one of said lines with a free one of said selectors in the time position assigned to said calling line, a selector signal channel interconnecting said selectors and said revertive call trunks, means included in said one selector and responsive to switch directing impulses transmitted over said calling line for releasing selector forward pulses to said selector signal channel in the time position assigned to a free one of said trunks, means in said one trunk and responsive to said selector forward pulses for operatively associating said one trunk with said one selector in the time position assigned to said one trunk, a control channel interconnecting said selectors and said trunks, means included in said trunk and responsive to switch directing impulses transmitted over said calling line for selecting the party line ringing signal assigned to the called substation, means including said one trunk and said one selector for transmitting said selected party line ringing signal over said calling line after the calling party hangs up, means included in said one trunk and responsive to a call answering signal transmitted over said calling line for transmitting a revertive call control signal over said control channel, means included in said one selector and responsive to said control signal transmitted over said control channel for terminating transmission of said selector forward pulses over said selector signal channel, and means included in said one trunk and responsive to termination of transmission of said selector forward pulses over said selector signal channel for releasing said one trunk from said one selector.

39. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for operatively associating a calling one of said lines with a free one of said selectors in the time position assigned to said calling line, a selector signal channel interconnecting said selectors and said revertive call trunks, means included in said one selector and responsive to switch directing impulses transmitted over said calling line for releasing selector forward pulses to said selector signal channel in the time position assigned to a free one of said trunks, means in said one trunk and responsive to said selector forward pulses for operatively associating said one trunk with said one selector in the time position assigned to said one trunk, a control channel interconnecting said selectors and said trunks, means included in said trunk and responsive to switch directing impulses transmitted over said calling line for selecting the party line ringing signal assigned to the called substation, means including said one trunk and said one selector for transmitting said selected party line ringing signal over said calling line after the calling party hangs up, means included in said one trunk and responsive to a call answering signal transmitted over said calling line for transmitting a revertive call control signal over said control channel, means included in said one selector and responsive to said control signal transmitted over said control channel for terminating transmission of said selector forward pulses over said selector signal channel, means included in said one trunk and responsive to termination of transmission of said selector forward pulses over said selector signal channel for releasing said one trunk from said one selector, and means for releasing said one selector from said calling line when the revertive call is terminated.

40. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for developing calling line pulses in the time position assigned to a calling one of said lines during periods when an off hook condition exists on said calling line, means controlled in part by said calling line pulses for operatively associating a free one of said selectors with said calling line, a selector signal channel interconnecting said selectors and said revertive call trunks, means included in said one selector and responsive to switch directing impulses transmitted over said calling line for releasing selector forward pulses to said selector signal channel in the time position assigned to a free one of said trunks, means in said one trunk and responsive to said selector forward pulses for operatively associating said one trunk with said selector in the time position assigned to said one trunk, a control channel interconnecting said selectors and said trunks, means included in said trunk and responsive to switch directing impulses transmitted over said calling line for selecting the party line ringing signal assigned to the called substation, means included in said one trunk and responsive to completion of dialing at the calling substation for transmitting a revertive call control signal over said control channel, said control signal comprising a series of pulses individually appearing in the time position assigned to said one trunk, means included in said one selector and responsive to said series of pulses transmitted over said control channel for conditioning said one selector to remain operatively associated with the time position assigned to said calling line when the calling party hangs up to permit completion of the revertive call and development of said calling line pulses is terminated, means for terminating transmission of said selector forward pulses over said selector signal channel when the calling party hangs up, means included in said one trunk for holding said one trunk operatively associated with said one selector when selector forward pulse transmission is terminated, means including said one trunk and said one selector for transmitting said selected party line ringing signal over said calling line after the calling party hangs up, means included in said one selector for resuming transmission of said selector forward pulses over said selector signal channel in the time position assigned to said one trunk when the revertive call is answered, ring trip means included in said one trunk and responsive to resumption of transmission of said selector forward pulses over said selector signal channel for terminating transmission of said selected party line ringing signal over said calling line, means included in said one trunk and controlled in part by said ring trip means for transmitting a second revertive call control signal over said control channel when transmission of said selected party line ringing signal is terminated, means included in said one selector and responsive to said second control signal transmitted over said control channel for terminating transmission of said selector forward pulses over said selector signal channel, and means included in said one selector and responsive to said second control signal transmitted over said control channel for releasing said one trunk from said one selector.

41. In an automatic telephone system, a plurality of lines having individually assigned thereto different time positions in repetitive time position frames, at least some of said lines having a plurality of substations associated therewith each identifiable by a different party line ringing signal, a plurality of revertive call trunks having individually assigned thereto different ones of said time positions, a plurality of impulse responsive selectors, means for developing calling line pulses in the time position assigned to a calling one of said lines during periods when an off hook condition exists on said calling line, means controlled in part by said calling line pulses for operatively associating a free one of said selectors with said calling line, a selector signal channel interconnecting said selectors and said revertive call trunks, means included in said one selector and responsive to switch directing impulses transmitted over said calling line for releasing selector forward pulses to said selector signal channel in the time position assigned to a free one of said trunks, means in said one trunk and responsive to said selector forward pulses for operatively associating said one trunk with said one selector in the time position assigned to said one trunk, a control channel interconnecting said selectors and said trunks, means included in said trunk and responsive to switch directing impulses transmitted over said calling line for selecting the party line ringing signal assigned to the called substation, means included in said one trunk and responsive to completion of dialing at the calling substation for transmitting a revertive call control signal over said control channel, said control signal comprising a series of pulses individually appearing in the time position assigned to said one trunk, means included in said one selector and responsive to said series of pulses transmitted over said control channel for conditioning said one selector to remain operatively associated with the time position assigned to said calling line when the calling party hangs up to permit completion of the revertive call and development of said calling line pulses is terminated, means for terminating transmission of said selector forward pulses over said selector signal channel when the calling party hangs up, means included in said one trunk for holding said one trunk operatively associated with said one selector when selector forward pulse transmission is terminated, means including said one trunk and said one selector for transmitting said selected party line ringing signal over said calling line after the calling party hangs up, means included in said one selector for resuming transmission of said selector forward pulses over said selector signal channel in the time position assigned to said one trunk when the revertive call is answered, ring trip means included in said one trunk and responsive to resumption of transmission of said selector forward pulses over said selector signal channel for terminating transmission of said selected party line ringing signal over said calling line, means included in said one trunk and controlled in part by said ring trip means for transmitting a second revertive call control signal over said control channel when transmission of said selected party line ringing signal is terminated, means included in said one selector and responsive to said second control signal transmitted over said control channel for terminating transmission of said selector forward pulses over said selector signal channel, means included in said one selector and responsive to said second control signal transmitted over said control channel for releasing said one trunk from said one selector, and means for transmitting a revertive call tone signal over said calling line during the period between termination of said ringing signal and release of said one trunk.

42. In an automatic telephone system, a group of more than one hundred lines, at least some of said lines having a plurality of substations associated therewith identifiable by different party line ringing signals, means responsive to the initiation of a call on one of said multiparty lines for developing pulses representing said calling line and distinguishable from pulses representing other lines of the system, and means responsive to said pulses and directively controllable over said calling line for setting up a revertive call connection between different substations associated with said calling line.

43. In an automatic telephone system, a plurality of lines, at least some of said lines having a plurality of substations associated therewith, each of said substations having a directory number assigned thereto and a special revertive call number assigned thereto, means responsive to the initiation of a call on one of said multiparty lines for developing pulses representing said calling line and distinguishable from pulses representing other lines of the system, and means responsive to said pulses and directively controllable over said calling line for setting up a revertive call connection between different substations associated with said calling line.

44. In an automatic telephone system, a plurality of lines, at least some of said lines having a plurality of substations associated therewith each identifiable by a different party line ringing signal, means responsive to initiation of a revertive call on a calling one of said multiparty lines for developing pulses representing said calling line, and means responsive to said pulses and directively controllable in accordance with switch directing impulses initiated at the calling substation for registering the identity of both the calling and called substations on said calling line.

45. In an automatic telephone system, a plurality of lines having individually assigned thereto different time positions in repetitive time position frames, at least some of said lines having a plurality of substations associated therewith having individually assigned thereto different ringing digits, and impulse responsive means controlled in accordance with the time position assigned to a revertively calling line for registering the numerical values of the ringing digits assigned to both the calling and called substations on said revertively calling line in response to switch directing impulses initiated at the calling substation.

46. In an automatic telephone system, a plurality of lines, at least some of said lines having a plurality of substations connected thereto each identifiable by a different party line ringing signal, a plurality of impulse responsive revertive call trunks common to said lines, means responsive to the initiation of a call on one of said multiparty lines for developing pulses representing said calling line and distinguishable from pulses representing other lines of the system, selector means common to said lines and responsive to said developed pulses for operatively associating said calling multiparty line with an idle one of said revertive call trunks, and means including said one trunk for setting up a revertive call connection between different substations connected to said calling multiparty line.

47. In an automatic telephone system, a plurality of lines, at least some of said lines having a plurality of substations connected thereto each identifiable by a different party line ringing signal, a plurality of electronic impulse responsive revertive call trunks common to said lines, electronic selector means common to said lines for operatively associating a calling one of said multiparty lines with an idle one of said revertive call trunks, electronic means including said one trunk for selecting the party line ringing signal assigned to the called substation associated with said calling multiparty line in response to dial impulses initiated at the calling substation, electronic means including said one trunk for transmitting said selected party line ringing signal over said multiparty calling line after the calling subscriber has hung up, and electronic means including said one trunk for transmitting a revertive call tone signal over said multiparty calling line when the revertive call is answered by the calling or called subscriber.

48. In an automatic telephone system, a plurality of lines, at least some of said lines having a plurality of substations associated therewith, means responsive to initiation of a revertive call on a calling one of said multiparty lines for developing pulses representing said calling line, a plurality of impulse responsive revertive call trunks common to said lines, means controlled in part by said pulses for operatively associating one of said trunks with said calling multiparty line, and means including said one trunk for setting up a revertive call connection between different substations associated with said calling multiparty line.

49. In an automatic telephone system, a plurality of lines, at least some of said lines having a plurality of substations associated therewith, each identifiable by a different party line ringing signal, means responsive to initiation of a revertive call on a calling one of said multiparty lines for developing pulses representing said calling line, a plurality of impulse responsive revertive call trunks common to said lines, means controlled in part by said pulses for operatively associating one of said trunks with said calling multiparty line, means including said one trunk for transmitting a party line ringing signal over said calling multiparty line in accordance with the identity of the called substation associated therewith, and means for releasing said one trunk from said calling multiparty line when the revertive call is answered.

50. In an automatic telephone system, a plurality of lines, at least some of said lines having a plurality of substations associated therewith, means responsive to initiation of a revertive call on a calling one of said multiparty lines for developing pulses representing said calling line, a plurality of impulse responsive revertive call trunks common to said lines, means controlled in part by said pulses for operatively associating one of said trunks with said calling multiparty line, means including said one trunk for setting up a revertive call connection between different substations associated with said calling multiparty line, and means for releasing said one trunk from said calling multiparty line after a ringing time-out interval in the event the revertive call is not answered during said ringing time-out interval.

51. In an automatic telephone system, a multiparty subscriber's line having a plurality of substations associated therewith, each of said substations having a different party line ringing signal assigned thereto and at least two of said substations having assigned thereto ringing signals having a common signalling characteristic, means responsive to dial impulses transmitted over said line for transmitting over said line the party line ringing signals assigned to both the calling and called substations in setting up a revertive call connection between any pair of substations other than said two substations, and means responsive to initiation of a revertive call at one of said two substations and intended for the other of said two substations for preventing the transmission over said line of the party line ringing signal assigned to said one substation.

52. In an automatic telephone system, a plurality of lines each having a different directory number assigned thereto, the last digit of each number comprising a ringing digit, at least some of said lines having a plurality of substations associated therewith having different ringing digits assigned thereto, means responsive to the initiation of a call on one of said multiparty lines for developing pulses representing said calling line and distinguishable from pulses representing other lines of the system, means for modulating said developed pulses in accordance with dial impulses transmitted over the calling line, and means responsive to said pulses and directively controllable in response to dialing at a calling one of said substations the ringing digits assigned to both the calling and called substations for setting up a revertive call connection between said calling and called substations.

53. In an automatic telephone system, a plurality of lines, at least some of said lines having a plurality of substations associated therewith, means responsive to the initiation of a call on one of said multiparty lines for developing pulses representing said calling line and distinguishable from pulses representing other lines of the system, means for modulating said developed pulses in accordance with calling substation identifying signals, and substation identification means responsive to said signals for registering the particular designation of the calling substation to distinguish the same from other substations on said calling multiparty line.

54. In an automatic telephone system, a plurality of lines, at least some of said lines having a plurality of substations associated therewith each identifiable by a different party line ringing signal, means responsive to initiation of a revertive call on a calling one of said multiparty lines for developing pulses representing said calling line, a plurality of impulse responsive revertive call trunks common to said lines, means controlled in part by said pulses for operatively associating one of said trunks with said calling multiparty line, means including said one trunk for transmitting a party line ringing signal over said calling multiparty line in accordance with the identity of the called substation associated therewith after the calling party has hung up, and means for holding said one trunk operatively associated with said calling multiparty line while the calling party hangs up to permit transmission of said ringing signal over said calling line.

55. In an automatic telephone system, a plurality of lines, at least some of said lines having a plurality of substations associated therewith, a plurality of revertive call trunks common to said lines, means responsive to the initiation of a call on one of said multiparty lines for developing pulses representing said calling line and distinguishable from pulses representing other lines of the system, selector means responsive to said developed pulses and directively controllable over said calling multiparty line for operatively associating said calling line with one of said revertive call trunks, and means including said one trunk for setting up a revertive call connection between different substations connected to said calling multiparty line.

56. In an automatic telephone system, a plurality of lines, at least some of said lines having a plurality of substations associated therewith, a plurality of revertive call trunks common to said lines, means responsive to the initiation of a call on one of said multiparty lines for developing pulses representing said calling line and distinguishable from pulses representing other lines of the system, selector means responsive to said developed pulses and directively controllable over said calling multiparty line for operatively associating said calling line with one of said revertive call trunks, means for conditioning said selector means to remain operatively associated with said calling line while the calling party hangs up to permit completion of a revertive call, and means including said one trunk for selectively signalling the substations associated with said calling line after the calling party has hung up.

57. In an automatic telephone system, a plurality of lines, at least some of said lines having a plurality of substations associated therewith, a plurality of revertive call trunks common to said lines, means responsive to the initiation of a call on one of said multiparty lines for developing pulses representing said calling line and distinguishable from pulses representing other lines of the system, selector means responsive to said developed pulses and directively controllable over said calling multiparty line for operatively associating said calling line with one of said revertive call trunks, a control channel interconnecting said selector means and said trunks, means included in said one trunk for transmitting a revertive call control signal over said channel to said selector means in response to completion of dialing at the calling substation, and means included in said selector means and responsive to the revertive call control signal transmitted over said channel for conditioning said selector means to remain operatively associated with said calling line while the calling party hangs up to permit completion of a revertive call.

58. In an automatic telephone system, a plurality of lines, a plurality of trunks, selector means directively controllable over a calling one of said lines for operatively associating said calling line with an idle one of said trunks, a control channel interconnecting said selector means and said trunks, means for developing pulses representing said one trunk and distinguishable from pulses representing other ones of said trunks, means including said control channel for transmitting said developed pulses to said selector means, and means included in said selector means and responsive to said developed pulses for effecting a control operation in said selector means.

59. In an automatic telephone system, a plurality of lines, at least some of said lines having a plurality of substations associated therewith, a plurality of revertive call trunks, selector means directively controllable over a calling one of said lines for operatively associating said calling line with an idle one of said trunks, a control channel interconnecting said selector means and said trunks, means included in said one trunk and responsive to completion of dialing at the calling substation for transmitting pulses representing said one trunk over said control channel to said selector means, and means included in said selector means and responsive to said transmitted pulses for effecting a control operation in said selector means.

60. In an automatic telephone system, a plurality of lines, a plurality of selectors common to said lines, means for operatively associating a calling one of said lines with an idle one of said selectors, a plurality of trunks common to said lines, means in said one selector and directively controllable over said calling line for developing pulses representing one of said trunks and distinguishable from pulses representing other ones of said trunks, means responsive to said developed pulses for operatively associating said one trunk with said one selector, and means included in said one trunk for holding said one trunk operatively associated with said one selector when said developed pulses are terminated.

61. In an automatic telephone system, a plurality of lines, a plurality of selectors common to said lines, means for operatively associating a calling one of said lines with an idle one of said selectors, a plurality of trunks common to said lines, first and second pulse channels interconnecting said selectors and said trunks, means in said one selector for transmitting a first pulse over said first pulse channel operatively to associate an idle one of said trunks with said one selector, and means in said one trunk and responsive to completion of dialing on the calling line for transmitting a second pulse over said second pulse channel to said one selector to effect a control operation therein.

References Cited in the file of this patent

UNITED STATES PATENTS

| | | |
|---|---|---|
| 2,277,228 | Hecht | Mar. 24, 1942 |
| 2,541,362 | Jones | Feb. 13, 1951 |
| 2,550,585 | Murphy | Apr. 24, 1951 |
| 2,555,245 | Powell | May 29, 1951 |
| 2,666,096 | Cornell et al. | Jan. 12, 1954 |
| 2,672,515 | Barlow | Mar. 16, 1954 |